US011746426B2

(12) United States Patent
Agapie et al.

(10) Patent No.: US 11,746,426 B2
(45) Date of Patent: Sep. 5, 2023

(54) STABILIZATION OF A CO-BOUND INTERMEDIATE VIA MOLECULAR TUNING PROMOTES CO2-TO-ETHYLENE CONVERSION

(71) Applicants: California Institute of Technology, Pasadena, CA (US); The Governing Council of the University of Toronto, Toronto (CA)

(72) Inventors: Theodor Agapie, Pasadena, CA (US); Alonso Rosas-Hernandez, Pasadena, CA (US); Fengwang Li, Ontario (CA); Jonas C. Peters, Pasadena, CA (US); Edward H. Sargent, Ontario (CA); Arnaud Thevenon, Pasadena, CA (US)

(73) Assignees: California Institute of Technology, Pasadena, CA (US); The Governing Council of the University of Toronto, Toronto (CA)

( * ) Notice: Subject to any disclaimer, the term of this patent is extended or adjusted under 35 U.S.C. 154(b) by 216 days.

(21) Appl. No.: 16/925,833

(22) Filed: Jul. 10, 2020

(65) Prior Publication Data

US 2021/0062349 A1    Mar. 4, 2021

Related U.S. Application Data

(60) Provisional application No. 62/872,383, filed on Jul. 10, 2019.

(51) Int. Cl.
*C25B 3/25* (2021.01)
*C25B 11/095* (2021.01)
(Continued)

(52) U.S. Cl.
CPC ............... *C25B 3/25* (2021.01); *B01J 23/72* (2013.01); *C25B 9/23* (2021.01); *C25B 11/031* (2021.01);
(Continued)

(58) Field of Classification Search
CPC ........... C25B 3/25; C25B 3/26; C25B 11/031; C25B 11/095; C25B 11/032
See application file for complete search history.

(56) References Cited

U.S. PATENT DOCUMENTS

| 4,897,167 A | 1/1990 | Cook et al. |
| 5,804,045 A | 9/1998 | Orillon et al. |

(Continued)

FOREIGN PATENT DOCUMENTS

| DE | 102016218230 | 3/2018 |
| EP | 3434810 A1 | 1/2019 |

(Continued)

OTHER PUBLICATIONS

Akemann et al. (1991) "Vibrational modes of CO adsorbed on disordered copper films," J. Raman Spectrosc. 22, 797-803.
(Continued)

*Primary Examiner* — Brian W Cohen
(74) *Attorney, Agent, or Firm* — Leydig, Voit & Mayer, Ltd.

(57) ABSTRACT

Aspects included herein include an electrolytic system for electrochemical reduction of carbon dioxide, the system comprising: a cathode comprising: a porous gas-diffusion membrane permeable to $CO_2$; an electrocatalyst layer adjacent to a second side of the gas-diffusion membrane; the electrocatalyst layer comprising: an electrically conductive catalyst; and a selectivity-determining organic material attached to at least a portion of the electrically conductive catalyst; wherein: the organic material is formed of a plu-
(Continued)

rality of oligomers; each oligomer comprises a plurality of covalently bonded base units; each base unit comprises at least one heterocyclic group having at least one nitrogen in its structure; and an anion exchange membrane adjacent to the electrocatalyst layer and positioned between the anode and the cathode; wherein anion exchange membrane is characterized by anion conductivity and the cathode is in ionic communication with the anode via the anion exchange membrane.

32 Claims, 120 Drawing Sheets

(51) Int. Cl.
| | |
|---|---|
| *C25B 11/031* | (2021.01) |
| *C25B 9/23* | (2021.01) |
| *B01J 23/72* | (2006.01) |
| *C25B 13/08* | (2006.01) |
| *C25B 15/02* | (2021.01) |
| *C25B 15/08* | (2006.01) |

(52) U.S. Cl.
CPC ............ *C25B 11/095* (2021.01); *C25B 13/08* (2013.01); *C25B 15/02* (2013.01); *C25B 15/08* (2013.01)

(56) References Cited

U.S. PATENT DOCUMENTS

| | | |
|---|---|---|
| 8,845,878 B2 | 9/2014 | Cole et al. |
| 8,956,990 B2 | 2/2015 | Masel et al. |
| 9,464,359 B2 | 10/2016 | Masel et al. |
| 9,566,574 B2 | 2/2017 | Masel et al. |
| 10,047,446 B2 | 8/2018 | Kaczur et al. |
| 2008/0245672 A1 | 10/2008 | Little et al. |
| 2011/0143254 A1 | 6/2011 | Kongkanand et al. |
| 2011/0226632 A1 | 9/2011 | Cole et al. |
| 2013/0277209 A1 | 10/2013 | Sato et al. |
| 2015/0203977 A1 | 7/2015 | Luca et al. |
| 2016/0108530 A1 | 4/2016 | Masel et al. |
| 2016/0369415 A1 | 12/2016 | Masel et al. |
| 2017/0073825 A1 | 3/2017 | Sugano et al. |
| 2017/0183789 A1 | 6/2017 | Matthews et al. |
| 2018/0291515 A1 | 10/2018 | Han et al. |
| 2021/0218036 A1 | 7/2021 | Sargent et al. |

FOREIGN PATENT DOCUMENTS

| | | |
|---|---|---|
| FR | 2747694 A1 | 10/1997 |
| FR | 3007426 A1 | 12/2014 |
| WO | WO 2018/232515 A1 | 12/2018 |

OTHER PUBLICATIONS

Bielawski et al. (2007) "Efficient and general one-pot synthesis of diaryliodonium triflates: Optimization, scope and limitations," Adv. Synth. Catal. 349, 2610-2618.
Black et al. (1968) "Chemical constitution and activity of bipyridylium herbicides—III: Pyrazino[1.2.3.4-Imn]1,10-phenanthrolinium dibromide," Tetrahedron 24, 6453-6457.
Blöchl (1994) "Projector augmented-wave method," Phys. Rev. B 50, 17953-17979.
Bocarsly et al. (2012) "Comparative Study of Imidazole and Pyridine Catalyzed Reduction of Carbon Dioxide at Illuminated Iron Pyrite Electrodes," ACS Catal. 2, 1684-1692.
Calle-Vallejo et al. (2013) "Theoretical considerations on the electroreduction of CO to C2 species on Cu(100) electrodes," Angew. Chem. Int. Ed. 52, 7282-7285.
Chardon-Noblat et al. (1998) "Electroreduction of $CO_2$ catalyzed by polymeric $[Ru(bpy)(C0)_2]_n$ films in aqueous media: Parameters influencing the reaction selectivity", Journal of Electroanalytical Chemistry, 444, No. 2, 253-260.
Coe et al. (2006) "Unusually Facile Syntheses of Diquat (6,7-Dihydrodipyrido[1,2-a:2',1'-c]pyrazinediium) and Related Cations," Synthesis 2006(1), 146-150.
Cole et al. (2015) "Substituent Effects in the Pyridinium Catalyzed Reduction of CO2 to Methanol: Further Mechanistic Insights," Top. Catal. 58, 15-22.
Copéret et al. (2003) "Homogeneous and Heterogeneous Catalysis: Bridging the Gap through Surface Organometallic Chemistry," Angew. Chem. Int. Ed. 42, 156-181.
Cosnier et al. (1998) "Electrocatalytic reduction of CO2 on electrodes modified by fac-Re(2,2'-bipyridine)(CO)3CI complexes bonded to polypyrrole films", Journal of Molecular Catalysis, 45, 381-391.
Cui et al. (Jun. 2018) "Bridging homogeneous and heterogeneous catalysis by heterogeneous single-metal-site catalysts," Nat. Catal. 1, 385-397.
Deronzier (2002) "Selective Electrocatalytic Reduction of $CO_2$ on Electroprepared $[Ru(L)(CO)_2]_n$ Polymeric Film: L = 2,2'-Bipyridine Derivatives" in: "Conducting Polymers and Polymer Electrolytes", American Chemical Society, Washington, DC, XP055114782, ISBN: 978-0-84-121933-5, vol. 832, pp. 141-153, DOI: 10.1021/bk-2003-0832.ch011.
Deronzier et al. (1996) "Polypyrrole films containing metal complexes: syntheses and applications ", Coordination Chemistry Reviews, 147, 339-371.
Figueiredo et al. (2016) "In situ spectroscopic study of CO2 electroreduction at copper electrodes in acetonitrile," ACS Catal. 6, 2382-2392.
Ge et al. (2016) "Synthesis of conjugated polycyclic quinoliniums by rhodium(III)-catalyzed multiple C—H activation and annulation of arylpyridiniums with alkynes," Org. Lett. 18, 2483-2486.
Grosse et al. (May 2018) "Dynamic Changes in the Structure, Chemical State and Catalytic Selectivity of Cu Nanocubes during CO2 Electroreduction: Size and Support Effects," Angew. Chem. Int. Ed. 57, 6192-6197.
Gunathunge et al. (2017) "Spectroscopic observation of reversible surface reconstruction of copper electrodes under CO2 reduction," J. Phys. Chem. C 121, 12337-12344.
Gunathunge et al. (Jul. 2018) "Existence of an electrochemically inert CO population on Cu electrodes in alkaline pH," ACS Catal. 8, 7507-7516.
Gupta et al. (2006) "Calculation for the cathode surface concentrations in the electrochemical reduction of CO2 in KHCO3 solutions," J. Appl. Electrochem. 36, 161-172.
Henkelman et al. (2006) "A fast and robust algorithm for Bader decomposition of charge density," Comput. Mater. Sci. 36, 354-360.
Heyes et al. (2016) "CO2 reduction on Cu at low overpotentials with surface-enhanced in situ spectroscopy," J. Phys. Chem. C 120, 17334-17341.
Huang et al. (2017) "Electrochemical Reduction of CO2 Using Copper Single-Crystal Surfaces: Effects of Co* Coverage on the Selective Formation of Ethylene", ACS Catal. 7, 3, 1749-1756.
Inglis et al. (2012) "Electrocatalytic pathways towards sustainable fuel production from water and CO2," Coordination Chemistry Reviews, vol. 256, No. 21-22, 2571-2600, DOI: 10.1016/j.ccr.2012.05.002.
Jackson et al. (1979) "The kinetics of methoxydechlorination of 5-chloro-1,10-phenanthroline and some related reactions," J. Chem. Soc. Perkin Trans. 2, 607-610.
Jiang et al. (Jan. 2018) "Metal ion cycling of Cu foil for selective C—C coupling in electrochemical CO2 reduction," Nat. Catal. 1, 111-119.
Jouny et al. (Jan. 2018) "General techno-economic analysis of CO2 electrolysis systems," Ind. Eng. Chem. Res. 57, 2165-2177.
Kas et al. (2015) "Manipulating the Hydrocarbon Selectivity of Copper Nanoparticles in CO2 Electroreduction by Process Conditions", ChemElectroChem 2, 354-358.
Kim et al. (2015) "Achieving Selective and Efficient Electrocatalytic Activity for CO2 Reduction Using Immobilized Silver Nanoparticles," J. Am. Chem. Soc. 137, 13844-13850.

(56) References Cited

OTHER PUBLICATIONS

Kim et al. (2017) "Insight into Electrochemical CO2 Reduction on Surface-Molecule-Mediated Ag Nanoparticles," ACS Catal. 7, 779-785.
Kitamura et al. (1992) "Preparation of (p-phenylene)bis(aryliodonium) ditriflates and their double substitution by some nucleophiles" J. Org. Chem. 57, 6810-6814.
Kresse et al. (1996) "Efficiency of ab-initio total energy calculations for metals and semiconductors using a plane-wave basis set," Comput. Mater. Sci. 6, 15-50.
Kresse et al. (1993) "Ab initio molecular dynamics for liquid metals," Phys. Rev. B 47, 558-561.
Kwon et al. (2016) "CO2 Electroreduction with Enhanced Ethylene and Ethanol Selectivity by Nanostructuring Polycrystalline Copper," ChemElectroChem 3, 1012-1019.
Lau et al. (2016) "New Insights Into the Role of Imidazolium-Based Promoters for the Electroreduction of CO2 on a Silver Electrode," J. Am. Chem. Soc. 138, 7820-7823.
Lee et al. (Jun. 2018) et al. "Mixed copper states in anodized Cu electrocatalyst for stable and selective ethylene production from CO2 reduction," J. Am. Chem. Soc. 140, 8681-8689.
Li et al. (2016) "Recent advances in breaking scaling relations for effective electrochemical conversion of CO2," Adv. Energy Mater. 6, 1600463.
Li et al. (2017) "Revealing the synergy of mono/bimetallic PdPt/TiO2 heterostructure for enhanced photoresponse performance," J. Phys. Chem. C 121, 24861-24870.
Liu et al. (2017) "Stability and Effects of Subsurface Oxygen in Oxide-Derived Cu Catalyst for CO2 Reduction," J. Phys. Chem. C 121, 25010-25017.
Luc et al. (2017) "An Ir-based anode for a practical CO2 electrolyzer," Catal. Today 288, 79-84.
Lum et al. (Jan. 2018) "Stability of residual oxides in oxide-derived copper catalysts for electrochemical CO2 reduction investigated with $^{18}O$ labeling," Angew. Chem. Int. Ed. 57, 551-554.
Ma et al. (2016) "Controllable Hydrocarbon Formation from the Electrochemical Reduction of CO2 over Cu Nanowire Arrays," Angew. Chem. Int. Ed. 55, 6680-6684.
Ma et al. (2016) "One-step electrosynthesis of ethylene and ethanol from CO2 in an alkaline electrolyzer," J. Power Sources 301, 219-228.
Ma et al. (2017) "Electroreduction of Carbon Dioxide to Hydrocarbons Using Bimetallic Cu-Pd Catalysts with Different Mixing Patterns," J. Am. Chem. Soc. 139, 47-50.
Ma et al., (2017) in Anisotropic Shape-Selective Nanomaterials Structure-Property Relationships (Eds.: S.E. Hunyadi Murph, G.K. Larsen, K.J. Coopersmith), Springer International Publishing, Cham, pp. 337-373.
McCrum et al. (2015) "Electrochemical specific adsorption of halides on Cu 111, 100, and 211: A Density Functional Theory study," Electrochimica Acta 173, 302-309.
Montoya et al. (2015) "Theoretical insights into a CO dimerization mechanism in CO2 electroreduction," J. Phys. Chem. Lett. 6, 2032-2037.
Montoya et al. (2017) "Materials for solar fuels and chemicals," Nature Materials 16, 70-81.
Ogata et al. (2016) "Nanoscale corrosion behavior of polycrystalline copper fine wires in dilute NaCl solution investigated by in-situ atomic force microscopy," Corros. Sci. 105, 177-182.
Pasternak et al. (1970) "Diffusion and Permeation of Oxygen, Nitrogen, Carbon Dioxide, and Nitrogen Dioxide through Polytetrafluoroethylene," Macromolecules 3, 3, 366-371, doi 10.1021/ma60015a020.
Perez-Gallent et al. (2017) "Spectroscopic observation of a hydrogenated CO dimer intermediate during CO reduction on Cu(100) electrodes," Angew. Chem. Int. Ed. 56, 3621-3624.
Ponnurangam et al. (2017) "Nitrogen-containing polymers as a platform for CO2 electroreduction," Adv. Colloid Interface Sci. 244, 184-198.

Protopopoff et al. (2005) "Potential—pH diagrams for hydroxyl and hydrogen adsorbed on a copper surface," Electrochim. Acta 51, 408-417.
Reller et al. (2017) "Selective Electroreduction of CO2 toward Ethylene on Nano Dendritic Copper Catalysts at High Current Density," Adv. Energy Mater. 7, 1602114.
Ren et al. (2015) "Selective Electrochemical Reduction of Carbon Dioxide to Ethylene and Ethanol on Copper (I) Oxide catalysts", ACS Catal. 5, 2814-2821. doi:10.1021/cs502128q.
Roberts et al. (2015) "High Selectivity for Ethylene from Carbon Dioxide Reduction over Copper Nanocube Electrocatalysts," Angew. Chem. Int. Ed. 54, 5179-5182.
Rosen et al. (2011) "Ionic liquid-mediated selective conversion of CO2 to CO at low overpotentials," Science 334, 643-644.
Rybchenko et al. (2016) "Study of Pyridine-Mediated Electrochemical Reduction of CO2 to Methanol at High CO2 Pressure," ChemSusChem 9, 1660-1669.
Seh et al. (2017) "Combining theory and experiment in electrocatalysis: insights into materials design," Science 355, eaad4998.
Summers (1967) "Cyclic Diquaternary Salts of 1,10-Phenanthroline as One Electron Transfer Agents related to Bipyridylium Herbicides," Nature 215, 1410-1411.
Summers (1968) "Chemical constitution and activity of bipyridylium herbicides—II : Diquaternary salts of 1,10-phenanthroline," Tetrahedron 24, 5433-5437.
Thevenon et al. (Nov. 2019) "In-situ Nanostructuring and Stabilization of Polycrystalline Copper by an Organic Salt Additive Promotes Electrocatalytic CO2 Reduction to Ethylene," Angew. Chem. Int. Ed. 58, 16952-16958. https://onlinelibrary.wiley.com/doi/10.1002/anie.201907935.
Varela et al. (2016) "Tuning the Catalytic Activity and Selectivity of Cu for CO2 Electroreduction in the Presence of Halides," ACS Catal. 6, 2136-2144.
Wu et al. (2015) "Achieving Highly Efficient, Selective, and Stable CO2 Reduction on Nitrogen-Doped Carbon Nanotubes", ACS Nano 9, 5, 5364-5371.
Xiao et al. (2016) "Mechanistic Explanation of the pH Dependence and Onset Potentials for Hydrocarbon Products from Electrochemical Reduction of CO on Cu (111)", J. Am. Chem. Soc., 138, 483-486.
Yang et al. (2017) "Morphology-directed selective production of ethylene or ethane from CO2 on a Cu mesopore electrode," Angew. Chem. Int. Ed. 56, 796-800.
Zhang et al. (2017) "Nanostructured Materials for Heterogeneous Electrocatalytic CO2 Reduction and their Related Reaction Mechanisms," Angew. Chem. Int. Ed. 56, 11326-11353.
Zhao et al. (2010) "An efficient ultrasonic-assisted synthesis of imidazolium and pyridinium salts based on the Zincke reaction," Ultrason. Sonochem. 17, 685-689.
Zhong et al. (2015) "Effect of CO2 bubbling into aqueous solutions used for electrochemical reduction of CO2 for energy conversion and storage," J. Phys. Chem. C 119, 55-61.
U.S. Appl. No. 15/950,150, filed Apr. 10, 2018.
U.S. Appl. No. 16/959,918, filed Jul. 2, 2020.
Arán-Ais et al. (Oct. 2018) "Structure- and Electrolyte-Sensitivity in CO2 Electroreduction," Acc. Chem. Res. 51, 2906-2917.
Burdyny et al. (Jan. 2019) "CO2 reduction on gas-diffusion electrodes and why catalytic performance must be assessed at commercially-relevant conditions," Energy Environ. Sci., 12, 1442-1453, doi 10.1039/c8ee03134g.
Cao et al. (Apr. 2018) "Chelating N-Heterocyclic Carbene Ligands Enable Tuning of Electrocatalytic CO2 Reduction to Formate and Carbon Monoxide: Surface Organometallic Chemistry," Angew. Chem. Int. Ed. 57, 4981-4985.
Chen et al. (Jul. 2018) "The 'missing' bicarbonate in CO2 chemisorption reactions on solid amine sorbents," J. Am. Chem. Soc. 140, 8648-8651.
Cole et al. (2010) "Using a one-electron shuttle for the multielectron reduction of CO2 to methanol: kinetic, mechanistic, and structural insights," J. Am. Chem. Soc. 132, 11539-11551.
Copéret et al. (May 2018) "Bridging the Gap between Industrial and Well-Defined Supported Catalysts," Angew. Chem. Int. Ed. 57, 6398-6440.

(56) References Cited

OTHER PUBLICATIONS

De Luna et al. (Apr. 2019) "What would it take for renewably powered electrosynthesis to displace petrochemical processes?" Science 364, eaav3506.
De Luna et al. (Feb. 2018) "Catalyst electro-redeposition controls morphology and oxidation state for selective carbon dioxide reduction," Nat. Catal. 1, 103-110.
Dinh et al. (May 2018) "CO2 electroreduction to ethylene via hydroxide-mediated copper catalysis at an abrupt interface," Science 360, 783-787.
Droog et al. (1980) "Oxygen electrosorption on copper single crystal electrodes in sodium hydroxide solution," J. Electroanal. Chem. Interf. Electrochem. 112, 387-390.
Dunwell et al. (Oct. 2018) "Potential routes and mitigation strategies for contamination in interfacial specific infrared spectroelectrochemical studies," J. Phys. Chem. C 122, 24658-24664.
Favaro et al. (2017) "Subsurface Oxide Plays a Critical Role In CO2 Activation by Cu(111) Surfaces to form Chemisorbed CO2, the First Step in Reduction of CO2", Proc. Natl. Acad. Sci. USA, vol. 114, pp. 6706-6711.
Gabardo et al. (Nov. 2019) "Continuous Carbon Dioxide Electroreduction to Concentrated Multi-carbon Products Using a Membrane Electrode Assembly," Joule, vol. 3, Issue 11, 2777-2791. https://doi.org/10.1016/j.joule.2019.07.021.
Gao et al. (2017) "Improved CO2 Electroreduction Performance on Plasma-Activated Cu Catalysts via Electrolyte Design: Halide Effect," ACS Catal. 7, 5112-5120.
Gao et al. (2017) "Plasma-Activated Copper Nanocube Catalysts for Efficient Carbon Dioxide Electroreduction to Hydrocarbons and Alcohols," ACS Nano 11, 4825-4831.
Giesbrecht et al. (2017) "Electrochemical Reduction of Carbon Dioxide to Methanol in the Presence of Benzannulated Dihydropyridine Additives," ACS Energy Lett. 2, 549-555.
Gong et al. (2017) "Supramolecular Porphyrin Cages Assembled at Molecular-Materials Interfaces for Electrocatalytic CO Reduction," ACS Cent. Sci. 3, 1032-1040.
Grimme et al. (2010) "A consistent and accurate *ab initio* parametrization of density functional dispersion correction (DFT-D) for the 94 elements H-Pu," J. Chem. Phys. 132, 154104.
Guo et al. (Aug. 2018) "First-principles determination of CO adsorption and desorption on Pt(111) in the free energy landscape," J. Phys. Chem. C 122, 21478-21483.
Hahn et al. (2017) "Engineering Cu surfaces for the electrocatalytic conversion of CO2: Controlling selectivity toward oxygenates and hydrocarbons," Proc. Natl. Acad. Sci. 114, 5918-5923.
Hall et al. (2015) "Mesostructure-Induced Selectivity in CO2 Reduction Catalysis," J. Am. Chem. Soc. 137, 14834-14837.
Han et al. (2017) "CO2 Reduction Selective for C≥2 Products on Polycrystalline Copper with N-Substituted Pyridinium Additives," ACS Cent. Sci. 3, 853-859. DOI: 10.1021/acscentsci.7b00180.
Hartl et al. (2009) "Soluble Redox-Active Polymetallic Chains [{Ru$^0$(CO)(L)(bpy)}$'''$]n (bpy = 2,2'-bipyridine, L = PrCN, Cl-; m = 0, -1): Electrosynthesis and Characterization", Inorgan. Chem., 48, 8233-8244. DOI: 10.1021/ic9008043.
Higgins et al. (Dec. 2018) "Gas-Diffusion Electrodes for Carbon Dioxide Reduction: A New Paradigm," ACS Energy Lett. 4, 1, 317-324, doi 10.1021/acsenergylett.8b02035.
Hori et al. (1985) "Production of CO and CH$_4$ in Electrochemical Reduction of CO$_2$ at Metal Electrodes in Aqueous Hydrogencarbonate Solution," Chem. Lett. 1695-1698.
International Search Report and Written Opinion dated Oct. 27, 2020 in corresponding International application No. PCT/US2020/041583, 10 pp.
International Search Report dated Jun. 25, 2019 in Application No. PCT/EP2019/057573, 2 pp.
Jeon et al. (Nov. 2017) "Prism-Shaped Cu Nanocatalysts for Electrochemical CO2 Reduction to Ethylene," ACS Catal. 2018, 8, 531-535.
Karaiskakis et al. (2017) "Evaluation of the Impact of Surface Reconstruction on Rough Electrodeposited Copper-Based Catalysts for Carbon Dioxide Electroreduction," Energy Technol. 5, 901-910.
Kim et al. (2017) "Copper nanoparticle ensembles for selective electroreduction of CO2 to C2-C3 products," Proc. Natl. Acad. Sci. 114, 10560-10565.
Kim et al. (2017) "Electrochemical Activation of CO2 through Atomic Ordering Transformations of AuCu Nanoparticles", J. Am. Chem. Soc. 139, 8329-8336.
Kresse et al. (1994) "Ab initio molecular-dynamics simulation of the liquid-metal-amorphous-semiconductor transition in germanium," Phys. Rev. B 49, 14251-14269.
Kresse et al. (1996) "Efficient iterative schemes for ab initio total-energy calculations using a plane-wave basis set," Phys. Rev. B 54, 11169-11186.
Kresse et al. (1999) "From ultrasoft pseudopotentials to the projector augmented-wave method," Phys. Rev. B 59, 1758-1775.
Kuhl et al. (2012) "New insights into the electrochemical reduction of carbon dioxide on metallic copper surfaces," Energy Environ. Sci. 5, 7050-7059.
Li et al. (2012) "CO2 Reduction at Low Overpotential on Cu Electrodes Resulting from the Reduction of Thick Cu2O Films," J. Am. Chem. Soc. 134, 7231-7234.
Li et al. (2014) "Electroreduction of carbon monoxide to liquid fuel on oxide-derived nanocrystalline copper," Nature 508, 504-507.
Li et al. (2017) "Structure-Sensitive CO2 Electroreduction to Hydrocarbons on Ultrathin 5-fold Twinned Copper Nanowires," Nano Lett. 17, 1312-1317.
Li et al. (Jul. 2018) "Efficient electrocatalytic CO2 reduction on a three-phase interface," Nat. Catal. 1, 592-600.
Lobaccaro et al. (2016) "Effects of temperature and gas-liquid mass transfer on the operation of small electrochemical cells for the quantitative evaluation of CO2 reduction electrocatalysts," Phys. Chem. Chem. Phys. 18, 26777-26785.
Lum et al. (2017) "Optimizing C-C Coupling on Oxide-Derived Copper Catalysts for Electrochemical CO2 Reduction", J. Phys. Chem. C 121, 14191-14203.
Lum et al. (Aug. 2018) "Electrochemical CO reduction builds solvent water into oxygenate products," J. Am. Chem. Soc. 140, 9337-9340.
Men et al. (2015) "X-ray Photoelectron Spectroscopy of Pyridinium-Based Ionic Liquids: Comparison to Imidazolium- and Pyrrolidinium-Based Analogues," ChemPhysChem 16, 2211-2218.
Mistry et al. (2016) "Highly selective plasma-activated copper catalysts for carbon dioxide reduction to ethylene," Nat. Commun. 7, 12123.
Mistry et al. (2016) "Nanostructured electrocatalysts with tunable activity and selectivity," Nat. Rev. Mater. 1, 16009.
Nonoyama et al. (2011) "Analysis of Oxygen-Transport Diffusion Resistance in Proton-Exchange-Membrane Fuel Cells," Journal of the Electrochemical Society, 158 (4) B416-B423, doi 10.1149/1.3546038.
Nørskov et al. (2004) "Origin of the overpotential for oxygen reduction at a fuel-cell cathode," J. Phys. Chem. B 108, 17886-17892.
Pelletier et al. (2016) "Catalysis by Design: Well-Defined Single-Site Heterogeneous Catalysts," Acc. Chem. Res. 49, 664-677.
Perdew et al. (1996) "Generalized gradient approximation made simple," Phys. Rev. Lett. 77, 3865-3868.
Qiao et al. (2014) "A review of catalysts for the electroreduction of carbon dioxide to produce low-carbon fuels", Chemical Society Reviews, 43, 2, 631. DOI: 10.1039/c3cs60323g.
Ravel et al. (2005) "Athena, Artemis, Hephaestus: data analysis for X-ray absorption spectroscopy using IFEFFIT," J. Synchrotron Rad. 12, 537-541.
Rawson et al. (1995) "The coordination chemistry of 2-pyridone and its derivatives", Coordination Chemistry Reviews, 139, 313-374.
Saberi Safaei et al. (2016) "High-Density Nanosharp Microstructures Enable Efficient CO2 Electroreduction," Nano Lett. 16, 7224-7228.

(56) References Cited

OTHER PUBLICATIONS

Schrebler et al. (2002) "Study of the electrochemical reduction of $CO_2$ on a polypyrrol electrode modified by rhenium and copper-rhenium microalloy in methanol media", Journal of Electroanalytical Chemistry 533, 167-175.

Shaw et al. (2008) "Using a Two-Step Hydride Transfer to Achieve 1,4 Reduction in the Catalytic Hydrogenation of an Acyl Pyridinium Cation," J. Org. Chem. 73, 9668-9674.

Wong et al. (2005) "Solubility of carbon dioxide in aqueous HCl and $NaHCO_3$ solutions from 278 to 298," K. J. Chem. Eng. Data 50, 817-821.

Wuttig et al. (2015) "Impurity Ion Complexation Enhances Carbon Dioxide Reduction Catalysis," ACS Catal. 5, 4479-4484.

Xiao et al. (2017) "Cu metal embedded in oxidized matrix catalyst to promote $CO_2$ activation and CO dimerization for electrochemical reduction of $CO_2$," Proc. Natl. Acad. Sci. 114, 6685-6688.

Zhao et al. (2015) "Microporous carbonaceous adsorbents for $CO_2$ separation via selective adsorption," RSC Adv. 5, 30310-30330.

Zhou, Y. et al. (Jul. 2018) "Dopant-induced electron localization drives $CO_2$ reduction to C2 hydrocarbons," Nat. Chem. 10, 974-980.

Zhuang et al. (Dec. 2018) "Copper nanocavities confine intermediates for efficient electrosynthesis of C3 alcohol fuels from carbon monoxide," Nat. Catal. 1, 946-951.

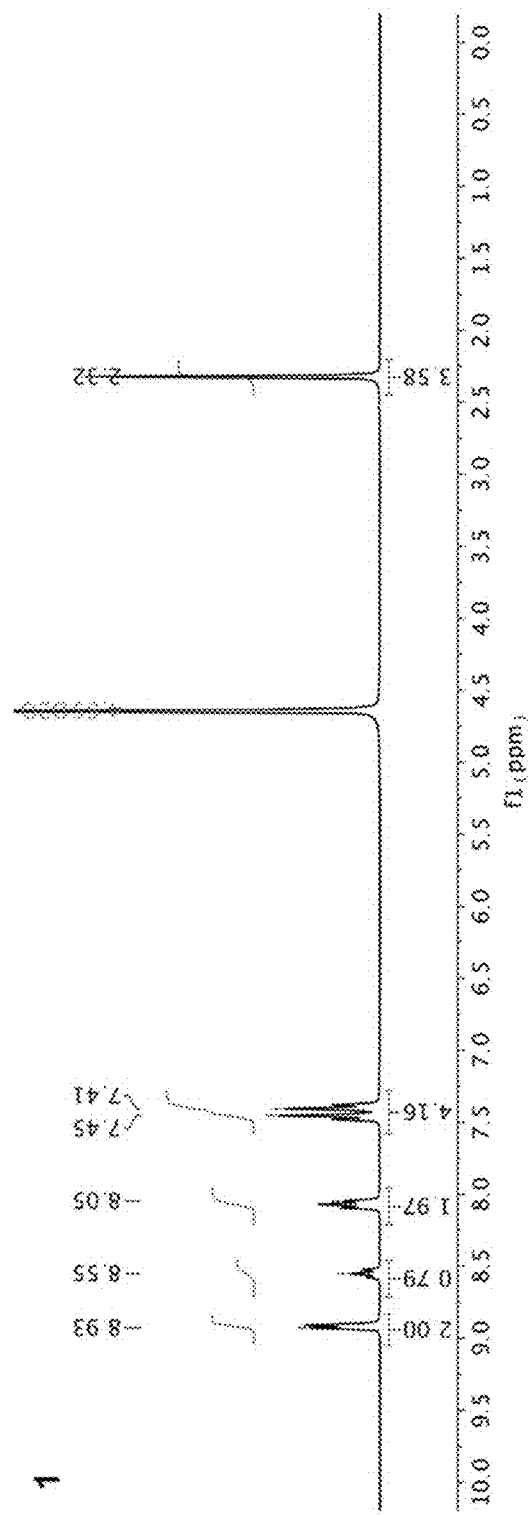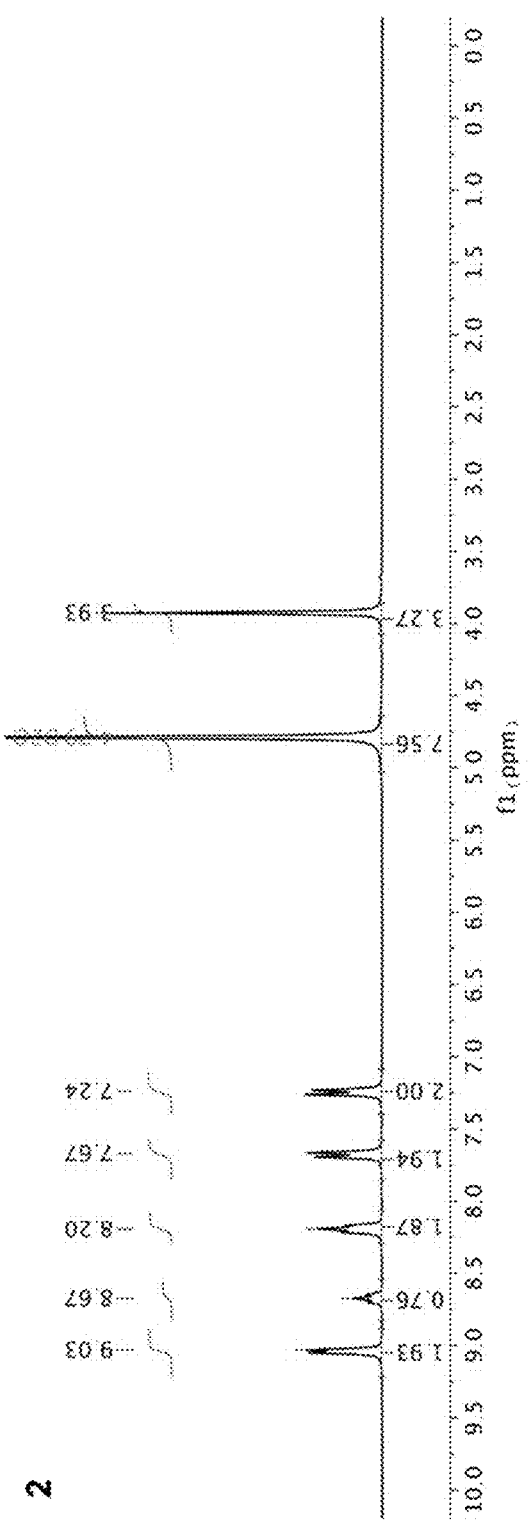
FIG. 5A
FIG. 5B

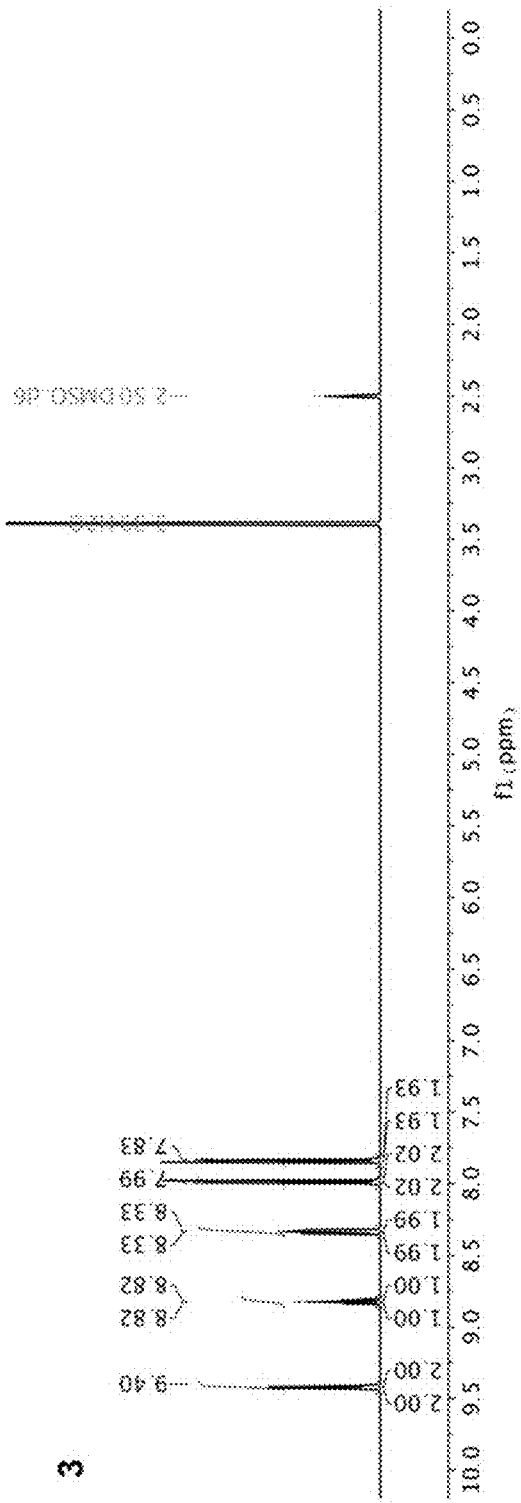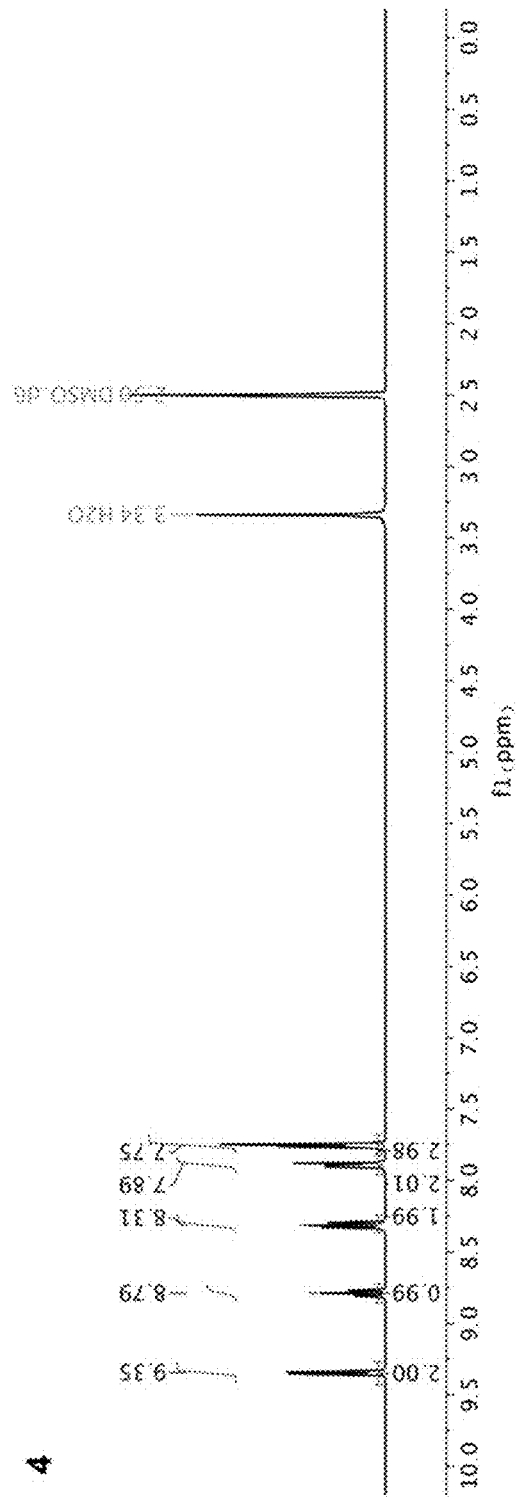

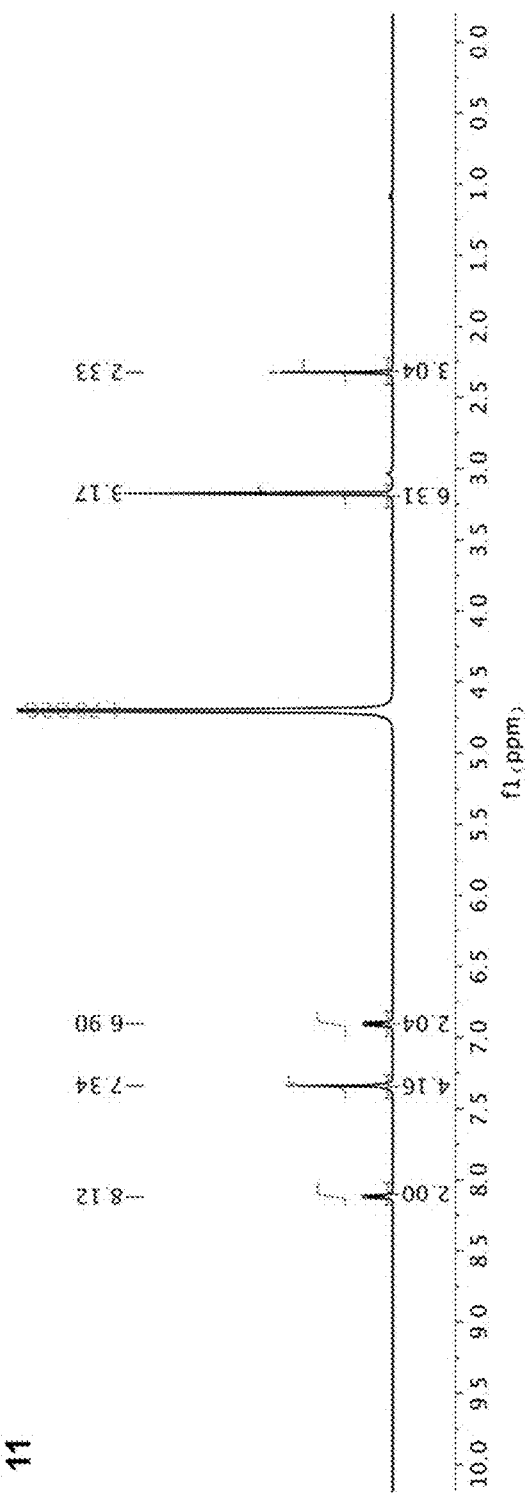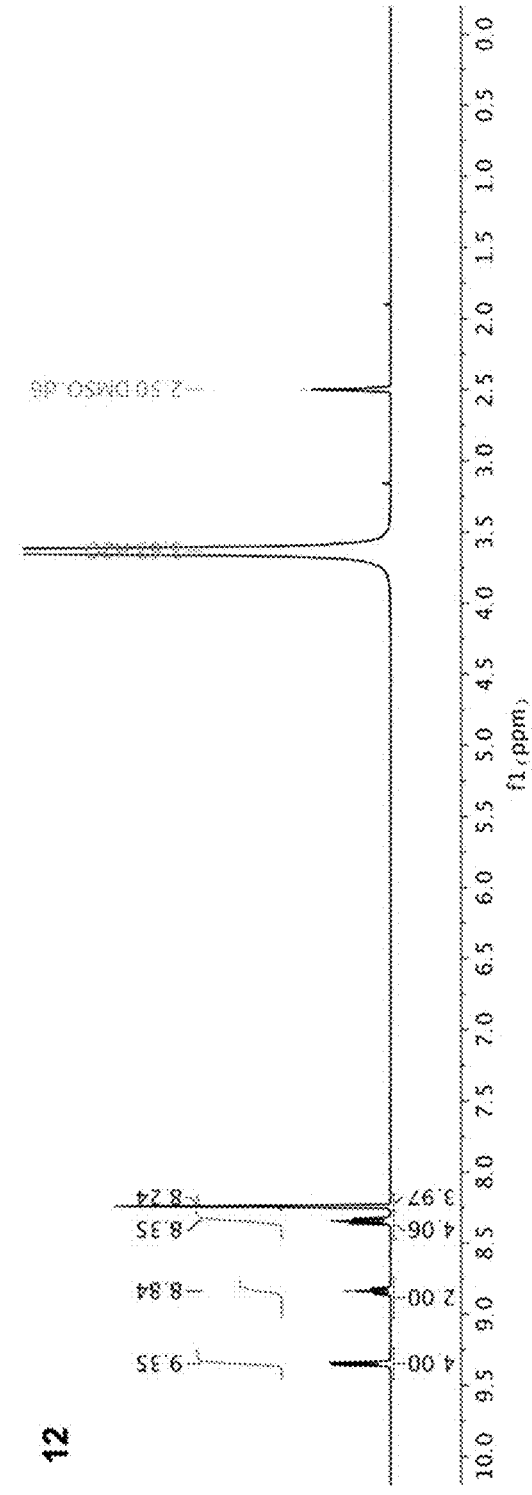

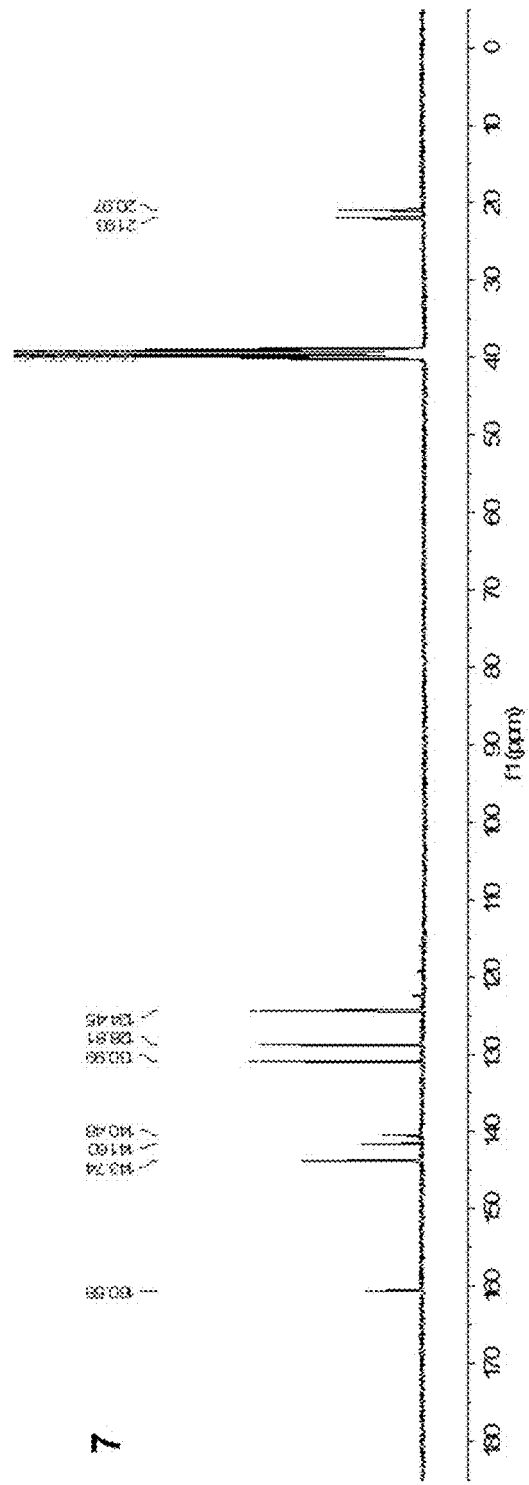
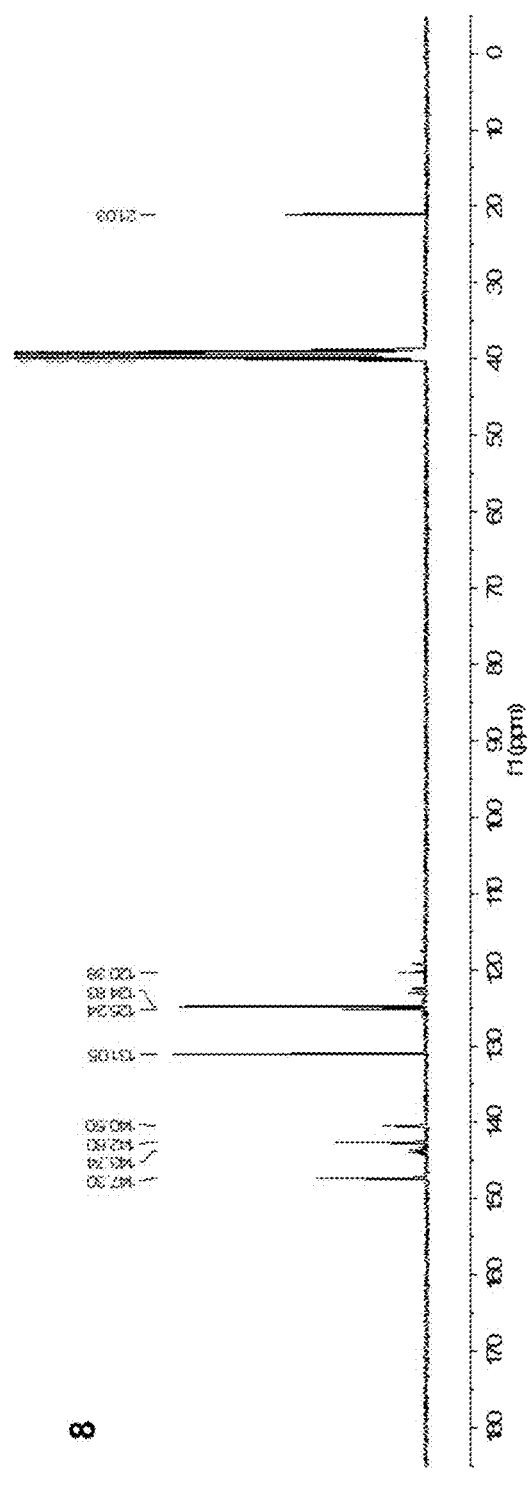
FIG. 6A
FIG. 6B

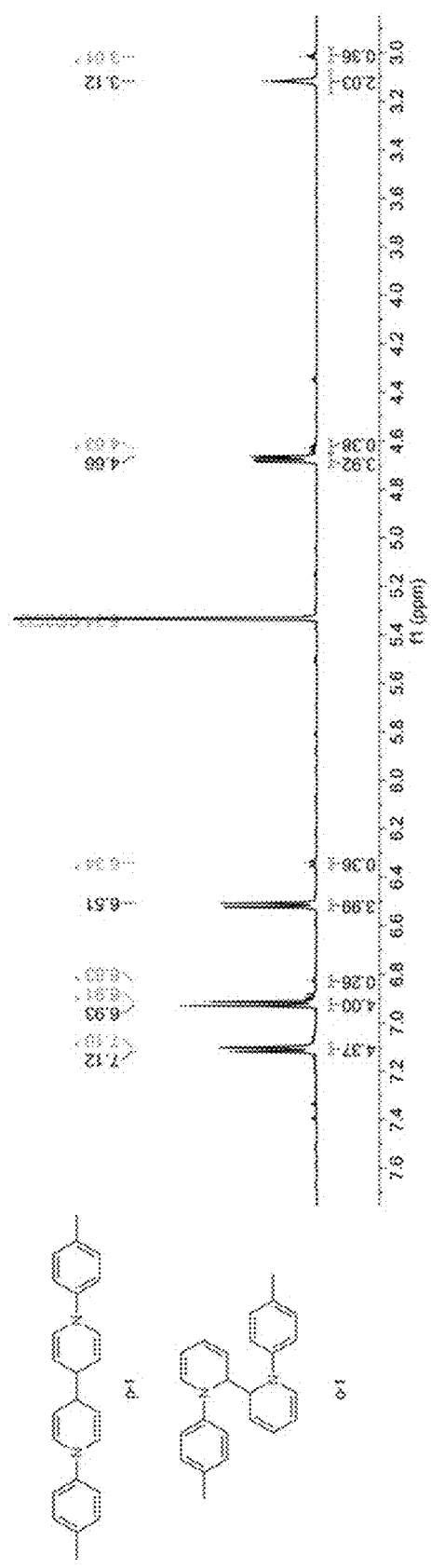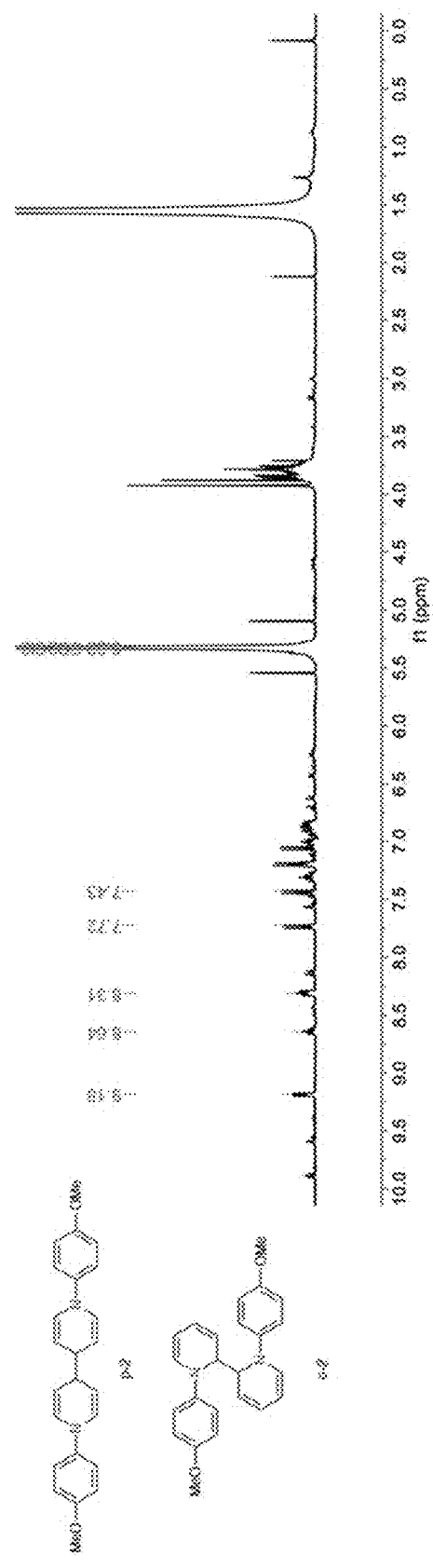
FIG. 9A
FIG. 9B

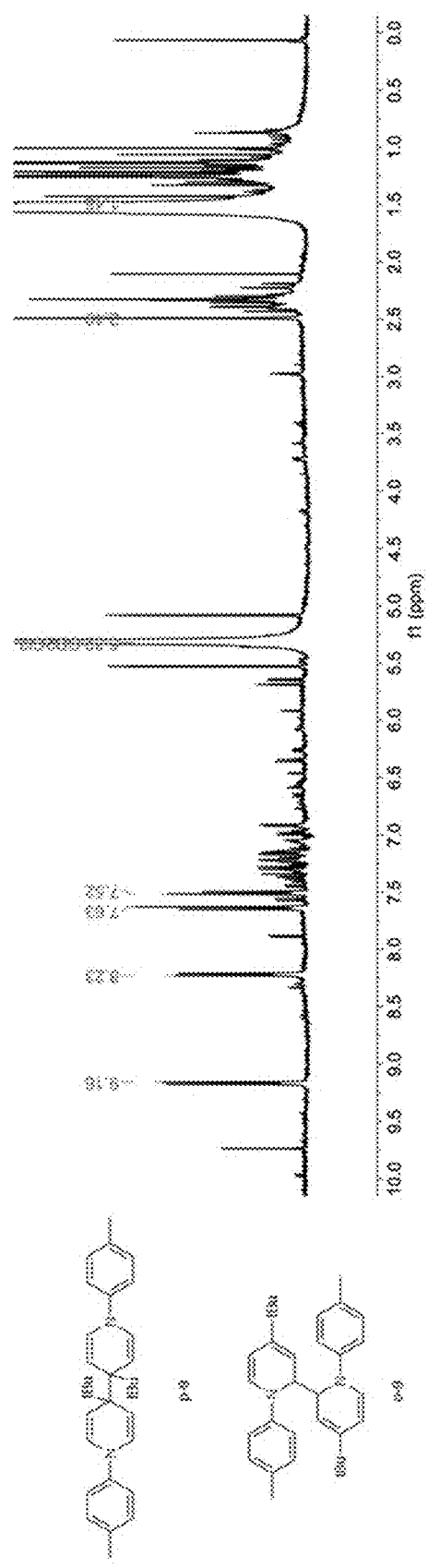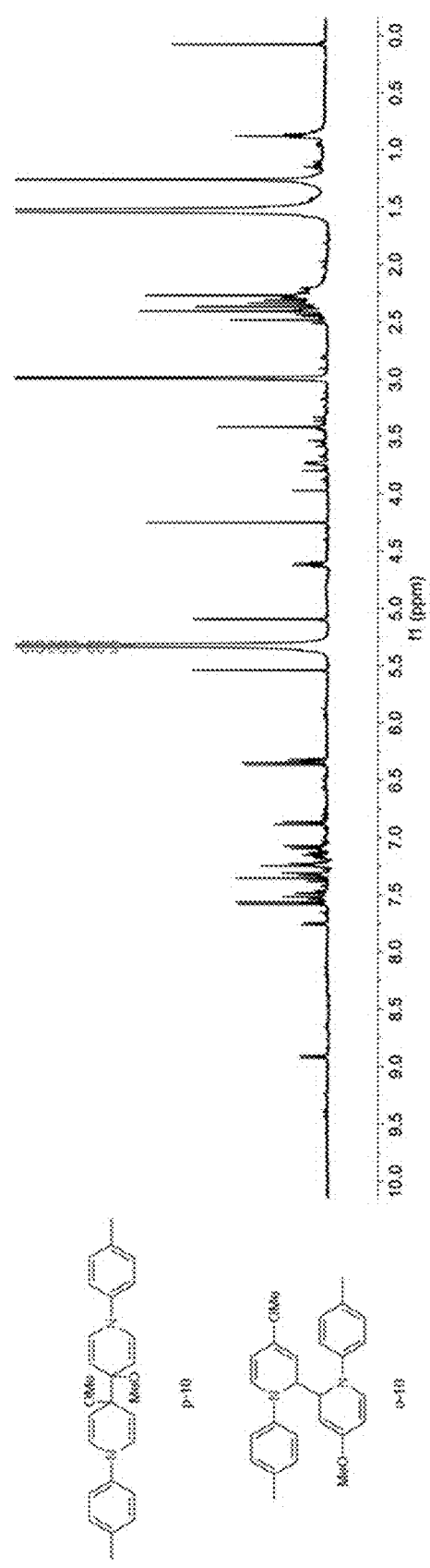
FIG. 9I
FIG. 9J

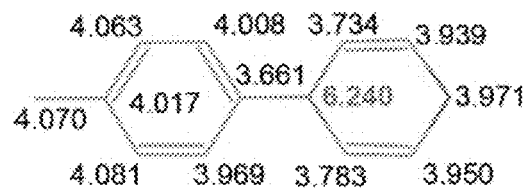
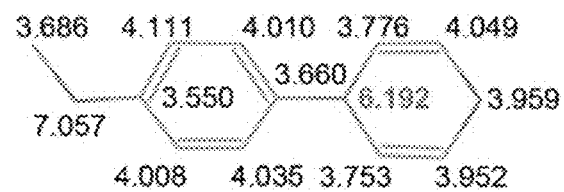
FIG. 10A  FIG. 10B
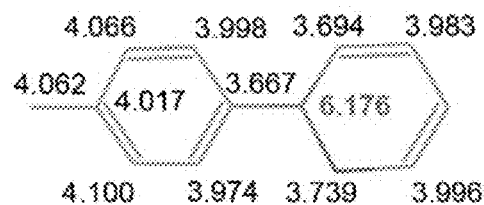
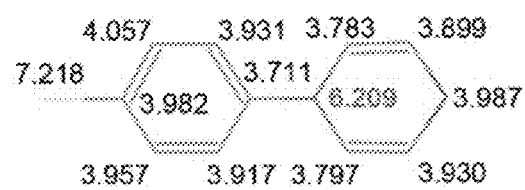
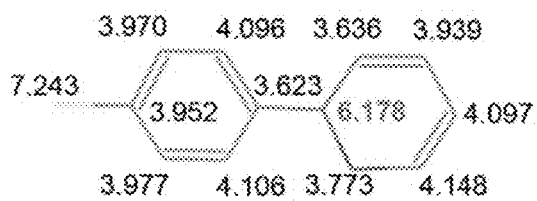
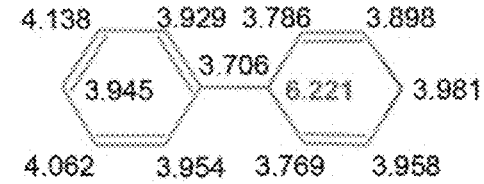
FIG. 10C  FIG. 10D
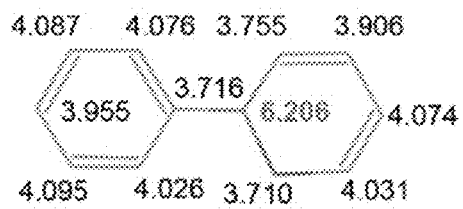

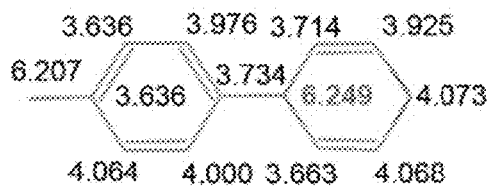
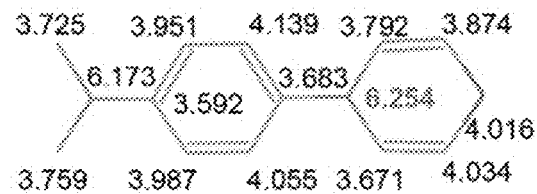
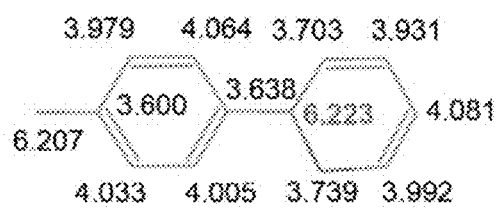
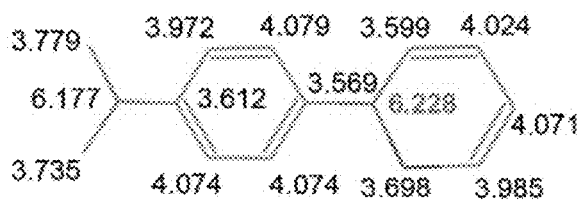
FIG. 10E  FIG. 10F
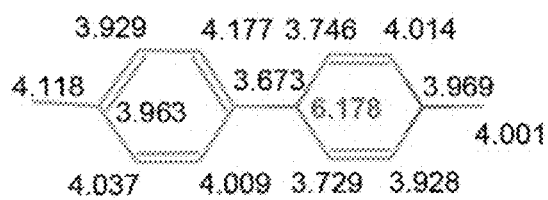
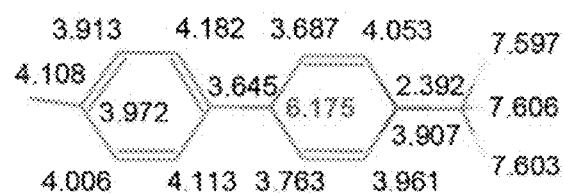
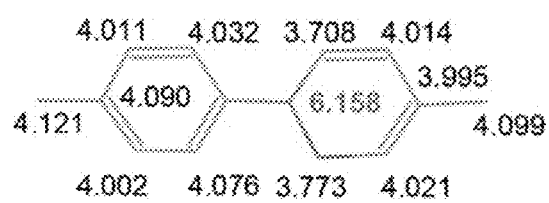
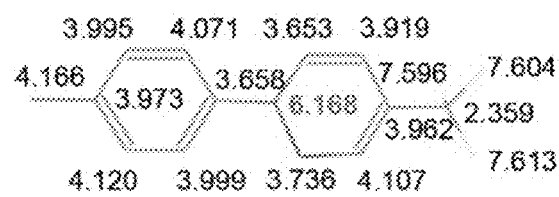
FIG. 10G  FIG. 10H

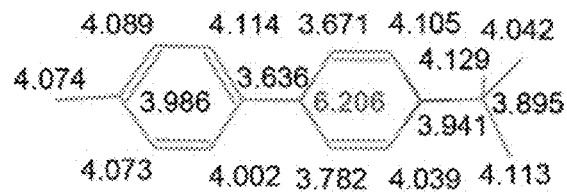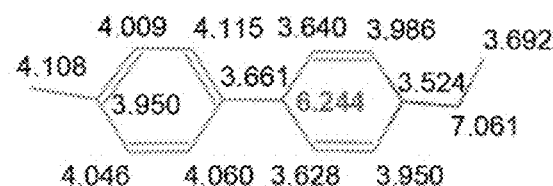
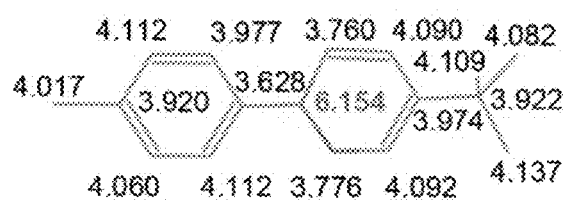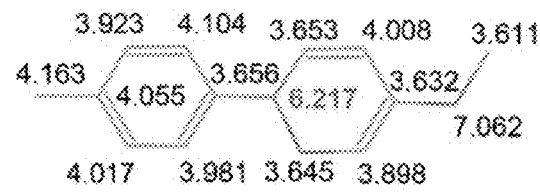
FIG. 10I  FIG. 10J
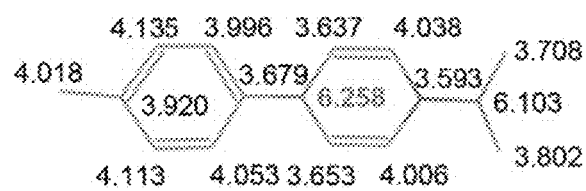
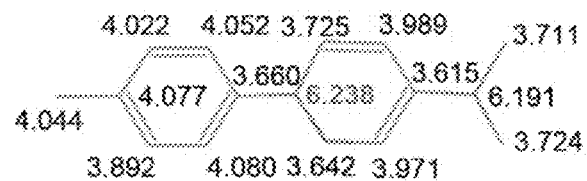
FIG. 10K tolyl-pyr 88%
*para-para* (1-Br)$_2$ 12%
*ortho-ortho* (1-Br)$_2$

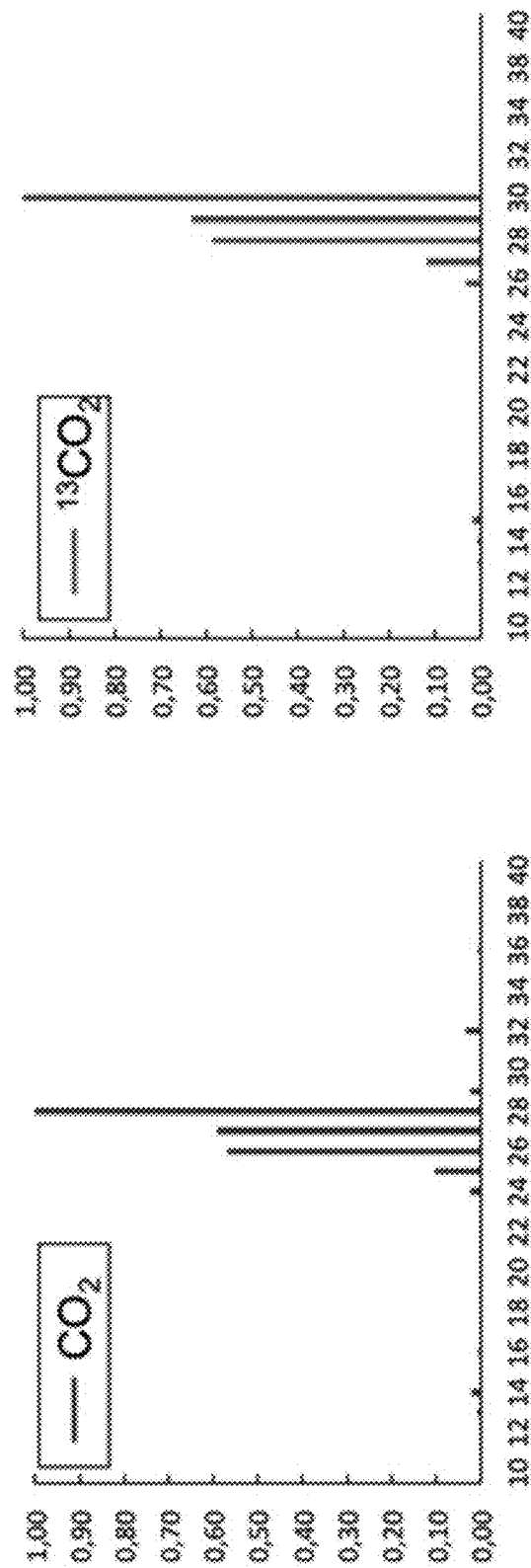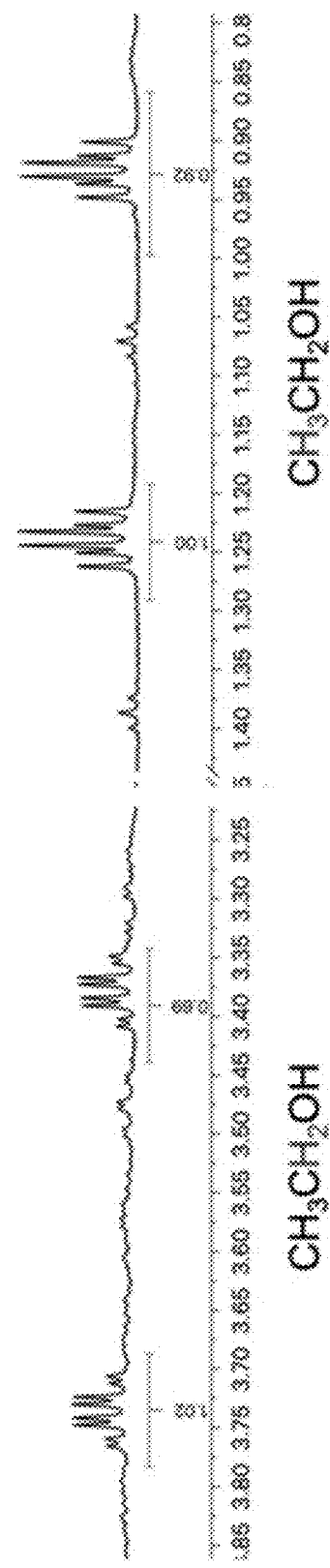
FIG. 46A
FIG. 46B

| Compound | CH₄ | C₂H₄ | C₂H₅OH | C₃H₇OH | CO | H₂ | HCOO⁻ | C₂₊ | Total | C₂₊/CH₄ | j (mA/cm²) |
|---|---|---|---|---|---|---|---|---|---|---|---|
| No additive | 20.2 | 12.4 | 7.2 | 2.8 | 1.7 | 42.8 | 4.7 | 26.0 | 96.4 | ≥0.7 | -4.46 |
| 1 | 1.0 | 40.5 | 30.6 | 7.1 | 1.8 | 15.5 | 6.5 | 78.2 | 103.1 | ≥36 | -1.02 |
| 2 | 3.1 | 29.3 | 29.6 | 0 | 2.5 | 21.8 | 10.1 | 58.9 | 96.4 | ≥15 | -0.70 |
| 3 | 0.3 | 37.7 | 22.3 | 8.7 | 2.1 | 16.6 | 10.6 | 68.6 | 98.3 | ≥130 | -1.46 |
| 4 | 2.1 | 18.2 | 16.0 | 0 | 3.7 | 52.1 | 6.9 | 34.2 | 99.0 | ≥9 | -1.40 |
| 5 | 0.1 | 40.8 | 26.7 | 8.6 | 2.1 | 12.4 | 8.8 | 76.1 | 99.5 | ≥450 | -1.34 |
| 6 | 0.07 | 33.6 | 27.1 | 11.8 | 3.1 | 10.0 | 13.0 | 72.4 | 98.7 | ≥830 | -1.10 |

Faradaic Efficiencies (%)

9, R = OH
10, R = CH$_2$NH$_3$Br
11, R = CH$_2$NMe$_2$HBr

12, R = Me
13, R = Et

STABILIZATION OF A CO-BOUND INTERMEDIATE VIA MOLECULAR TUNING PROMOTES CO2-TO-ETHYLENE CONVERSION

CROSS-REFERENCE TO RELATED APPLICATIONS

This application claims the benefit of priority to U.S. Provisional Patent Application No. 62/872,383 filed Jul. 10, 2019, which is hereby incorporated by reference in its entirety.

STATEMENT REGARDING FEDERALLY SPONSORED RESEARCH OR DEVELOPMENT

This invention was made with government support under Grant No. DE-AC02-06CH11357 and DE-SC0004993 awarded by the Department of Energy. The government has certain rights in the invention.

BACKGROUND OF INVENTION

The $CO_2$ reduction reaction is of particular interest for generating multicarbon products for use as fuels, chemical precursors for industrial applications and other applications. For instance, the $CO_2$ reduction reaction can generate $C_{\geq 2}$ hydrocarbons for use as fuels. Additionally, the $CO_2$ reduction reaction can occur at the cathode of a solar fuels generator. As a result, the $CO_2$ reduction reaction may be useful in renewable energy technologies. For example, enable the storage of intermittent renewable electricity as well as net reductions of greenhouse gas emissions.

The highly selective generation of economically desirable products such as ethylene from the carbon dioxide reduction reaction ($CO_2RR$) remains a challenge. In addition to $C_{\geq 2}$ hydrocarbons, the $CO_2$ reduction reaction can produce a variety of products in addition to $C_{\geq 2}$ hydrocarbons. For instance, the $CO_2$ reduction reaction can produce methane in addition to $C_{\geq 2}$ hydrocarbons or as an alternative to $C_{\geq 2}$ hydrocarbons. Additionally, the hydrogen evolution reaction (HER) can also occur under the same conditions as the $CO_2$ reduction reaction. Tuning the stabilities of intermediates to favour a desired reaction pathway can enhance selectivity. Unfortunately, the Faradaic efficiency for certain product hydrocarbons, such as ethylene, is still low, particularly in neutral media, resulting in a low energy efficiency. Accordingly, there is a need to control the selectivity of the $CO_2$ reduction reaction for particular products.

SUMMARY OF THE INVENTION

Provided herein are membranes, electrodes, electrocatalytic systems, and methods for address aforementioned and other challenges. In particular, embodiments disclosed herein provide for improved efficiencies and current densities for production of useful hydrocarbons from reduction of $CO_2$.

Aspects of the invention include an electrolytic system for electrochemical reduction of carbon dioxide, the system comprising: an anode; a cathode in electrical communication with the anode, the cathode comprising: a first current collector; a porous gas-diffusion membrane having a first side and a second side; wherein the porous gas-diffusion membrane is permeable to $CO_2$; an electrocatalyst layer adjacent to the second side of the gas-diffusion membrane and in electrical communication with the first current collector; the electrocatalyst layer comprising: an electrically conductive catalyst; and a selectivity-determining organic material attached to at least a portion of the electrically conductive catalyst; wherein: the organic material is formed of a plurality of oligomers; each oligomer comprises a plurality of covalently bonded base units; each base unit comprises at least one heterocyclic group having at least one nitrogen in its ring structure; and an anion exchange membrane adjacent to the electrocatalyst layer and positioned between the anode and the cathode; wherein anion exchange membrane is characterized by anion conductivity and the cathode is in ionic communication with the anode via the anion exchange membrane.

Preferably in any system, gas-diffusion membrane, and method disclosed herein, the system comprises a first electrolyte in physical contact and in ionic communication with at least a portion of the anode; wherein the anion exchange membrane physically separates the first electrolyte from the cathode. Preferably in any system, gas-diffusion membrane, and method disclosed herein, the first electrolyte is characterized by a pH selected from the range of 6 to 14. Preferably in any system, gas-diffusion membrane, and method disclosed herein, the first electrolyte is characterized by a pH of substantially 7 to avoid consuming bicarbonate from the reaction $^-OH + CO_2 \rightarrow HCO_3^-$. Preferably in any system, gas-diffusion membrane, and method disclosed herein, the system comprises a first gas volume adjacent to the first side of the porous gas-diffusion membrane; wherein the first gas volume is in operable contact with the gas-diffusion membrane such that $CO_2$ from the first gas volume can penetrate into the first side of the gas-diffusion membrane and such that a product gas can enter the first gas volume from the gas-diffusion membrane. Preferably in any system, gas-diffusion membrane, and method disclosed herein, the systems is configured such that: $CO_2$ gas is provided to the first gas volume; the $CO_2$ gas penetrates the first side of the gas-diffusion membrane and diffuses through the gas-diffusion membrane to the electrocatalyst layer; the $CO_2$ gas is reduced at the electrocatalyst layer to produce at least one product gas, the at least one product gas having a composition comprising at least two carbon atoms ($C_{\geq 2}$); and the at least one product gas diffuses through the gas-diffusion membrane and out of the first side of the gas-diffusion membrane. Preferably in any system, gas-diffusion membrane, and method disclosed herein, the anion exchange membrane provides for transport of anions formed or dissociated at the electrocatalyst layer from the electrocatalyst layer to the first electrolyte.

Preferably in any system, gas-diffusion membrane, and method disclosed herein, the electrically conductive catalyst comprises Cu. Preferably in any system, gas-diffusion membrane, and method disclosed herein, the electrically conductive catalyst is Cu. Optionally in any system, membrane, and methods disclosed herein, the electrically conductive catalyst is homogeneous and continuously or contiguous on the second side of the gas-diffusion membrane. The electrically conductive catalyst (e.g., Cu) is preferably deposited on one side of the gas-diffusion membrane. The gas-diffusion membrane and catalyst (e.g., PTFE/Cu) can then be functionalized with other porous materials which could be formed of the same (e.g., PTFE), similar, or other material as that gas-diffusion membrane, but the thickness of these functionalized porous material is significantly different from that of the gas-diffusion membrane. While the gas-diffusion membrane has a thickness on a micrometer (e.g., ≥50 µm; e.g., 200 µm) scale, a functionalization (e.g., using porous material) of the gas-diffusion membrane and catalyst (e.g., PTFE/Cu) has a thickness on the nanometer scale (e.g., <500 nm, for example). Optionally in any system, membrane, and methods disclosed herein, the electrically conductive catalyst is also a coating on an internal porous surface of the gas-diffusion membrane.

Preferably in any system, gas-diffusion membrane, and method disclosed herein, the gas-diffusion membrane is hydrophobic. Optionally in any system, gas-diffusion membrane, and method disclosed herein, the gas-diffusion membrane is hydrophobic and electrically insulating. Preferably in any system, gas-diffusion membrane, and method disclosed herein, the gas-diffusion membrane comprises a fluorocarbon polymer, such as PTFE. Preferably in any system, gas-diffusion membrane, and method disclosed herein, the gas-diffusion membrane has: a porosity characterized by pores having a characteristic pore size selected from the range of 10 nm to 2 µm and a thickness selected from the range of 20 nm to 500 µm.

Preferably in any system, gas-diffusion membrane, and method disclosed herein, the selectivity-determining organic material is attached to the electrically conductive catalyst via physisoprtion (van der Waals interactions).

Preferably in any system, gas-diffusion membrane, and method disclosed herein, each of the oligomers comprises 2, 3, or 4 of the base units. Preferably in any system, gas-diffusion membrane, and method disclosed herein, each of the oligomers is a dimer comprising 2 of the base units. Optionally in any system, membrane, and methods disclosed herein, each of the oligomers is positively charged. Preferably in any system, gas-diffusion membrane, and method disclosed herein, each of the base units comprises at least one substituted or unsubstituted pyridinium group, at least one substituted or unsubstituted arylpyridinium group, and/or at least one substituted or unsubstituted phenanthrolinium group. Preferably in any system, gas-diffusion membrane, and method disclosed herein, each of the base units comprises at least one substituted or unsubstituted N-functionalized pyridinium group. Optionally in any system, gas-diffusion membrane, and method disclosed herein, each of the base units independently comprises a moiety characterized by Formula FX1A, FX1B, FX1C, FX1D, FX2A, FX2B, FX2C, FX2D, FX2E, FX3A, FX3B, FX3C, FX3D, or any combination of these. Optionally in any system, gas-diffusion membrane, and method disclosed herein, each of the base units independently comprises a moiety characterized by Formula FX1A, FX1B, FX1C, FX1D, FX2A, FX2B, FX2C, FX2D, FX2E, FX3A, FX3B, FX3C, or FX3D. Optionally in any system, gas-diffusion membrane, and method disclosed herein, each of the base units is independently characterized by Formula FX1A, FX1B, FX1C, FX1D, FX2A, FX2B, FX2C, FX2D, FX2E, FX3A, FX3B, FX3C, or FX3D. Preferably in any system, gas-diffusion membrane, and method disclosed herein, each of the base units is independently characterized by Formula FX1A, FX1B, FX1C, FX1D, FX2A, FX2B, FX2C, FX2D, FX2E, FX3A, FX3B, FX3C, FX3D, or any combination of these:

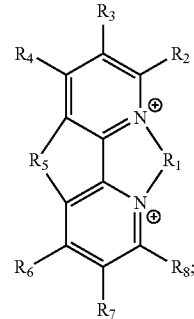

(FX1A)

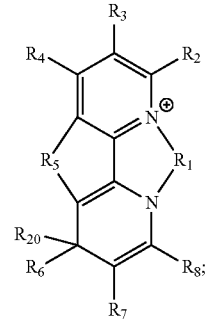

(FX1B)

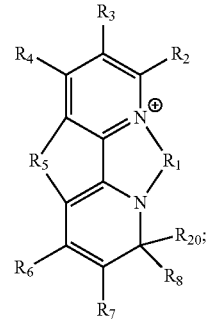

(FX1C)

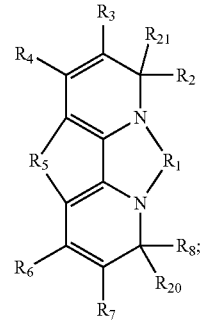

(FX1D)

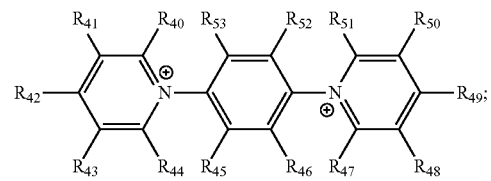

(FX2A)

-continued

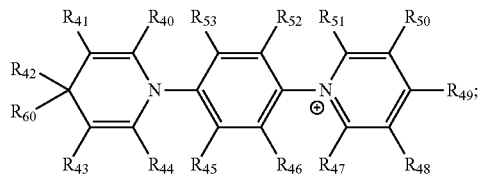 (FX2B)

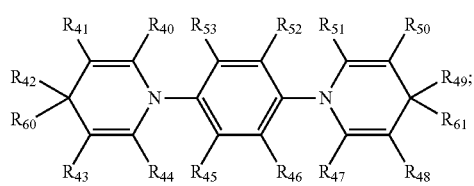 (FX2C)

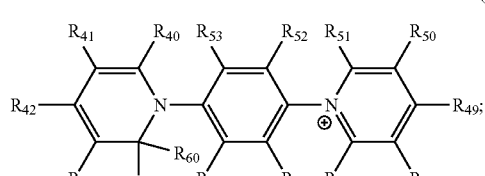 (FX2D)

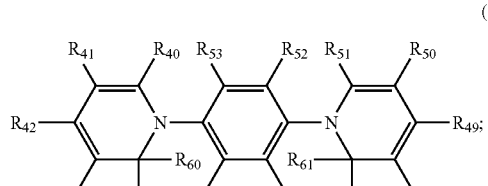 (FX2E)

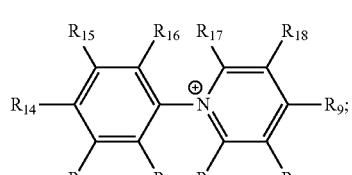 (FX3A)

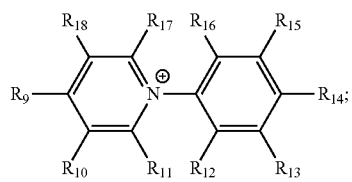 (FX3B)

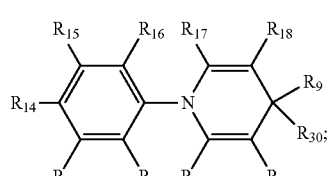 (FX3C)

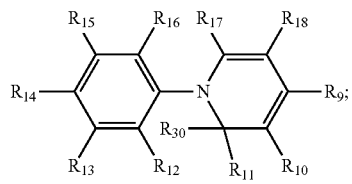 (FX3D)

wherein: each of $R_1$ and $R_5$ is a substituted or unsubstituted $C_2$ to $C_n$ alkylene group, a substituted or unsubstituted $C_2$ to $C_n$ heteroalkylene group, a substituted or unsubstituted $C_2$ to $C_n$ alkenylene group, or substituted or unsubstituted $C_2$ to $C_n$ heteroalkenylene group; n is an integer greater than 2 or an integer selected from the range of 2 to 100; each of $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$ is independently a single bond to another base unit of the respective oligomer, a divalent linker group to another base unit of the respective oligomer, a hydrogen, a halogen, or selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium (e.g., substituted pyridinium) and any combination of these; and each of $R_3$, $R_7$, $R_{10}$, $R_{12}$-$R_{16}$, $R_{18}$-$R_{21}$, $R_{30}$, $R_{41}$, $R_{43}$, $R_{45}$-$R_{46}$, $R_{48}$, $R_{50}$, $R_{52}$-$R_{53}$, and $R_{61}$ (or, any R group in Formulas FX1A, FX1B, FX1C, FX1D, FX2A, FX2B, FX2C, FX2D, FX2E, FX3A, FX3B, FX3C, and FX3D other than $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$) is independently a hydrogen, a halogen, or selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium (e.g., substituted pyridinium), and any combination of these. Optionally in any system, gas-diffusion membrane, and method disclosed herein, each of $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$ is independently a divalent linker group to another base unit of the respective oligomer, a hydrogen, a halogen, or selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium (e.g., substituted pyridinium), and any combination of these. Optionally in any system, gas-diffusion membrane, and method disclosed herein, each of the base units independently comprises a moiety characterized by Formula FX1E, FX1F, FX1G, FX1H, FX2F, FX2G, FX3E, FX3F, FX3G, or FX3H. Optionally in any system, gas-diffusion membrane, and method disclosed herein, each of the base units independently comprises a moiety characterized by Formula FX1E, FX1F, FX1G, FX1H, FX2F, FX2G, FX3E, FX3F, FX3G, FX3H, or any combination of these. Preferably in any system, gas-diffusion membrane, and method disclosed herein, each of the base units is independently characterized by Formula FX1E, FX1F, FX1G, FX1H, FX2F, FX2G, FX3E, FX3F, FX3G, FX3H, or any combination of these:

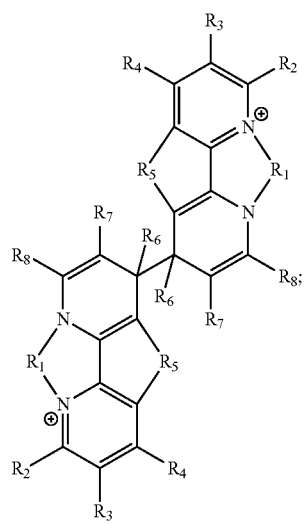
(FX1E)
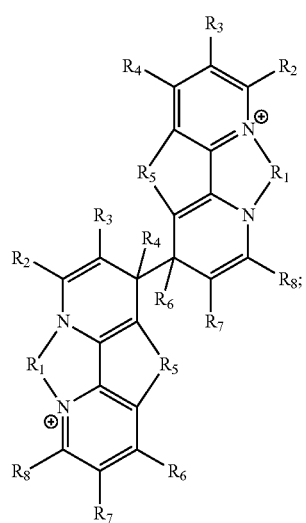
(FX1F)
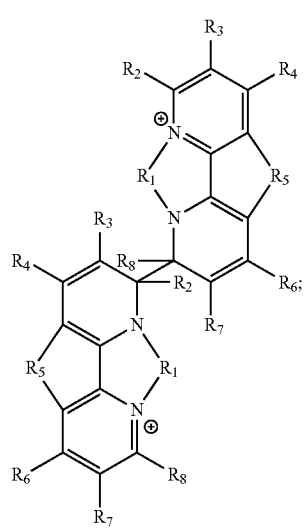
(FX1G)
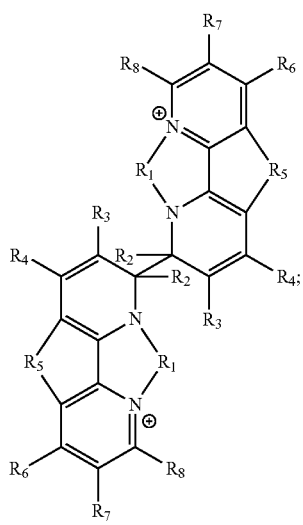
(FX1H)
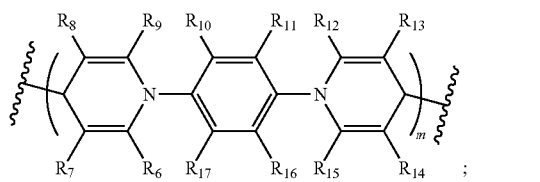
(FX2F)
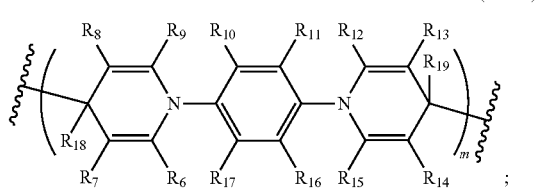
(FX2G)
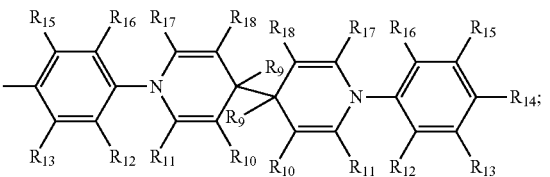
(FX3F)
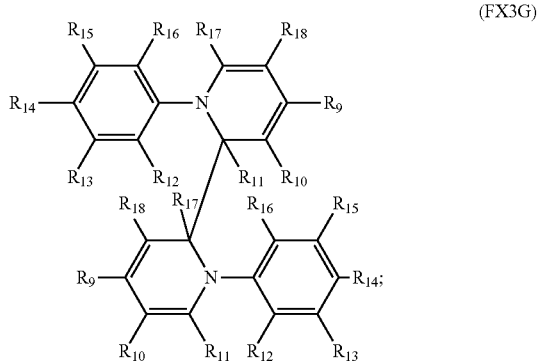
(FX3G)

-continued

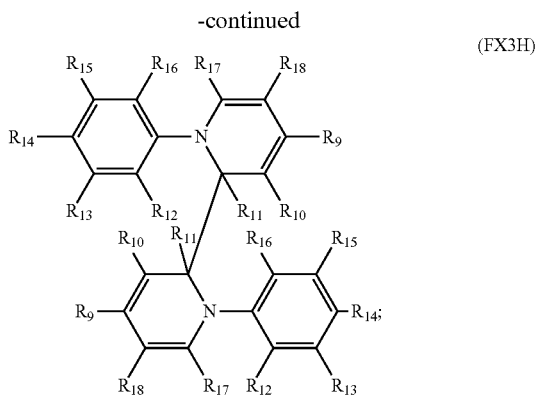

(FX3H)

wherein: each of $R_1$ and $R_5$ is a substituted or unsubstituted $C_2$ to $C_n$ alkylene group, a substituted or unsubstituted $C_2$ to $C_n$ heteroalkylene group, a substituted or unsubstituted $C_2$ to $C_n$ alkenylene group, or substituted or unsubstituted $C_2$ to $C_n$ heteroalkenylene group; n is an integer greater than 2 or an integer selected from the range of 2 to 100; each of $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$ is independently a divalent linker group to another base unit of the respective oligomer, a hydrogen, a halogen, or selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium (e.g., substituted pyridinium), and any combination of these; and each of $R_3$, $R_7$, $R_{10}$, $R_{12}$-$R_{16}$, $R_{18}$-$R_{21}$, $R_{30}$, $R_{41}$, $R_{43}$, $R_{45}$-$R_{46}$, $R_{48}$, $R_{50}$, $R_{52}$-$R_{53}$, and $R_{61}$ is independently a hydrogen, a halogen, or selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium (e.g., substituted pyridinium) and any combination of these. Optionally in any system, gas-diffusion membrane, and method disclosed herein, each of $R_3$, $R_7$, $R_{10}$, $R_{12}$-$R_{16}$, $R_{18}$-$R_{21}$, $R_{30}$, $R_{41}$, $R_{43}$, $R_{45}$-$R_{46}$, $R_{48}$, $R_{50}$, $R_{52}$-$R_{53}$, and $R_{61}$ is independently a hydrogen, a halogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{70}$, —$CONR^{71}R^{72}$, —$COR^{73}$, —$SOR^{74}$, —$OSR^{75}$, —$SO_2R^{76}$, —$OR^{77}$, —$SR^{78}$, —$NR^{79}R^{80}$, —$NR^{81}COR^{82}$, $C_1$-$C_{30}$ alkyl halide, phosphonate, phosphonic acid, silane, siloxane, silsesquioxane, $C_2$-$C_{30}$ halocarbon chain, pyrdinium, substituted pyridinium, or any combination thereof; each of $R^{70}$-$R^{82}$ is independently a H, $C_5$-$C_{10}$ aryl or $C_1$-$C_{10}$ alkyl, and any combination of these; and each $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$ is independently a divalent linker group to another base unit of the respective oligomer, a hydrogen, a halogen, $C_1$-$C_{30}$ alkyl, $C_3$-$C_{30}$ cycloalkyl, $C_5$-$C_{30}$ aryl, $C_5$-$C_{30}$ heteroaryl, $C_1$-Cao acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{70}$, —$CONR^{71}R^{72}$, —$COR^{73}$, —$SOR^{74}$, —$OSR^{75}$, —$SO_2R^{76}$, —$OR^{77}$, —$SR^{78}$, —$NR^{79}R^{80}$, —$NR^{81}COR^{82}$, $C_1$-$C_{30}$ alkyl halide, phosphonate, phosphonic acid, silane, siloxane, silsesquioxane, $C_2$-$C_{30}$ halocarbon chain, pyrdinium, substituted pyridinium, or any combination thereof.

Preferably in any system, gas-diffusion membrane, and method disclosed herein, the electrocatalyst layer provides for selectivity of at least 70%, more preferably at least 75%, more preferably at least 80%, more preferably at least 85%, more preferably at least 90%, more preferably at least 95%, more preferably at least 99%, for $C_{\geq 2}$ products of $CO_2$ reduction. Preferably in any system, gas-diffusion membrane, and method disclosed herein, the electrocatalytic system is characterized by a $CO_2$ reduction current density of at least 100 mA/cm$^2$, preferably at least 200 mA/cm$^2$, optionally selected from the range of 200 to 800 mA/cm$^2$, more preferably at least 300 mA/cm$^2$, more preferably at least 400 mA/cm$^2$, more preferably at least 500 mA/cm$^2$, more preferably at least 600 mA/cm$^2$, more preferably at least 700 mA/cm$^2$, and more preferably at least 800 mA/cm$^2$. Preferably in any system, gas-diffusion membrane, and method disclosed herein, the organic material stabilizes a morphology of the electron conducting catalyst for at least 60 hours, optionally selected from the range of 60 to 190 hours, preferably at least 100 hours, preferably at least 120 hours, preferably at least 150 hours, preferably at least 190 hours, during the $CO_2$ reduction with respect to the morphology of the electron conducting catalyst without the organic material thereon. Preferably in any system, gas-diffusion membrane, and method disclosed herein, the electrocatalytic system is characterized by a current density of at least 230 mA/cm$^2$ and a selectivity of at least 72% for ethylene production via $CO_2$ reduction for at least 190 hours. Preferably in any system, gas-diffusion membrane, and method disclosed herein, the electrocatalytic system is characterized by an energy efficiency of at least 20%.

Aspects of the invention include a porous gas-diffusion membrane comprising: a first side and a second side; and an electrocatalyst layer adjacent to the second side of the gas-diffusion membrane; the electrocatalyst layer comprising: an electrically conductive catalyst; and a selectivity-determining organic material attached to at least a portion of the electron conducting catalyst; wherein: the organic material is formed of a plurality of oligomers; each oligomer comprises a plurality of covalently bonded base units; and each base unit comprises at least one heterocyclic group having at least one nitrogen in its ring structure; wherein the porous gas-diffusion membrane is permeable to $CO_2$ gas; wherein the first side of the gas-diffusion membrane is capable of providing transport of $CO_2$ gas therethrough; and wherein the electron conducting catalyst is capable of being electrically connected to an electrode of an electrolytic system.

Aspects of the invention include a method of depositing an organic material onto an electrically conductive catalyst, the method comprising steps of: exposing the electrically conductive catalyst to an electrolyte; wherein: the electrically conductive catalyst is provided on a second side of a gas-diffusion membrane; the gas-diffusion membrane is electrically insulating, porous, and $CO_2$-permeable; the electrolyte comprises a first salt having a first concentration and at least one additive salt having a second concentration; the at least one additive comprises an organic cation having at least one heterocyclic group having at least one nitrogen in its ring structure; applying a current and/or voltage to the electrically conductive catalyst; and via the step of applying the current and/or voltage, reducing the at least one additive at the electrically conductive catalyst thereby depositing the organic material onto the electrically conductive catalyst;

wherein: the organic material is formed of a plurality of oligomers; each oligomer comprises a plurality of covalently bonded base units; and each base unit comprises at least one heterocyclic group having at least one nitrogen in its ring structure. Preferably in any embodiments disclosed herein, each of the at least one additive comprises at least one substituted or unsubstituted pyridinium group, at least one substituted or unsubstituted arylpyridinium group, and/or at least one substituted or unsubstituted phenanthrolinium group. Preferably in any embodiments disclosed herein, each of the at least one additive comprises at least one substituted or unsubstituted N-functionalized pyridinium group. Preferably in any embodiments disclosed herein, each of the at least one additive comprises at least one substituted or unsubstituted cation comprising a moiety characterized by Formula FX1A, FX2A, and FX3B. Preferably in any embodiments disclosed herein, each of the at least one additive comprises at least one substituted or unsubstituted cation characterized by Formula FX1A, FX2A, and

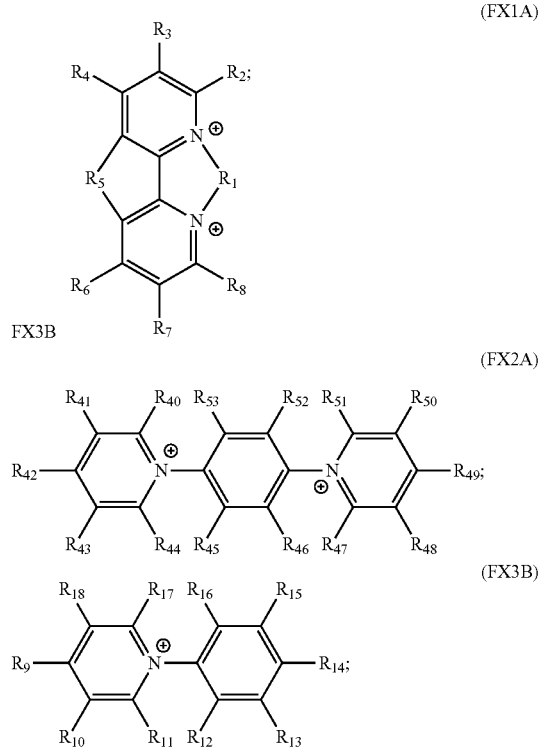

wherein: each of $R_1$ and $R_5$ is a substituted or unsubstituted $C_2$ to $C_n$ alkylene group, a substituted or unsubstituted $C_2$ to $C_n$ heteroalkylene group, a substituted or unsubstituted $C_2$ to $C_n$ alkenylene group, or substituted or unsubstituted $C_2$ to $C_n$ heteroalkenylene group; n is an integer greater than 2 or an integer selected from the range of 2 to 100; each of $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$ is independently a divalent linker group to another base unit of the respective oligomer, a hydrogen, a halogen, or selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium (e.g., substituted pyridinium), and any combination of these; and each of $R_3$, $R_7$, $R_{10}$, $R_{12}$-$R_{16}$, $R_{18}$-$R_{21}$, $R_{30}$, $R_{41}$, $R_{43}$, $R_{45}$-$R_{46}$, $R_{48}$, $R_{50}$, $R_{52}$-$R_{53}$, and $R_{61}$ is independently a hydrogen, a halogen, or selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium (e.g., substituted pyridinium), and any combination of these. Preferably in any embodiments disclosed herein, the electrolyte has a pH selected from the range of 6 to 14.

Aspects disclosed herein also include a method for reducing $CO_2$ gas using an electrolytic system, the method comprising steps of: applying a voltage between an anode and a cathode of the electrolytic system; wherein the electrolytic system comprises: the anode; the cathode in electrical communication with the anode, the cathode comprising: a first current collector; a porous gas-diffusion membrane having a first side and a second side; wherein the porous gas-diffusion membrane is permeable to $CO_2$; an electrocatalyst layer adjacent to the second side of the gas-diffusion membrane and in electrical communication with the first current collector; the electrocatalyst layer comprising: an electrically conductive catalyst; and a selectivity-determining organic material attached to at least a portion of the electrically conductive catalyst; wherein: the organic material is formed of a plurality of oligomers; each oligomer comprises a plurality of covalently bonded base units; and each base unit comprises at least one heterocyclic group having at least one nitrogen in its ring structure; and an anion exchange membrane adjacent to the electrocatalyst layer and positioned between the anode and the cathode; wherein anion exchange membrane is characterized by anion conductivity and the cathode is in ionic communication with the anode via the anion exchange membrane; delivering the $CO_2$ gas to the first side of the gas-diffusion membrane such that the $CO_2$ gas diffuses through the gas-diffusion membrane to the electrocatalyst layer; reducing the $CO_2$ gas at the electrocatalyst layer to produce at least one product gas at the electrocatalyst layer, the at least one product gas having a composition comprising at least two carbon atoms ($C_{\geq 2}$); wherein the organic material increases a selectivity for the at least one product gas with respect to reducing the $CO_2$ gas at the electrically conductive catalyst free of the organic material; and removing the at least one product gas from the gas-diffusion membrane.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1A. Reaction describing the electro-dimerization process that converts an N-arylpyridinium salt to a mixture of N-aryl-substituted tetrahydro-bipyridines. FIG. 1B. Molecular structures of additives 1-11. FIG. 1C. Trend for ethylene FE and calculated Bader charge for the nitrogen atom of the N-aryl-substituted tetrahydro-bipyridines prepared from 1-11. Owing to the symmetric molecular structure of the tetrahydro-bipyridines, a hydrogen atom was used to replace half of the dimer unit (see FIGS. 10A-10L for details). A spread of Bader charges for the nitrogen, covering the limiting values of the para,para and ortho,ortho structures, was plotted. The circles correspond to the average contribution from both the para,para and ortho,ortho isomers where their ratio could be determined by $^1$H NMR spectroscopy (see Example 2B Note 1 for details). The error bars for ethylene FE uncertainty represent one standard deviation based on three independent samples. The corresponding error bars for ethylene FE uncertainty were arbitrarily placed in the middle of the interval for those tetrahydro-bipyridines for which the para,para versus ortho,ortho ratio could not be reliably determined by $^1$H NMR spectroscopy. Molecules or compounds 1-11 shown in FIGS. 1A-1C are exemplary additives useful for forming selectivity-determining organic material, according to embodiments herein.

FIG. 2A. The relationship between the ethylene FE and the ratio of atop CO and bridge CO on Cu-x electrodes. The relative population of these two kinds of Cu-bound CO was calculated through the integrated areas of each band in the Raman spectra, which are proportional to the corresponding *CO coverage (see Example 2B Note 3 for more details). The error bars for ethylene FE uncertainty represent one standard deviation based on three independent samples. FIG. 2B. The relationship between the ratio of atop CO to bridge CO on Cu-x and the Bader charge for the nitrogen atom of the N-aryl-substituted tetrahydro-bipyridine formed from additive x. The Bader charges and associated uncertainty were calculated using the same protocol as in FIGS. 1A-1C. The error bars for the ratio of $CO_{atop}$ to $CO_{bridge}$ in FIGS. 2A and 2B represent one standard deviation based on two independent measurements. FIG. 2C. Energy barriers of the dimerization of two CO at both bridge sites and two CO at bridge and atop sites, respectively. IS, initial state; TS, transient state; FS, final state. FIG. 2D. Plots of electron density difference for the CO adsorption with one water layer and the tetrahydro-bipyridine formed from 1. The yellow and blue contours represent electron density accumulations and depressions, respectively. Dashed lines indicate hydrogen bond network. Red, O; grey, C; blue, N; white, H; pink, Cu.

FIG. 3A. Reaction describing the electro-oligomerization of the N,N'-(1,4-phenylene)bispyridinium salt 12 to form an N-aryl-dihydropyridine-based oligomer. FIG. 3B. FE of ethylene on Cu and Cu-12 using $CO_2$-saturated 1 M $KHCO_3$ as the supporting electrolyte. FIG. 3C. FEs of CO and ethylene on Cu and Cu-12 at the applied potential range of −0.47 V to −0.84 V. The error bars for FE uncertainty represent one standard deviation based on three independent samples. Compound 12 shown in FIG. 3A is an exemplary additive useful for forming selectivity-determining organic material, according to embodiments herein. Cu-12 refers to a selectivity-determining organic material derived or formed from compound 12 and attached to Cu.

FIGS. 5A-5L. $^1$H NMR of the molecules 1-4. (Shown in FIGS. 5A-5D) The spectra of 1 and 2 were recorded in $D_2O$ (298 K) and the rest in DMSO-$d_6$ (298 K). $^1$H NMR of the molecules 5-8. (Shown in FIGS. 5E-5H) The spectrum of 5 was recorded in $D_2O$ (298 K) and the rest in DMSO-$d_6$ (298 K). $^1$H NMR of the molecules 9-12. (Shown in FIGS. 5I-5L) The spectra of 9 and 11 were recorded in $D_2O$ (298 K) and the rest in DMSO-$d_6$ (298 K). Any of molecules 1-12 referred to in these figures correspond to respective molecules of molecules 1-12 illustrated in FIG. 1B.

FIGS. 6A-6E. $^{13}$C NMR of the new molecules 7-9. (Shown in FIGS. 6A-6C) The spectrum of the molecule 9 was recorded in $D_2O$ (298 K) and the rest in DMSO-$d_6$ (298 K). $^{13}$C NMR of the new molecules 10 and 11. (Shown in FIGS. 6D-6E) The spectrum of the molecule 10 was recorded in DMSO-$d_6$ (298 K) and 11 in $D_2O$ (298 K). Any of molecules 1-12 referred to in these figures correspond to respective molecules of molecules 1-12 illustrated in FIG. 1B.

FIGS. 9A-9M. Molecular structures and $^1$H NMR spectra of N-aryl-substituted tetrahydro-bipyridines formed from additives 1-5. (Shown in FIGS. 9A-9E) The $^1$H NMR spectrum of the tetrahydro-bipyridine from additive 2 could not be assigned. Molecular structures and $^1$H NMR spectra of the N-aryl-substituted tetrahydro-bipyridines formed from additives 6-10. (Shown in FIGS. 9F-9J) The $^1$H NMR spectra of the tetrahydro-bipyridines from additives 7, 9 and 10 could not be assigned. Molecular structures and $^1$H NMR spectra of the N-aryl-substituted tetrahydro-bipyridine and oligomer formed from additives 11 and 12. (Shown in FIGS. 9K-9L) All the spectra were recorded in $CD_2Cl_2$ except the film from molecule 8 which was recorded in $CDCl_3$ (298 K)$^1$. FIG. 9L. $^1$H NMR spectrum zoomed in the region of interest of the oligomer formed from molecule 12 in $CD_2Cl_2$. The spectrum suggests that the film deposited on the Cu electrode consists of an oligomer. The two end groups consist of 1-(1-4dihydropyridine)phenyl-4-pyridinium moieties and the repeating unit of a 1-4-di(1-4dihydropyridine)phenyl block. From the ratio between the numbers of protons of the two end groups and the repeating units (accounted for 28 protons and 84 protons, respectively) the number of repeating units was found to be three. Therefore, the oligomer deposited on the Cu appears to result primarily from the reductive coupling of five N,N'-(1,4-phenylene)bispyridinium additive (12). To prepare sufficient quantities of film for NMR characterization (FIGS. 9A-9L), longer electrodeposition time at a fixed applied potential (−1 V vs. RHE) on a copper foil electrode was adopted. FIG. 9M. In order to evaluate if the chemical composition of the film prepared by this method was the same as the one prepared for electrocatalysis measurement, we compared the $^1$H NMR spectra of films formed from additive 1 prepared by both methods (top for fixed applied potential on copper foil, bottom for fixed current on electrode described in Electrode Preparation part in Methods). The spectra are very similar, indicating the films prepared by both methods have similar composition. * denotes signal from benzene contamination. Any of molecules 1-12 referred to in these figures correspond to respective molecules of molecules 1-12 illustrated in FIG. 1B.

FIGS. 10A-10L. Formal Bader charges of the N-aryl-substituted tetrahydro-bipyridines and the N-aryl-dihydro-pyridine-based oligomer formed from molecule 1-12. Due to the symmetric molecular structure of the tetrahydro-bipyridines, we used a hydrogen atom to replace half of the tetrahydro-bipyridine unit. The position of carbon atom with this hydrogen atom was labelled in purple. The oligomer was calculated as resulting from three units of initial additive. The hydrogen atoms and corresponding formal Bader charges were not shown to keep the values of interest easy to read. The Bader charge of an atom is calculated by subtraction of the formal Bader charges from the outermost electron number of the atom (1, 4, 5, 6, 7 and 7 for H, C, N, O, Cl and F, respectively). Taking nitrogen atom in FIG. 10A as an example: The Bader charge is 5−6.240=−1.240. The Bader charge of nitrogen atom of tetrahydro-bipyridines was calculated by averaging the charges in the ortho,ortho and the para,para tetrahydro-bipyridines in cases where their ratio could be determined from $^1$H NMR data (FIGS. 10A-10L) using the following equation: Any of molecules 1-12 referred to in these figures correspond to respective molecules of molecules 1-12 illustrated in FIG. 1B. Bader charge of $$N_{average} = \text{Bader charge}_{para} \times \text{percentage}_{para} + \text{Bader charge}_{ortho} \times (1 - \text{percentage}_{para})$$

The Bader charge of nitrogen atom in the oligomer was calculated by averaging the charges of all the six nitrogen atoms.

Figure 1A:
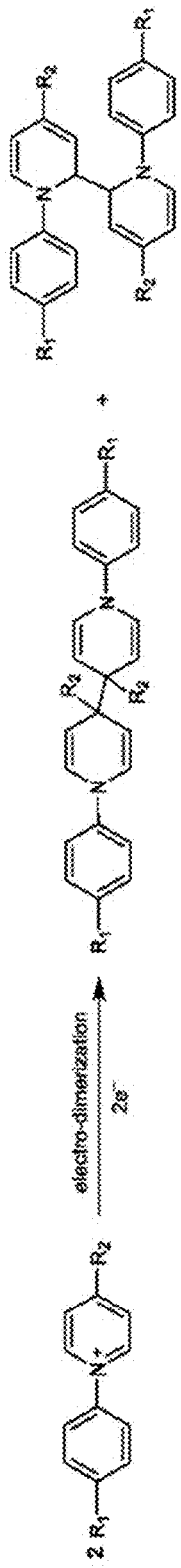
FIGS. 1A-1C. Dimerization of N-arylpyridinium additives, and correlation of ethylene selectivity with Bader charge.
Figure 1B:
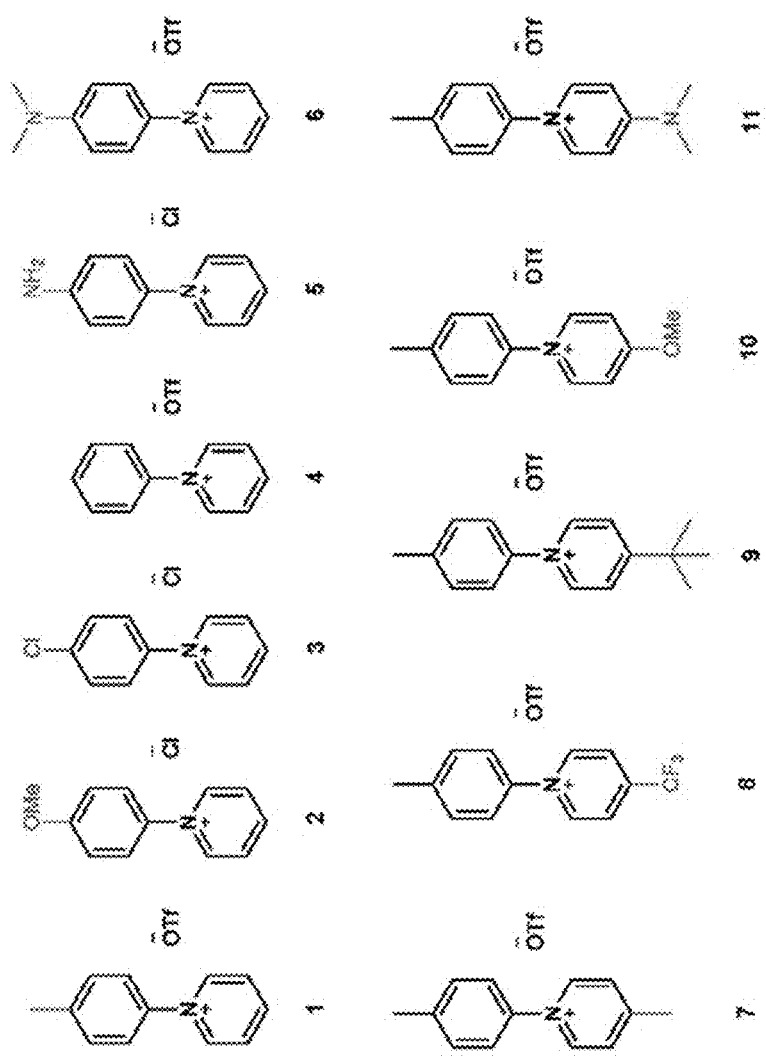
Figure 11A:
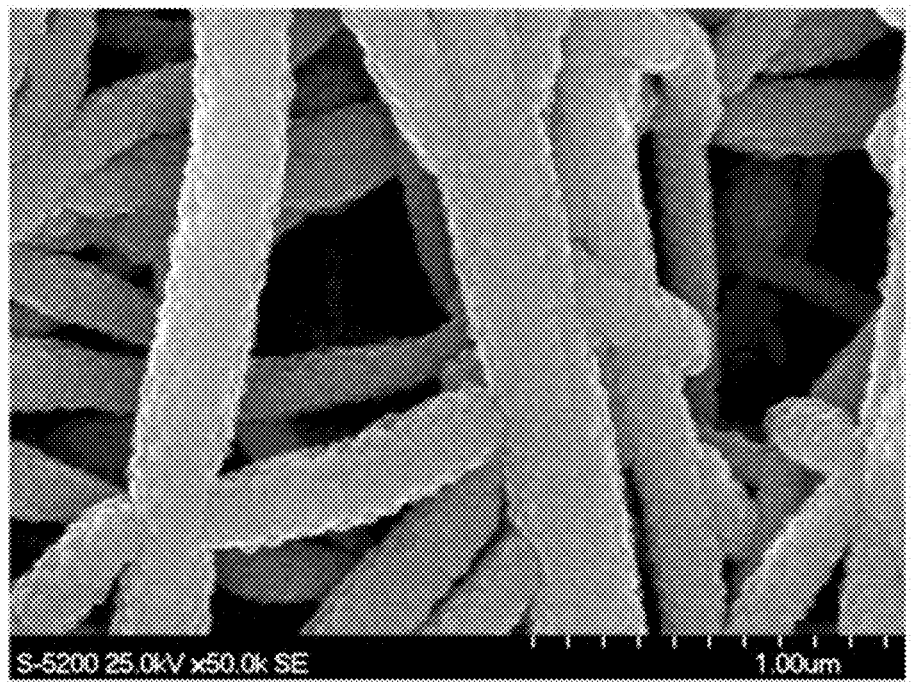
Figure 11B:
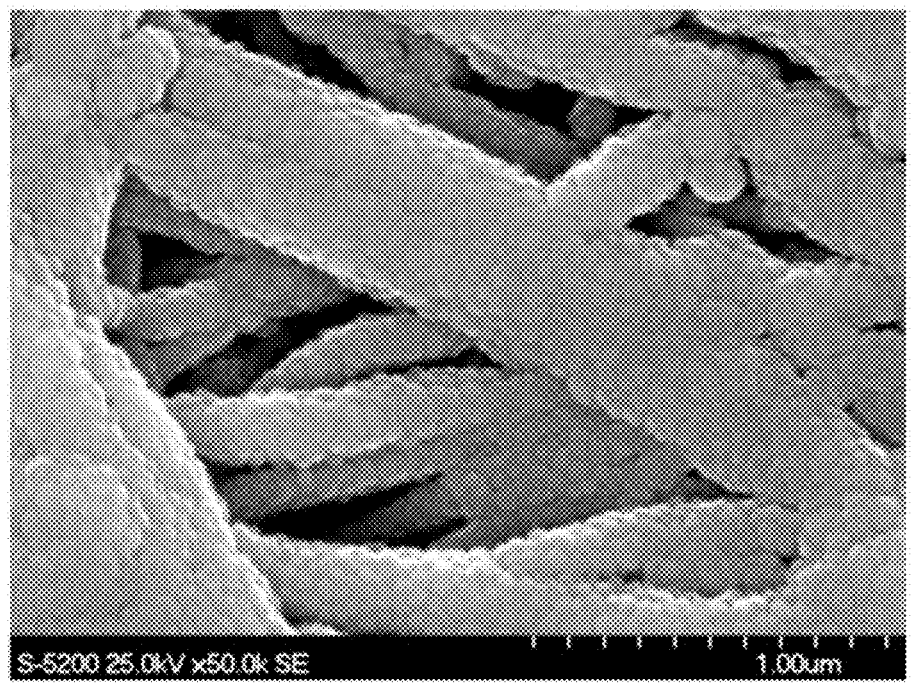
Figure 11C:
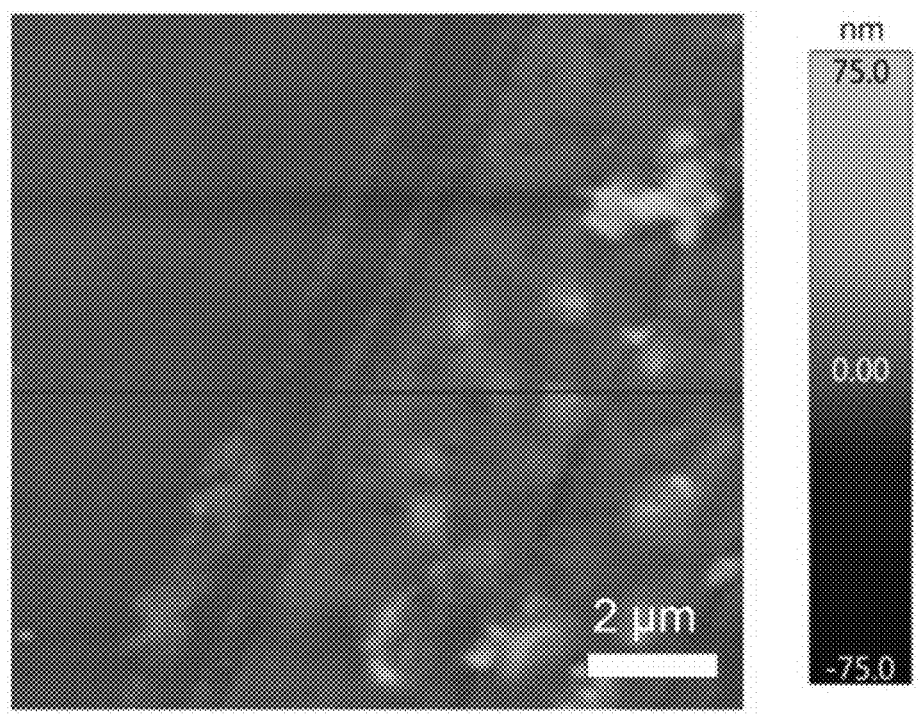
Figure 11D:
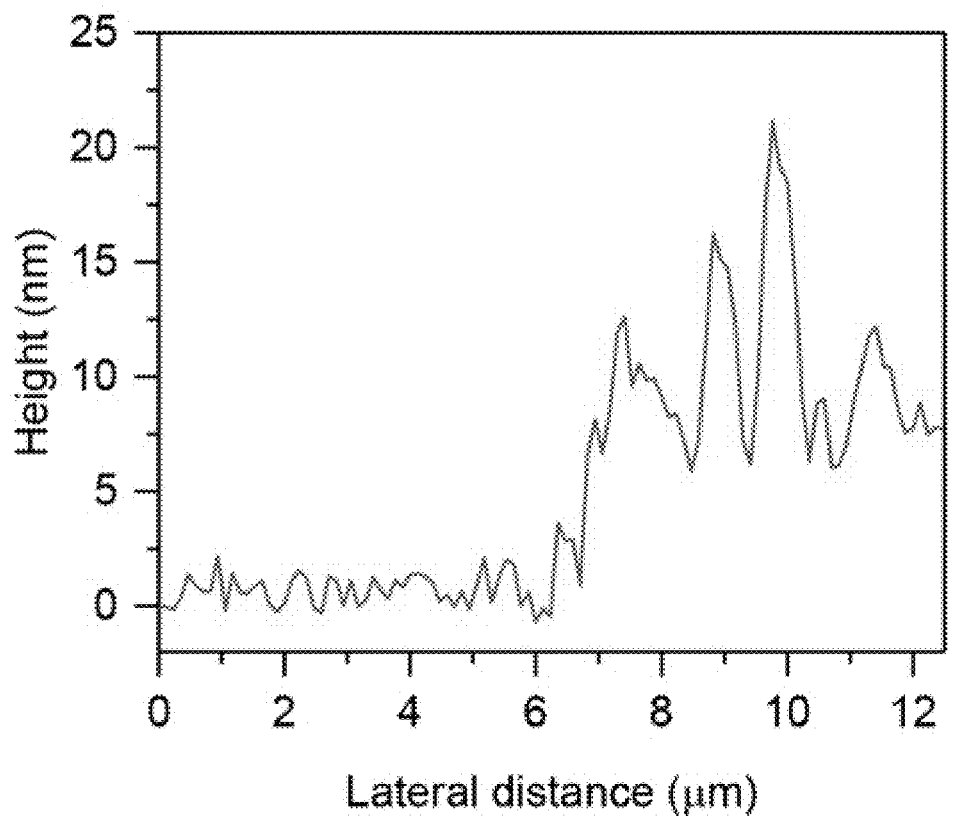
Figure 11E:
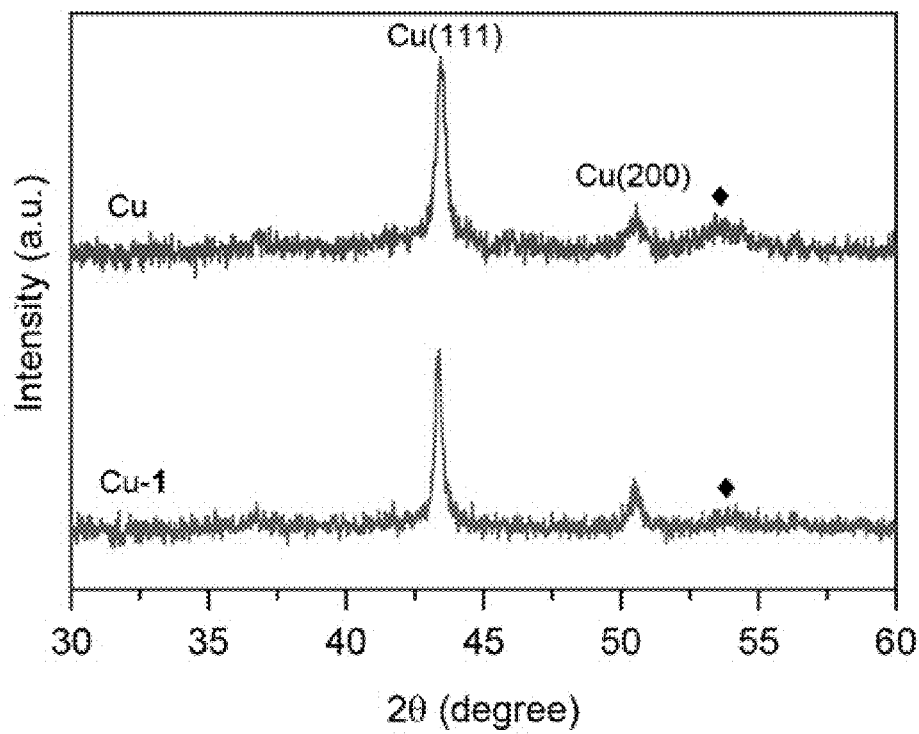
Figure 11F:
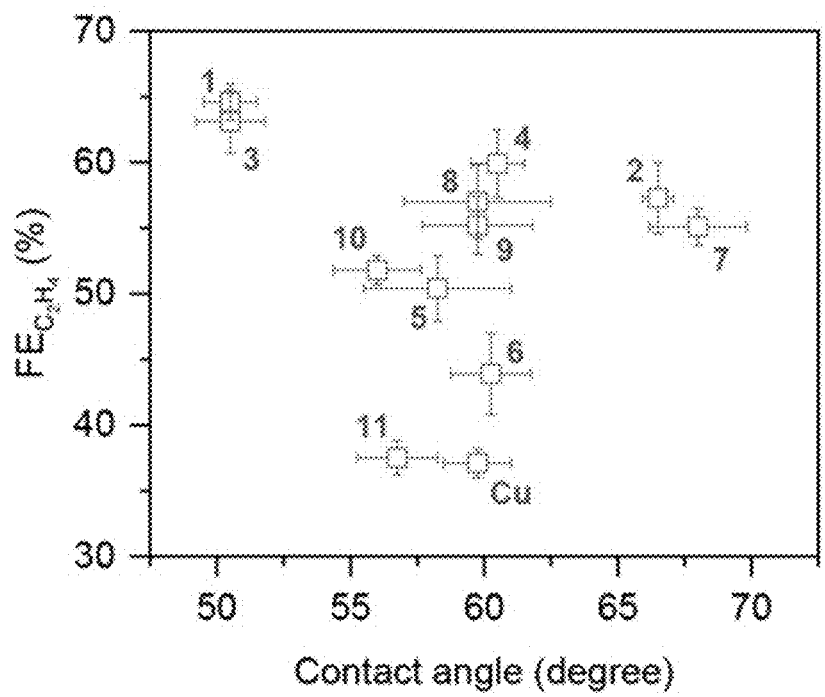

FIGS. 11A-11F. Characterizations of tetrahydro-bipyridine modified Cu electrode. SEM before (FIG. 11A) and after (FIG. 11B) modification of N-aryl-substituted tetrahydro-bipyridine formed from 1 on PTFE electrode sputtered with 300 nm Cu. AFM (FIG. 11C) and corresponding height profile (FIG. 11D) of the film electrodeposited from 1 on a silicon wafer. FIG. 11E. XRD patterns before and after modification of the tetrahydro-bipyridine formed from 1 on the electrode. The peak labeled by ♦ belongs to PTFE substrate. FIG. 11F. Contact angles on bare Cu and Cu modified by tetrahydro-bipyridines formed from 1-11. The values are at the range of 40-60 degree. Any of molecules 1-12 referred to in these figures correspond to respective molecules of molecules 1-12 illustrated in FIG. 1B.

Figure 12A:
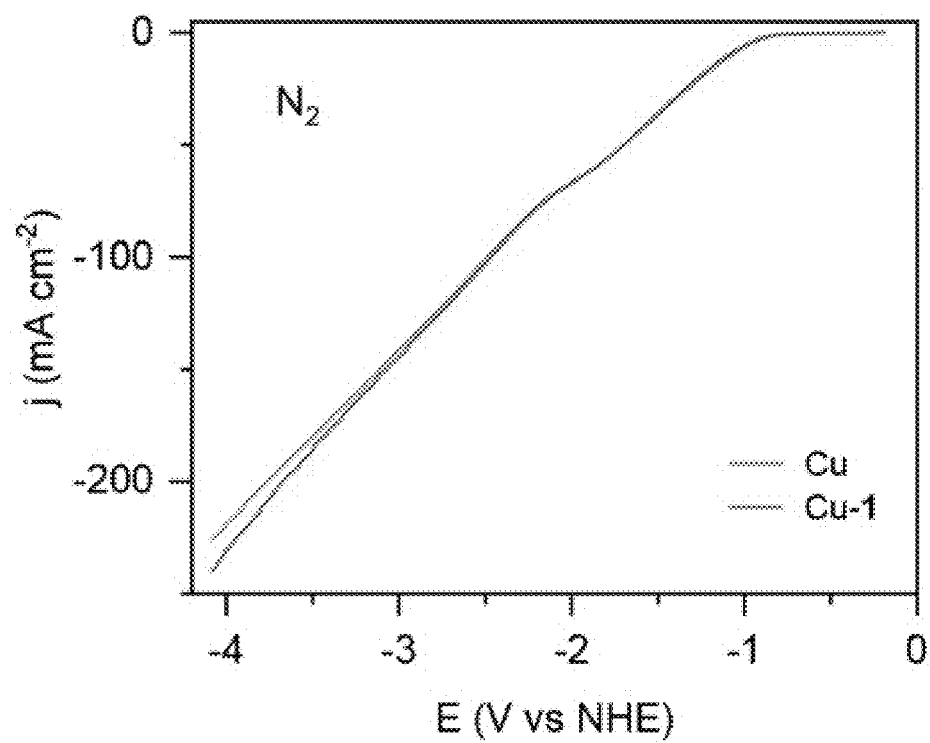
Figure 12B:
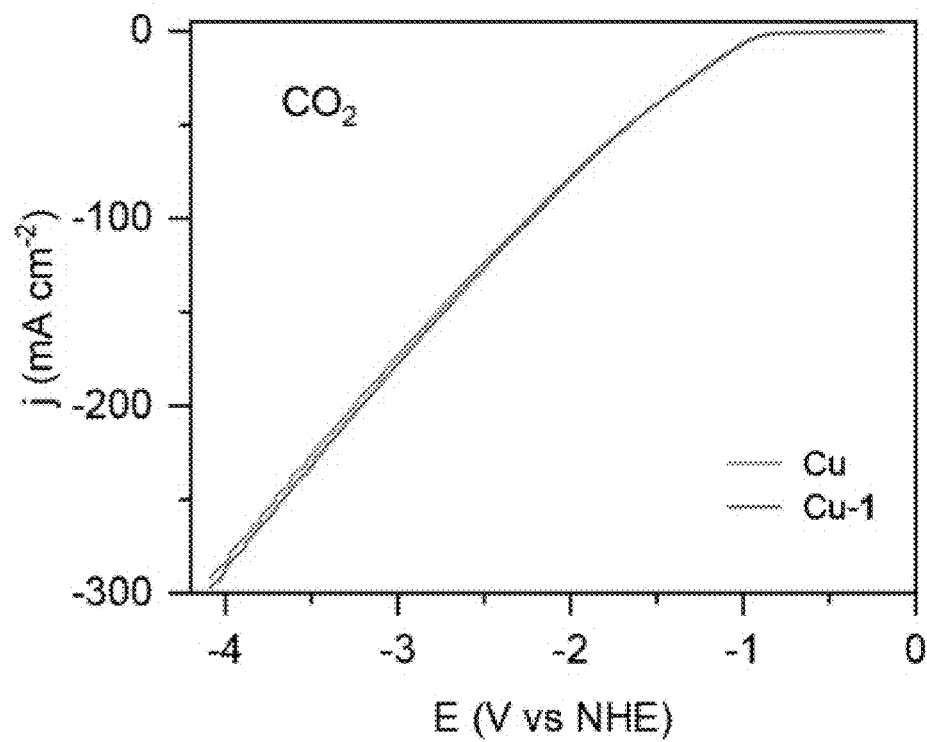
Figure 12C:
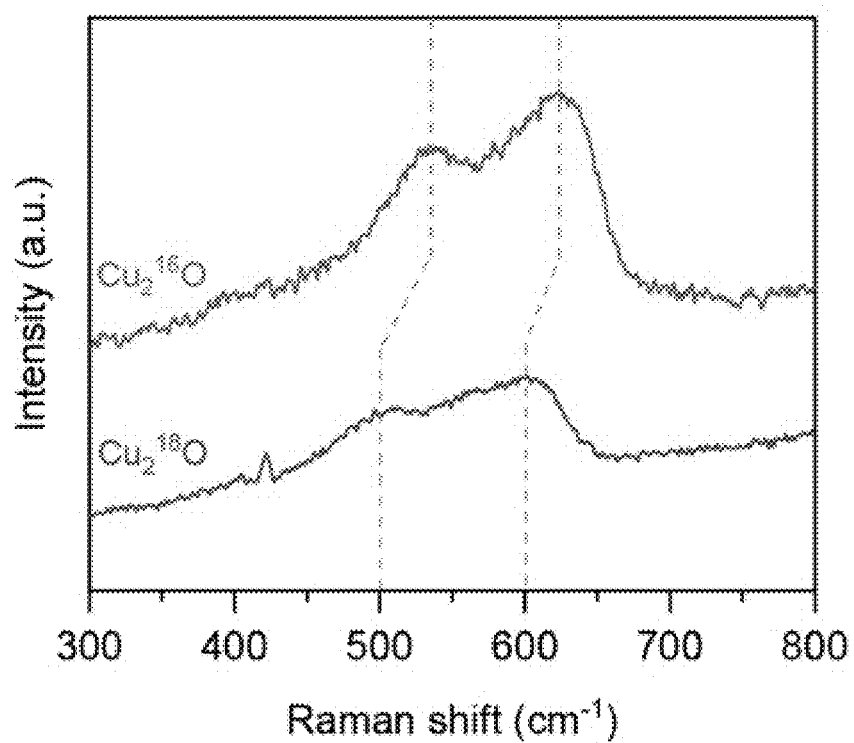
Figure 12D:
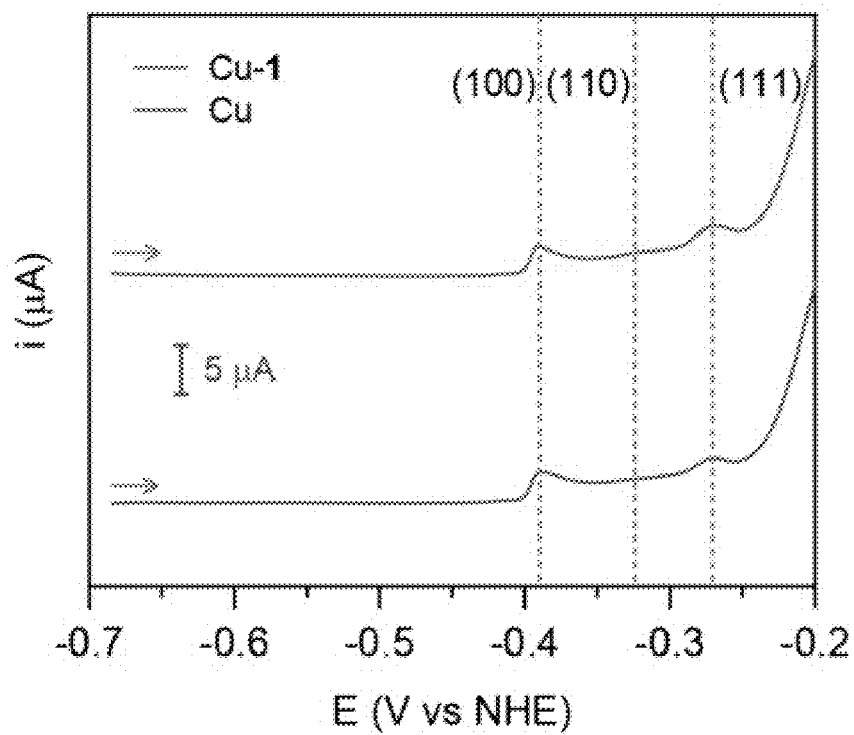

FIGS. 12A-12D. Transport properties of reactants and ions and local environment near active Cu surface. Linear sweep voltammetry curves of Cu and Cu-1 electrodes in a liquid-electrolyte flow cell using 1 M KHCO$_3$ as electrolyte. N$_2$ (FIG. 12A) or CO$_2$ (FIG. 12B) was flowed through the gas chamber. The electrolytes were stopped flowing during measurements. FIG. 12C. Raman spectra of Cu$_2$O formed from electrochemical oxidation of Cu-1 by sweeping the potential from −0.6 V to +0.2 V vs Ag/AgCl at a scan rate of 20 mV s$^{-1}$ in 0.1 M KHCO$_3$ solution (containing 35 mM KCl) saturated with N$_2$. The electrolytes were prepared using $^{18}$O labeled water (H$_2$$^{18}$O) or unlabeled water (H$_2$$^{16}$O), respectively. FIG. 12D. OH$^-$ adsorption curves of Cu and Cu-1 electrodes in 0.1 M KOH solution saturated with N$_2$.

Figure 13:
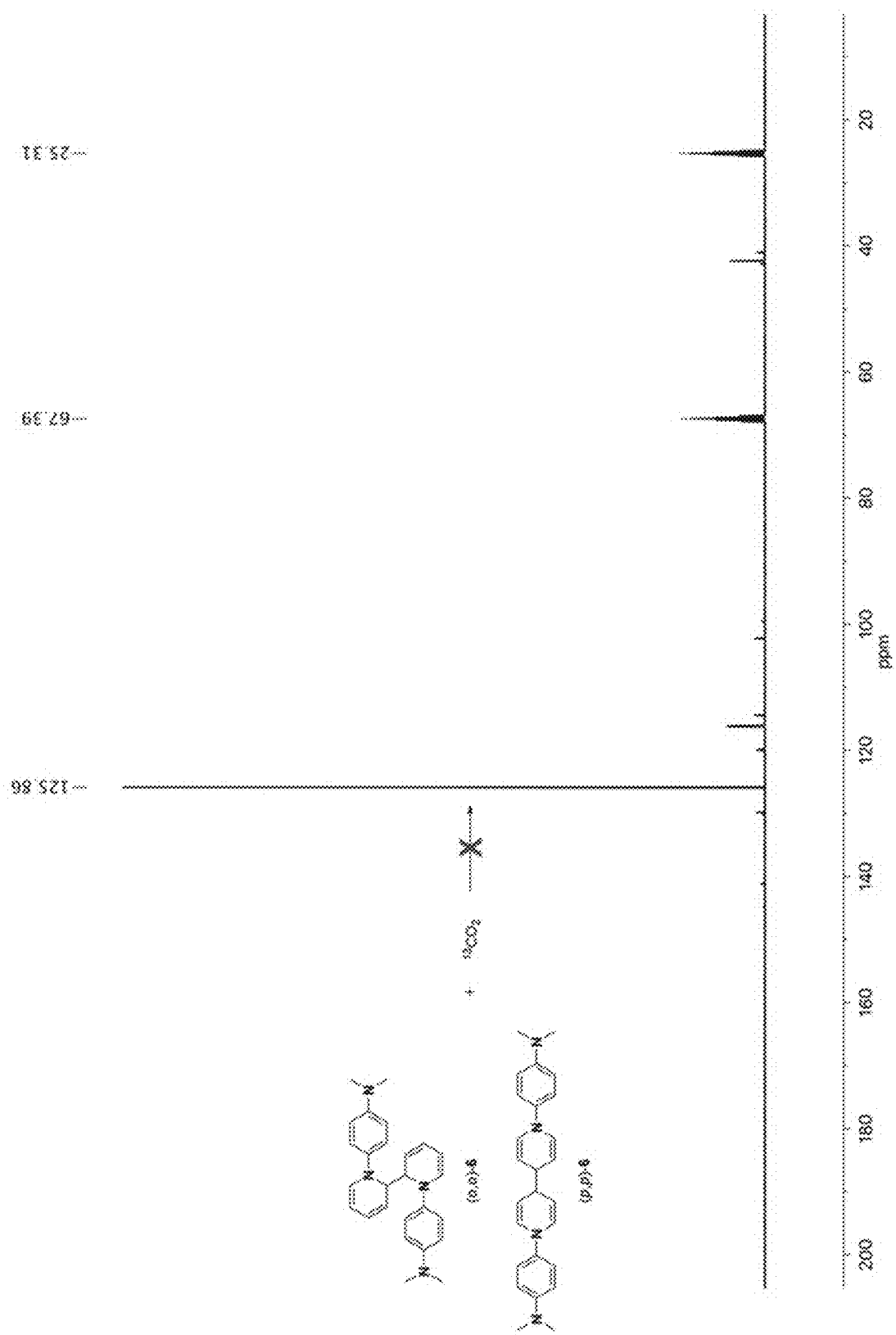

FIG. 13. $^{13}$C NMR spectrum of the species after the reaction between $^{13}$CO$_2$ and tetrahydro-bipyridine dimerized from molecule 6. Peak at 125.86 ppm corresponds to dissolved $^{13}$CO$_2$ in the reaction mixture.

Figure 14:
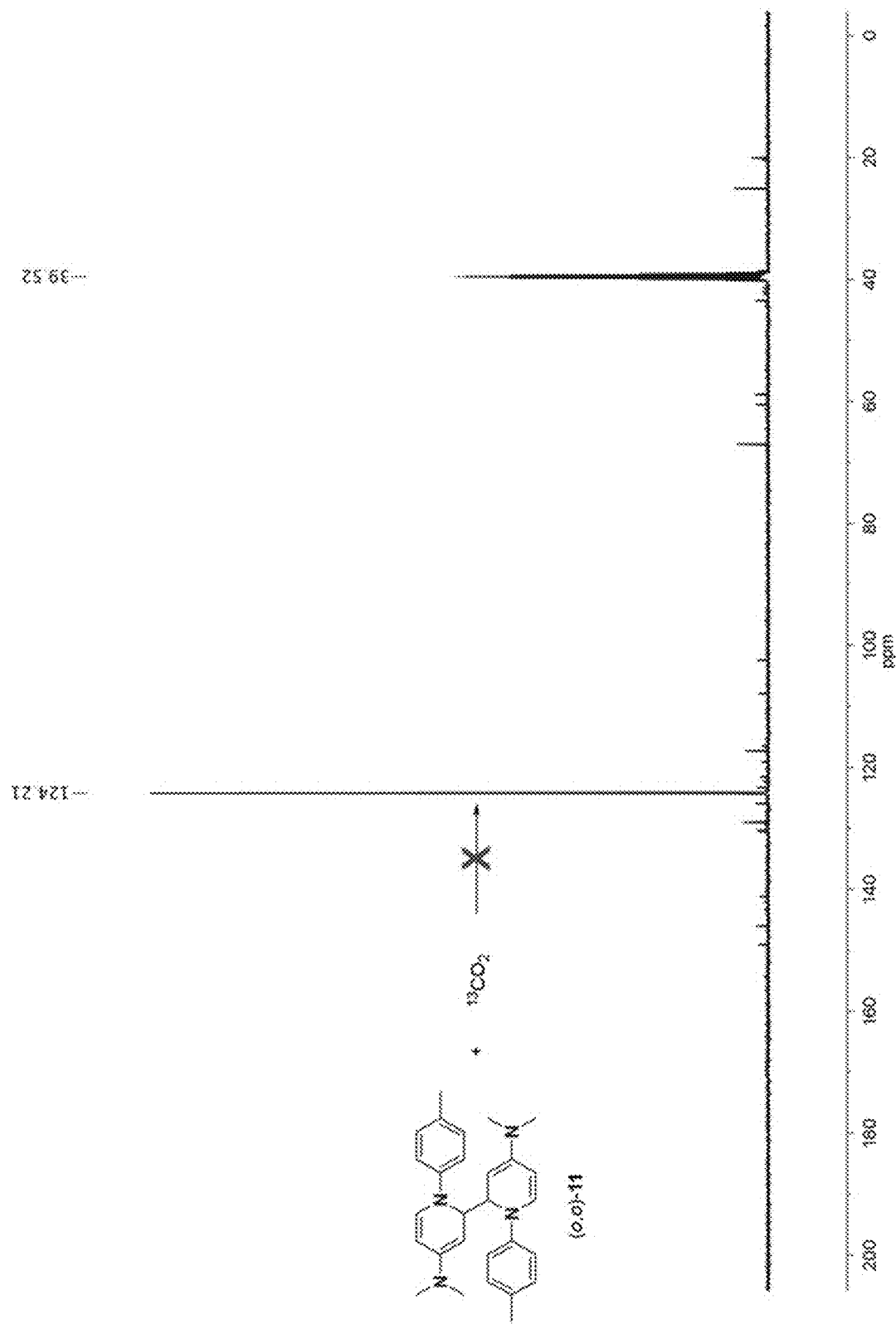

FIG. 14. $^{13}$C NMR spectrum of the species after the reaction between $^{13}$CO$_2$ and tetrahydro-bipyridine dimerized from molecule 11. Peak at 125.86 ppm corresponds to dissolved $^{13}$CO$_2$ in the reaction mixture.

Figure 15:
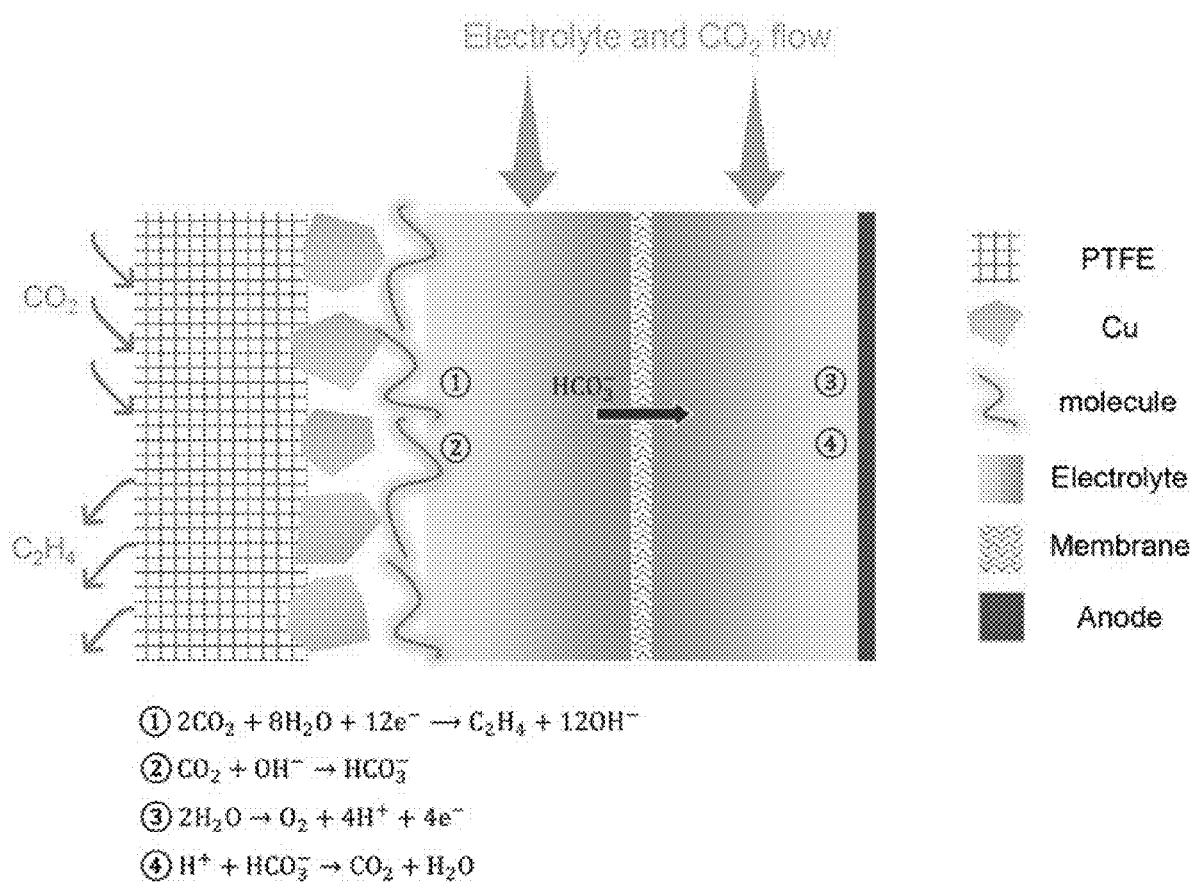

FIG. 15. Schematic illustration of the liquid-electrolyte flow cell and chemical reactions during CO$_2$RR. The flow cell consists of gas chamber, catholyte chamber, and anolyte chamber. The PTFE electrode (300 nm thick Cu with molecule functionalization) was sandwiched between CO$_2$ gas chamber and catholyte chamber and was used as cathode. A Ag/AgCl electrode (3 M KCl) was inserted in the cathode chamber and worked as reference electrode. A piece of Ni foam was employed as anode. Catholyte and anolyte chambers were separated by an anion-exchange membrane. Aqueous KHCO$_3$ electrolytes (1 M, saturated with CO$_2$) were used as both catholyte and anolyte and were circulated through the flow cell using peristaltic pumps. CO$_2$ was kept flowing into both catholyte and anolyte to maintain ion strength and pH during the entire electrolysis. The CO$_2$ gas was flowed into the gas chamber with a constant flow rate controlled by a digital gas flow controller. The gaseous products were sampled by a gas-tight syringe and analyzed by gas chromatography. A photo of the flow cell can be found in the previous report.

Figure 16A:
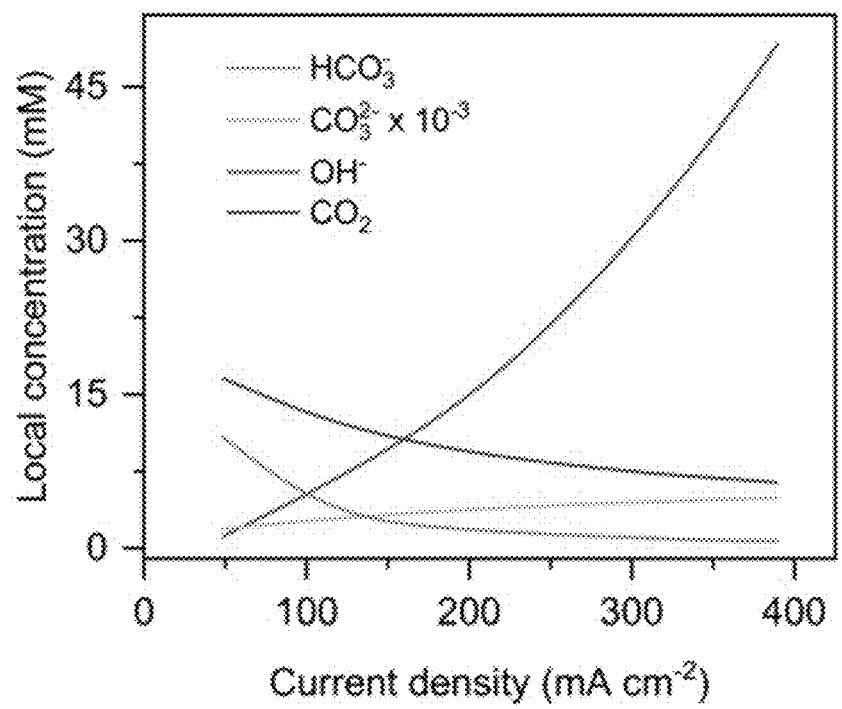
Figure 16B:
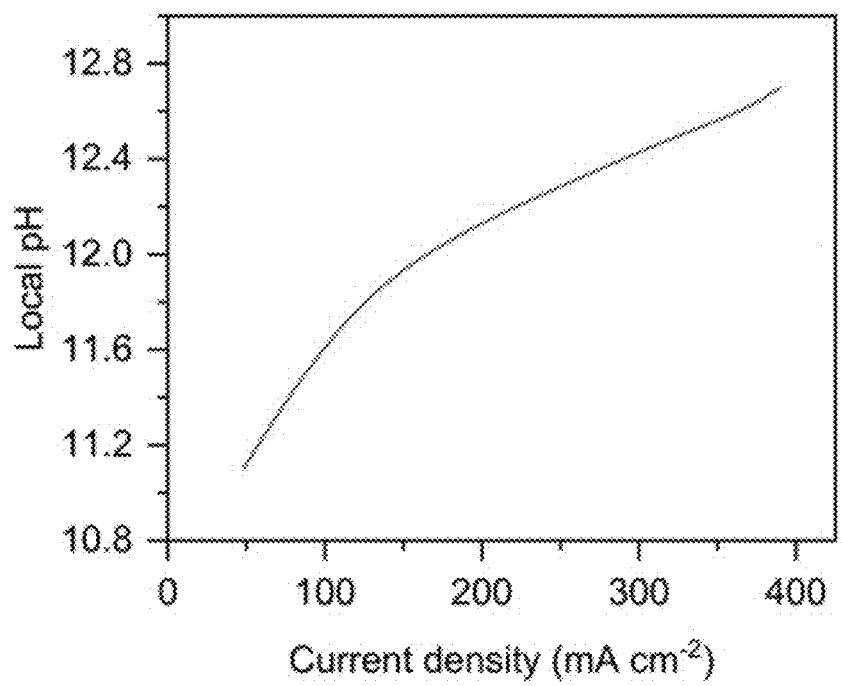

FIGS. 16A-16B. Local species modelling in the catalyst layer at different current densities. FIG. 16A. Concentrations of OH$^-$, CO$_3$$^{2-}$, HCO$_3$$^-$ and CO$_2$. FIG. 16B. Local pH.

Figure 17:
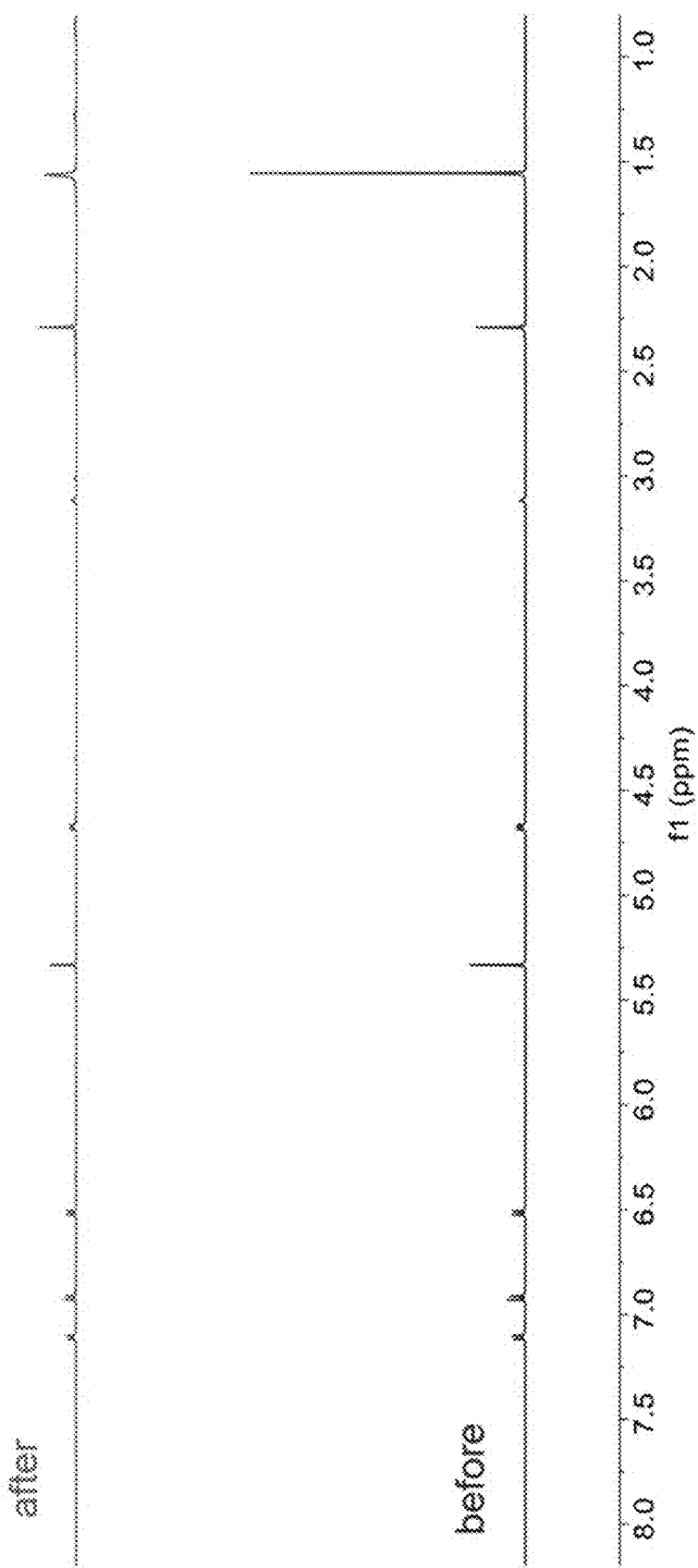

FIG. 17. $^1$H NMR spectra of tetrahydro-bipyridine dimerized from molecule 1 before and after electrolysis in 1 M KOH. The electrolysis was carried out in the liquid-electrolyte flow cell using 1 M aqueous KOH solution as electrolyte for 2 hours. The local pH is higher than that in 1 M KHCO$_3$ solution. The $^1$H NMR spectrum of the film after electrolysis was the same as the spectrum before electrolysis, suggesting that the film is resistant to OH$^-$. The spectrum was recorded in CD$_2$Cl$_2$ (298 K).

Figure 18:
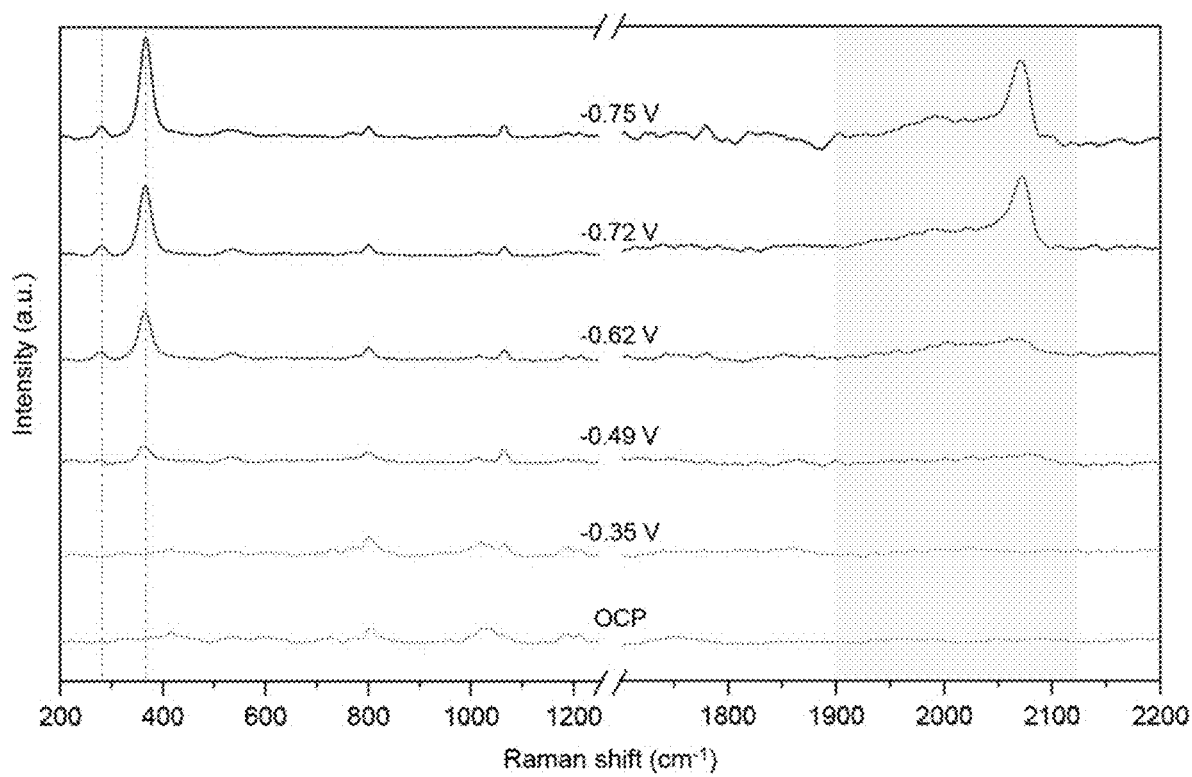
Figure 19A:
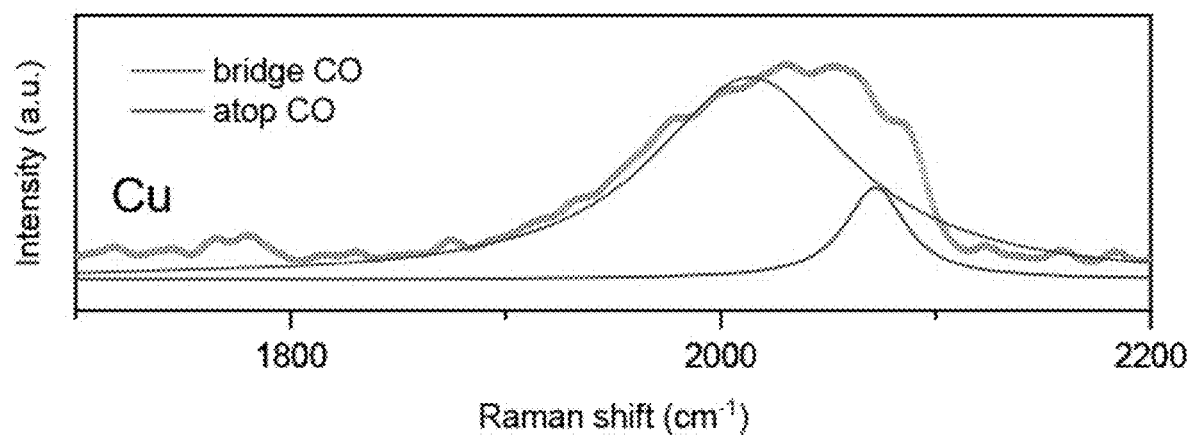
Figure 19B:
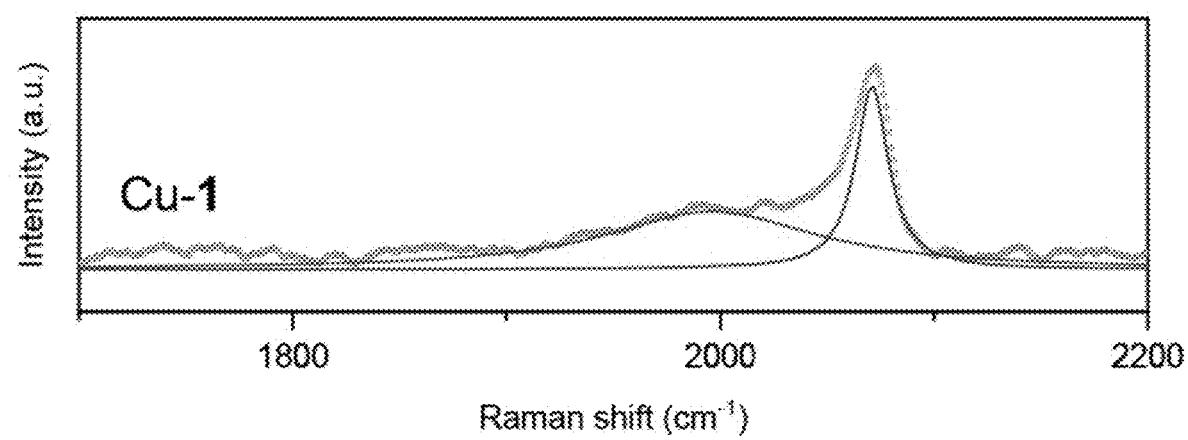
Figure 19C:
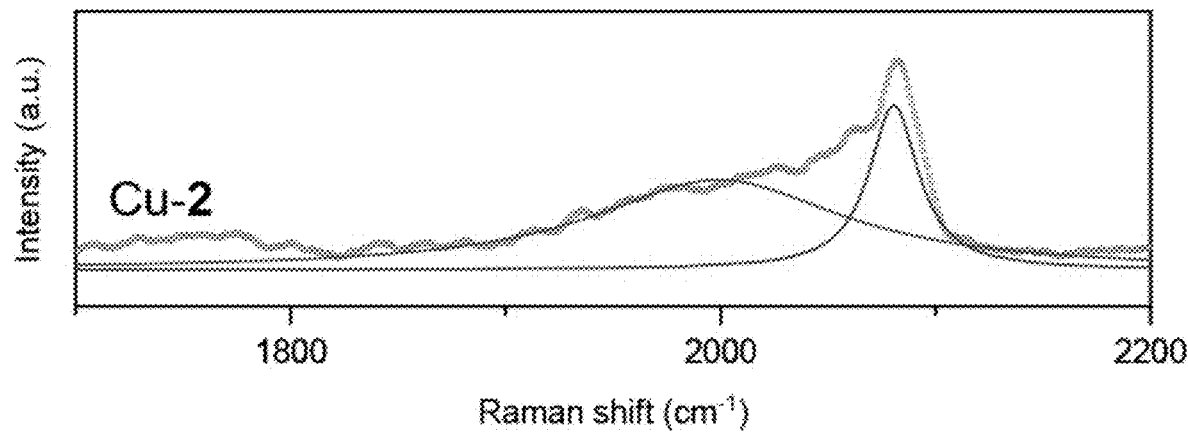
Figure 19D:
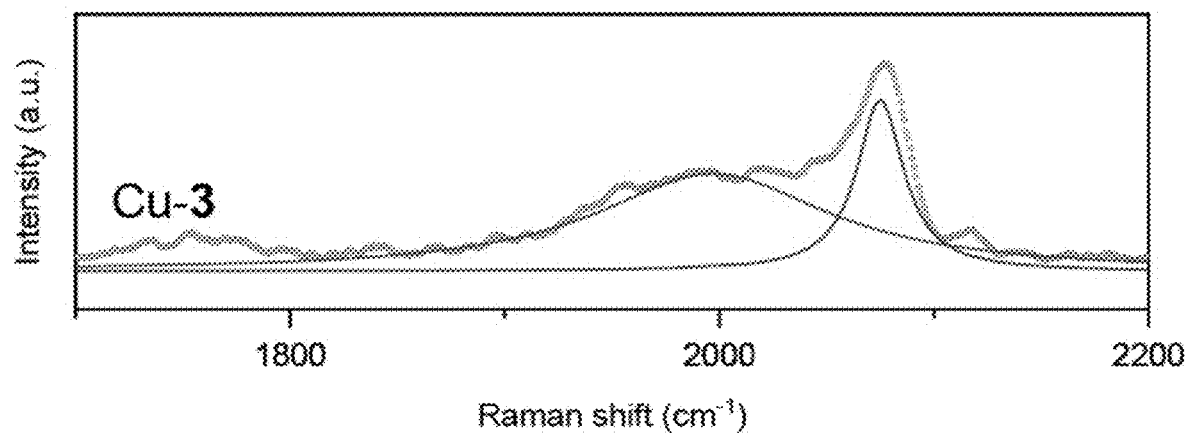
Figure 19E:
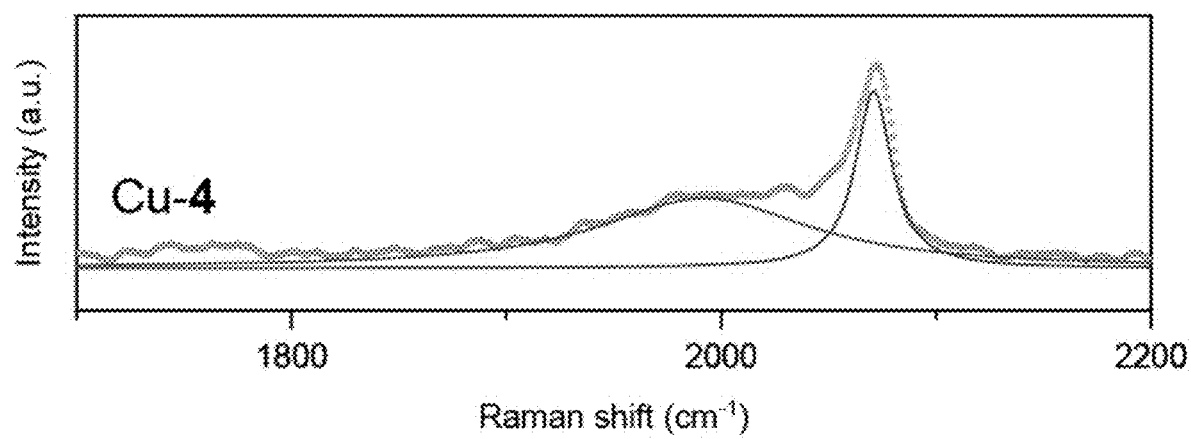
Figure 19F:
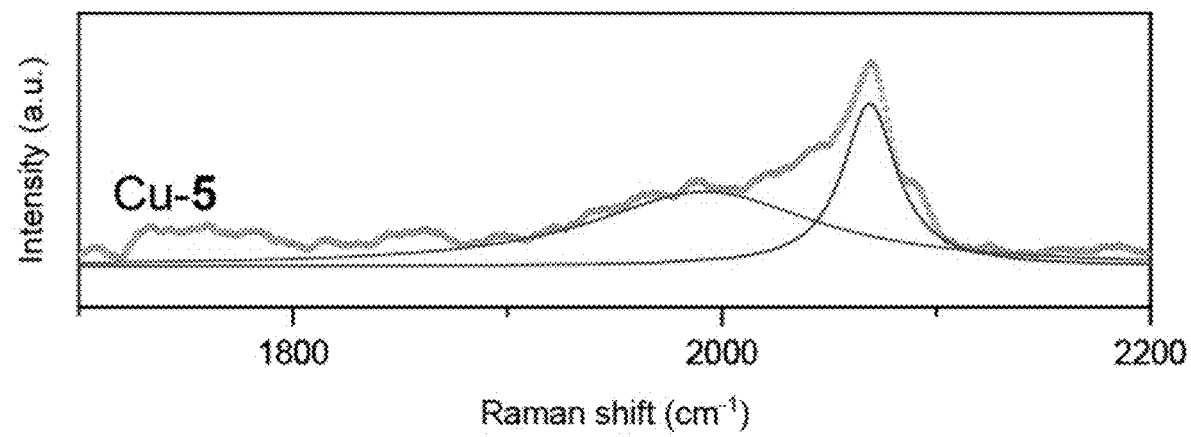
Figure 19G:
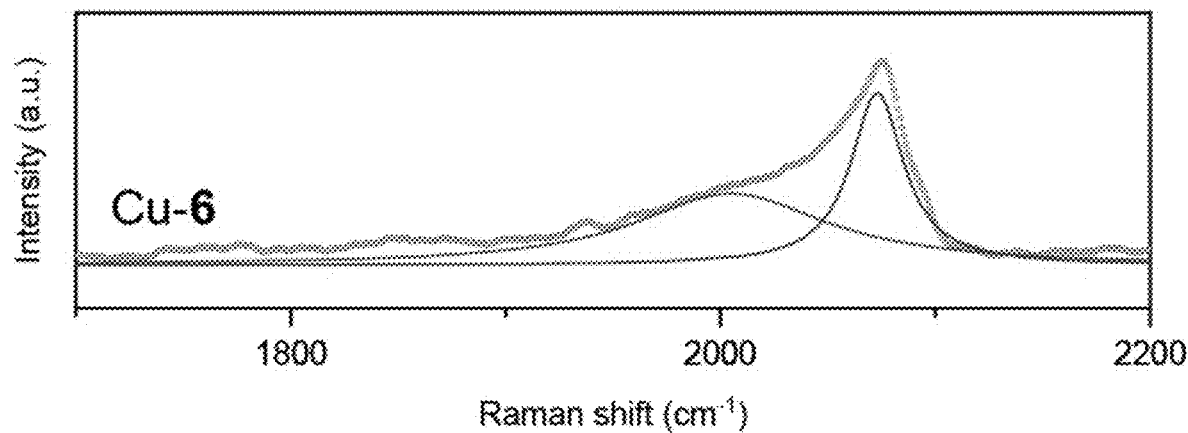
Figure 19H:
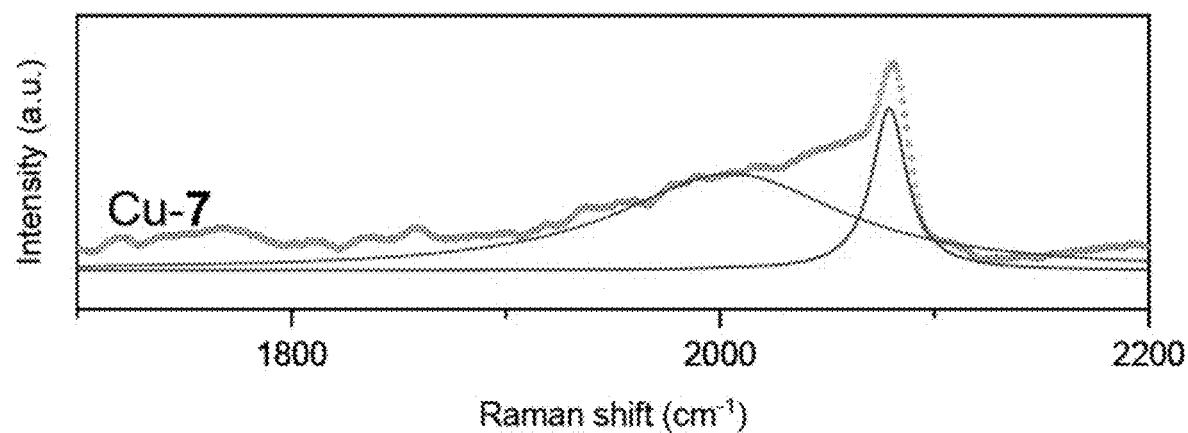
Figure 19I:
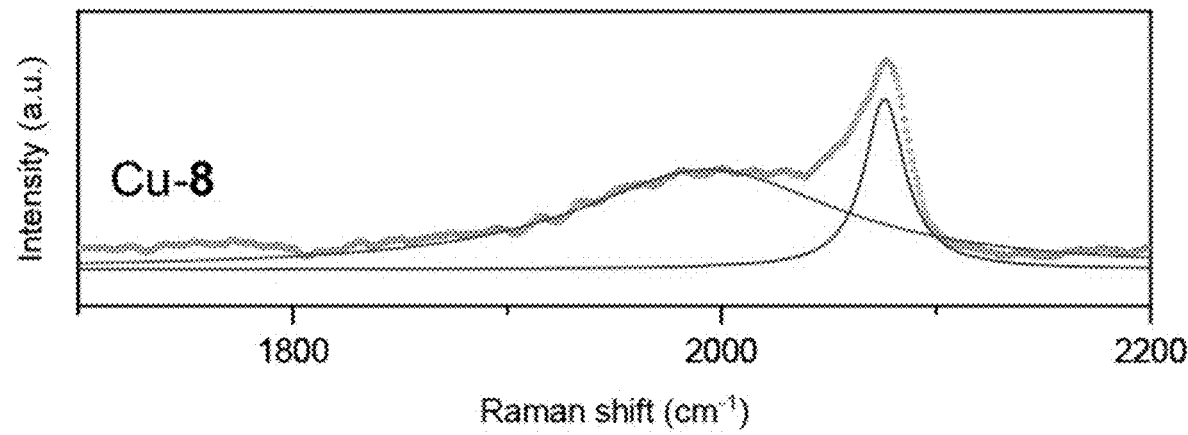
Figure 19J:
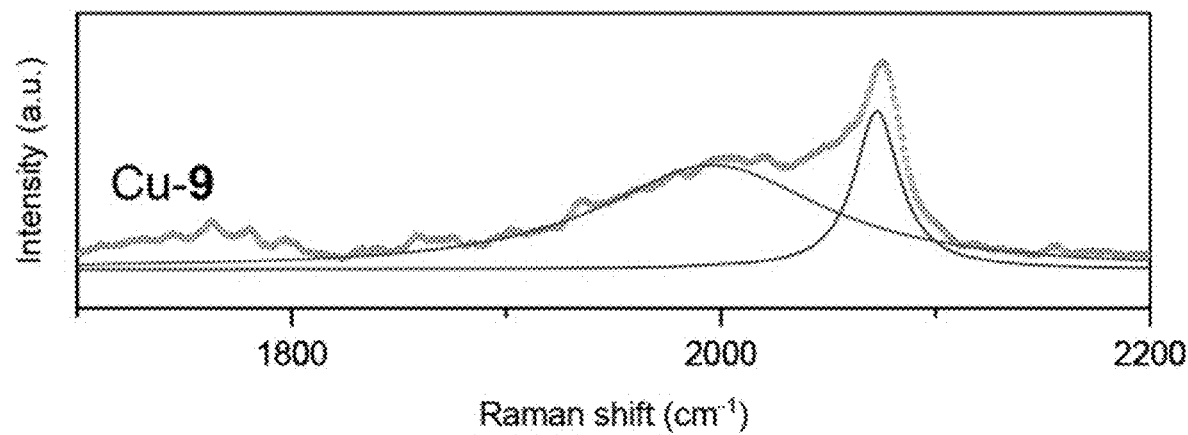
Figure 19K:
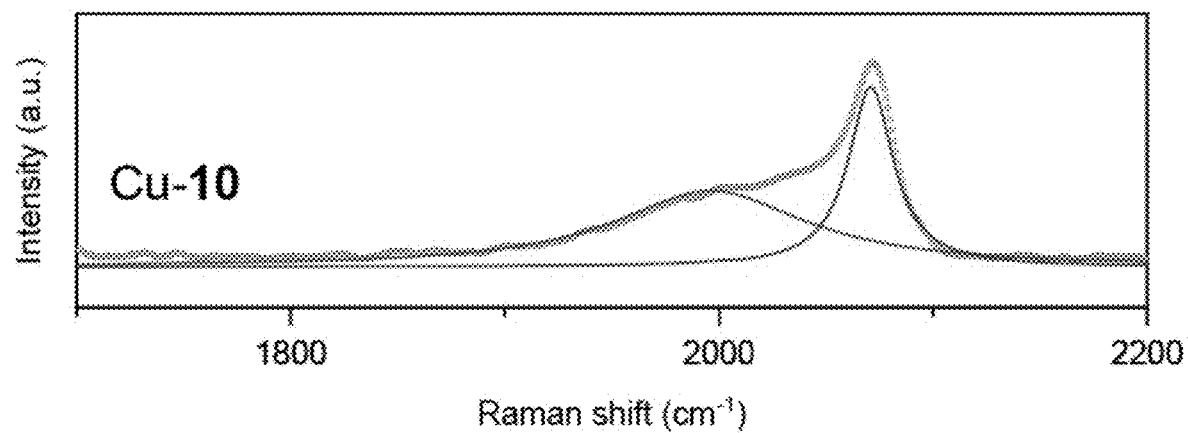
Figure 19L:
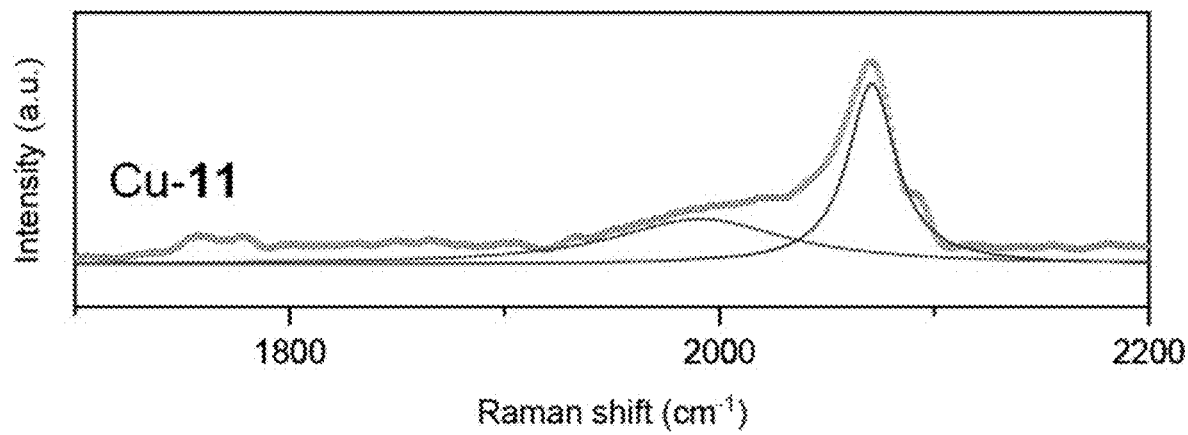
Figure 19M:
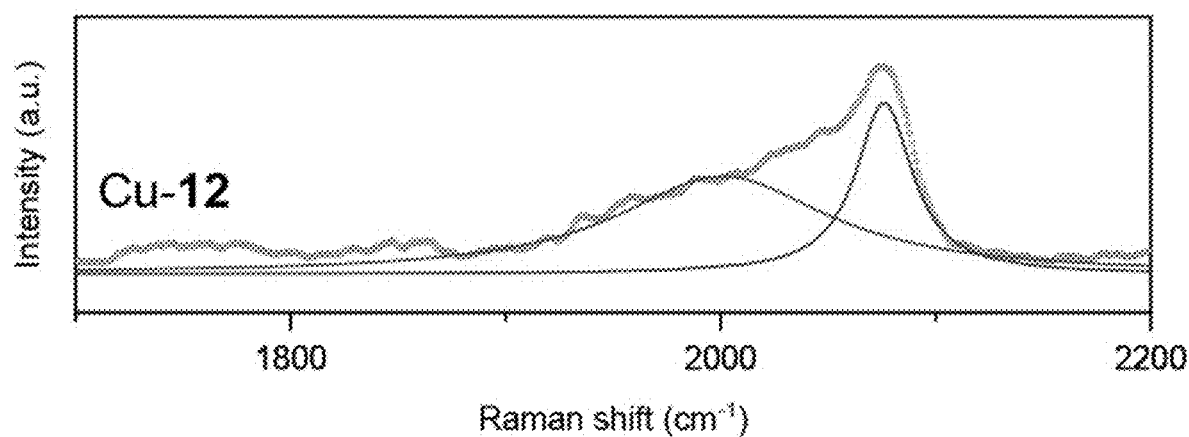

FIG. 18. in situ Raman spectra of Cu-1 under a range of applied potentials. The lines and shaded area indicate the frustrated rotational mode of CO (280 cm$^{-1}$), Cu—CO stretch (365 cm$^{-1}$) and C≡O stretch (1900-2120 cm$^{-1}$), respectively.

FIGS. 19A-19M. in situ Raman spectra of the C≡O stretch region of Cu-x electrodes. The asymmetric band is deconvoluted into bands for atop CO and bridge CO by Lorentzian fitting. The ratio between the intensities of the two bands is summarized in Example 2B Table 2.

Figure 20A:
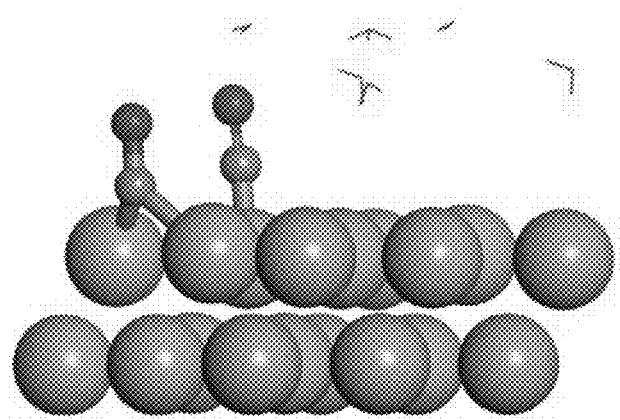
Figure 20B:
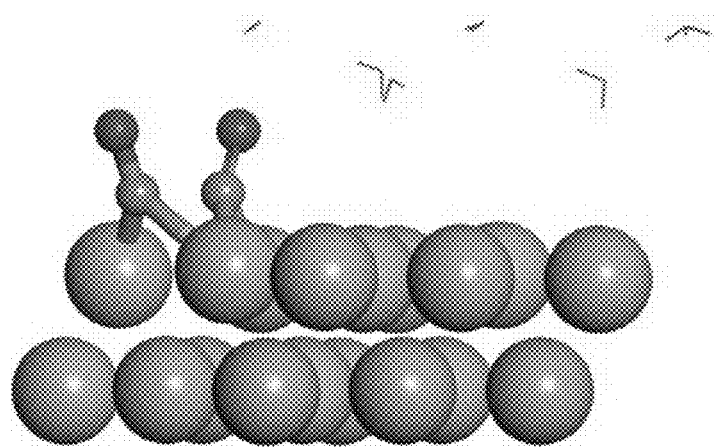
Figure 20C:
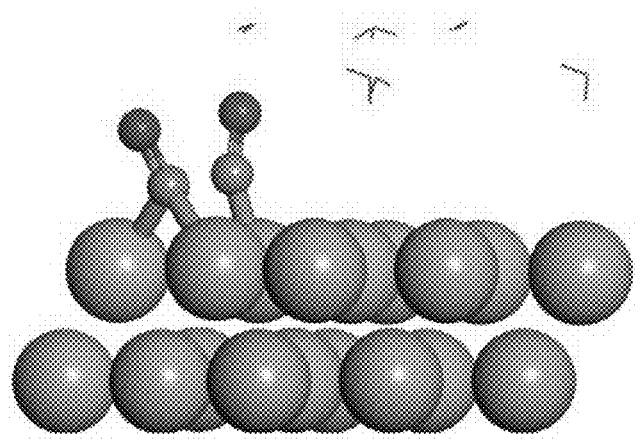
Figure 20D:
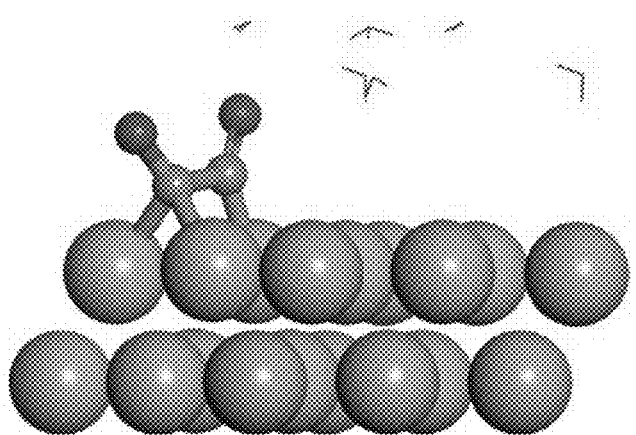
Figure 21A:
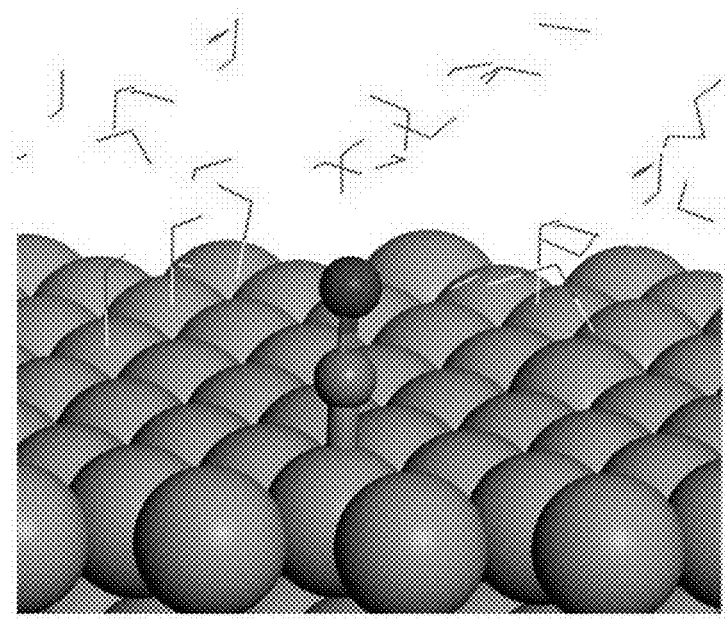
Figure 21B:
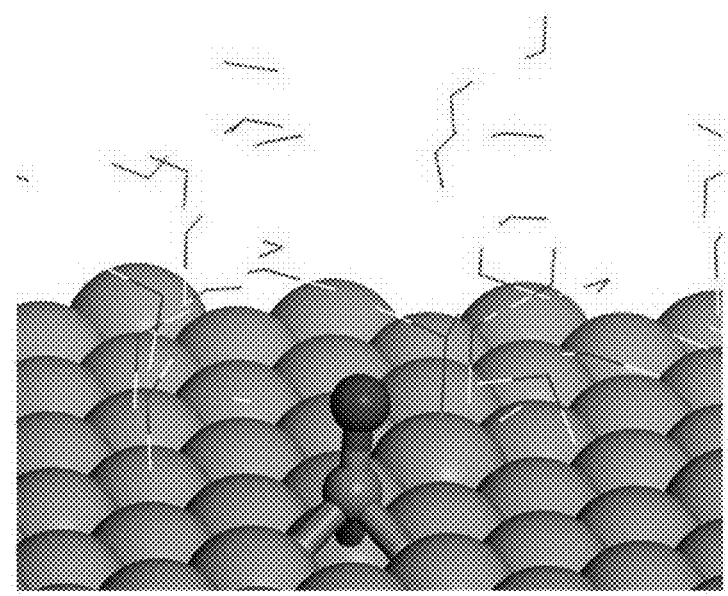
Figure 21C:
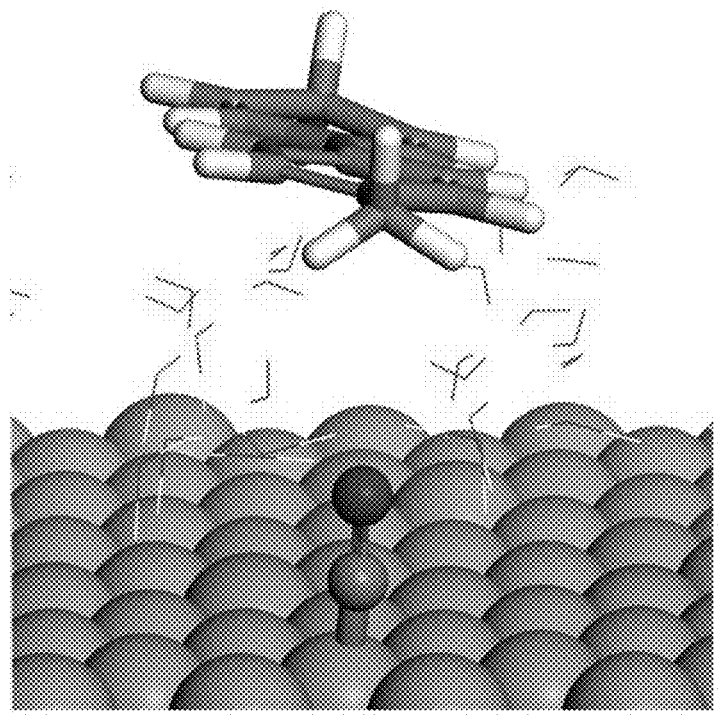
Figure 21D:
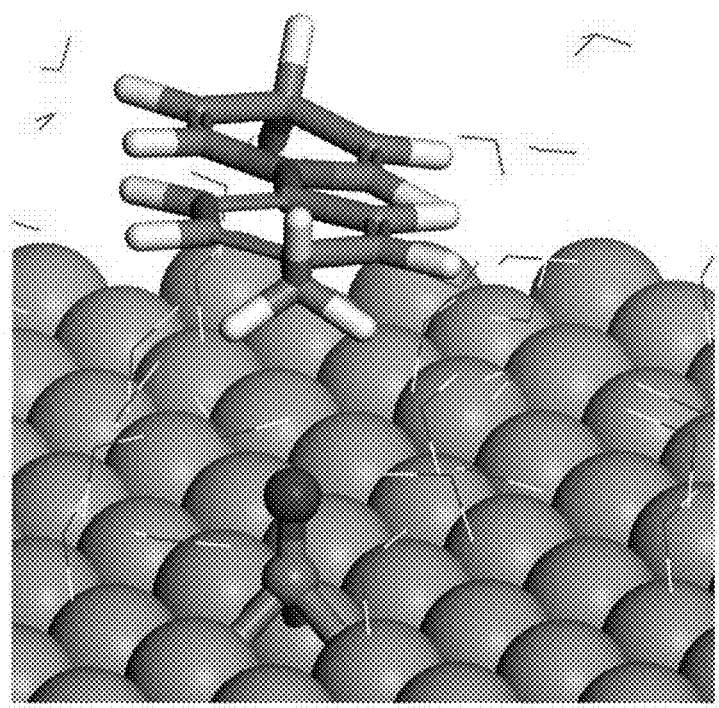

FIGS. 20A-20D. Optimized geometries of CO and OCCO on Cu (111). FIG. 20A. Initial state of CO. Transient state of two CO both at bridge sites (FIG. 20B) and two CO at bridge and atop sites (FIG. 20C). FIG. 20D. Final state of dimerized CO, i.e., OCCO. A water layer on Cu (111) was used to capture the reaction environment. Red: O, grey: C, white: H, and pink: Cu.

FIGS. 21A-21D. Predicted CO adsorption geometries. Cu (111) atop site (FIGS. 21A and 21C) and hollow site (FIGS. 21B and 21D) without (top) and with (bottom) N-aryl-substituted tetrahydro-bipyridine formed from molecule 1. To simplify the calculations, half part of the tetrahydro-bipyridine was used. A water layer on Cu (111) was used to capture the reaction environment since a proton source near the catalyst surface is necessary for CO$_2$RR[38]. The bridge CO configuration is in equilibrium with 3-fold hollow site with the latter being slightly more stable than the former in the model we used[39]. Therefore, the hollow site is essentially equivalent to the bridge site observed in in situ Raman spectroscopy. On bare Cu (111), the hollow site appears to be the most stable adsorption site for CO with a CO adsorption energy ($E_{CO}$) of −0.39 eV, while $E_{CO}$ on the atop site is only −0.13 eV (Example 2B Table 3).

Figure 22:
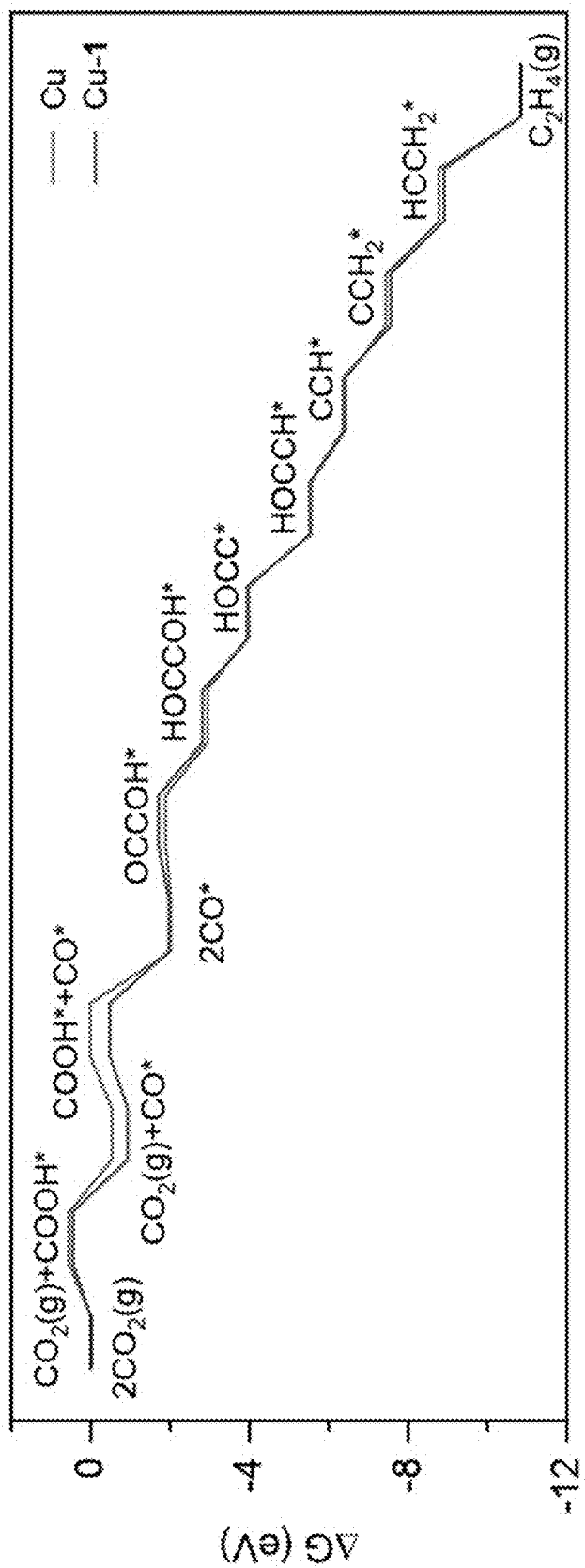
Figure 23A:
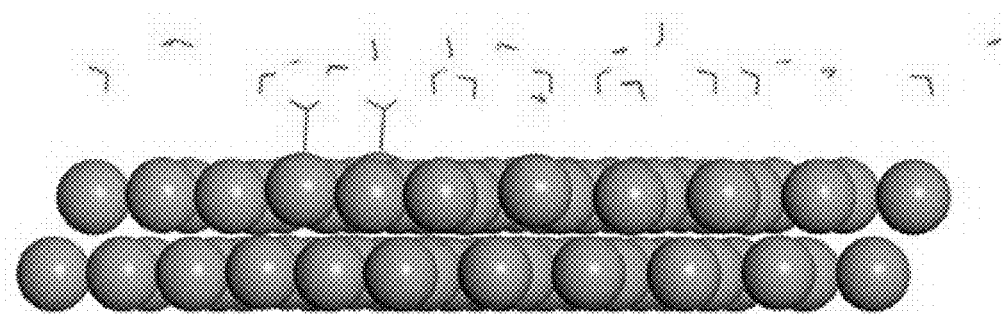
Figure 23B:
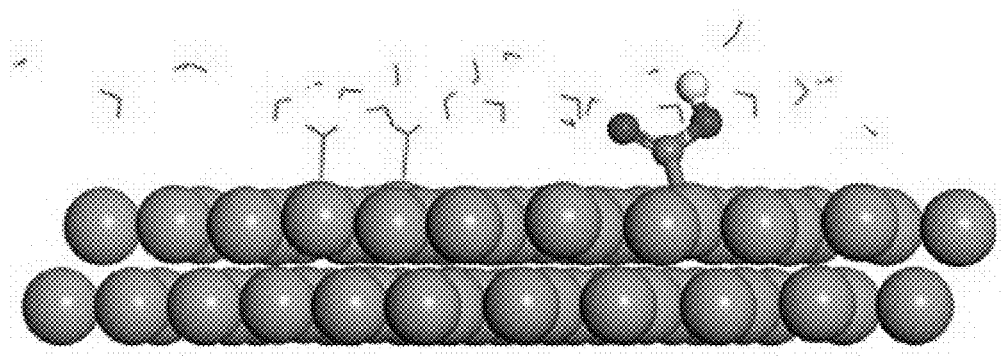
Figure 23C:
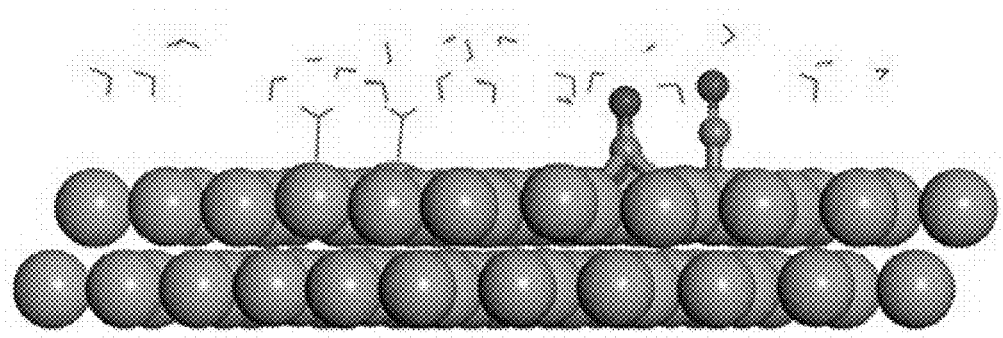
Figure 23D:
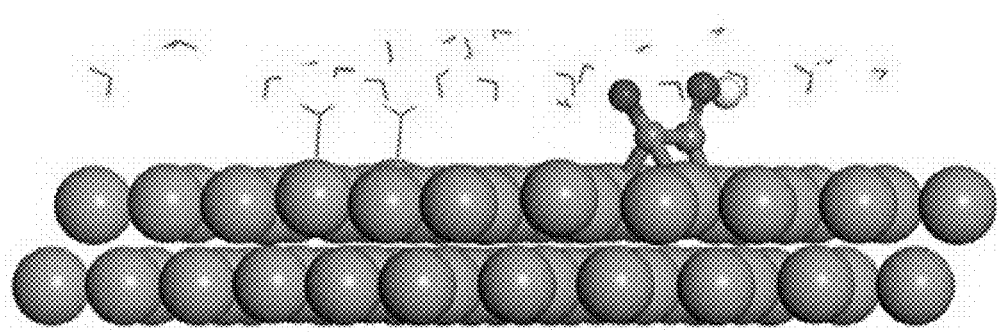
Figure 23E:
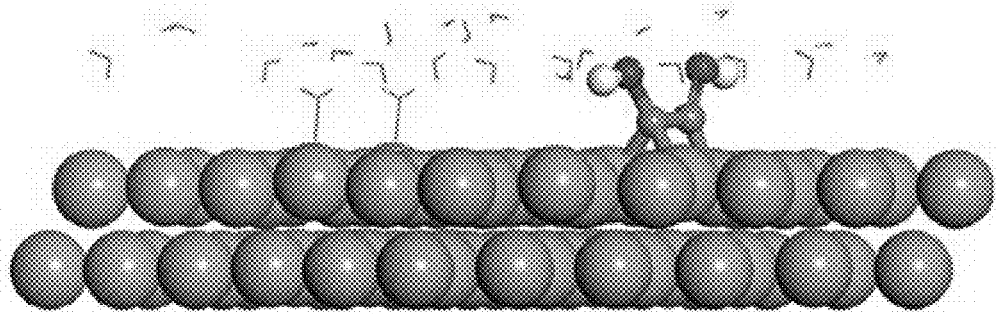
Figure 23F:
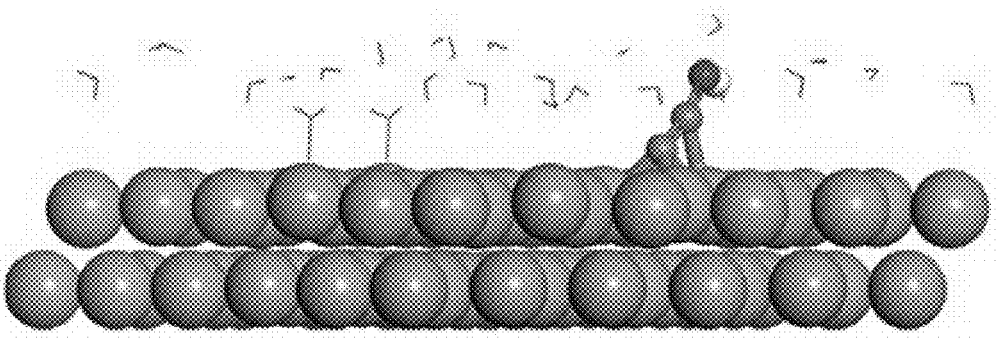
Figure 23G:
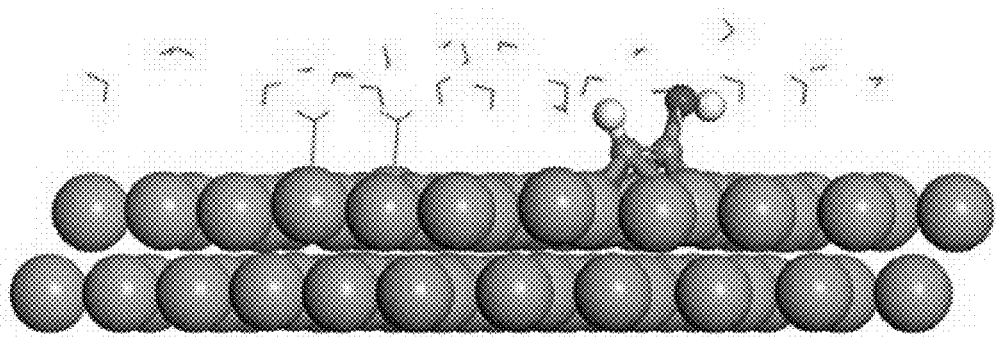
Figure 23H:
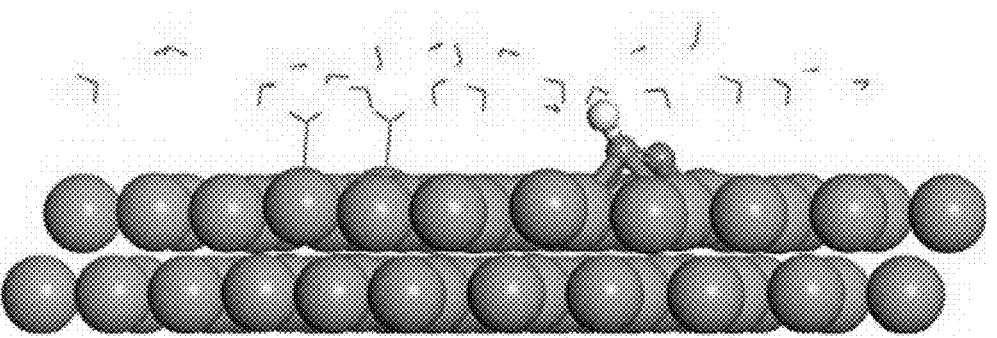
Figure 23I:
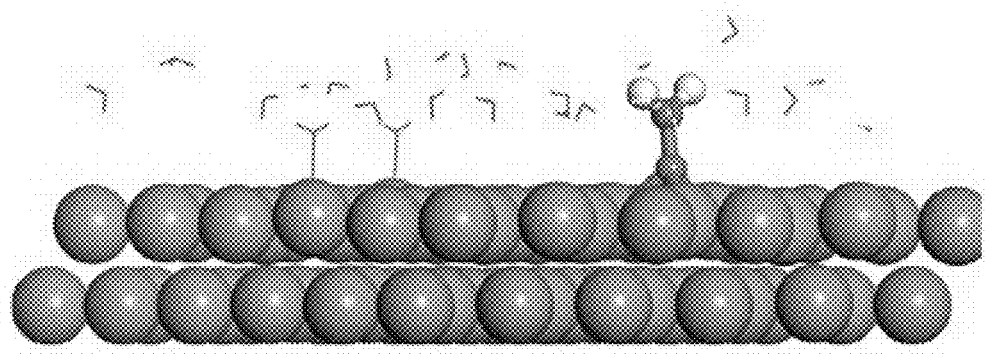
Figure 23J:
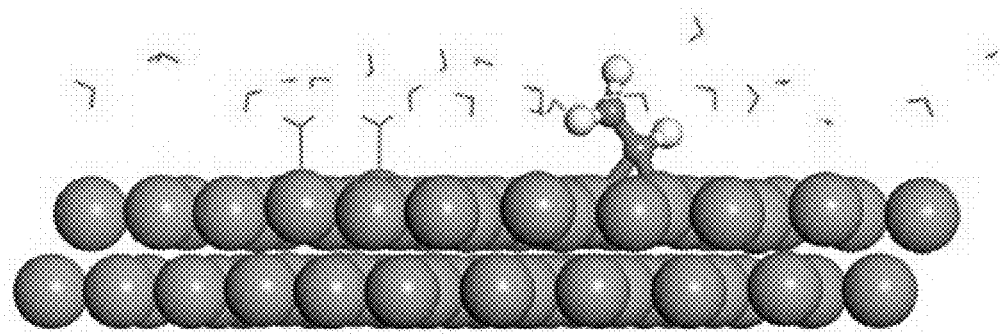
Figure 24A:
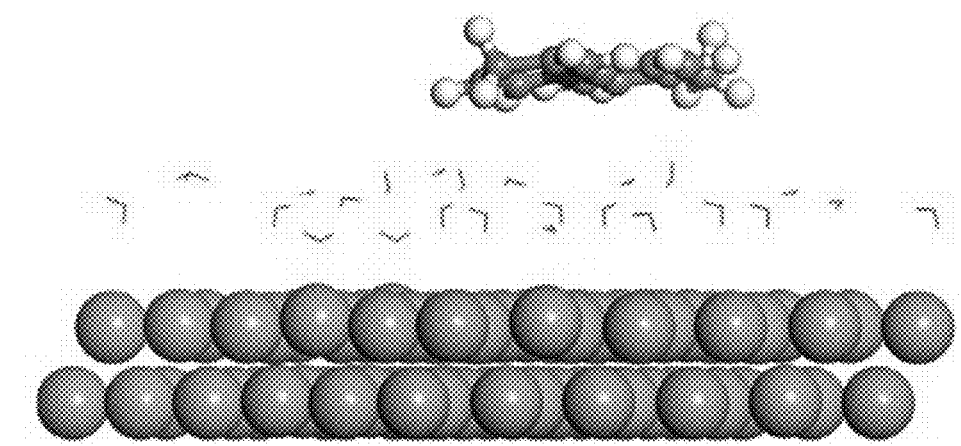
Figure 24B:
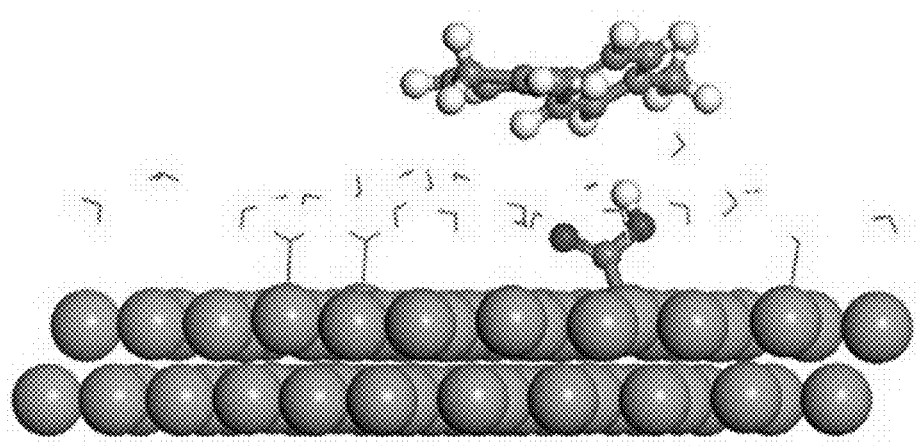
Figure 24C:
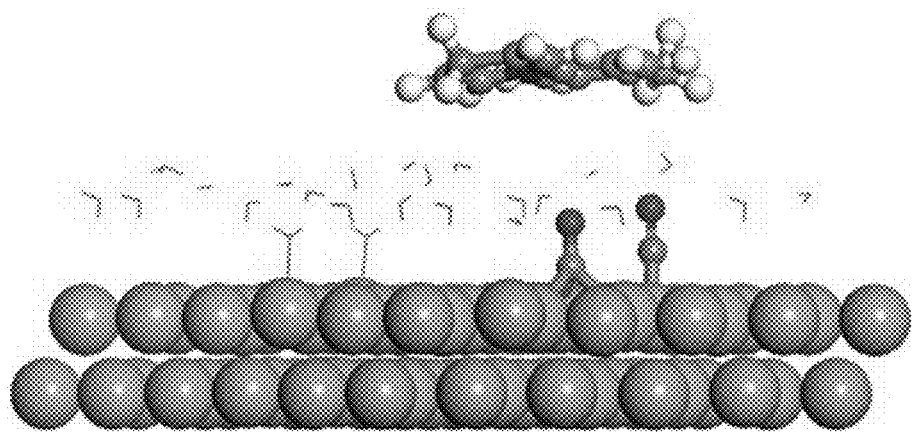
Figure 24D:
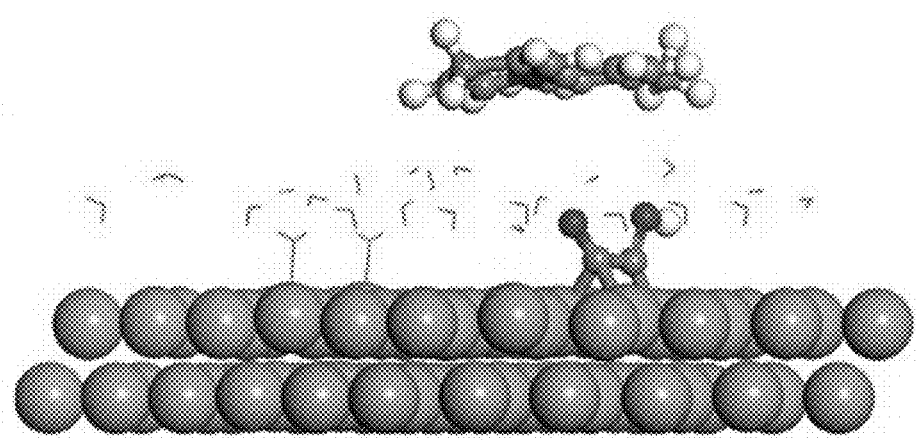
Figure 24E:
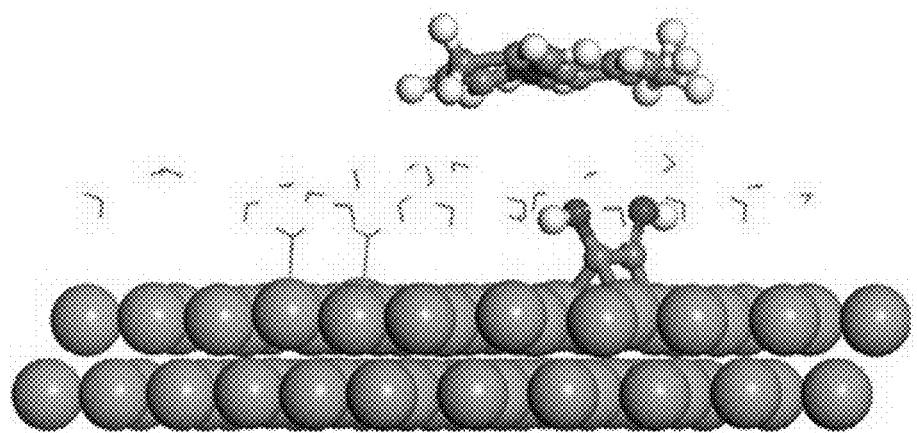
Figure 24F:
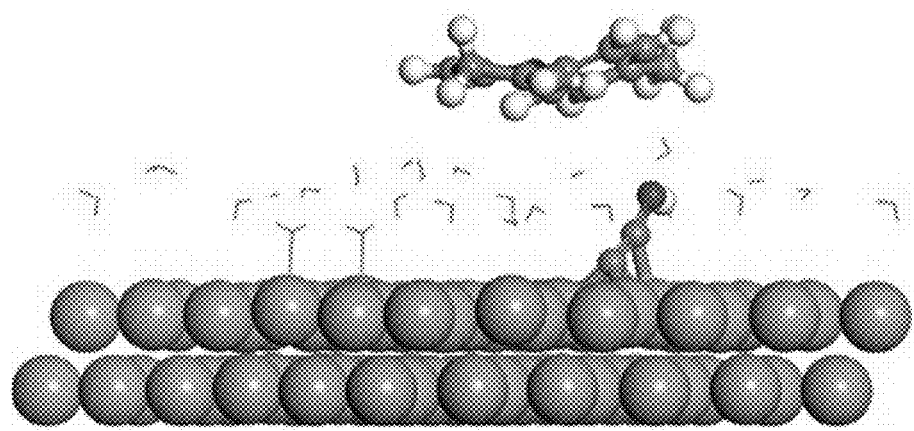
Figure 24G:
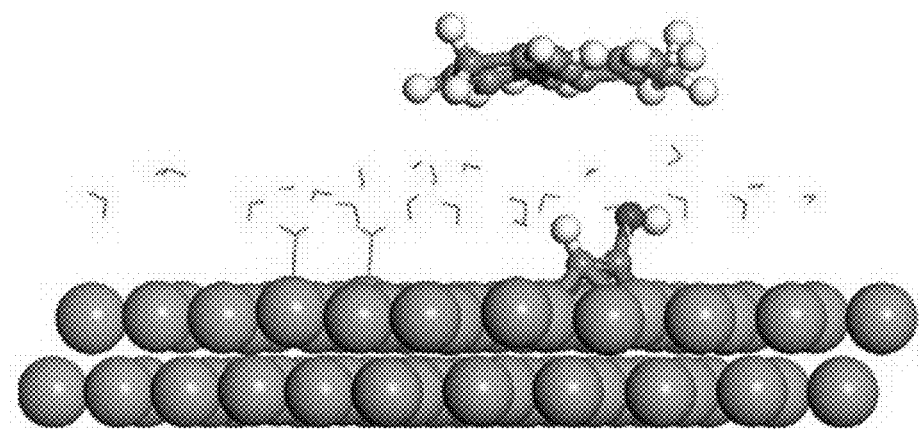
Figure 24H:
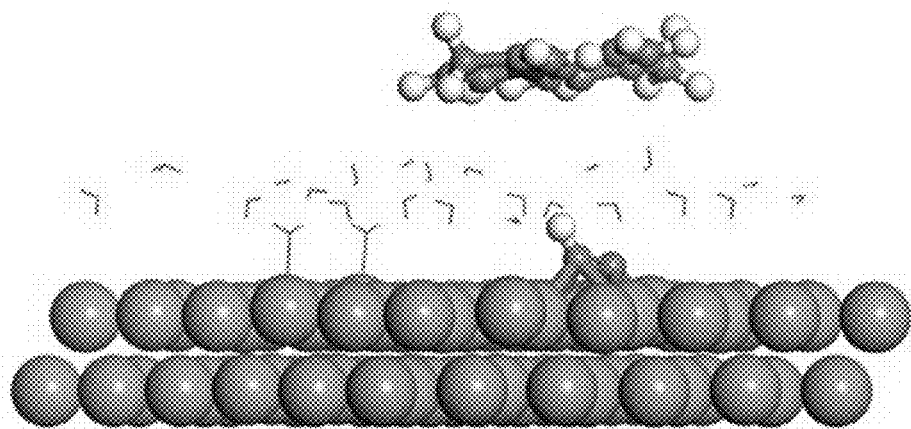
Figure 24I:
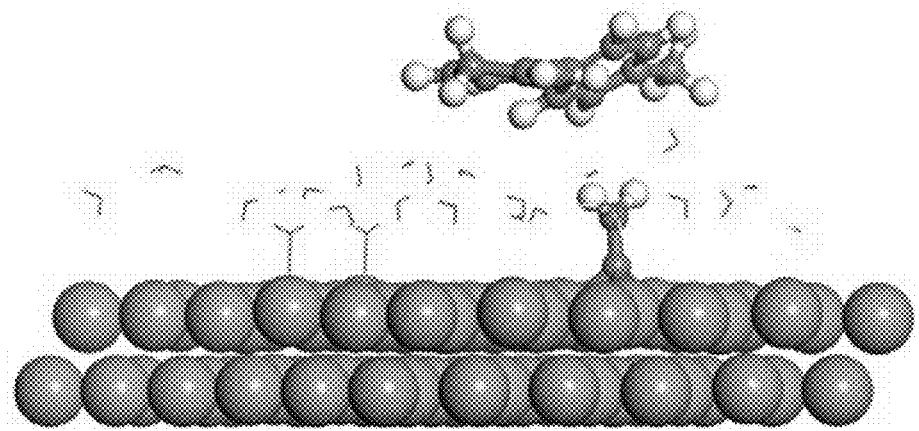
Figure 24J:
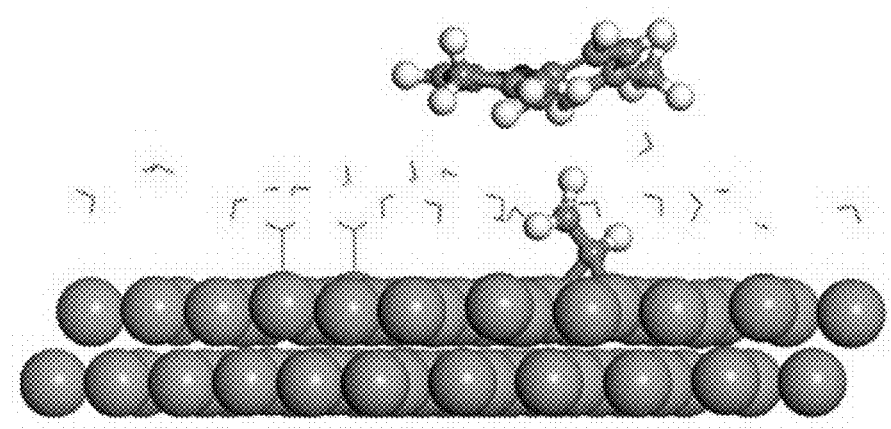

FIG. 22. Predicted $CO_2$-to-ethylene reaction pathway. Energy profile of calculated $CO_2$-to-ethylene pathway on Cu (111) and Cu (111)-1 at an applied potential of −0.80 V vs. computational hydrogen electrode (CHE)[40]. The most prominent influence of the molecule on the energy profile is the enhancement of CO adsorption (lowering $\Delta G$). This enhancement is in agreement with experimental results, in which the increased FE for ethylene comes at the expense of CO evolution on tetrahydro-bipyridine-functionalized Cu electrodes. The molecule has little influence on other steps/intermediates except that the $CO_2$ activation to *COOH becomes slightly more favorable after the molecular functionalization on Cu.

FIGS. 23A-23J. Predicted intermediate adsorption geometries on Cu (111). A water layer on Cu (111) was used to capture the reaction environment. Red: O, grey: C, white: H, and pink: Cu.

FIGS. 24A-24J. Predicted intermediate adsorption geometries on Cu (111)-1. To simplify the calculations, half part of the tetrahydro-bipyridine was used to capture the main properties of the molecule due to its symmetric structure. A water layer on Cu (111) was used to capture the reaction environment. Red: O, grey: C, blue: N, white: H, and pink: Cu.

Figure 25A:
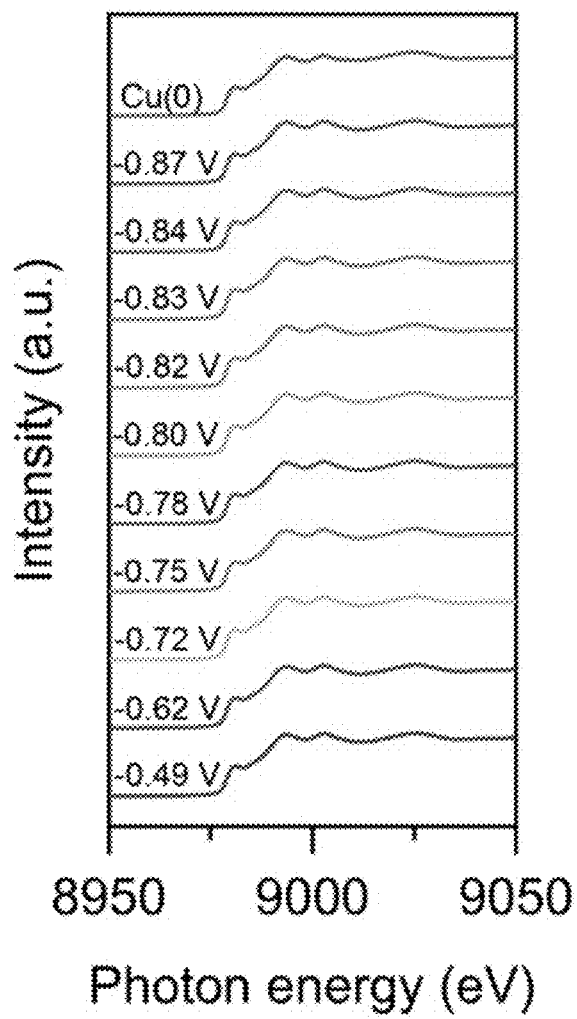
Figure 25B:
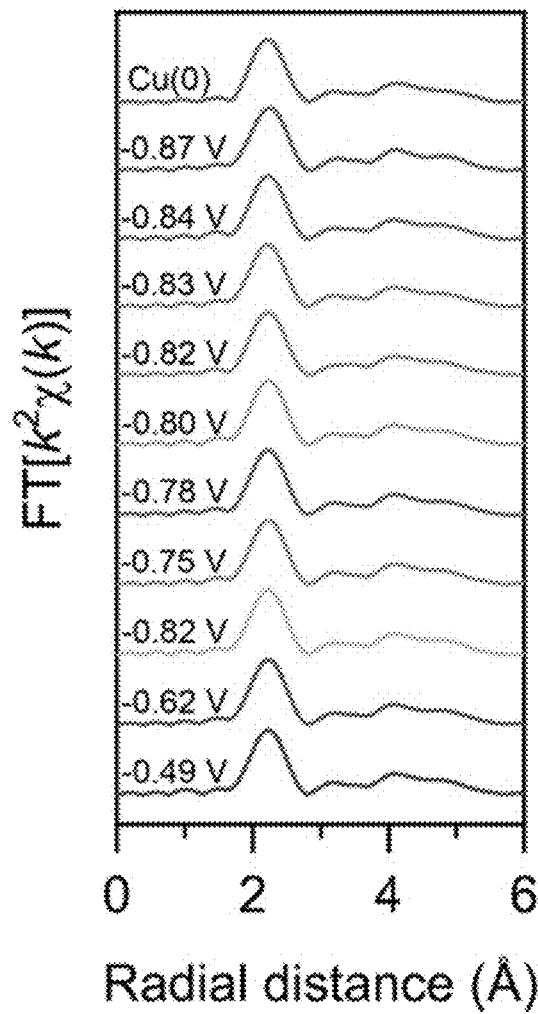
Figure 25C:
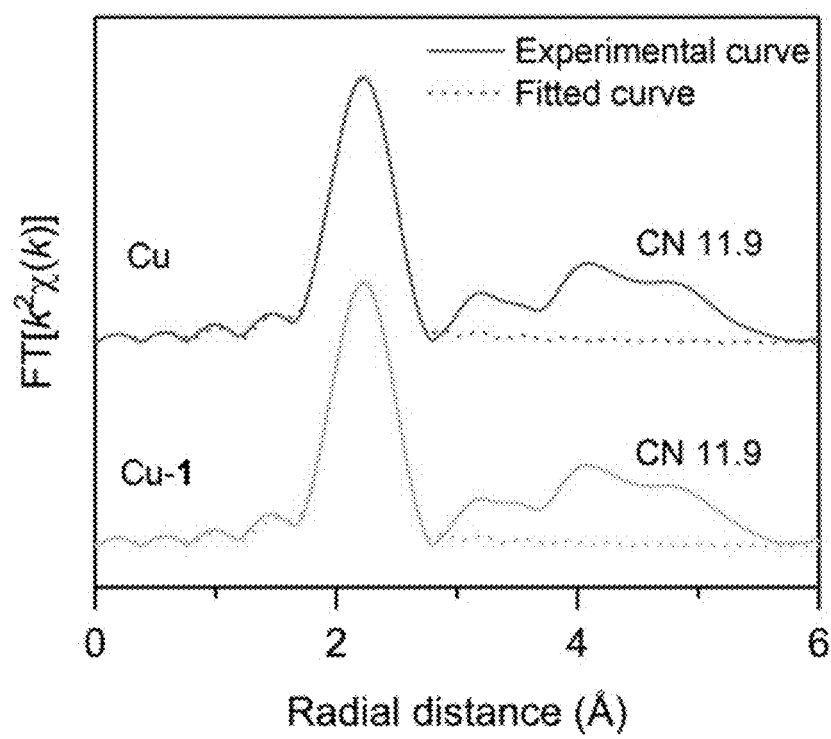

FIGS. 25A-25C. Operando X-ray absorption spectroscopic analysis. X-ray absorption spectra (FIG. 25A) and Cu K-edge X-ray absorption near edge structure spectra (FIG. 25B) of Cu-1 at applied potential range of −0.49-−0.87 V. FIG. 25C. Coordination number (CN) fitting of Cu of pure Cu electrode and Cu-1 electrode. Operando Cu K-edge spectra of Cu-1 at both near-edge and extended-edge regions showed the existence of only $Cu^0$ at the applied potential range. The coordination number of Cu in the Cu-1 sample is determined to be 11.9, the same as that of pure Cu. Ex situ Cu K-edge X-ray absorption spectroscopy of metallic Cu foil was performed as standard. FT: Fourier transform.

Figure 26A:
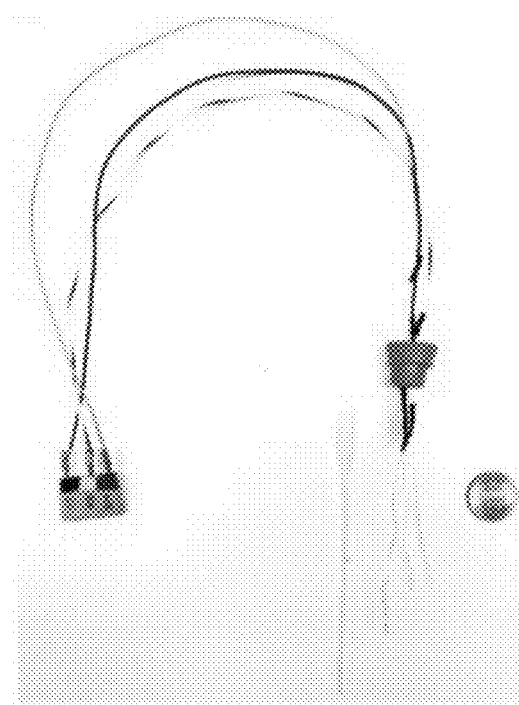
Figure 26B:
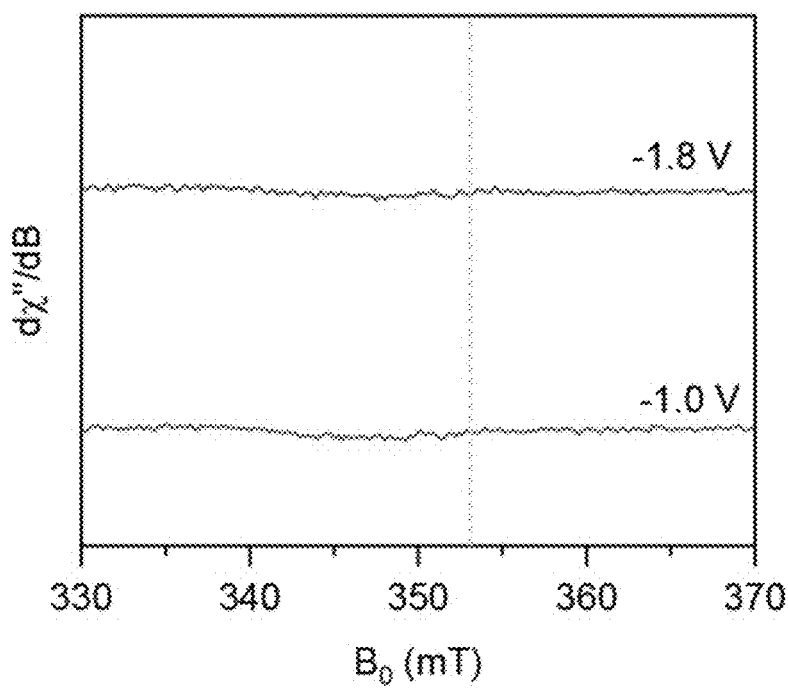
Figure 26C:
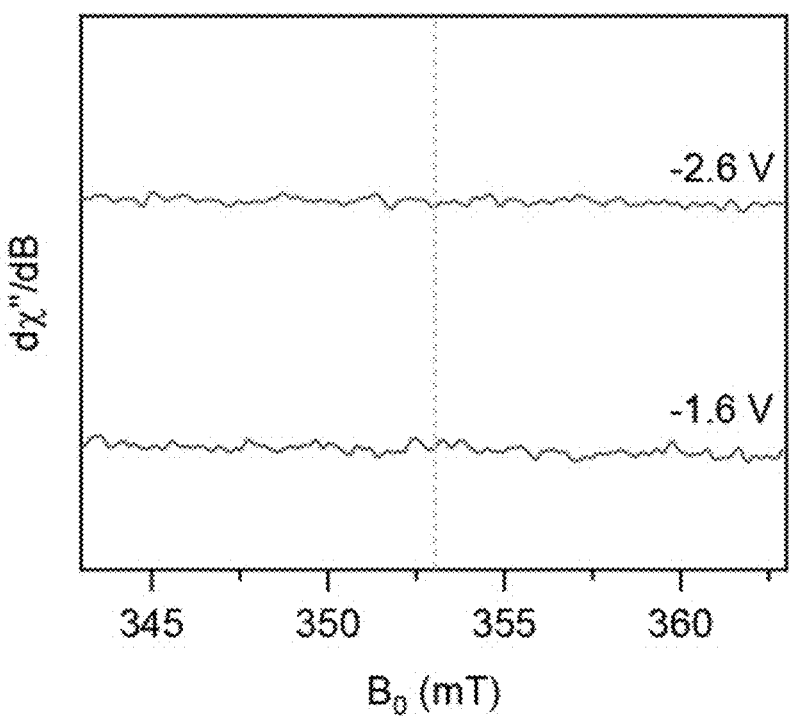

FIGS. 26A-26C. in situ EPR measurements. FIG. 26A. A picture of the in situ EPR electrochemical cell. All the electrodes were inserted into a glass capillary tube (end sealed) containing electrolyte and connected to external electrochemical workstation through electric wires. A silver wire was used as a pseudo reference electrode. The potential was converted to the NHE scale using the $[Fe(CN)_6]^{3-}/[Fe(CN)_6]^{4-}$ and ferrocene/ferrocenium redox couples in corresponding aqueous and organic electrolytes, respectively. FIG. 26B. in situ X-band (9.879 GHz) room temperature EPR spectra at an applied potential of −1.0 V and −1.8 V vs. NHE in 0.1 M $KHCO_3$ solution saturated with $CO_2$. A Cu wire with the tetrahydro-bipyridine electrodeposited from molecule 1 was used as the working electrode and a Pt wire was used as the counter electrode. Signals were started to sample after applying each potential for 3 minutes. FIG. 26C. in situ X-band (9.875 GHz) room temperature EPR spectra at an applied potential of −1.6 V and −2.6 V vs. NHE in a mixture of $CH_2Cl_2$ and dimethylformamide (4:6 by volume) containing 0.1 M tetrabutylammonium chloride as supporting electrolyte. The tetrahydro-bipyridine film electrodeposited from molecule 1 was dissolved in this electrolyte by rinsing the as-deposited film on Cu foil with $CH_2Cl_2$. The electrolyte was saturated with $N_2$. Pt wires were used as the working and counter electrodes, respectively. Signals were started to sample after applying each potential for 3 minutes. The dotted line points to the magnetic field corresponding to g=2.0, which is the typical region for organic radicals. We did not observe the build-up of radicals under operating conditions, either in heterogeneous or homogeneous forms.

Figure 27:
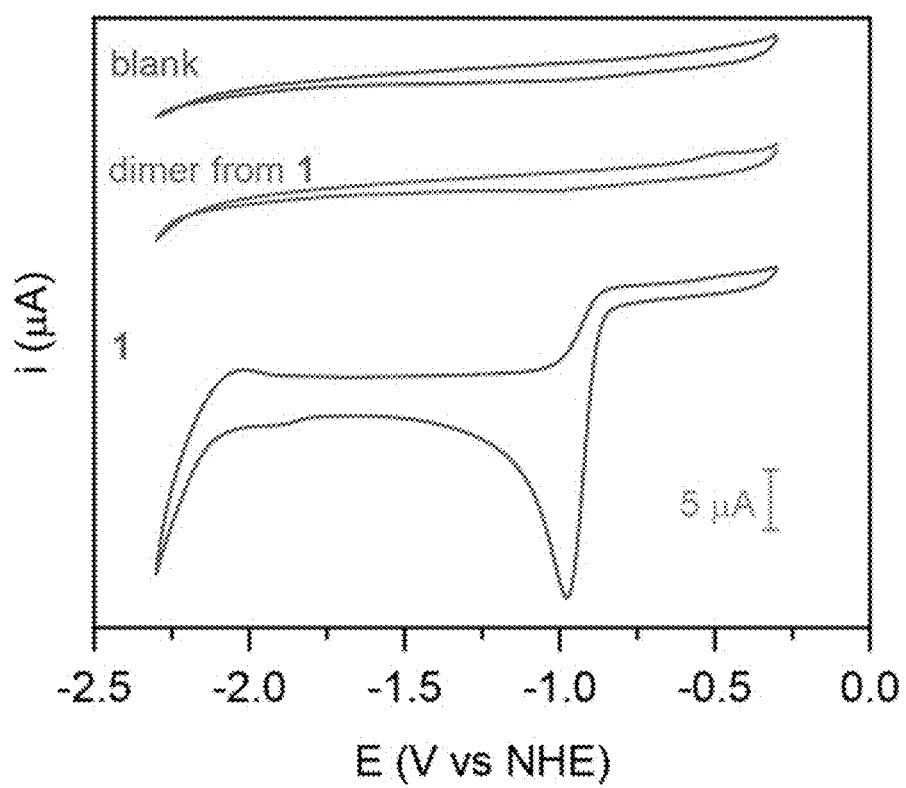

FIG. 27. Electrochemistry of 1 and N-aryl-substituted tetrahydro-bipyridine formed from 1 in organic media. Cyclic voltammetry of molecule 1 (1 mM), tetrahydro-bipyridine dimerized from molecule 1 (1 mM) and blank electrode in acetonitrile containing 0.1 M tetrabutylammonium hexafluorophosphate as supporting electrolyte. The electrolyte was saturated with $N_2$. Glassy carbon, Ag/AgCl and Pt were used as working, reference and counter electrodes, respectively. Scan rate: 100 mV $s^{-1}$. No reductive process was identified from the dimer species, indicating that no organic radicals from a reduction of tetrahydro-bipyridine was involved in the $CO_2RR$.

Figure 28:
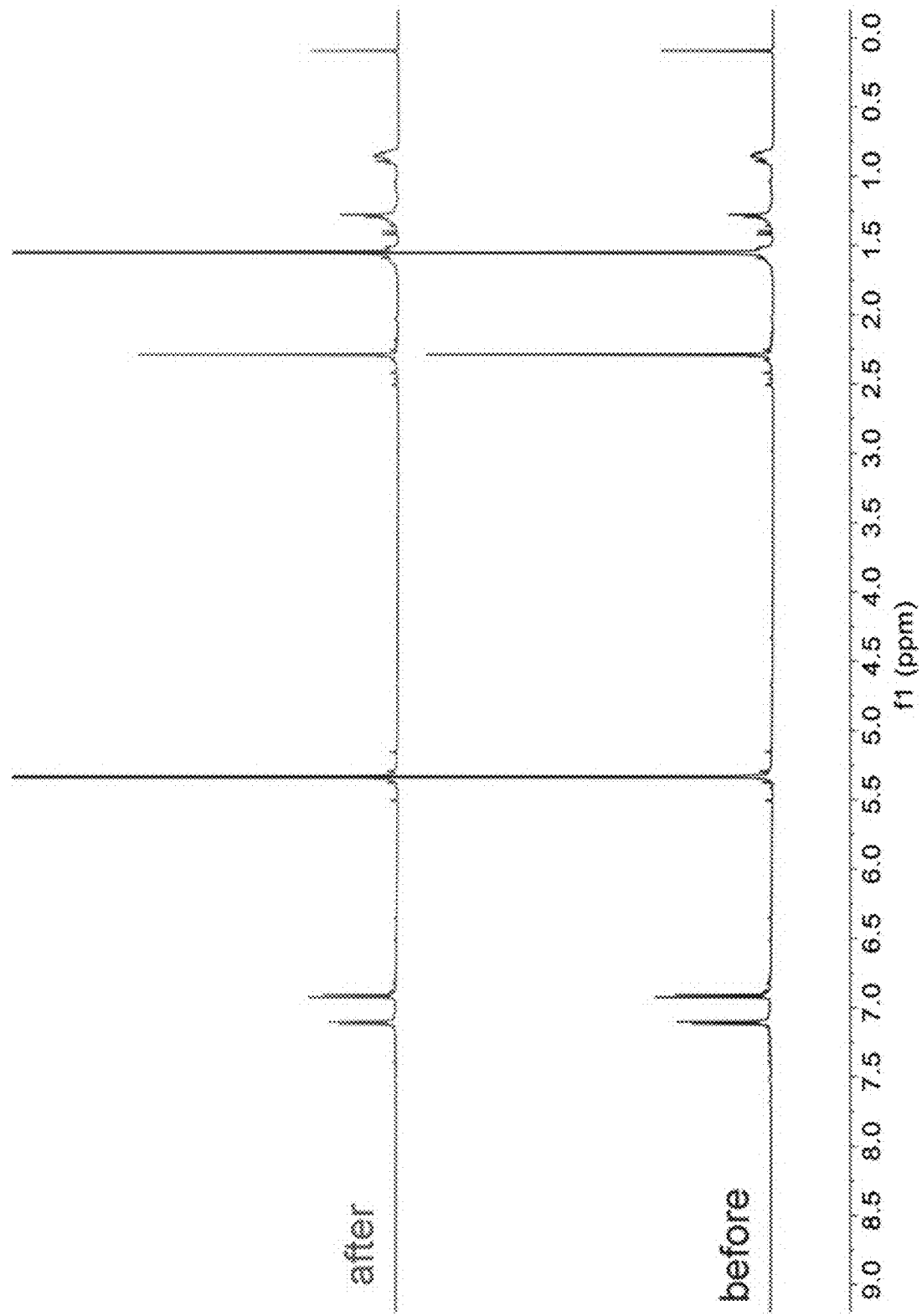

FIG. 28. $^1H$ NMR spectra of the tetrahydro-bipyridine dimerized from deuterated d5-1 before and after electrolysis. Deuterated molecule 1, d5-1, was synthesized from the reaction of ditolyl-iodonium triflate salt and d-5 pyridine as described in the Molecule synthesis part in Methods. d5-1 was then electrodeposited on the PTFE/Cu electrode using the same protocol as the deposition of 1. Electrolysis was carried out in the liquid-electrolyte flow cell under the same conditions as those for other tetrahydro-bipyridines for 1 hour. The $^1H$ NMR spectra of the film before and after electrolysis are the same, indicating that the deuterium atoms did not exchange with protons during $CO_2RR$. This suggests that the layer does not act as hydrogen transfer catalyst. The spectra were recorded in $CD_2Cl_2$ (298 K).

Figure 29A:
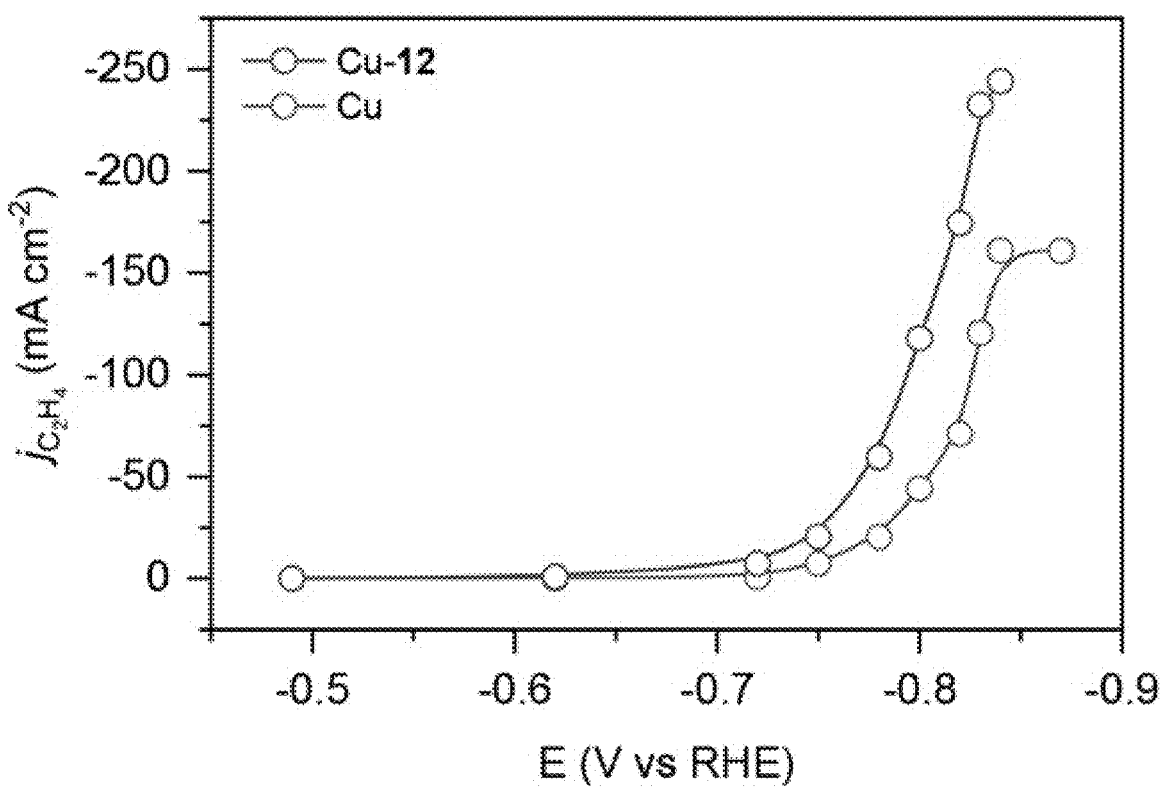
Figure 29B:
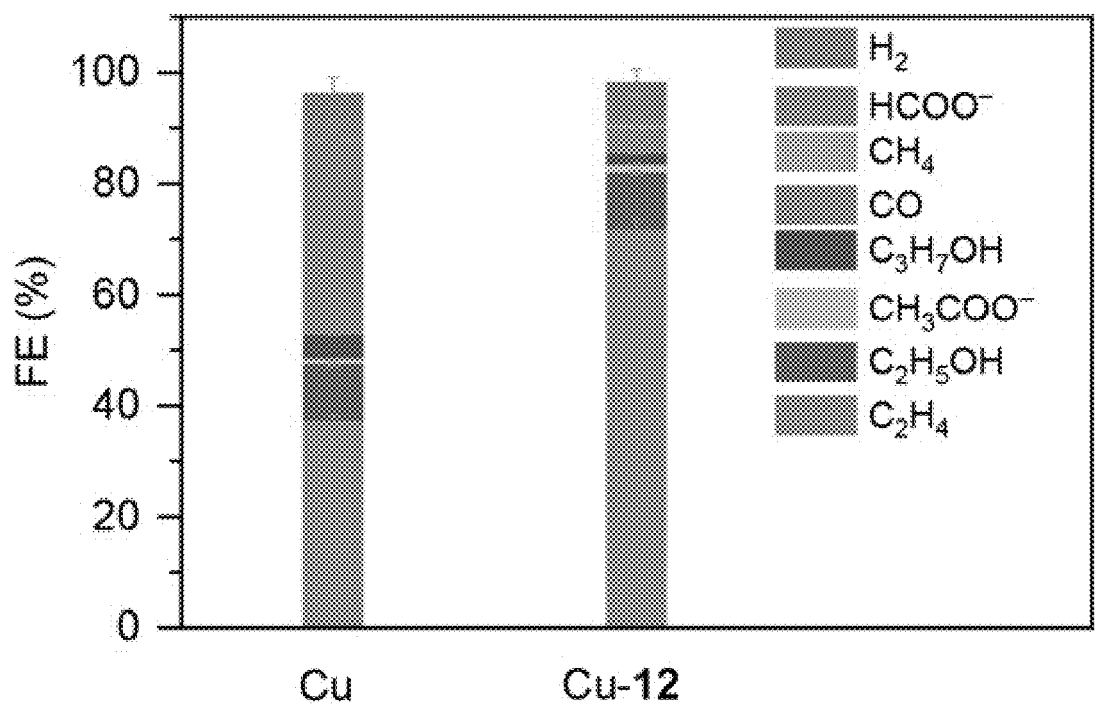

FIGS. 29A-29B. $CO_2RR$ performance in liquid-electrolyte flow cells. FIG. 29A. Partial current density of ethylene on Cu and Cu-12 using $CO_2$-saturated 1 molar $KHCO_3$ as the supporting electrolyte. FIG. 29B. Product distributions on Cu and Cu-12 at an applied potential of −0.83 V. The error bars for FE uncertainty represent one standard deviation based on three independent samples.

Figure 30:
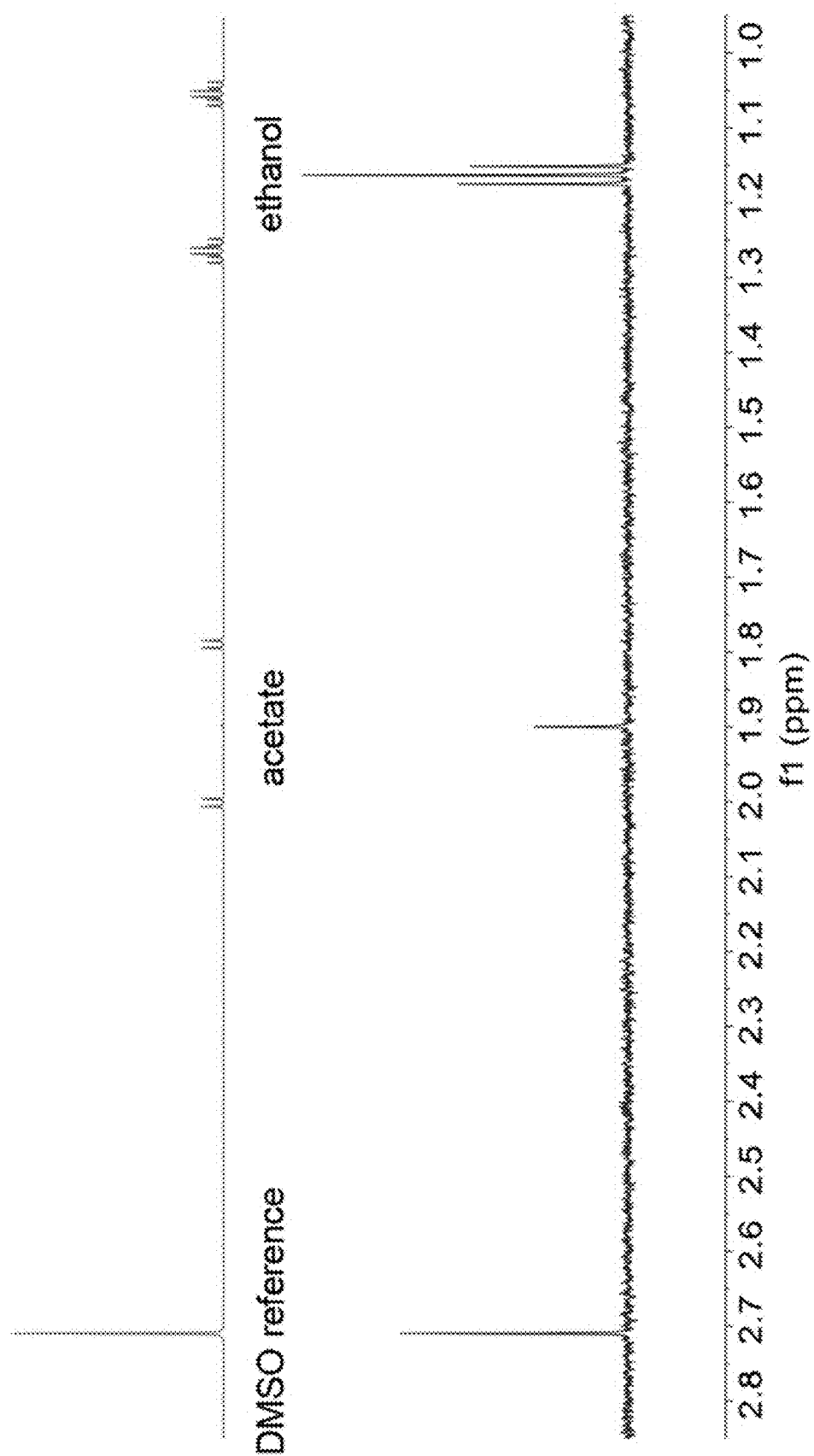

FIG. 30. Liquid products from isotopic $CO_2$ sources. $^1H$ NMR spectra of liquid products from $CO_2RR$ using $^{12}CO_2$ (red) and $^{13}CO_2$ (cyan) as gas sources, respectively.

Figure 31:
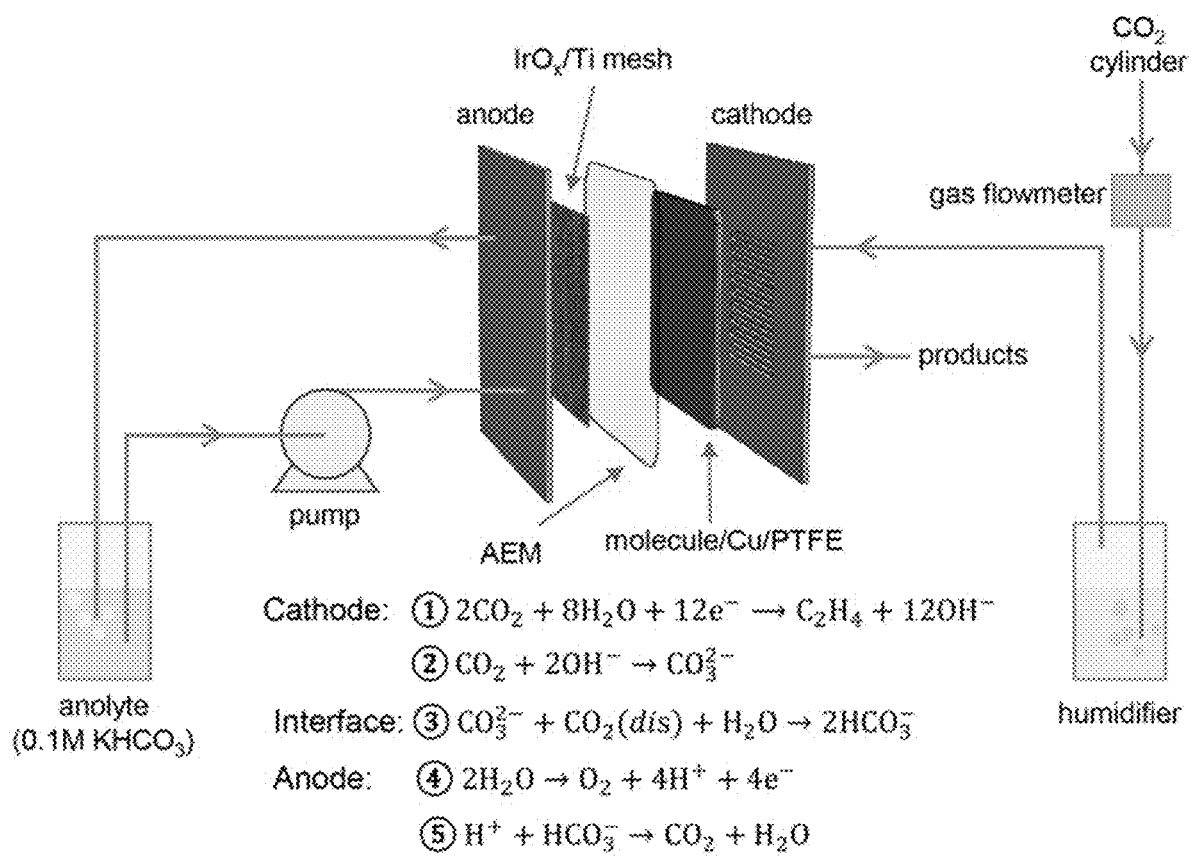

FIG. 31. An electrolytic system, according to certain embodiments disclosed herein, showing components and chemical reactions for electrolysis in the MEA system. The "molecule" refers to the selectivity-determining organic material, according to embodiments herein. The "Cu" can be any electrically conductive catalyst according to embodiments herein, which is preferably Cu. The "PTFE" refers to the porous gas-diffusion membrane according to embodiments herein, which is preferably, but not necessarily, formed of PTFE. The geometric area of the cathode is 5 $cm^2$, of which 45% is the gas channel while the rest 55% is the land area.

Figure 32A:
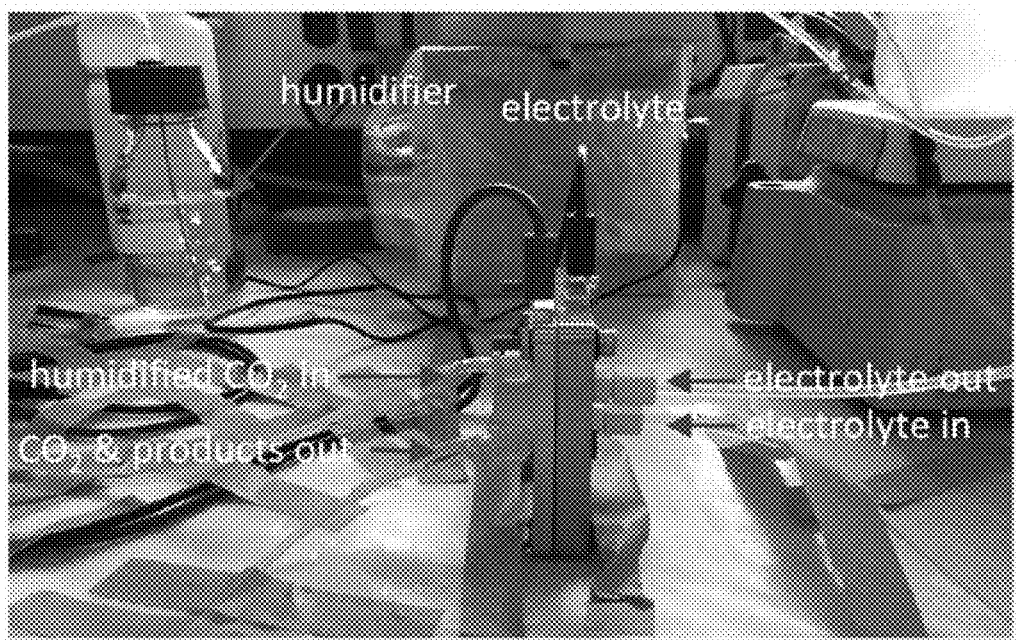
Figure 32B:
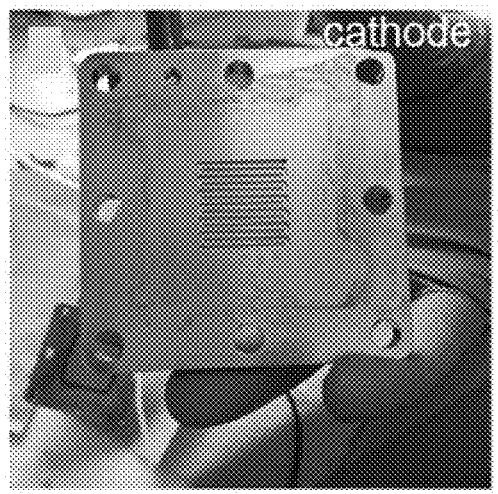
Figure 32C:
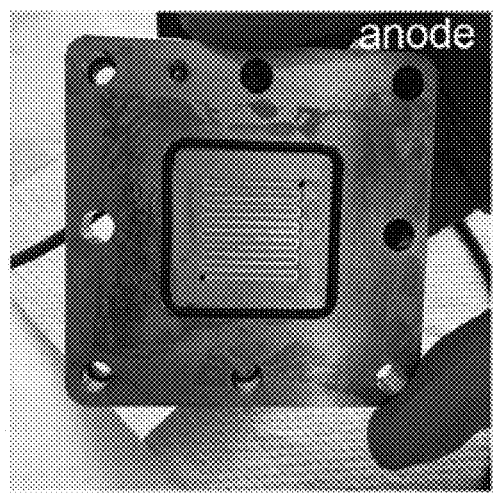

FIGS. 32A-32C. Pictures of the MEA. FIG. 32A. Setup of the MEA system. FIG. 32B. Cathode flow field. FIG. 32C. Anode flow field.

Figure 33A:
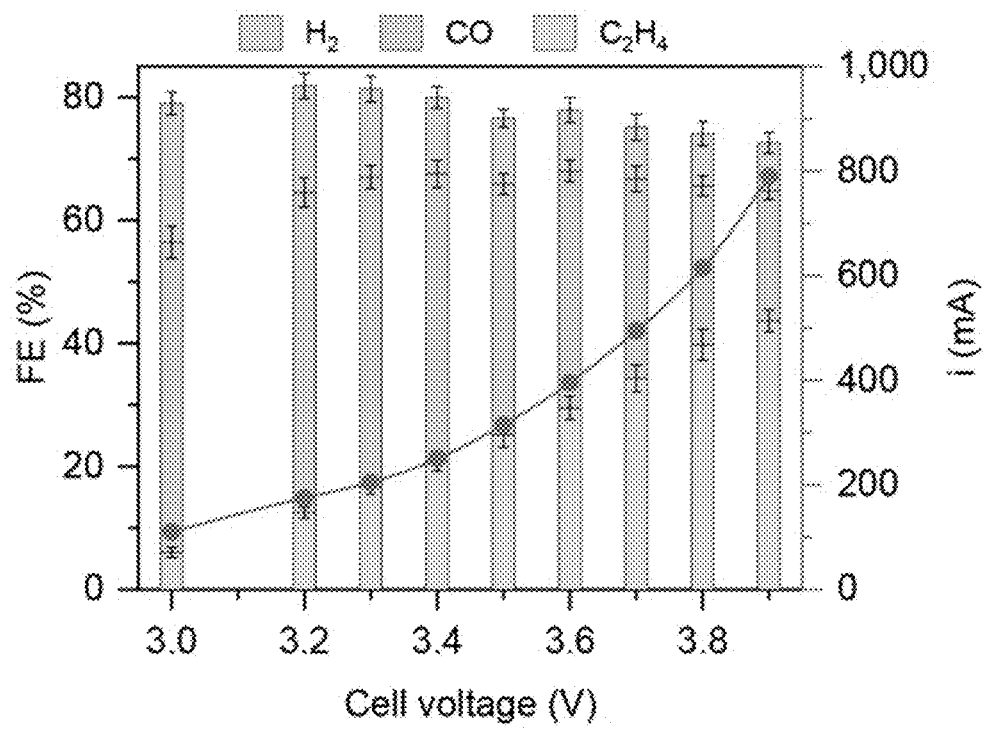
Figure 33B:
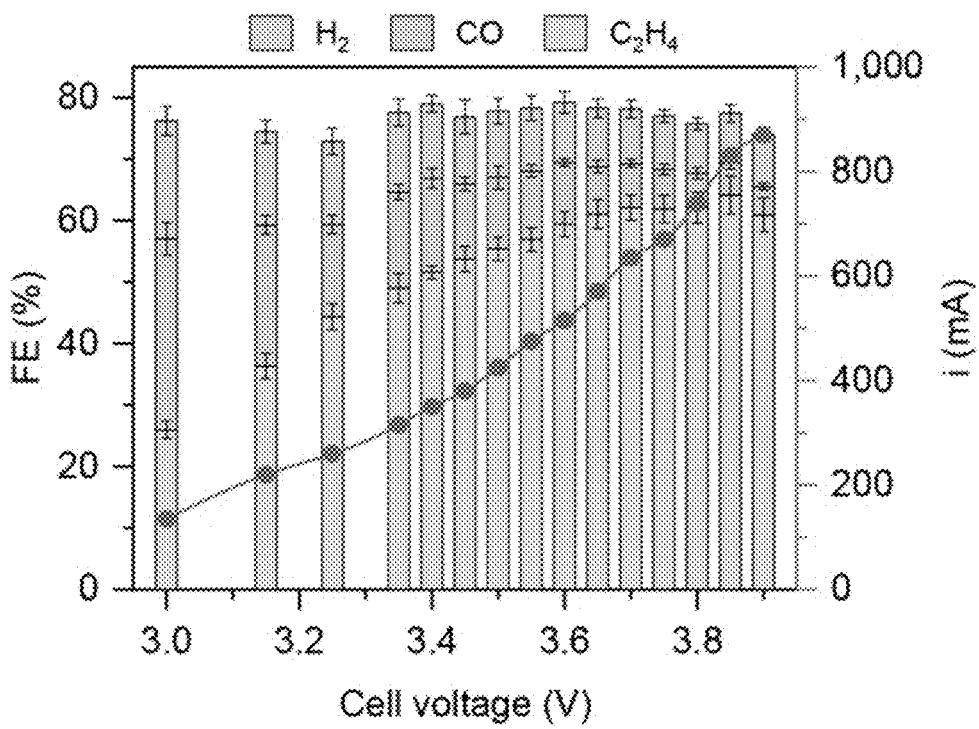
Figure 33C:
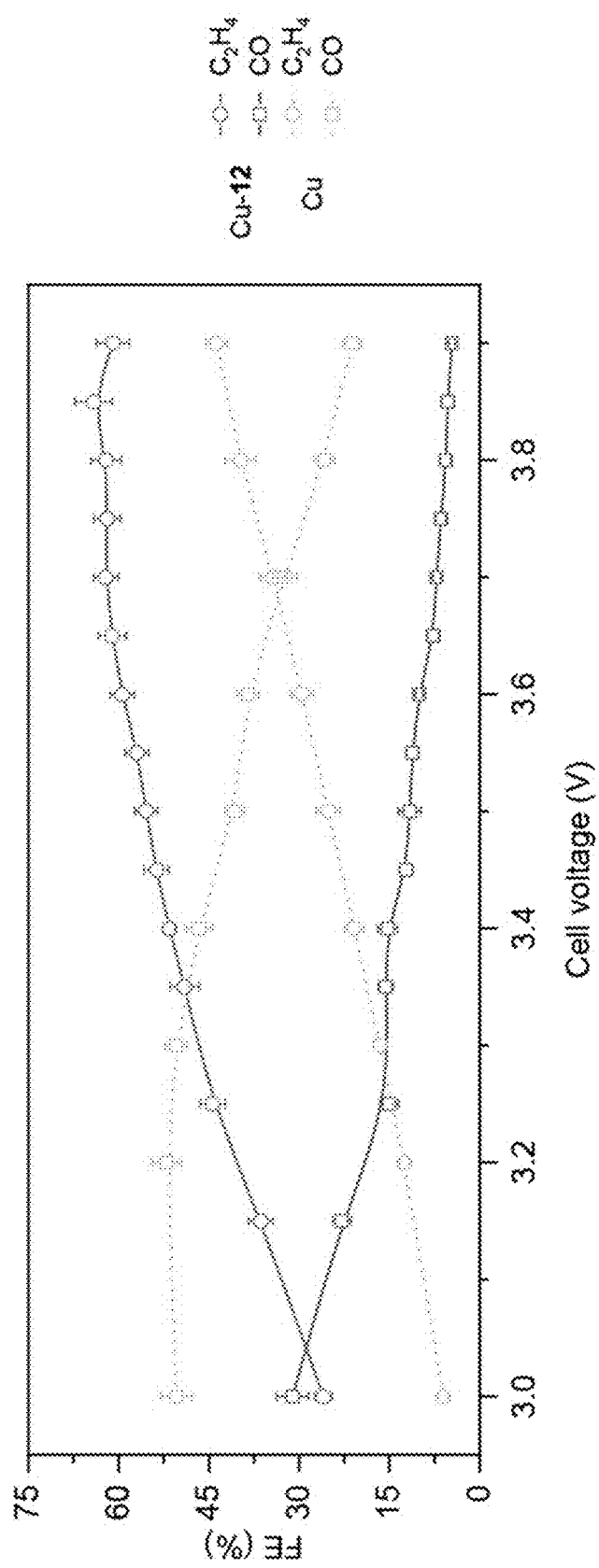

FIGS. 33A-33C. $CO_2RR$ in the MEA system. Gas product distribution at a range of full-cell voltage using Cu (FIG. 33A) and Cu-12 (FIG. 33B) as cathode.

FIG. 33C. Faradaic efficiency for CO and $C_2H_4$ on Cu and Cu-12 electrodes. The FE of $CH_4$ is below 1% at all voltages and was not plotted. The error bars for FE uncertainty represent one standard deviation based on three independent samples.

Figure 34:
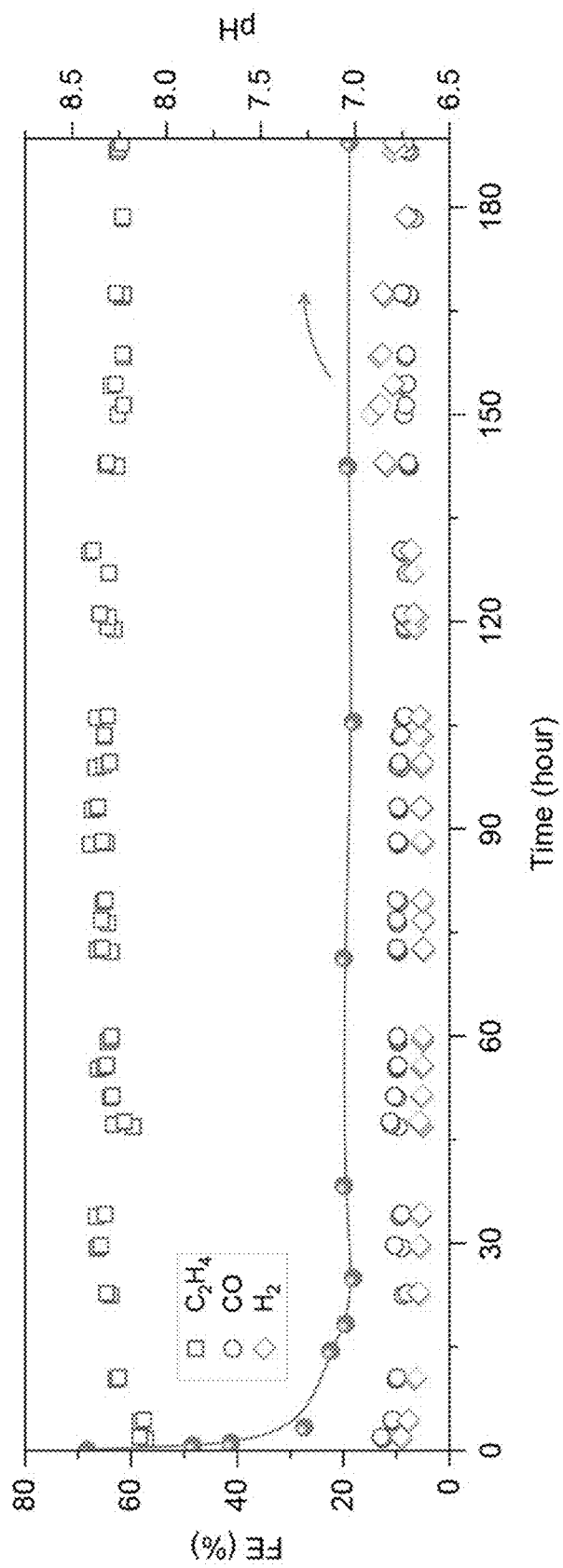

FIG. 34. Gas product distribution and pH of anolyte during extended electrolysis in the MEA system. The FE of $CH_4$ is below 1% and was not plotted.

Figure 35:
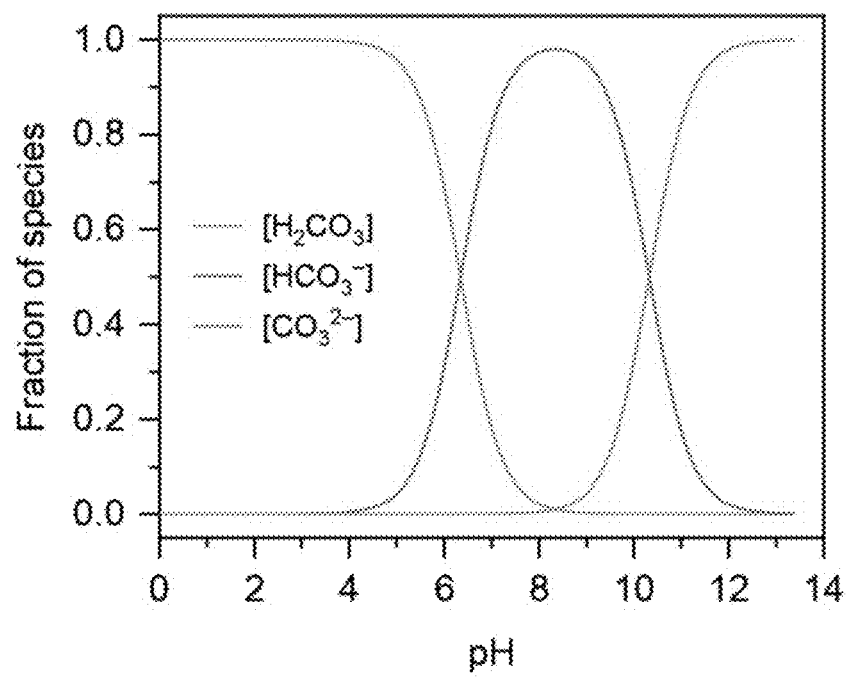

FIG. 35. Speciation diagram for carbonic acid system as a function of pH at 25° C. $H_2CO_3$ includes both carbonic acid and dissolved $CO_2$ molecules, of which the latter are the major species.

Figure 36:
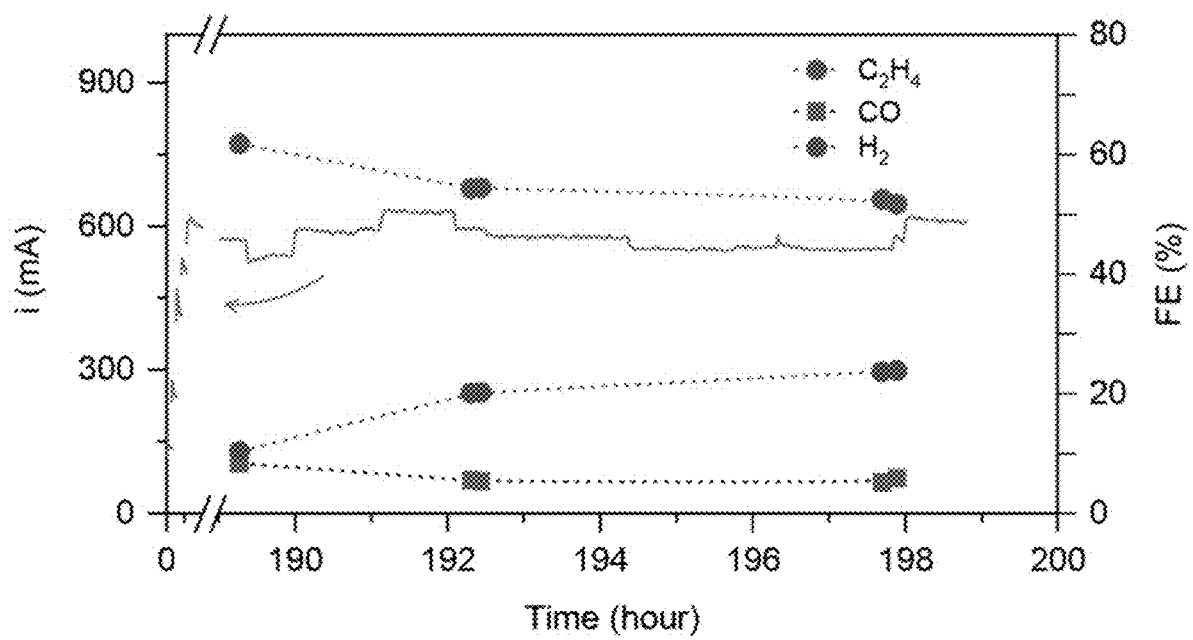

FIG. 36. Current and FEs of gas products after 190-hour electrolysis in MEA.

Figure 37A:
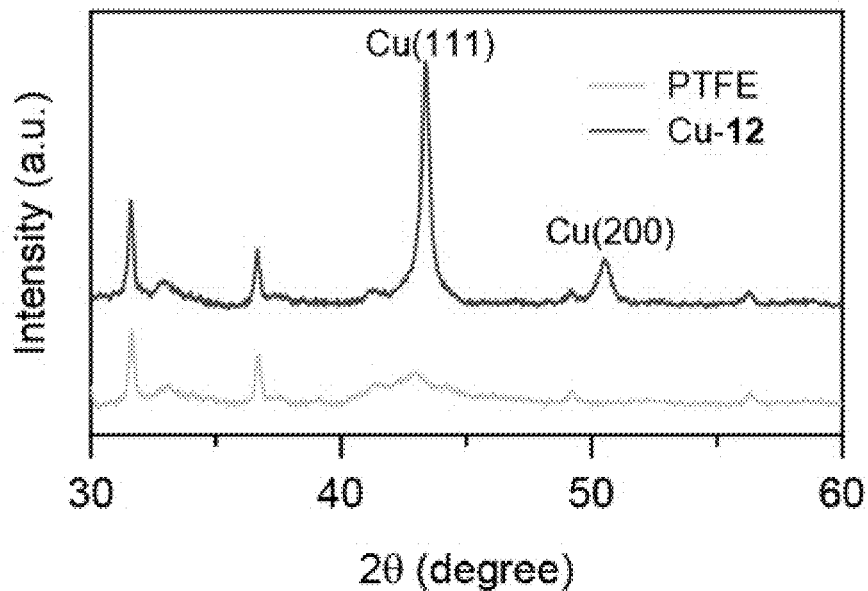
Figure 37B:
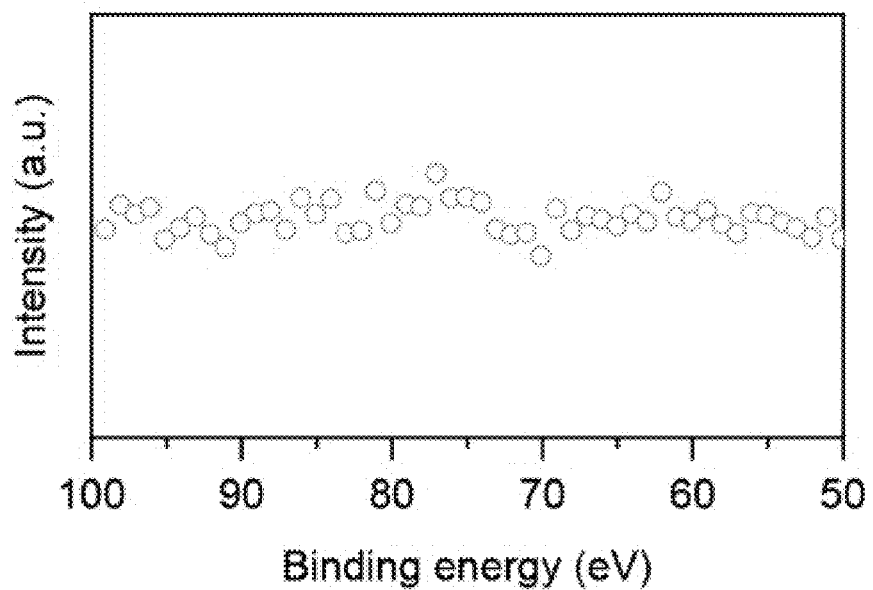
Figure 37C:
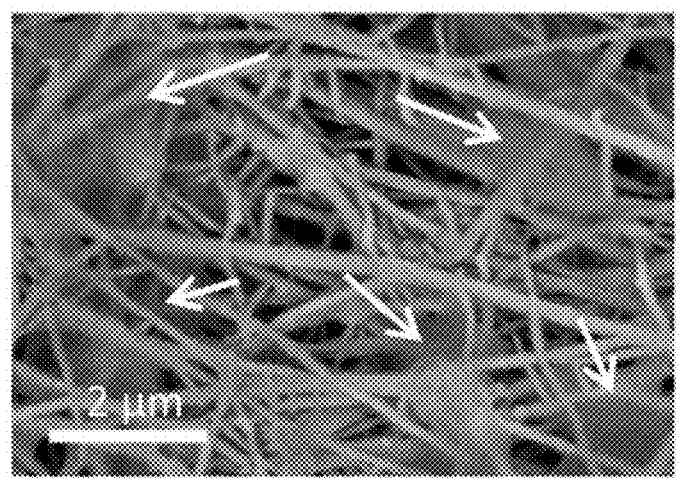
Figure 37D:
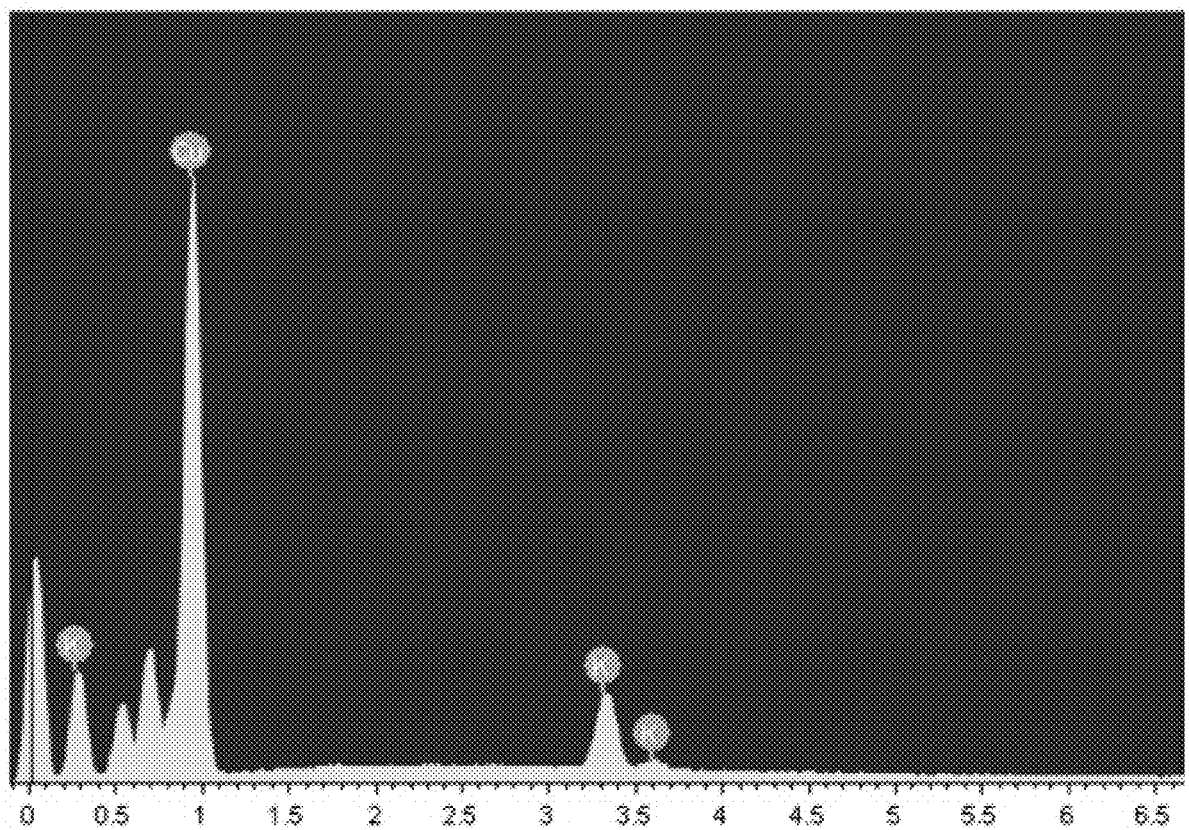
Figure 37E:
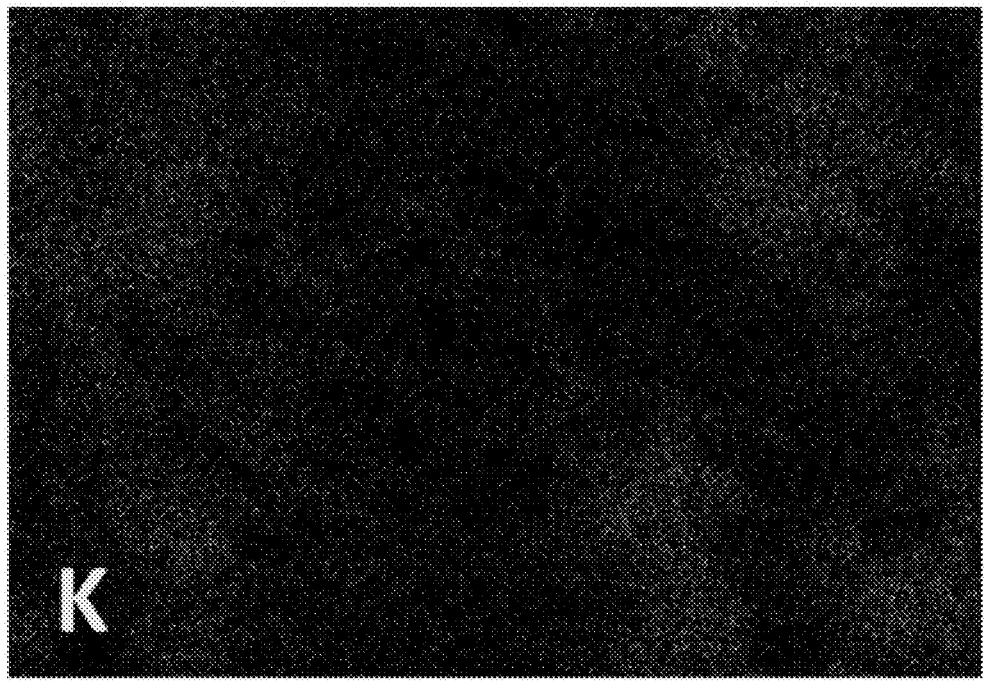
Figure 37F:

FIGS. 37A-37F. Characterization of cathode after electrolysis in MEA. XRD patterns (FIG. 37A), XPS at the region of Ir (FIG. 37B), SEM image (FIG. 37C) and corresponding EDS elemental analysis (FIG. 37D) and elemental mapping of K (FIG. 37E) and Cu (FIG. 37F).

Figure 38:
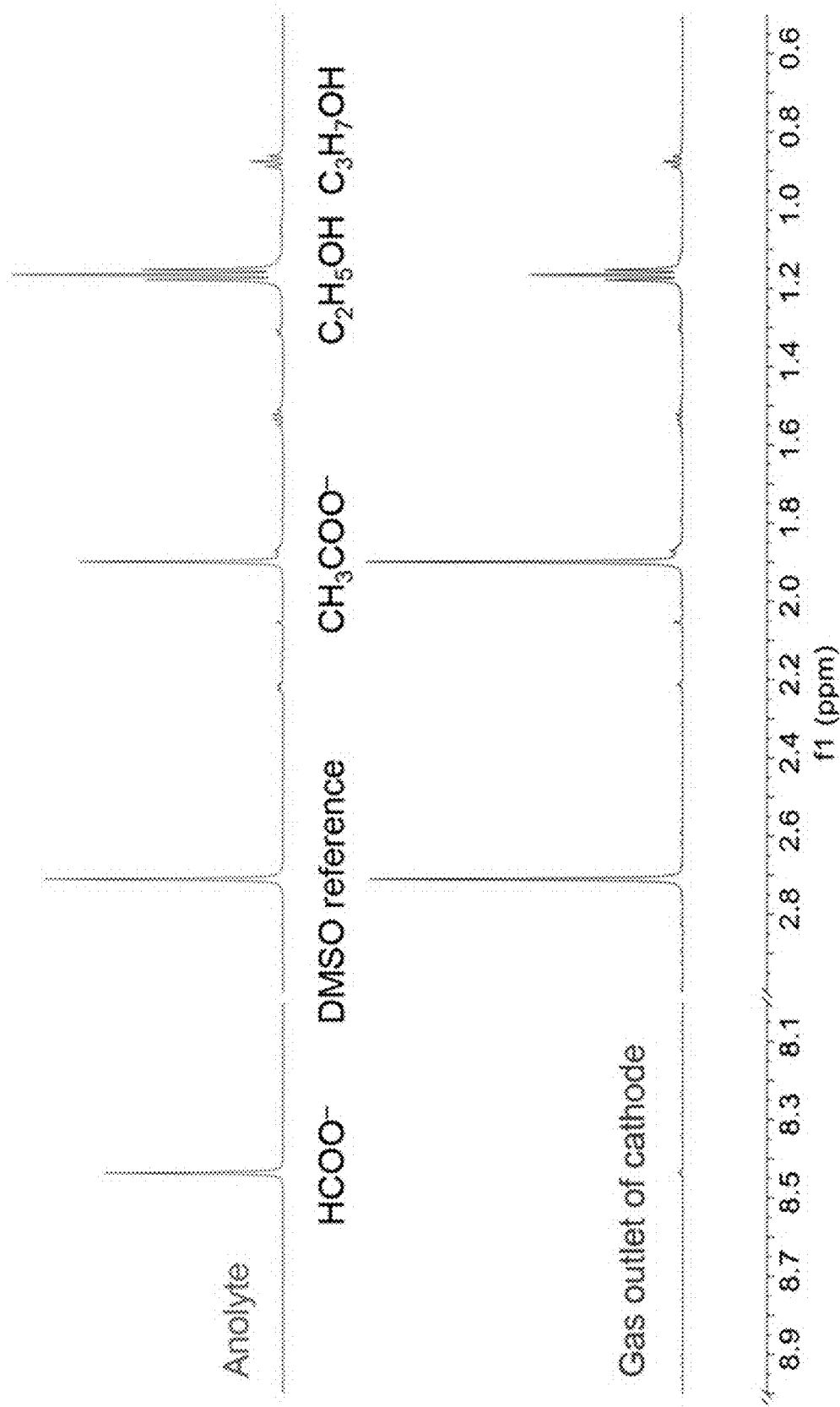

FIG. 38. Liquid products crossover. $^1$H NMR spectra of liquid products collected from the anolyte and the gas outlet of cathode. The presence of all the liquid products in the anolyte indicates the crossover of these liquids, especially $HCOO^-$.

Figure 39A:
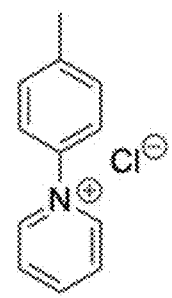
Figure 39B:
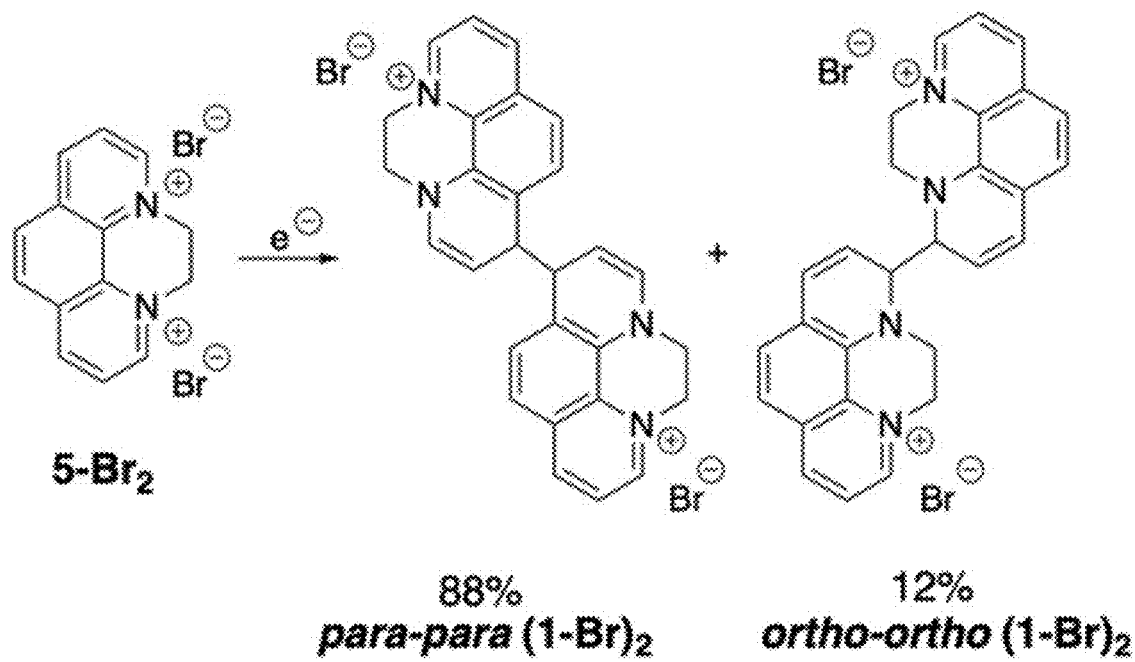
Figures 39C, 39D:
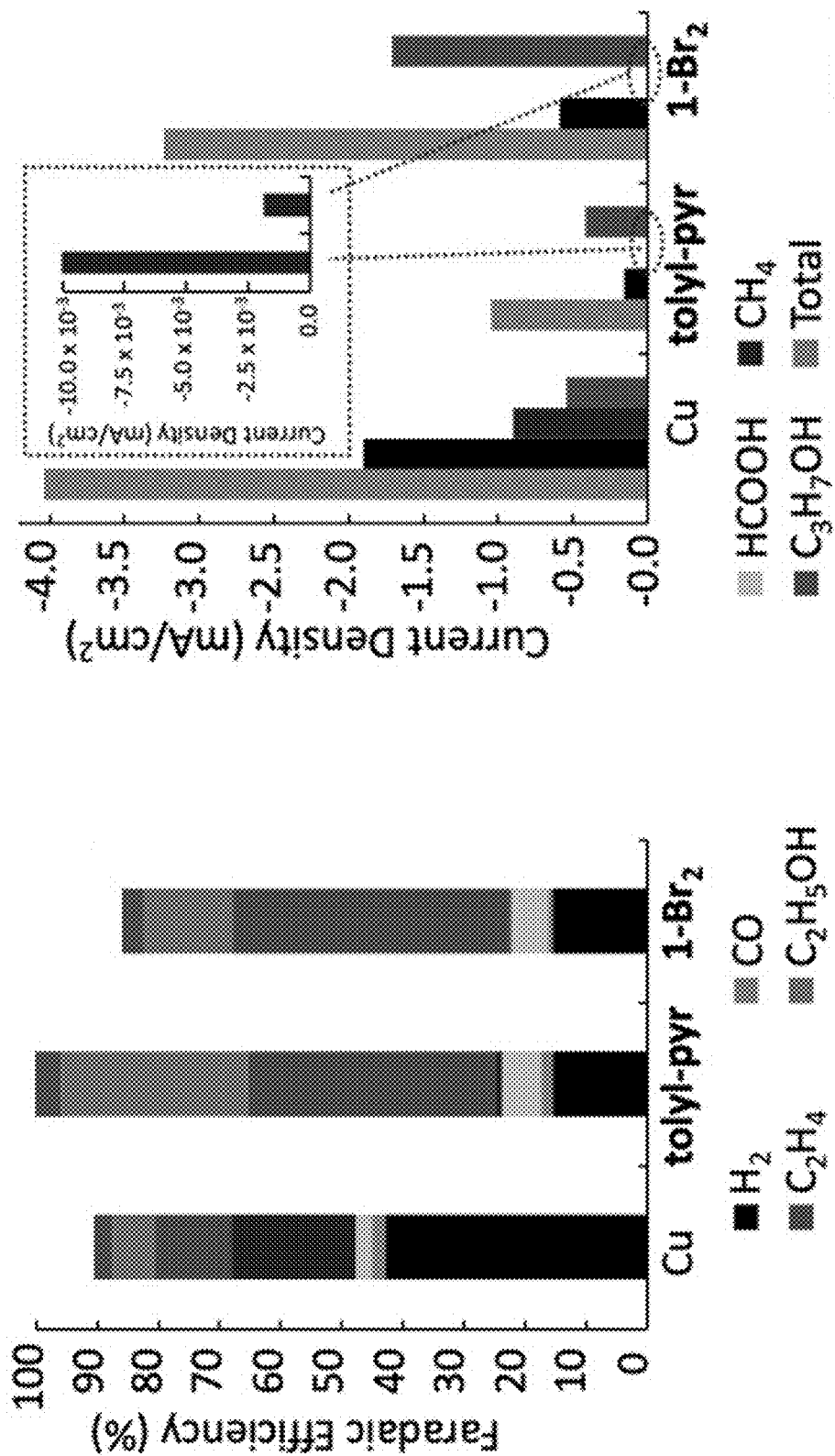

FIGS. 39A-39D. Chemical structure of (FIG. 39A) tolyl-pyr, (FIG. 39B) 1-$Br_2$ and its reduction to para-para (1-$Br)_2$ and ortho-ortho (1-$Br)_2$ coupled dimers, respectively. FIG. 39C. Faradaic efficiencies toward different products formed during $CO_2$RR at −1.07 V in a $CO_2$-saturated 0.1 M $KHCO_3$ electrolyte either without, or with, 10 mM of either tolyl-pyr, or 1-$Br_2$. FIG. 39D. Total and partial current densities for $H_2$, $CH_4$ and $C_2H_4$ without or with 10 mM of either tolyl-pyr or 1-$Br_2$. The molecule 1-$Br_2$ refers to N,N'-ethylene-phenanthrolinium dibromide and the molecule tolyl-pyr refers to N-tolylpyridinium chloride.

Figure 40A:
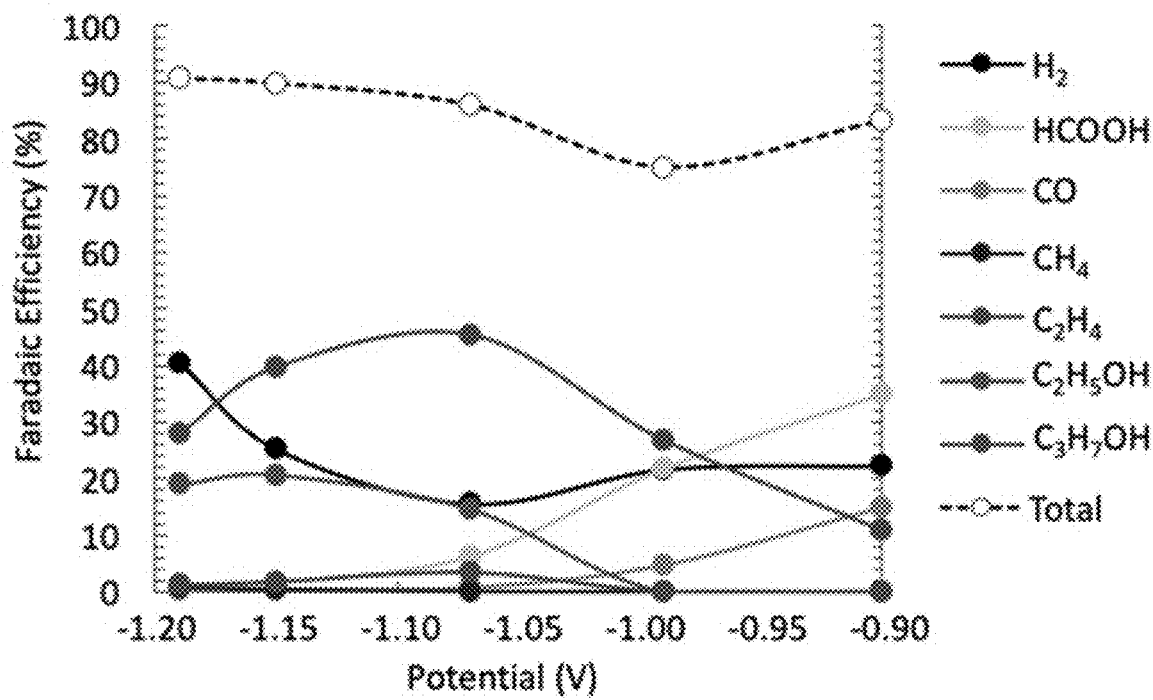

FIG. 40A. Faradaic efficiencies and (FIG. 40B) partial current densities for $CO_2$RR products and hydrogen as a function of potential during $CO_2$RR in a $CO_2$-saturated 0.1 M $KHCO_3$ electrolyte with 10 mM of 1-$Br_2$. Each data point shows the average of three individual measurements.

FIGS. 41A-41D. Ex-situ SEM images of four Cu electrodes (FIG. 41A) after electropolishing; (FIG. 41B) after 65 min of electrocatalysis at −1.07 V in 0.1 M $KHCO_3$ without 1-$Br_2$; (FIG. 41C) same as FIG. 41B, but with 10 mM of 1-$Br_2$; (FIG. 41D) ex-situ SEM image of the post catalysis electrode from FIG. 41C, at higher magnification.

FIGS. 42A-42D. Ex-situ AFM images of Cu electrodes (FIG. 42A) after electropolishing; (FIG. 42B) after 5 min in contact with a 10 mM solution of 1-$Br_2$ in 0.1 M $KHCO_3$; (FIG. 42C) after 5 min in contact with a 10 mM solution of 1-$Br_2$ in 0.1 M $KHCO_3$ and 3 cycles of PEIS; (FIG. 42D) after 65 min of electrocatalysis at −1.07 V in 0.1 M $KHCO_3$ with 1-$Br_2$. The molecule 1-$Br_2$ refers to N,N'-ethylene-phenanthrolinium dibromide.

FIGS. 43A-43D. Ex-situ AFM images of Cu electrodes (FIG. 43A) after 65 min of electrocatalysis at −1.07 V in 0.1 M $KHCO_3$ with 1-$Br_2$; (FIG. 43B) the same electrode as FIG. 43A after extracting the organic film; (FIG. 43C) after resubmitting a similar electrode as FIG. 43A to a second catalytic run; (FIG. 43D) after a second catalytic run using same electrode as in FIG. 43B. The molecule 1-$Br_2$ refers to N,N'-ethylene-phenanthrolinium dibromide.

Figure 44:
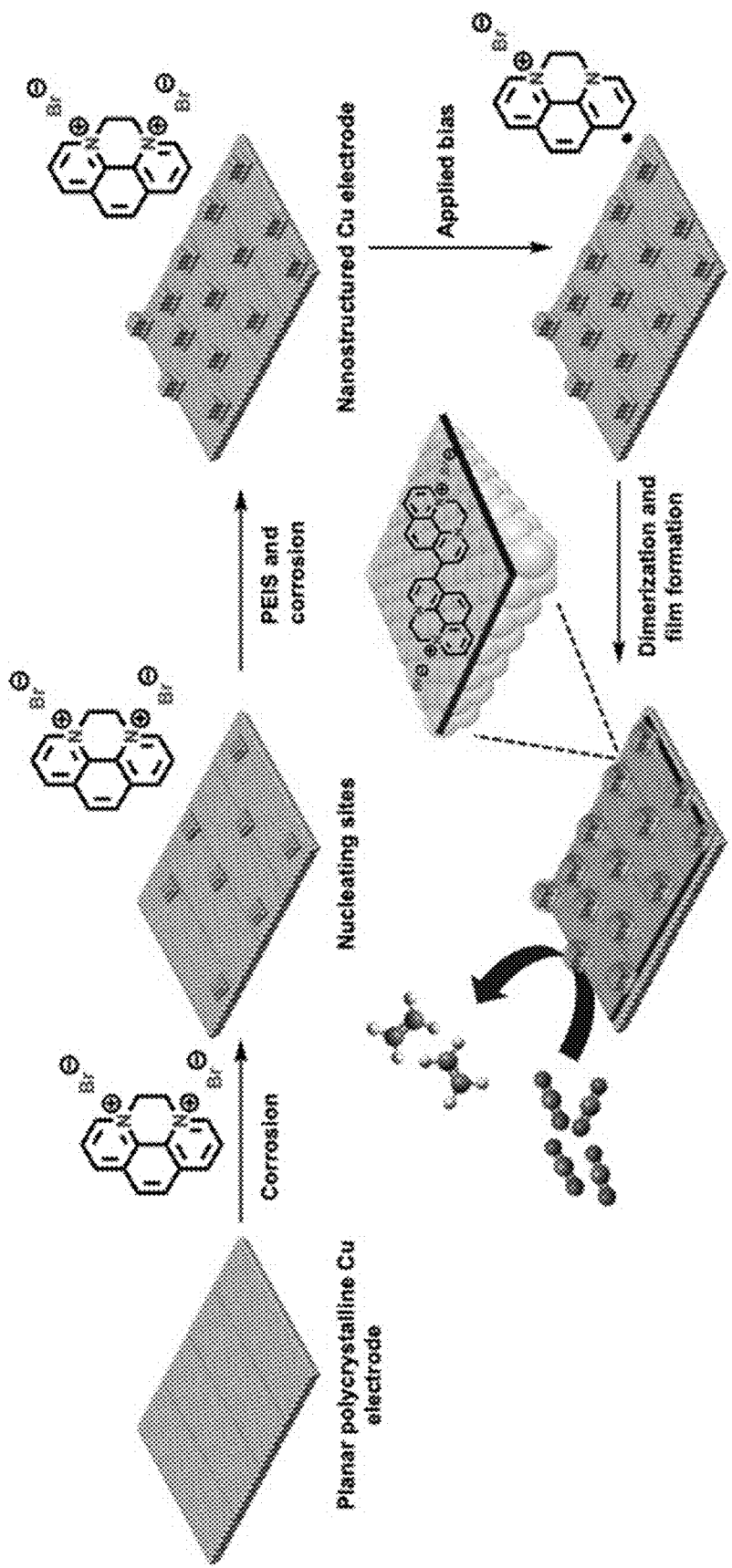

FIG. 44. Pictorial representation of the model for nanostructuring of a polycrystalline copper electrode and film electrodeposition as (1-$Br)_2$. The combination of film and nanostructuring leads to high $C_{\geq 2}$ selectivity for $CO_2$RR electrocatalysis. The molecule 1-$Br_2$ refers to N,N'-ethylene-phenanthrolinium dibromide.

Figure 45:
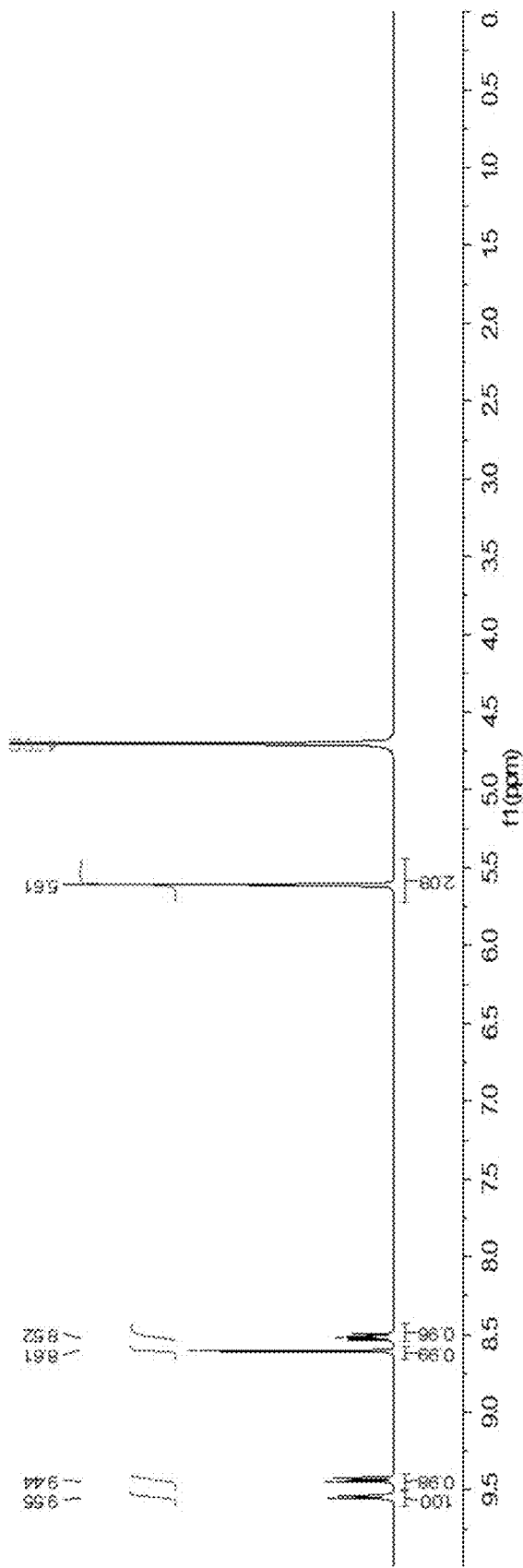

FIG. 45. $^1$H NMR spectrum of 1-$Br_2$ ($D_2O$, 298 K). The molecule 1-$Br_2$ refers to N,N'-ethylene-phenanthrolinium dibromide.

Figure 46C:
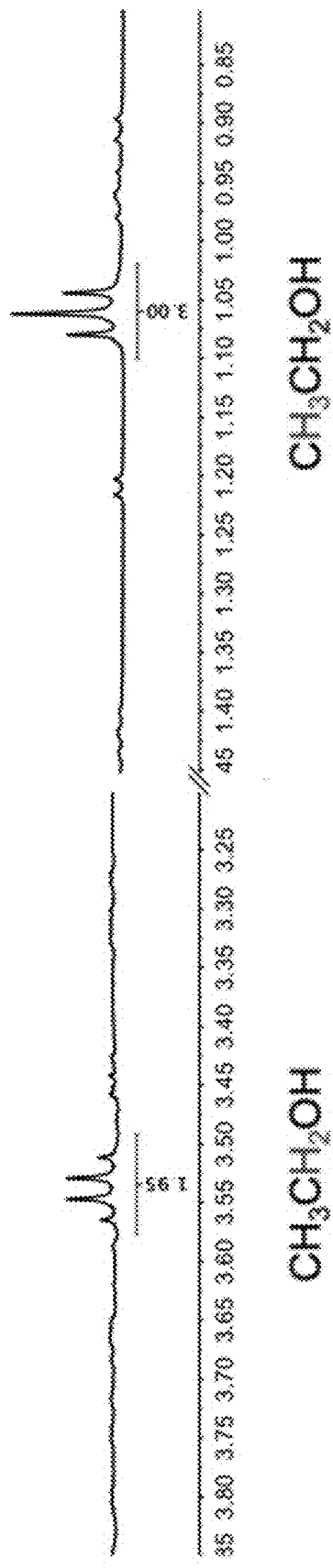

FIG. 46A. GC-MS analyses of ethylene generated during $CO_2$RR at −1.07 V with 10 mM of 1-$Br_2$ with natural abundance (blue) and $^{13}$C-enriched (red) $CO_2$-saturated $KHCO_3$ (0.1 M). $^1$H NMR spectra ($H_2O:D_2O=9:1$, 298 K) of ethanol produced under the same electrocatalytic conditions with $^{13}$C-enriched $CO_2$ (FIG. 46B) and with natural abundance $CO_2$-saturated $KHCO_3$ (FIG. 46C).

Figure 47:
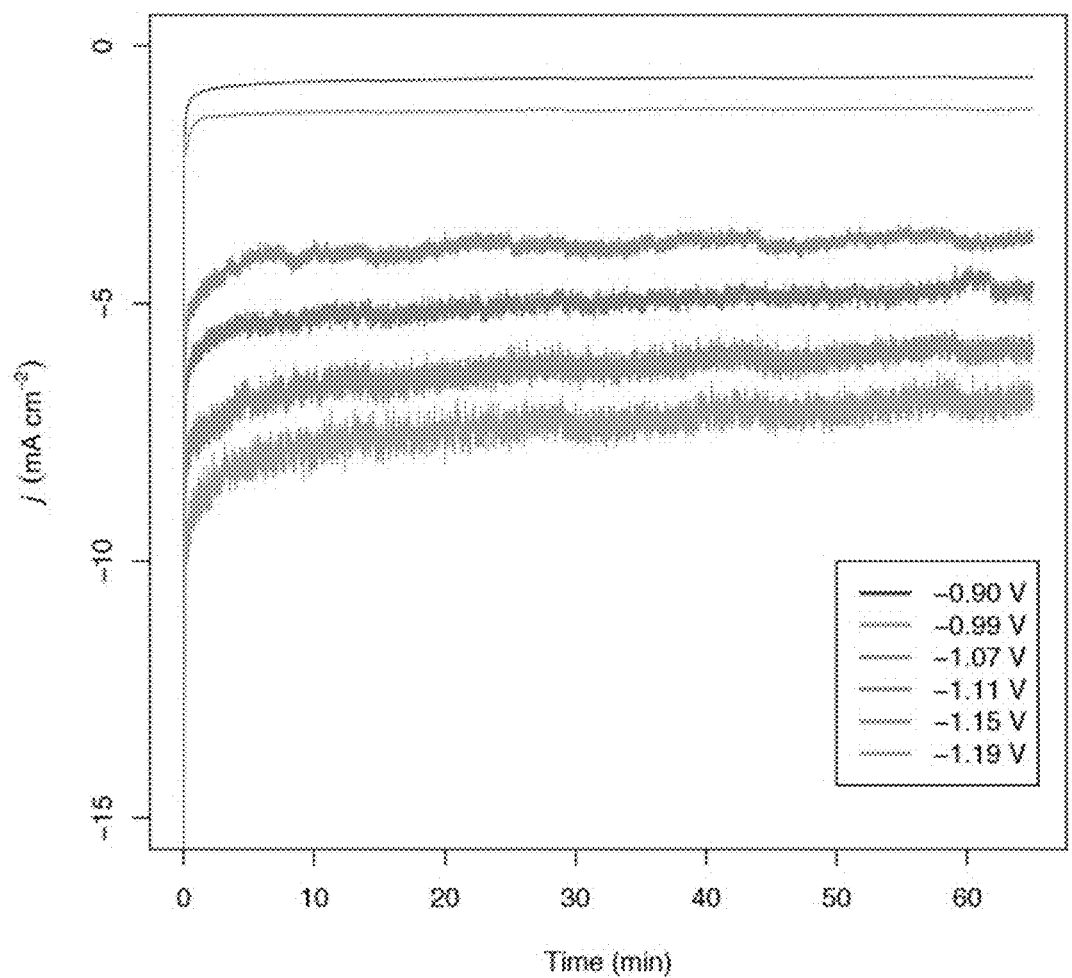

FIG. 47. Chronoamperograms of electrolysis on a Cu electrode in a $CO_2$-saturated 0.1 M $KHCO_3$ electrolyte with 10 mM of 1-$Br_2$ at different potentials.

Figure 48:
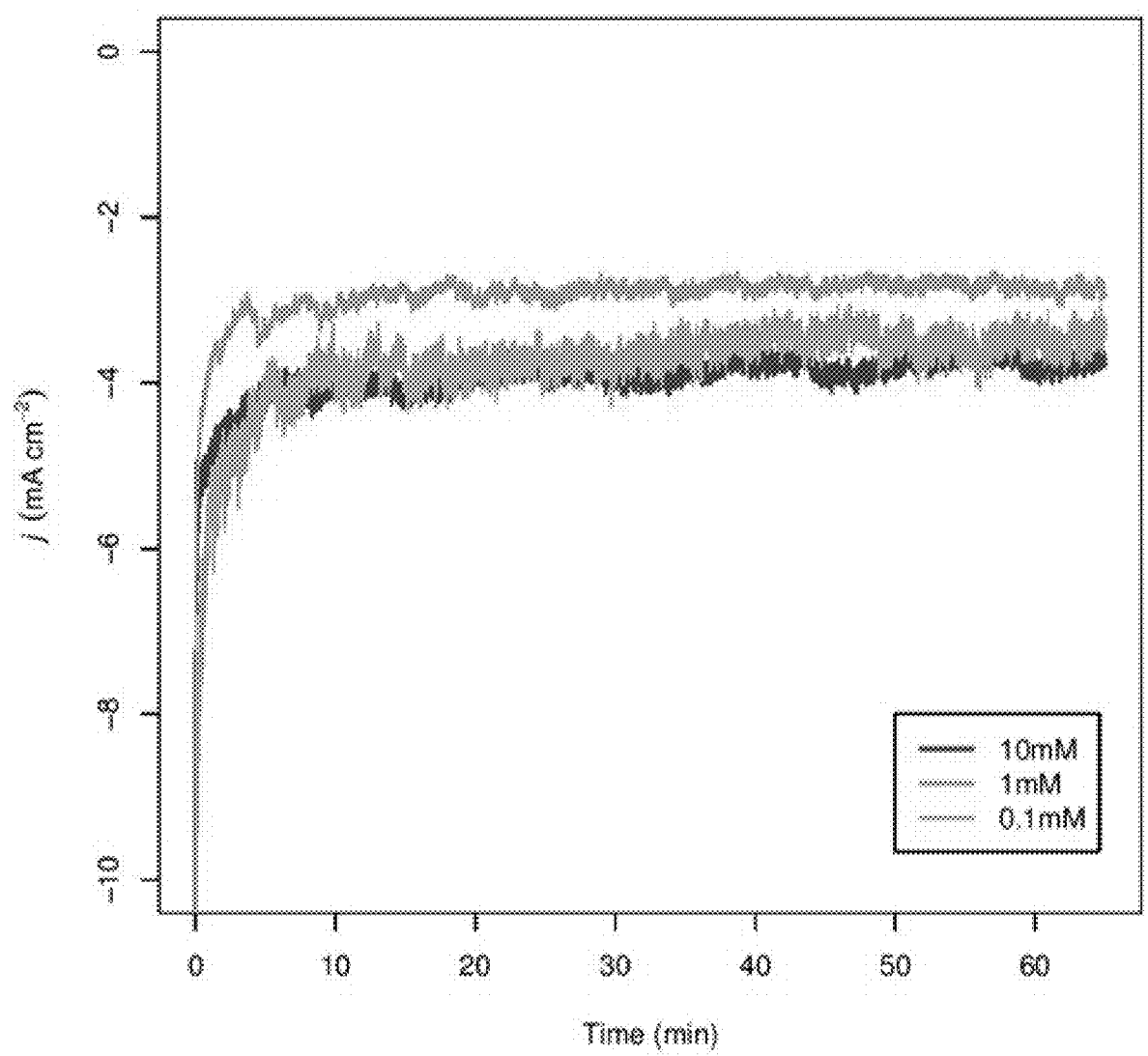

FIG. 48. Chronoamperograms of electrolysis on a Cu electrode in a $CO_2$-saturated 0.1 M $KHCO_3$ electrolyte with different concentrations of 1-$Br_2$ at −1.07 V.

Figure 49:
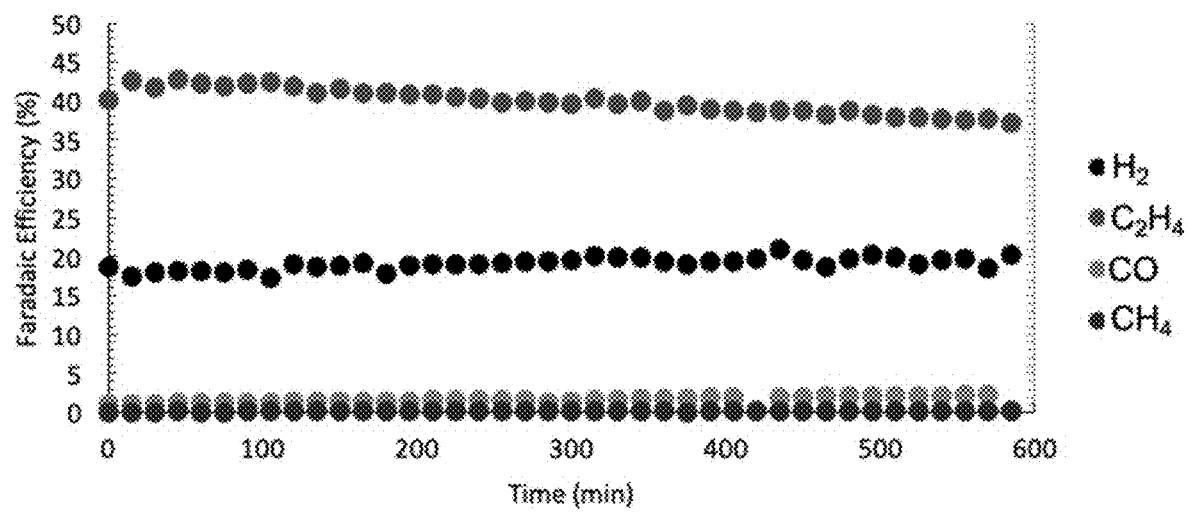

FIG. 49. Plot of the Faradaic efficiencies for gaseous products over 10 h on a Cu electrode in a $CO_2$-saturated 0.1 M $KHCO_3$ electrolyte with 10 mM of 1-$Br_2$ at −1.07 V.

Figure 50:
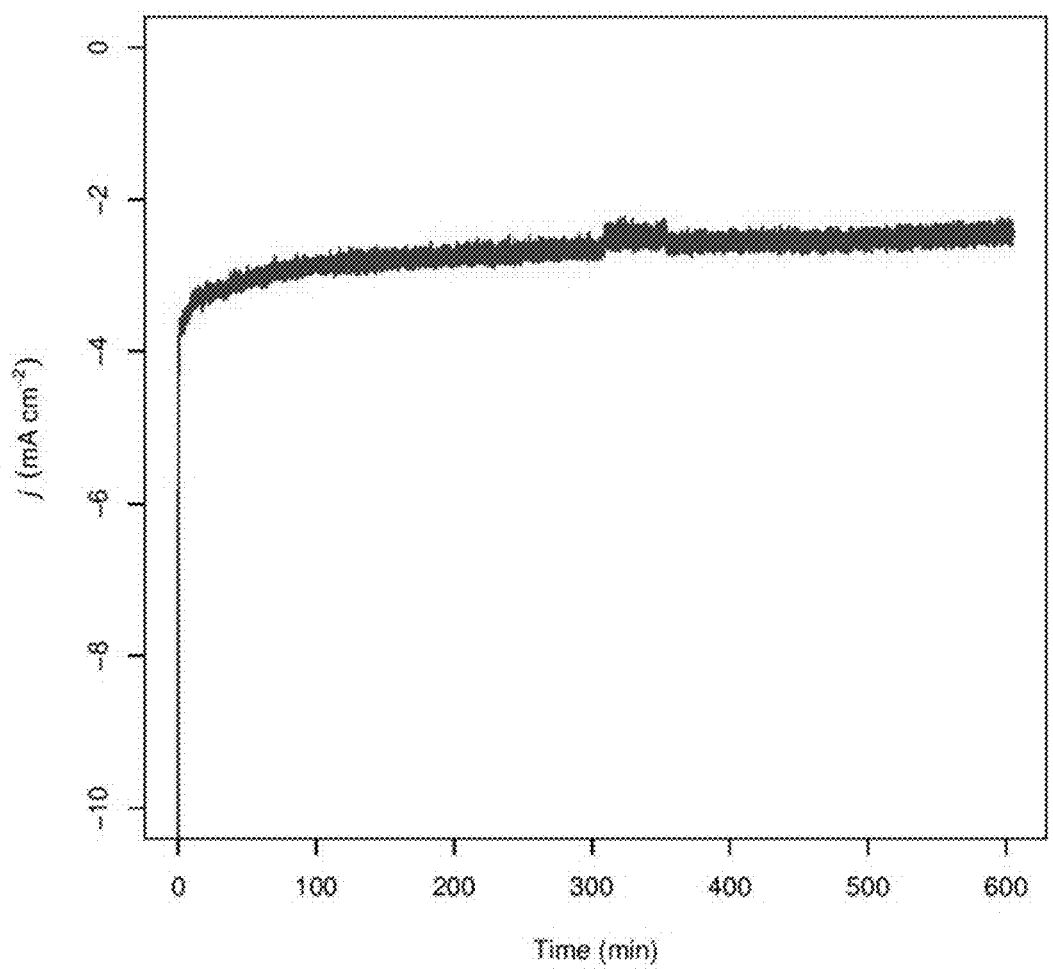

FIG. 50. Chronoamperograms of electrolysis on a Cu electrode in a $CO_2$-saturated 0.1 M $KHCO_3$ electrolyte with 10 mM of 1-$Br_2$ for 10 h.

Figure 51:
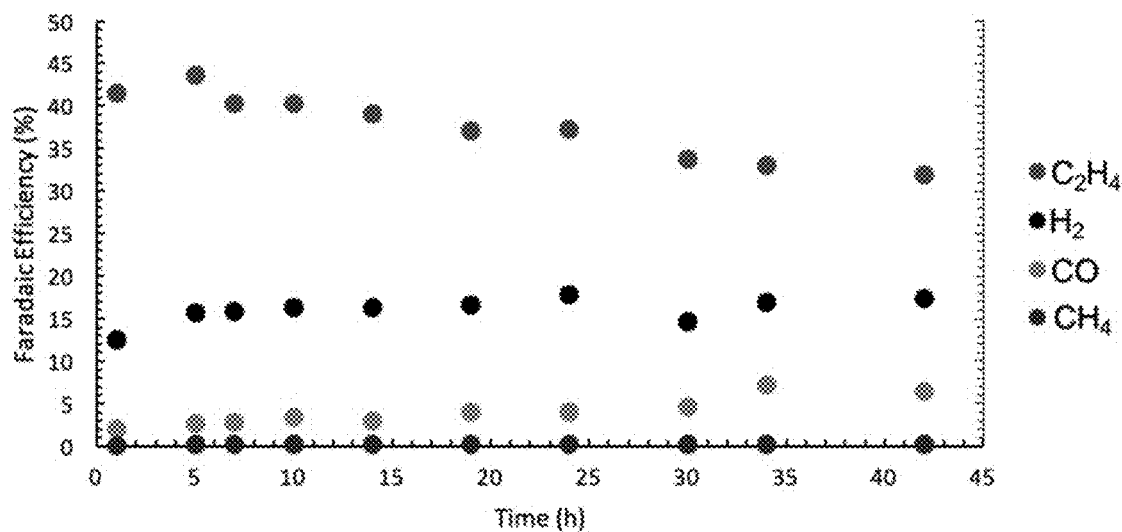

FIG. 51. Plot of the faradaic efficiencies for gaseous products over 42 h on a Cu electrode in a $CO_2$-saturated 0.1 M $KHCO_3$ electrolyte with 10 mM of 1-$Br_2$ at −1.07 V.

Figure 52:
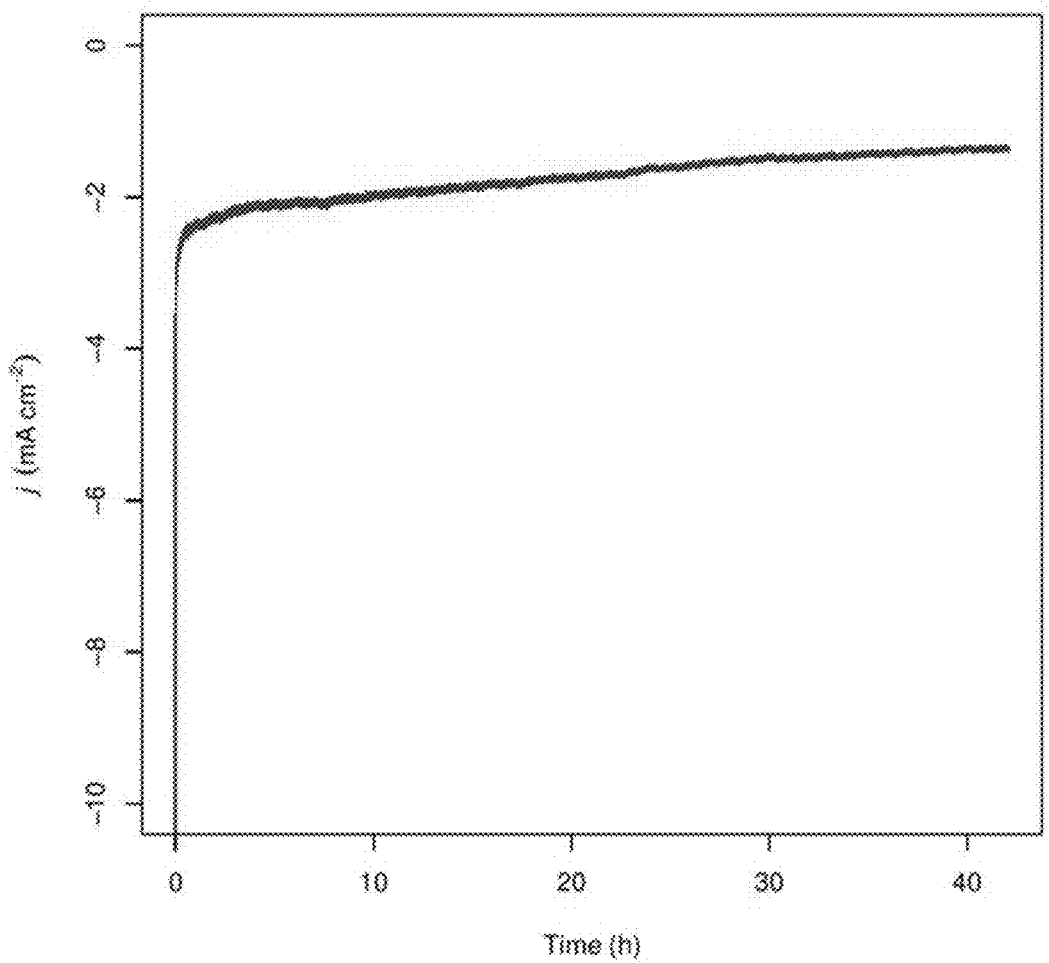

FIG. 52. Chronoamperograms of electrolysis on a Cu electrode in a $CO_2$ saturated 0.1 M $KHCO_3$ electrolyte with 10 mM of 1-$Br_2$ for 42 h.

Figure 53:
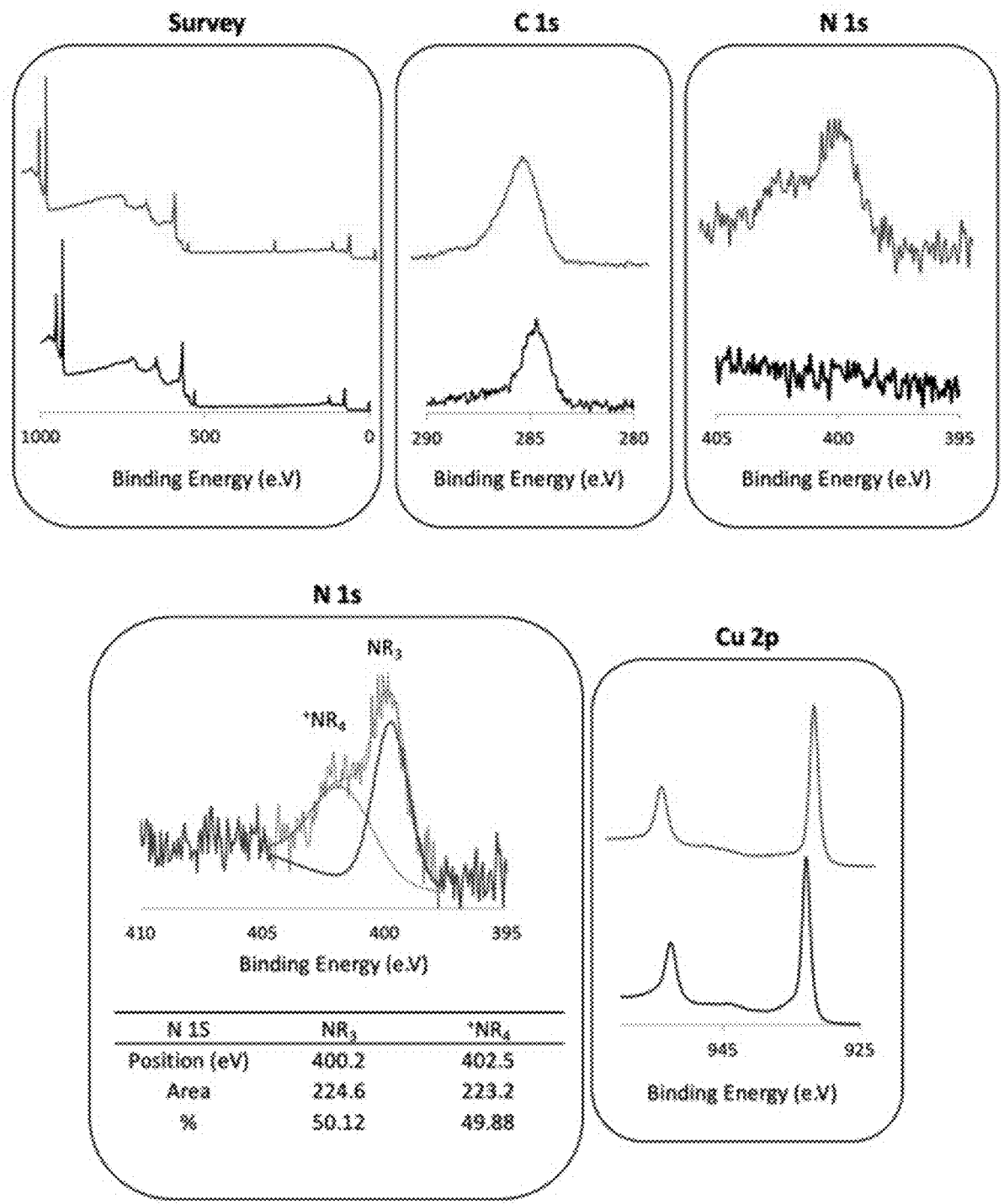

FIG. 53. Normalized X-ray photoelectron spectra of Cu electrodes after electrolysis at −1.07 V in $KHCO_3$ (0.1 M) with (red trace) and without (black trace) 1-$Br_2$ (10 mM). The broad N 1s peak has been deconvoluted into two peaks corresponding to quaternary amine (green trace) and tertiary amine (blue trace) nitrogens. The purple trace corresponds to the overall fitting of the model. XPS spectra suggest that the surfaces of copper foils are mixtures of copper metal and $Cu_2O$ after electrolysis both with and without 10 mM of 1-$Br_2$. Due to the complexity of the organic molecule in the C 1s region, spectral energy for all samples are calibrated using the Cu 2p3/2 peak (932.63 eV) instead of C 1s. The Cu 2p band for the two samples shows a pair of 2p 3/2 and 2p1/2 peaks, indicative of Cu metal and/or $Cu_2O$. These two oxidation states in the 2p region give near identical binding energy. The lack of large satellites at 940-945 and 960-963 eV indicates that the surfaces do not contain CuO. For the sample after electrolysis in the presence of 1-$Br_2$, two N 1s peaks are observed at 400.2 eV and 402.5 eV, which correspond to a tertiary amine and a quaternary amine nitrogen, respectively.[8,9] Integration of the two peaks indicates a 50% ratio of the two different types of nitrogen present in the organic film. These observations are consistent with the $^1$H NMR spectrum assignment of the two dimers ortho-ortho (1-$Br)_2$ and para-para (1-$Br)_2$.

Figure 54:
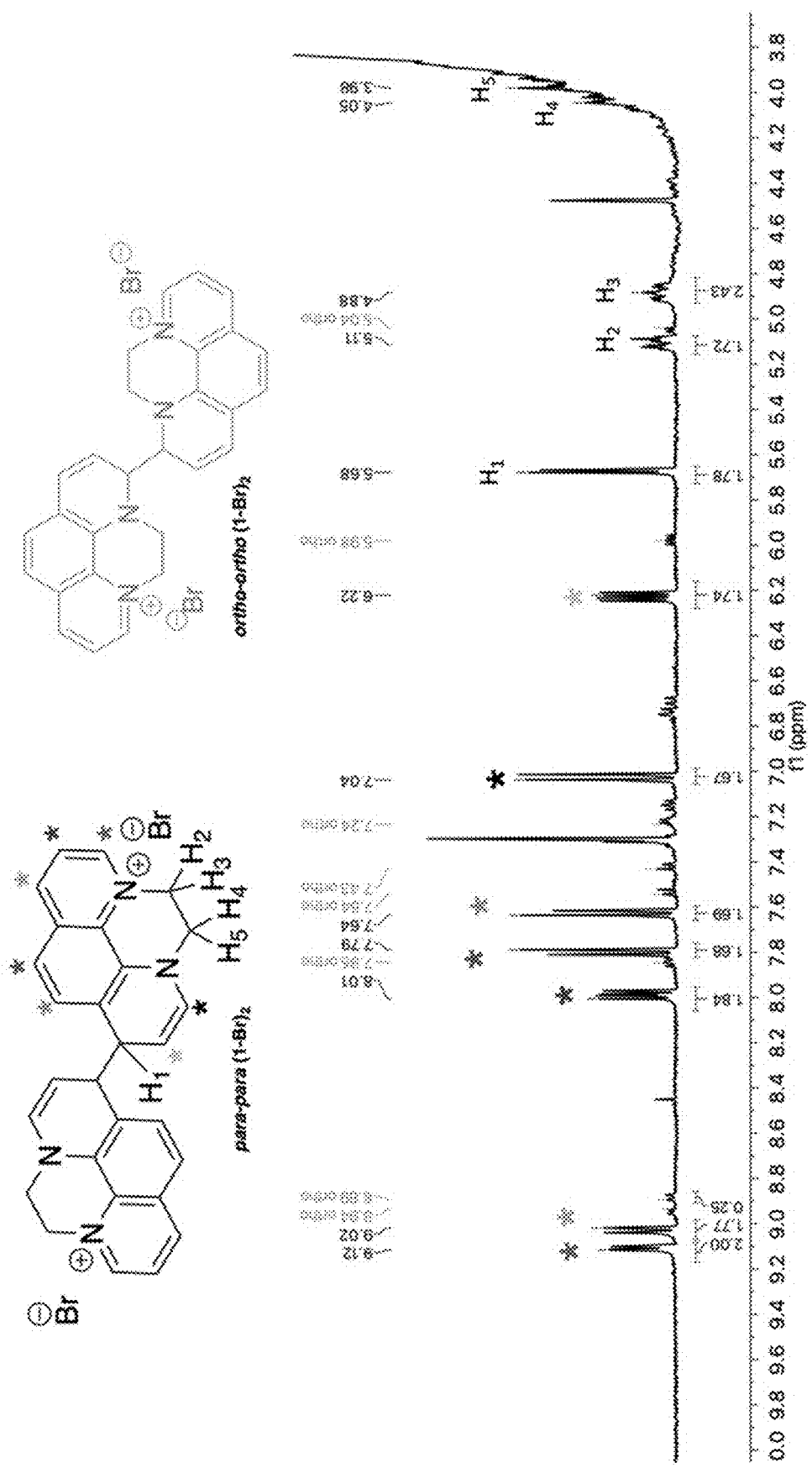

FIG. 54. Proposed structure of the dimers (top), para-para (1-$Br)_2$ and ortho-ortho (1-$Br)_2$ (black and grey, respectively). $^1$H NMR spectrum (bottom, DMSO-$d_6$, 298 K) of the organic film extracted from a post catalysis Cu electrode at −1.4 V in a $CO_2$ saturated 0.1 M $KHCO_3$ electrolyte with 10 mM of 1-$Br_2$. The $^1$H NMR spectrum suggests the formation of two products which have been assigned to the para-para and the ortho-ortho coupling of two phenanthrolinium radicals (blue and grey labels, respectively). The para-para product is the major species (88%). Two resonances from the bridge overlap with the water peak. Nevertheless, COSY shows the coupling of these two resonances with the resonances at 5.11 ppm and 4.88 ppm, corresponding to the two other protons of the bridge. The para-para (1-$Br)_2$ and ortho-ortho (1-$Br)_2$ products represent >95% of the material present on the surface of the electrode. Some minor resonances at 8.50 ppm (s), 7.30 (s), 7.18 ppm (m), 6.75 ppm (m) and 6.65 ppm (m) could not be assigned. They could come from unidentified by-products or other isomers of (1-$Br)_2$.

Figure 55:
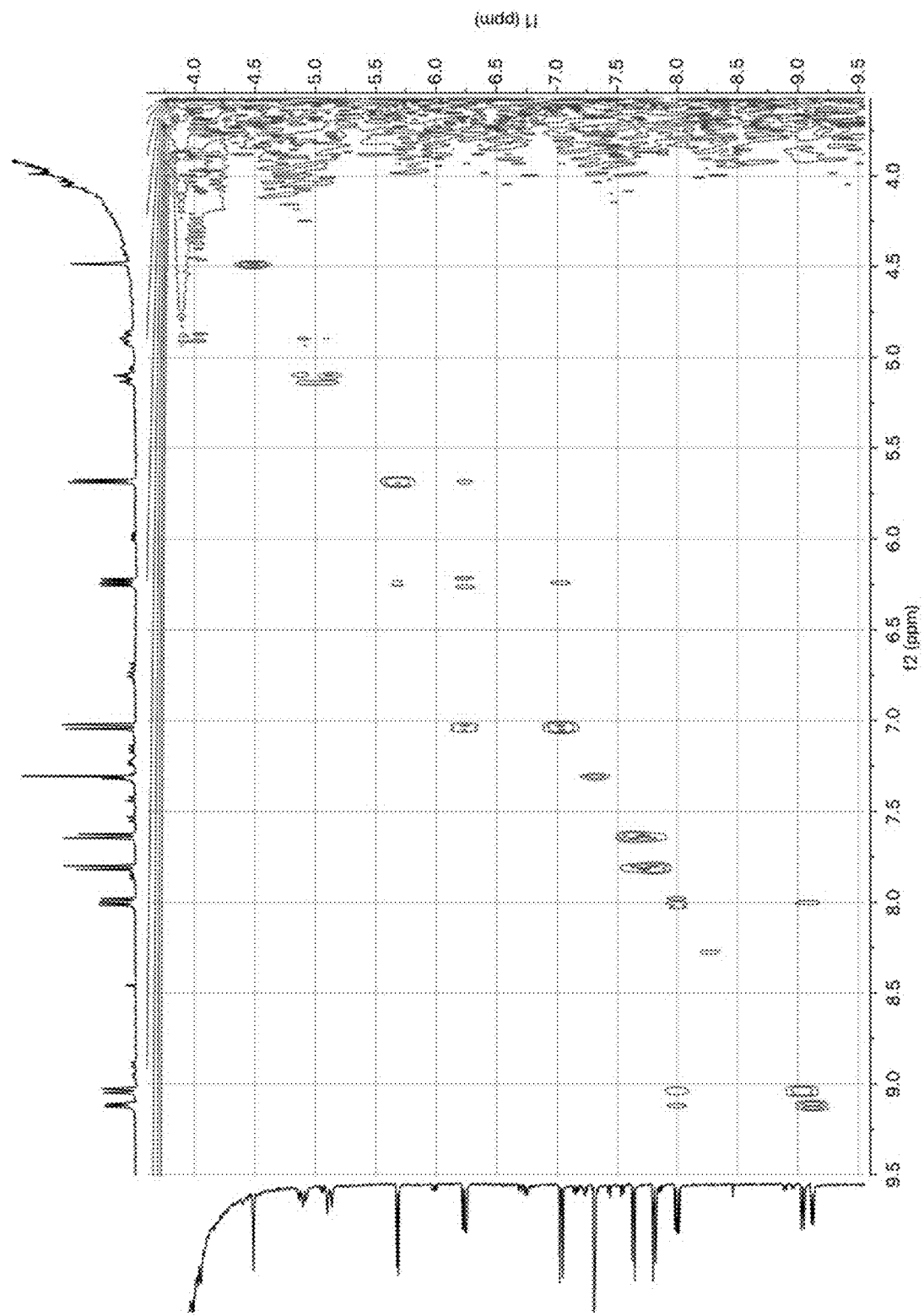

FIG. 55. $^1$H-$^1$H COSY spectrum of the organic film extracted from a post catalysis Cu electrode at −1.4 V in a CO$_2$ saturated 0.1 M KHCO$_3$ electrolyte with 10 mM of 1-Br$_2$. (DMSO-d$_6$, 298 K).

Figure 56:
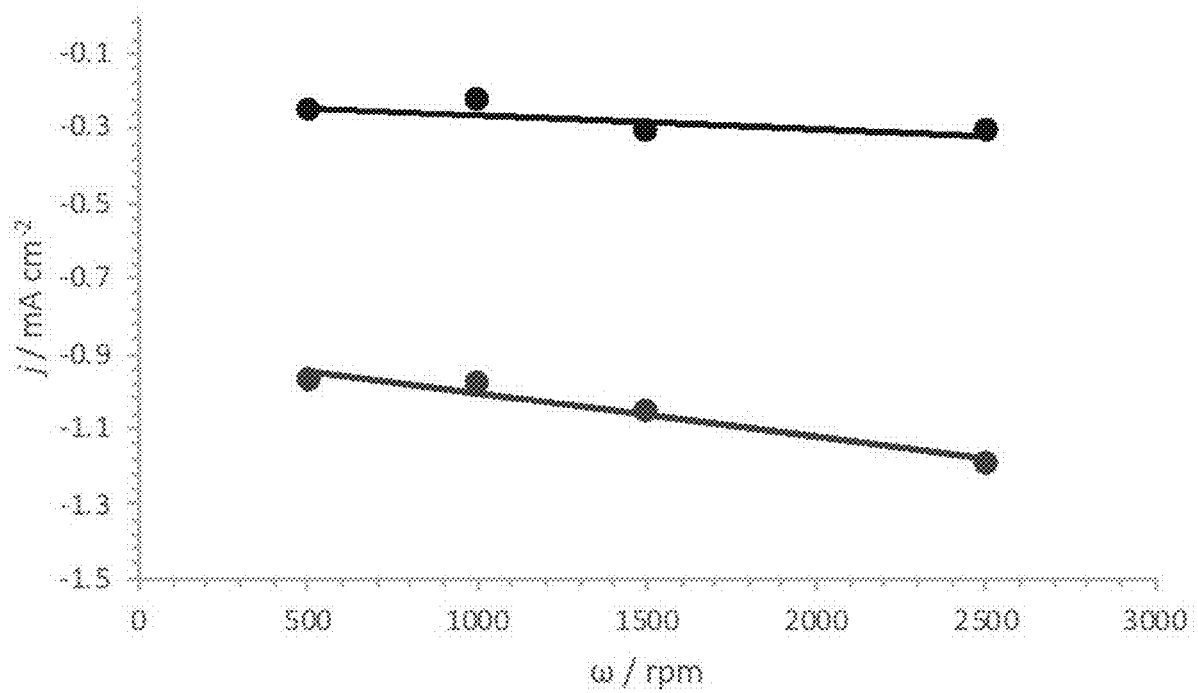

FIG. 56. Catalytic currents as a function of rotation rate of a Cu rotating disk electrode in Ar-saturated 0.1 M KHCO$_3$ at −1.10 V vs RHE in the absence (red trace) and in the presence of 10 mM of 1-Br$_2$ (blue trace). Lines are included as guides to the eye.

Figure 57:
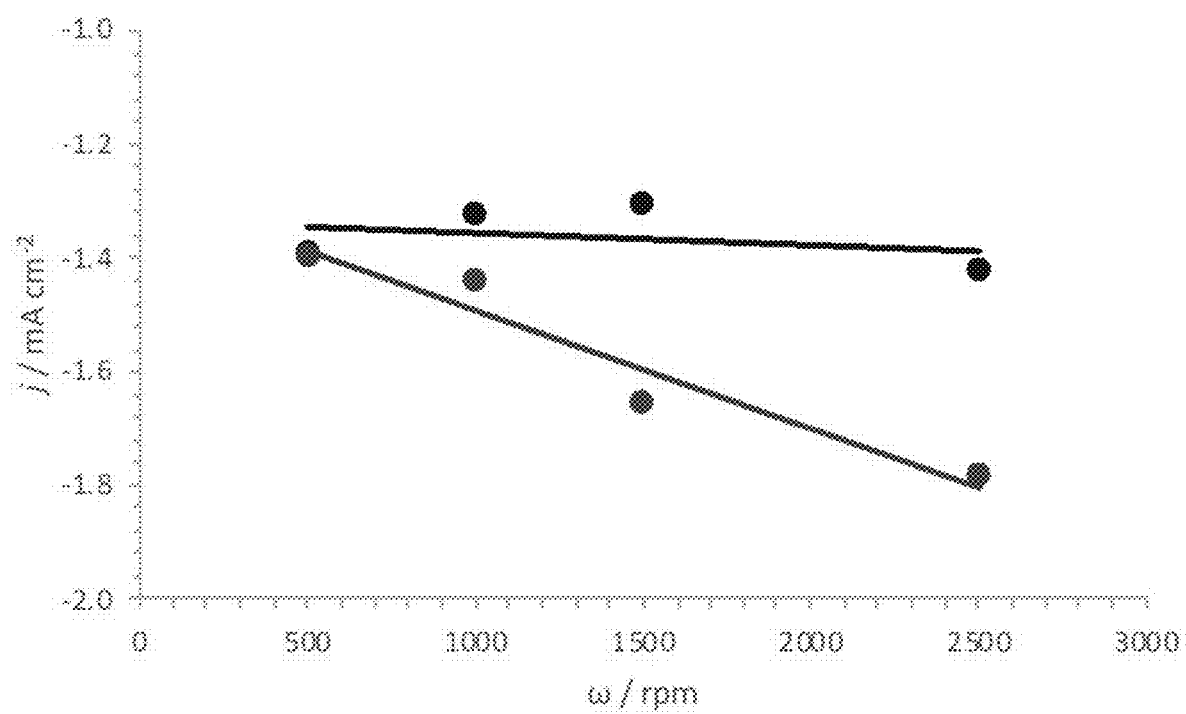

FIG. 57. Catalytic currents as a function of rotation rate of a Cu rotating disk electrode in CO$_2$-saturated 0.1 M KHCO$_3$ at −1.10 V vs RHE in the absence (red trace) and in the presence of 10 mM of 1-Br$_2$ (blue trace). Lines are included as guides to the eye.

Figure 58A:
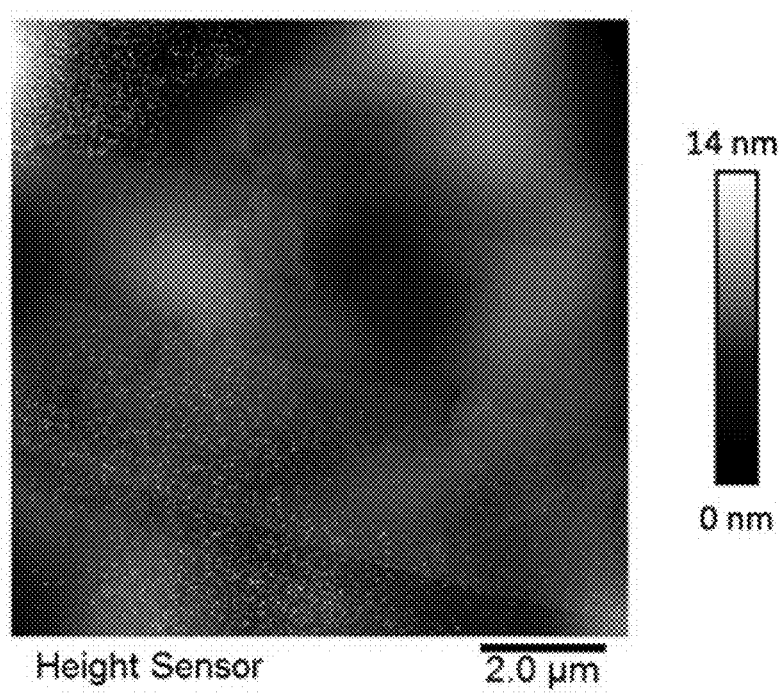
Figure 58B:
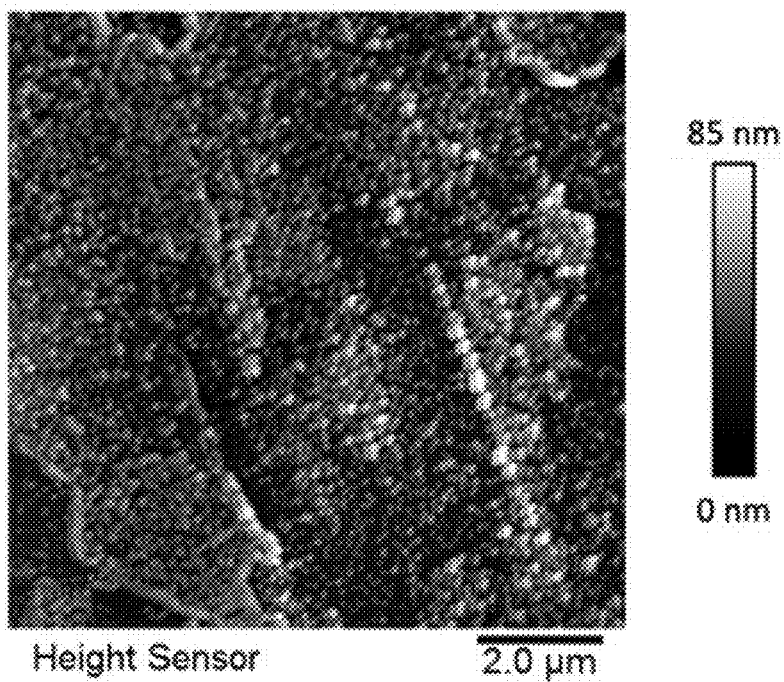
Figure 58C:
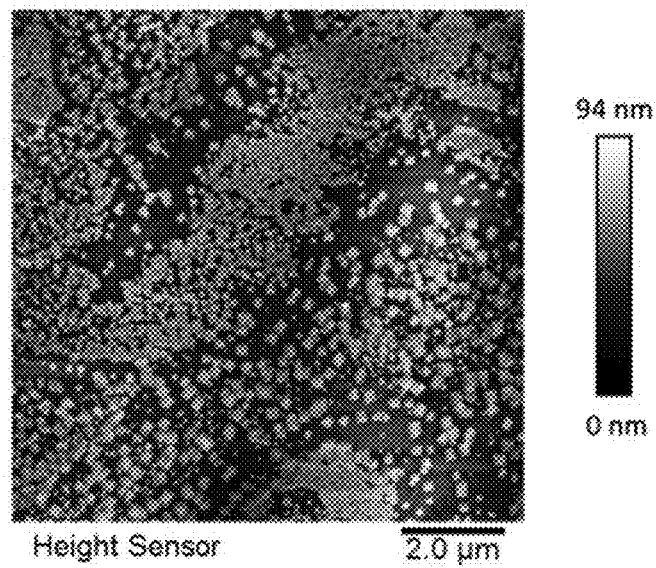
Figure 58D:
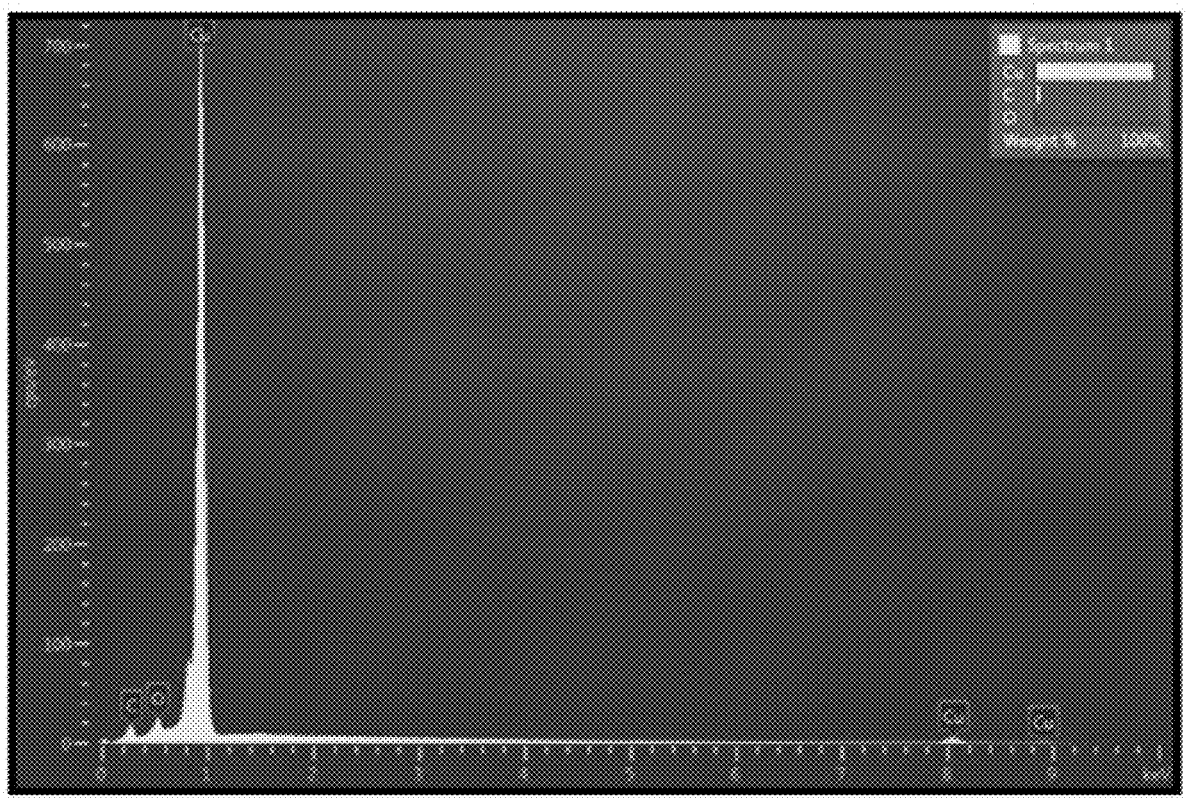

FIGS. 58A-58D. Ex-situ AFM images of Cu electrodes after electropolishing (FIG. 58A); after 65 min of electrocatalysis at −1.07 V in a CO$_2$-saturated 0.1 M KHCO$_3$ without additives (FIG. 58B); with 10 mM of 1-Br$_2$ (FIG. 58C). FIG. 58D. EDX spectrum of the surface of FIG. 58C.

Figure 59A:
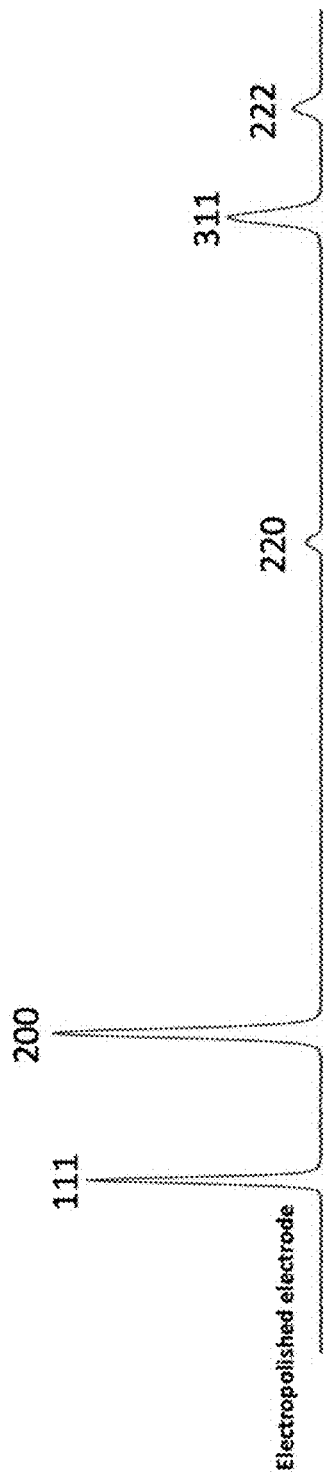
Figure 59B:
Figure 59C:
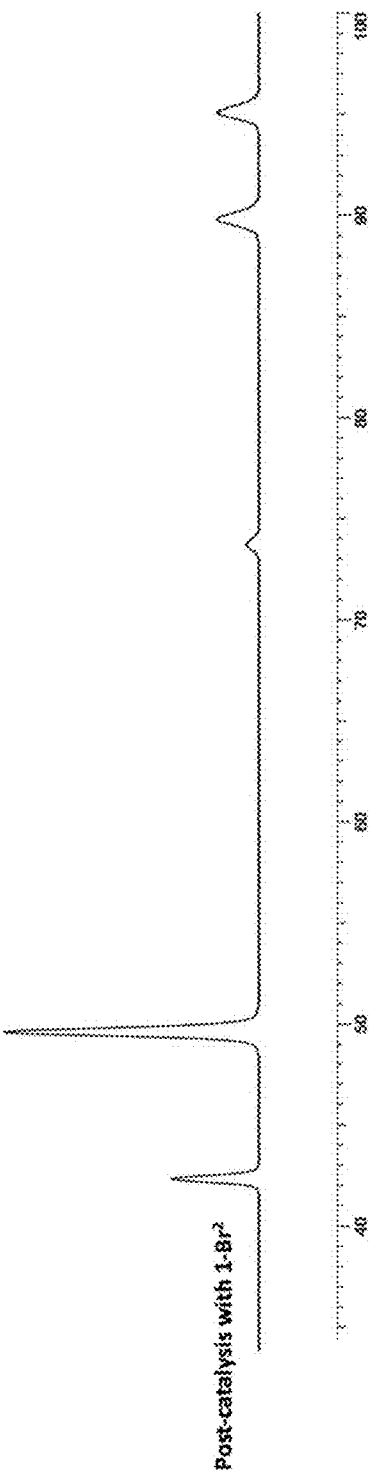

FIGS. 59A-59C. Typical normalized XRD pattern of (FIG. 59A) an electropolished Cu electrode; post catalysis Cu electrodes (FIG. 59B) without additive; (FIG. 59C) with 1-Br$_2$.

Figure 60A:
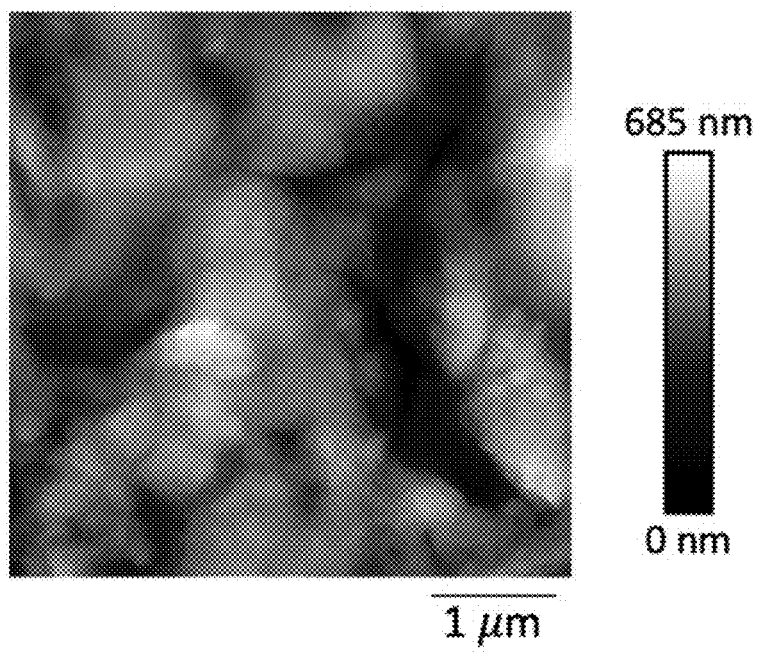
Figure 60B:
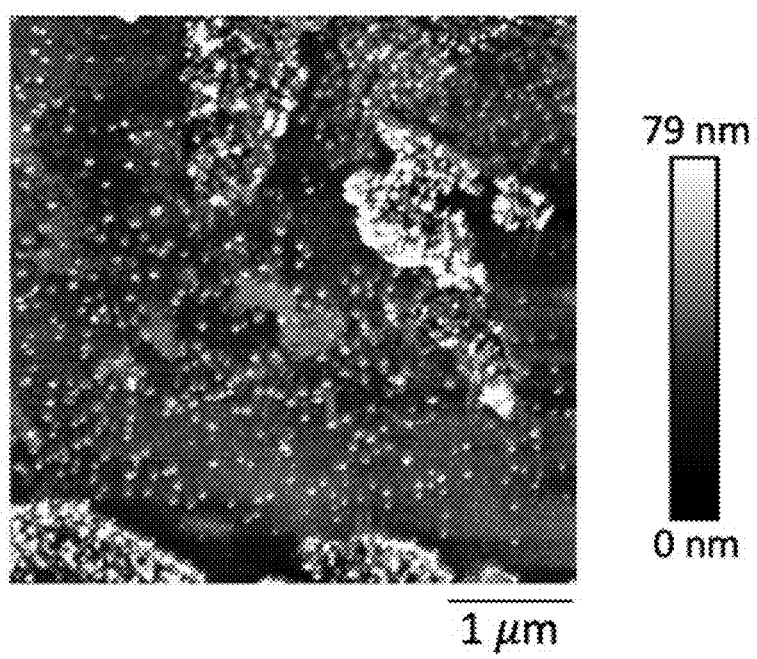

FIGS. 60A-60B. Ex-situ AFM images of the same post catalysis Cu electrode after 43 h of electroreduction at −1.07 V (FIG. 60A) before and (FIG. 60B) after the extraction of the organic film.

Figure 61A:
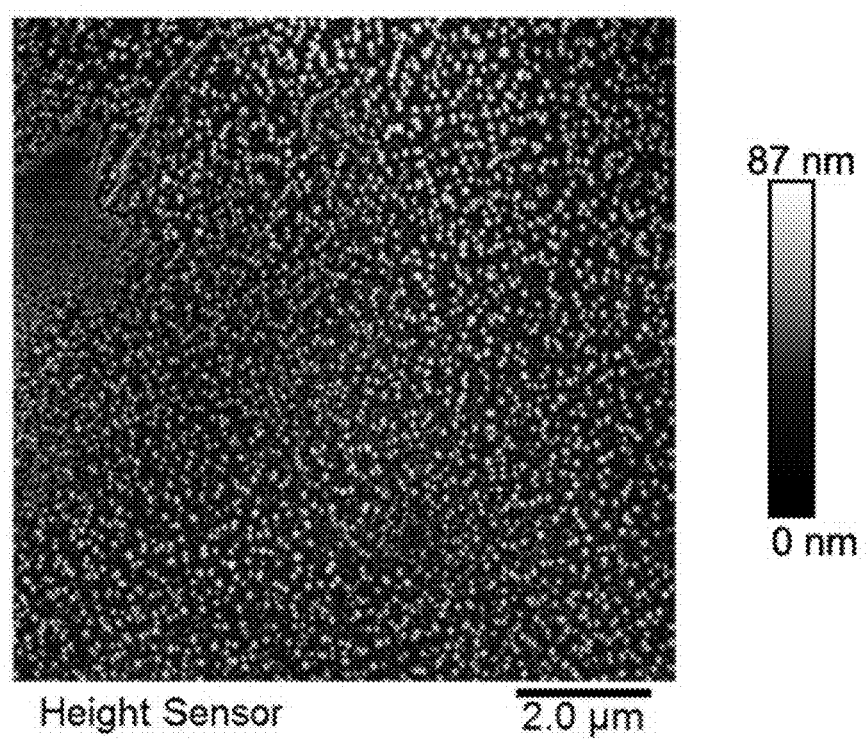
Figure 61B:
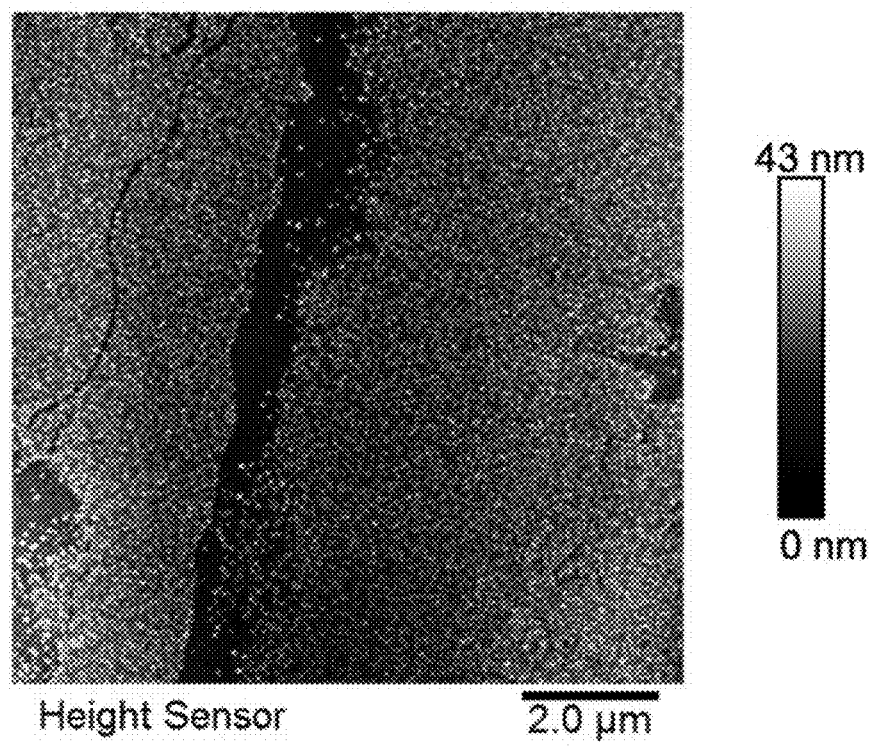

FIGS. 61A-61B. Ex-situ AFM images (FIG. 61A) after three cycles of PEIS; and (FIG. 61B) after 65 min of electrocatalysis at −1.07 V in presence of 20 mM of KBr.

FIGS. 62A-62D. Ex-situ AFM images of Cu electrodes after 65 min of electrocatalysis at −1.07 V in 0.1 M KHCO$_3$ with (FIG. 62A) 1-Cl$_2$; (FIG. 62B) 1-(OTf)$_2$; (FIG. 62C) 1-I$_2$; (FIG. 62D) 1-I$_2$ after extracting the organic film.

Figure 63:
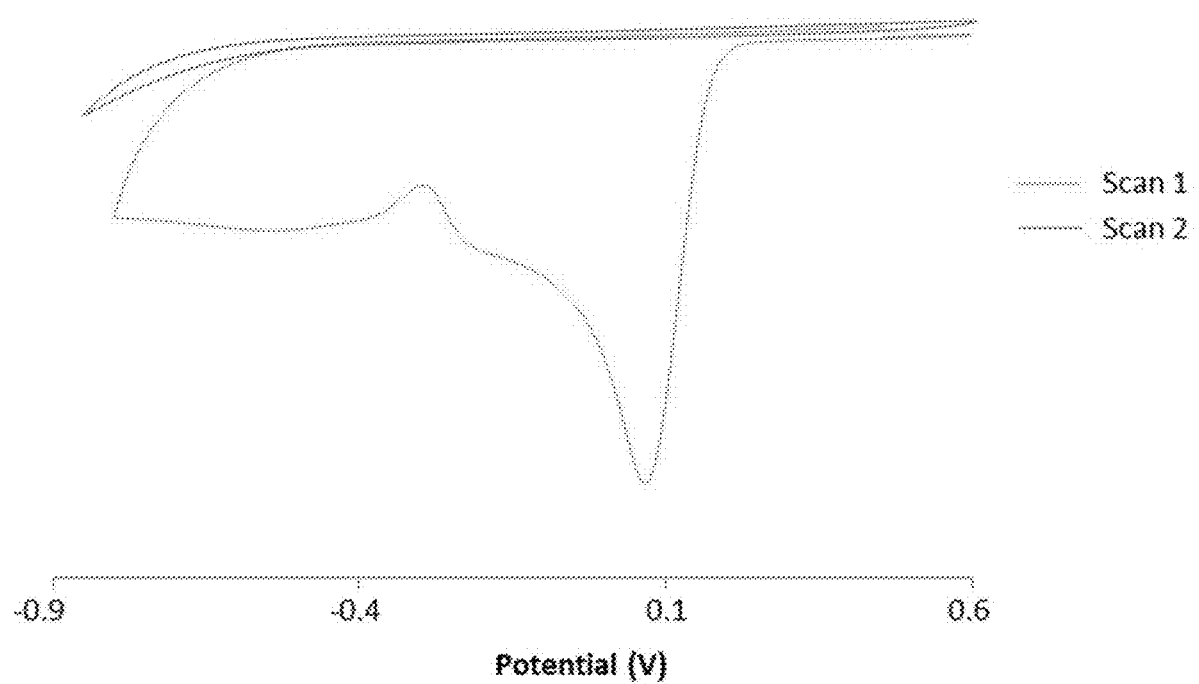

FIG. 63. First and second scan cyclic voltammogramms of 10 mM 1-Br$_2$ under CO$_2$ with a Cu disk electrode in 0.1 M KHCO$_3$ electrolyte at a scan rate of 50 mV/s. Similar results are obtained under N$_2$.

Figure 64:
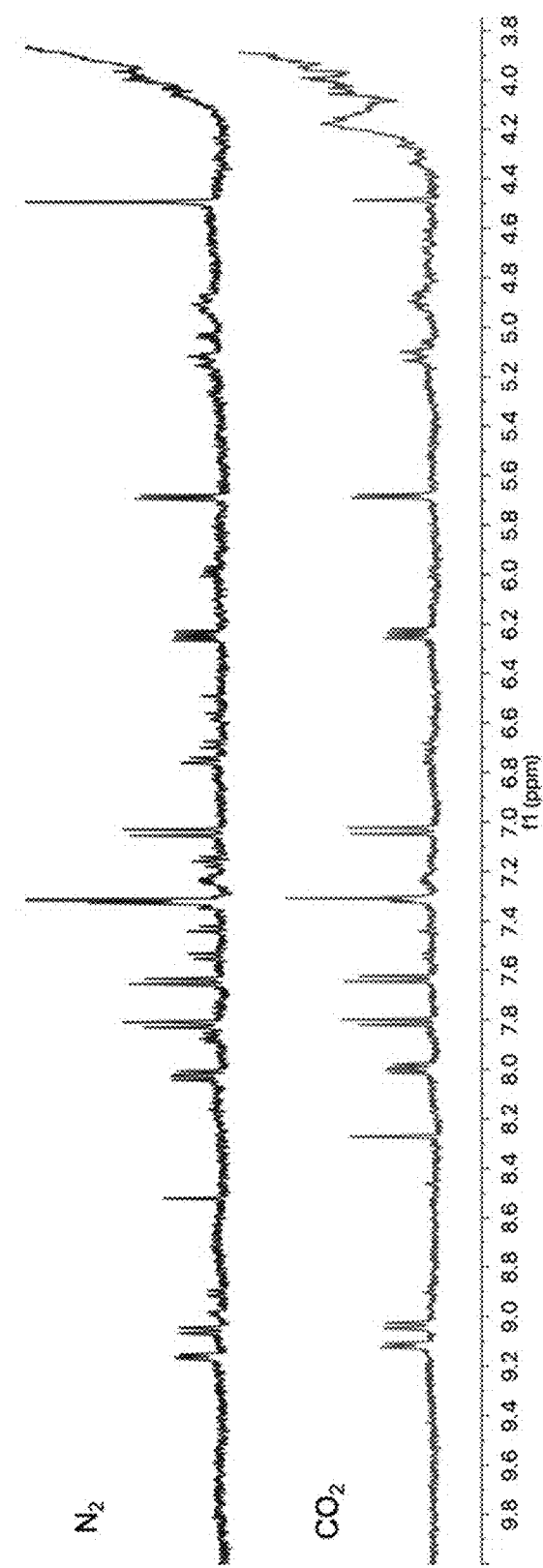

FIG. 64. $^1$H NMR (DMSO-d$_6$, 298 K) of the extracted films obtained after CV experiments under N$_2$ (top spectrum in blue) and CO$_2$ (bottom spectrum in red).

Figure 65B:
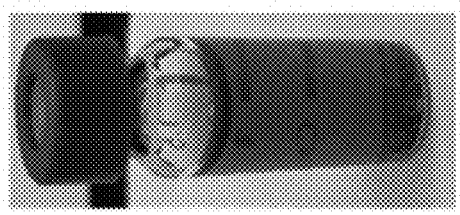
Figure 65A:
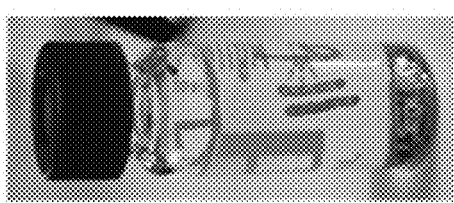

FIGS. 65A-65B. Photographs of the electrolyte containing 10 mM of 1-Br$_2$ in 0.1 M KHCO$_3$ (FIG. 65A) before catalysis and (FIG. 65B) just after catalysis.

Figure 66:
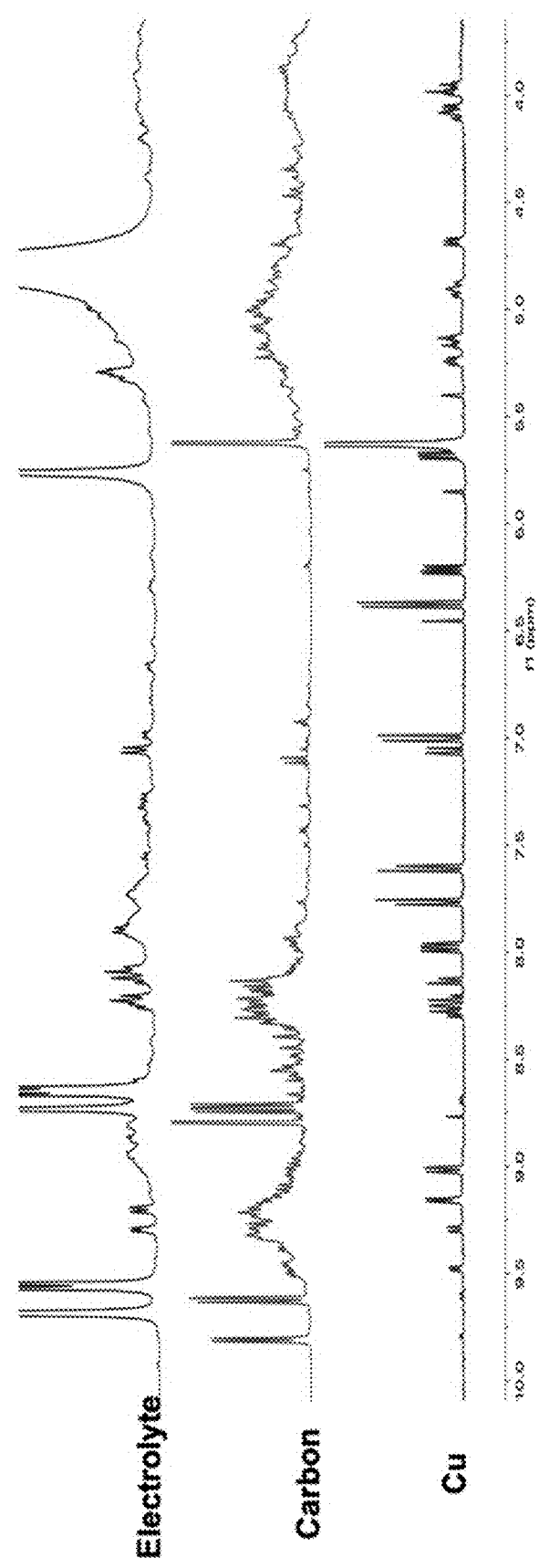

FIG. 66. Stack of $^1$H NMR spectra (298 K). The top trace corresponds to the electrolyte (D$_2$O), the middle trace to the organic precipitate extracted from the counter electrode (DMSO-d$_6$), and the bottom trace to the organic film extracted from the Cu electrode (DMSO-d$_6$).

Figure 67:
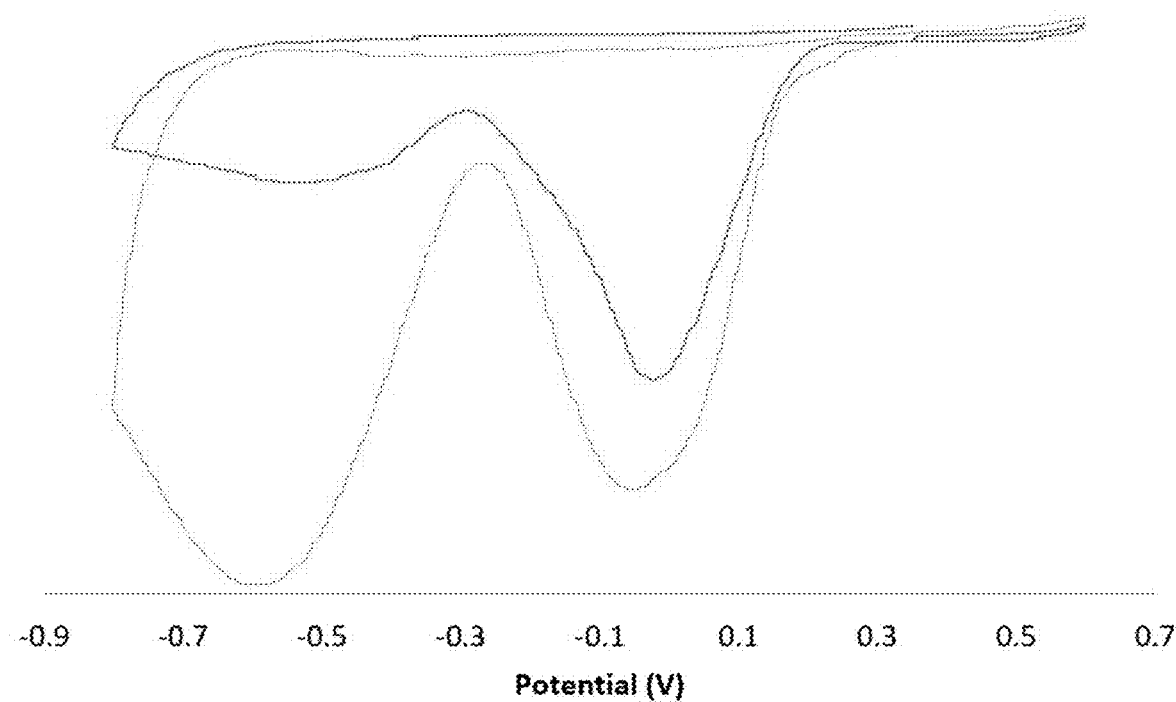

FIG. 67. Cyclic voltammogramms on a glassy carbon electrode of 10 mM 1-Br$_2$, in a CO$_2$-saturated 0.1 M KHCO$_3$ electrolyte at a scan rate of 50 mV/s between −0.9 V and 0.7 V of the first scan (blue curve) and the second scan (orange curve).

Figure 68:
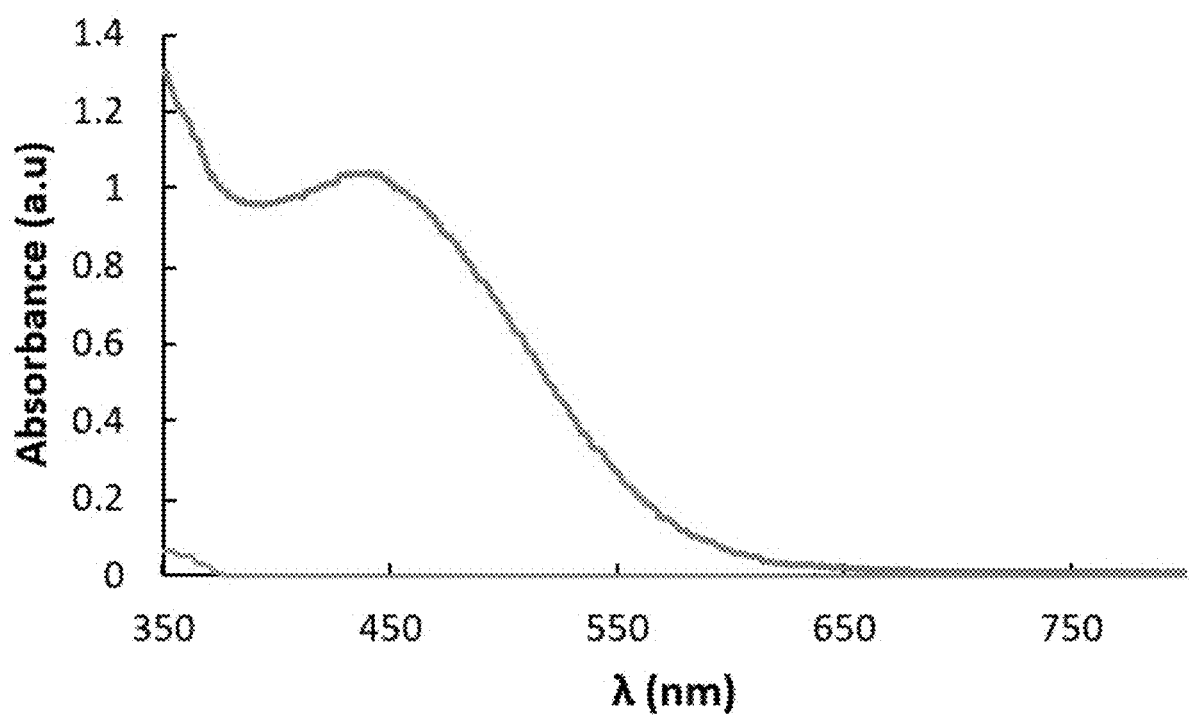

FIG. 68. Visible spectra of 1-Br$_2$ (orange) and 1'-Br (blue) in water.

Figure 69:
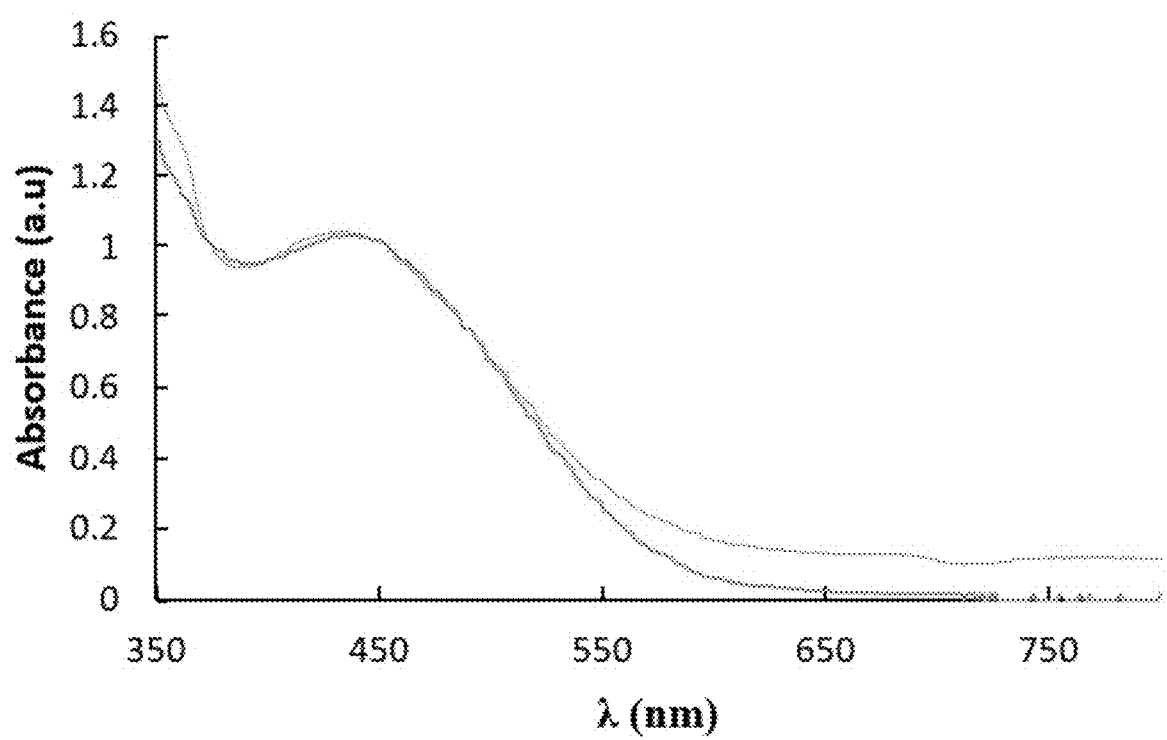

FIG. 69. Visible spectra of 1'-Br under N$_2$ (orange) and under CO$_2$ (orange) in 0.1 M KHCO$_3$.

Figure 70A:
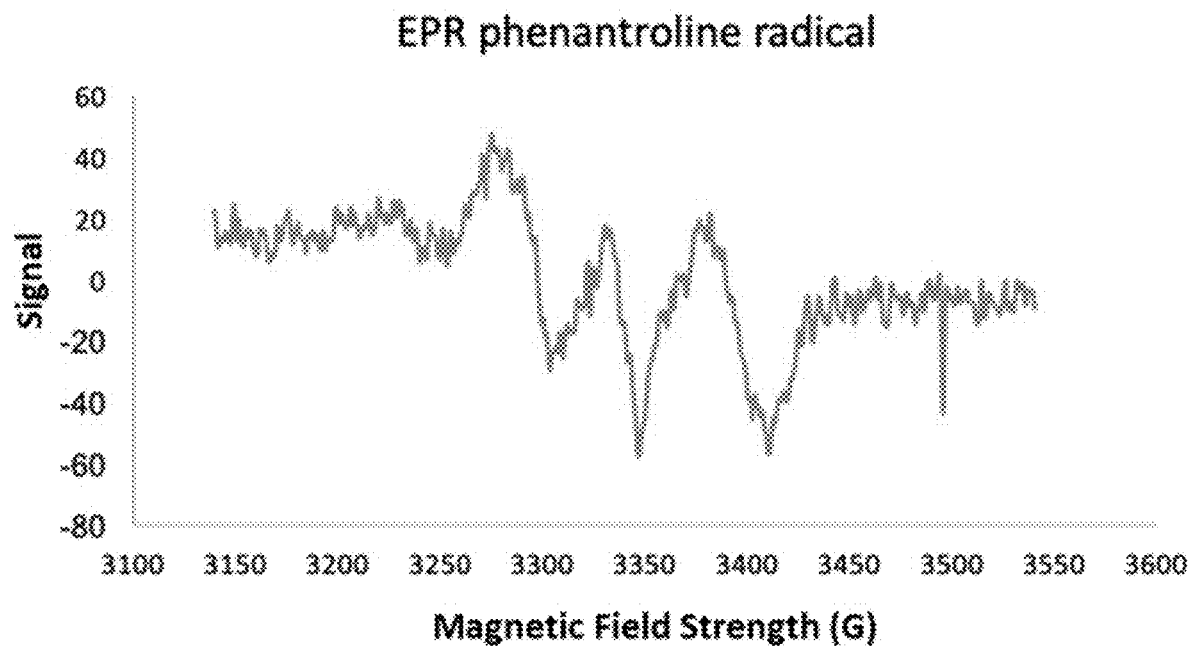
Figure 70B:
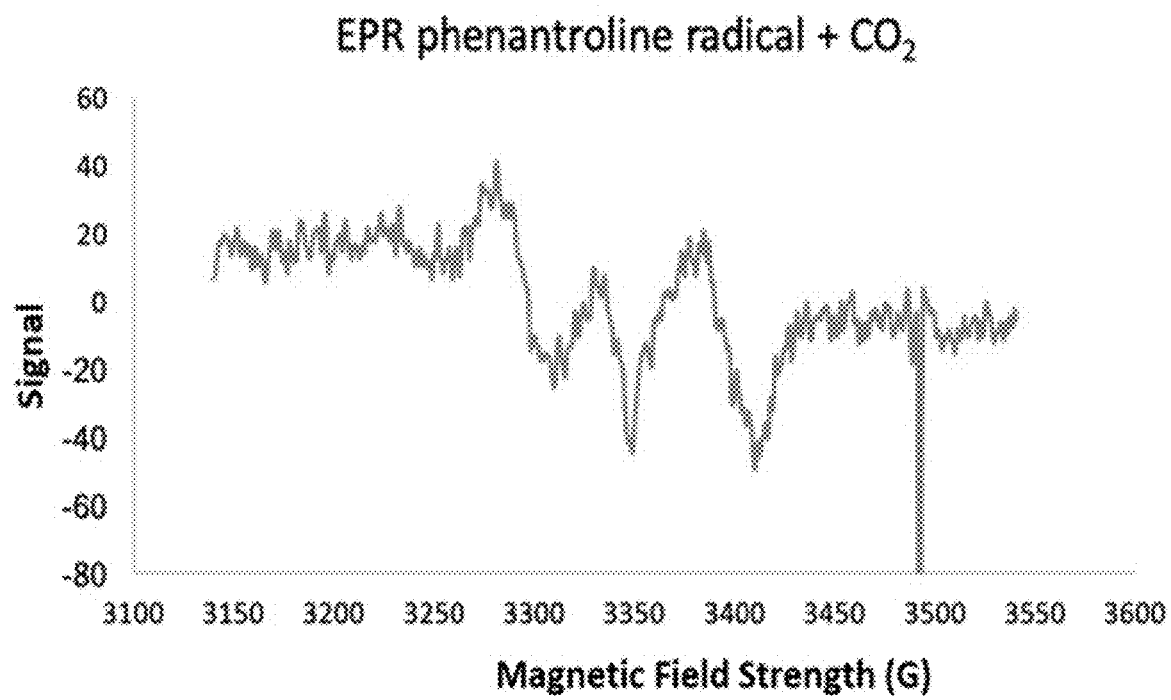

FIGS. 70A-70B. EPR spectra of 1'-Br, in a mixture of water/ethylene glycol (80/20), at 77 K, under N$_2$ (FIG. 70A) and under CO$_2$ (FIG. 70B).

Figure 71:
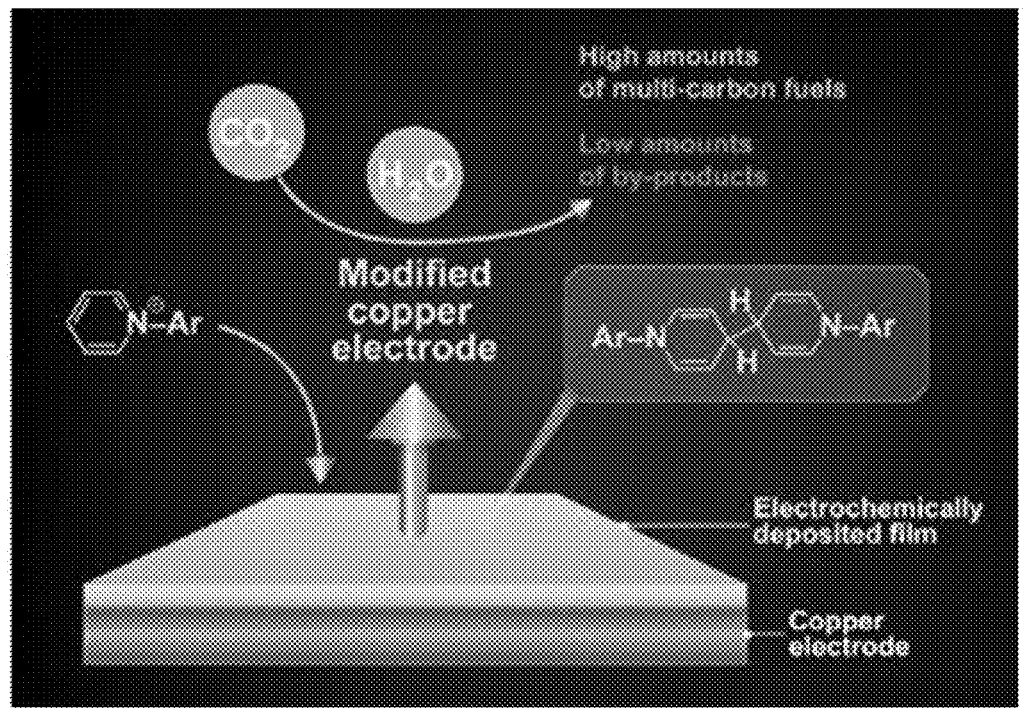

FIG. 71. A schematic illustrating certain embodiments of the inventions. The schematic illustrates electrodeposited N-substituted pyridinium additives enhance efficiency for C$_{2+}$ product via suppression of CH$_4$ and H$_2$.

Figure 72A:
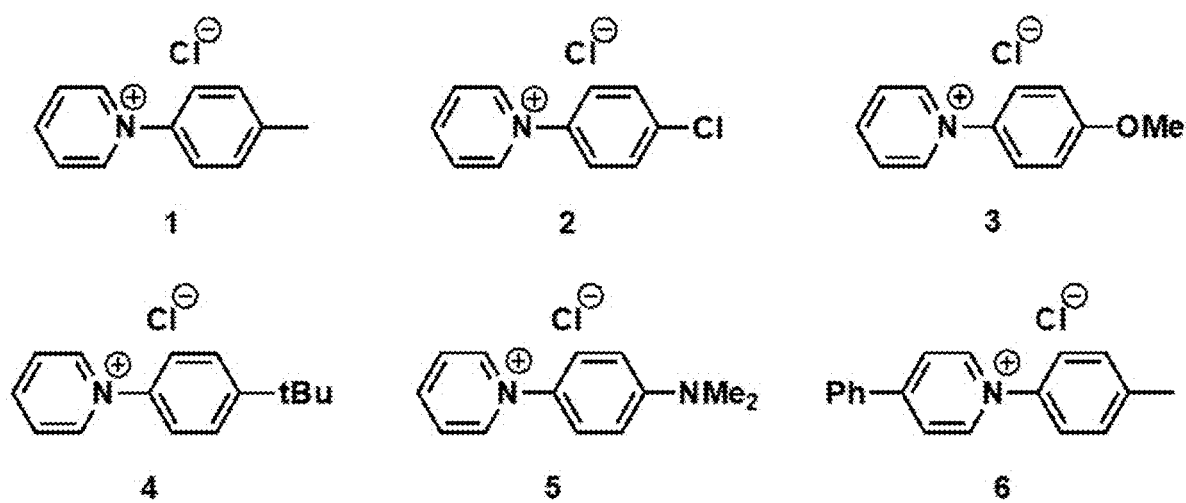

FIGS. 72A-72B. Effect of N-aryl pyridinium on Cu catalyzed CO$_2$ reduction.

FIG. 72A. Additives used to make electrodeposited selectivity-determining organic materials used in the electrochemical systems characterized and summarized in FIG. 72B. FIG. 72B. Table of Faradaic efficiencies and other CO$_2$ reduction parameters obtained using the various additives, after electrodeposition on Cu, shown in FIG. 7A. C$_{\geq 2}$ product selectivity increases from ~20% to >60% with several N-tolyl pyridinium additives; less current is passed in the presence of additives. The electrochemical system used for these measurements comprises: Working electrode: Copper foil; Counter electrode: Platinum foil; Applied potential: −1.1V vs. RHE; Membrane used to separate two compartments: Selemion; Reference electrode: Ag/AgCl; CO$_2$ flow rate: 5 sccm; Electrolyte: 0.1 M KHCO$_{3(aq)}$; Additive=10 mM.

Figure 73A:
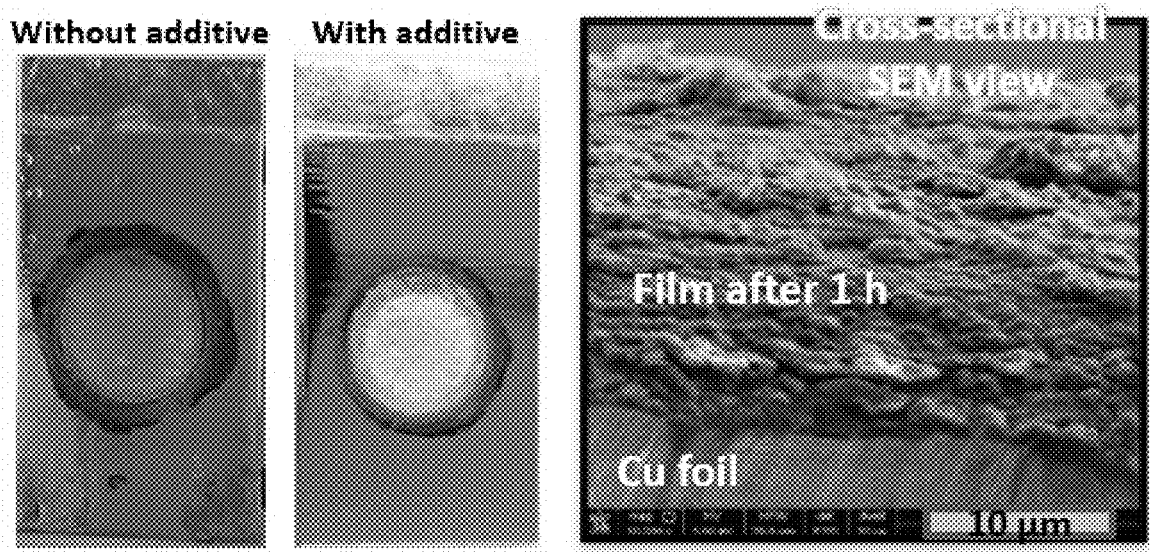
Figure 73B:
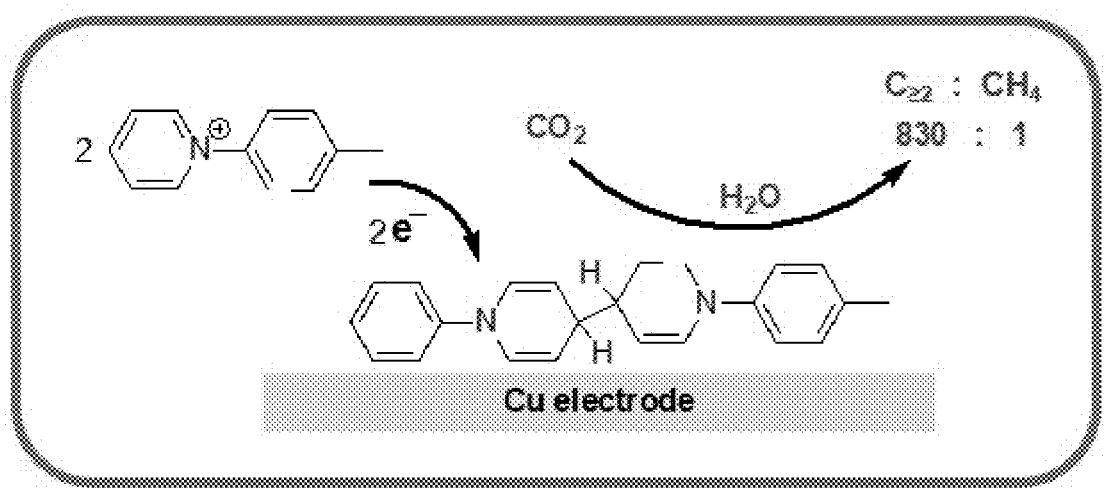
Figure 73B:
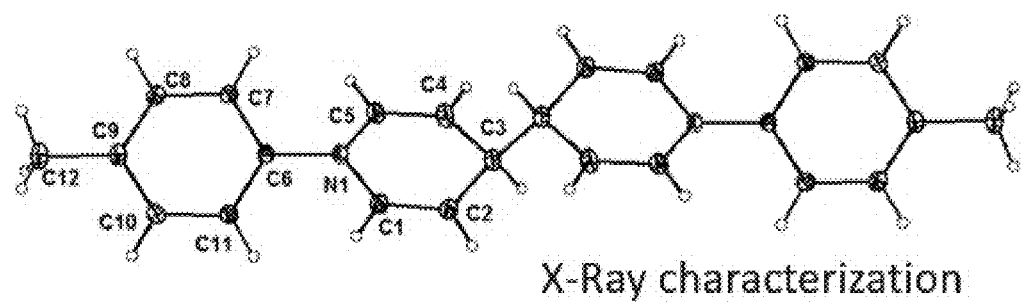
Figure 73C:
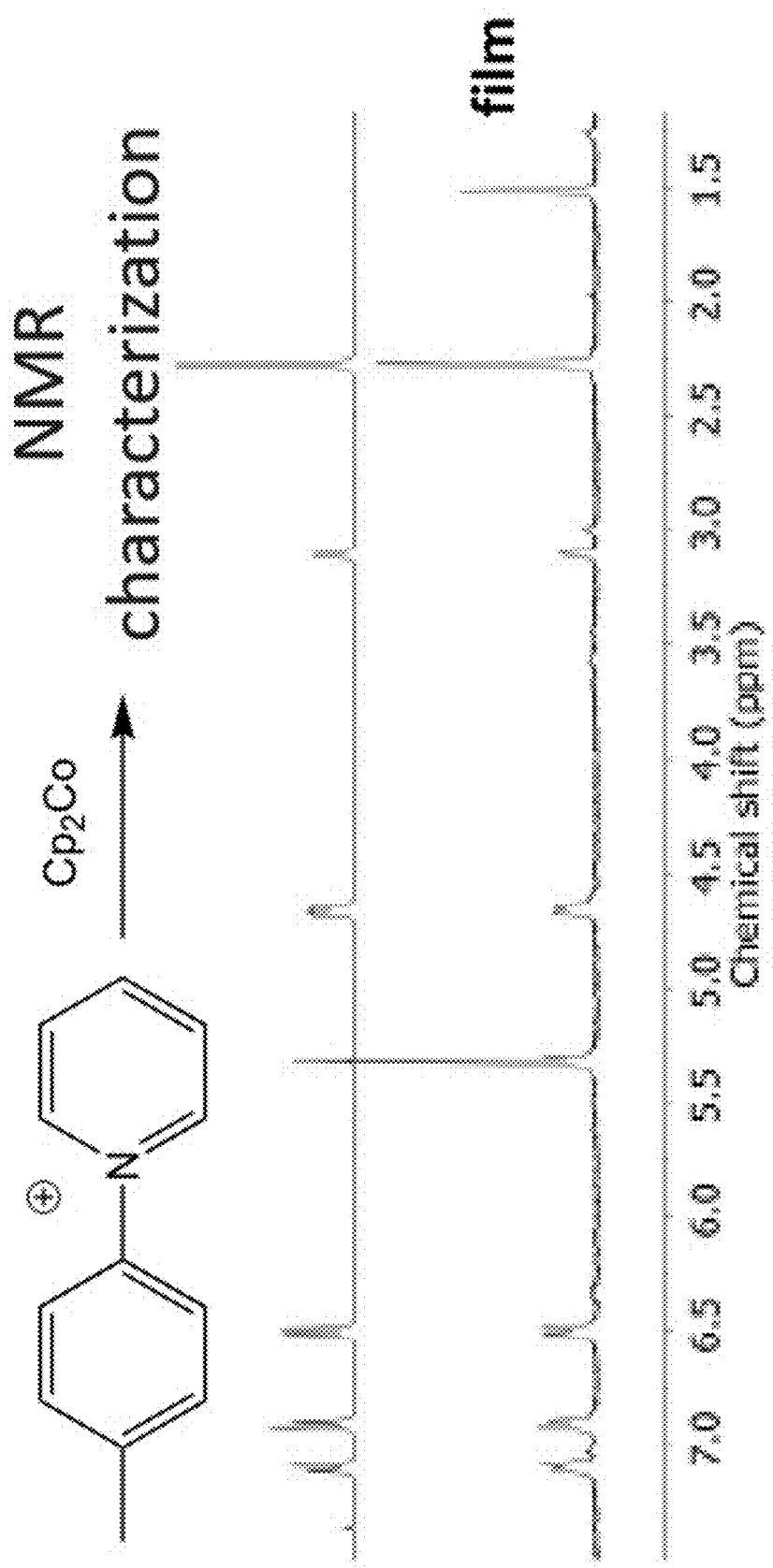
Figure 73D:
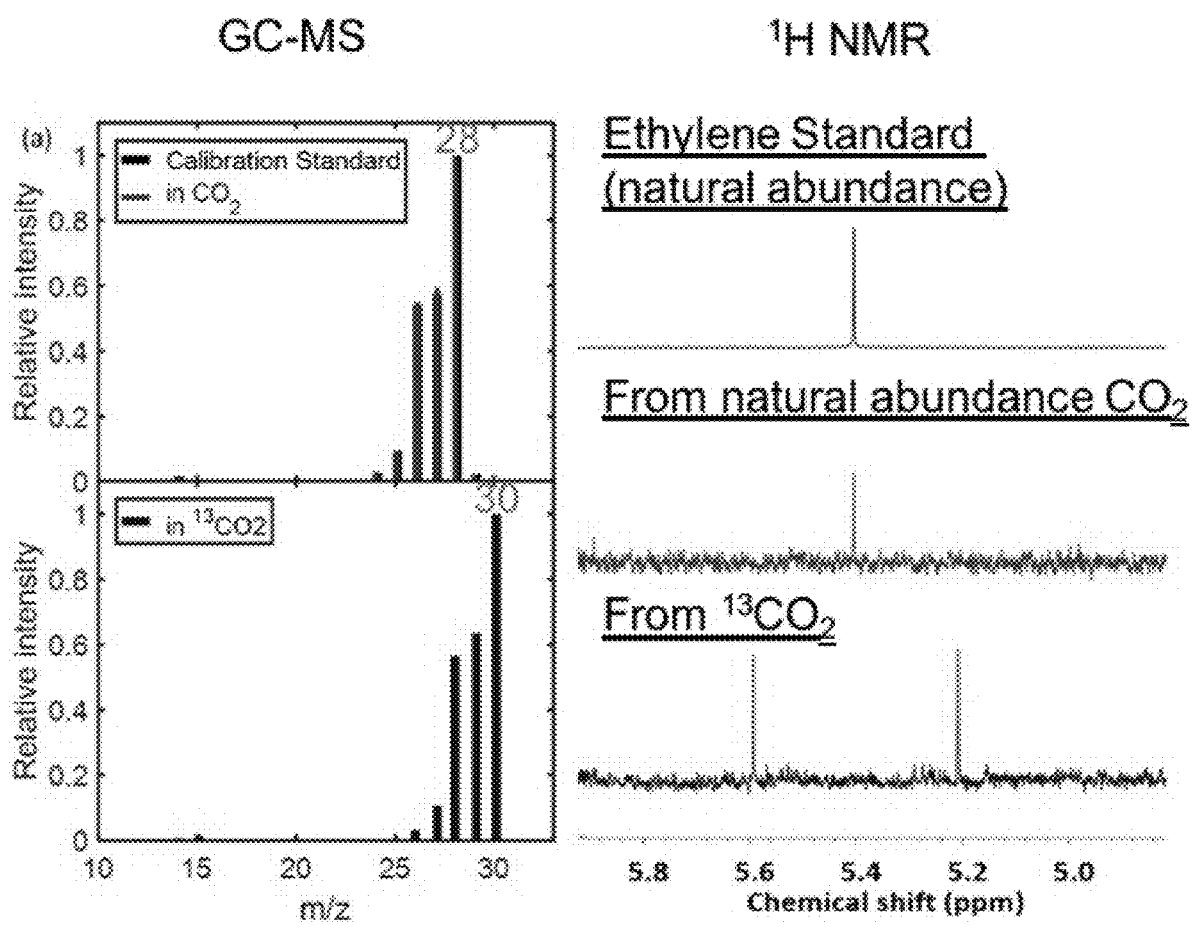

FIGS. 73A-73D. Effect of N-aryl pyridinium on Cu catalyzed CO$_2$ reduction. FIG. 73A. Cu substrate without additive (left panel), with electrodeposited additive (center panel), and cross-sectional SEM view (right panel). FIG. 73B. Schematic of selectivity-determining organic material deposition onto Cu electrode, and X-ray characterization. FIG. 73C. NMR characterization. FIG. 73D. $^{13}$CO$_2$ labeling experiment.

Figure 74:
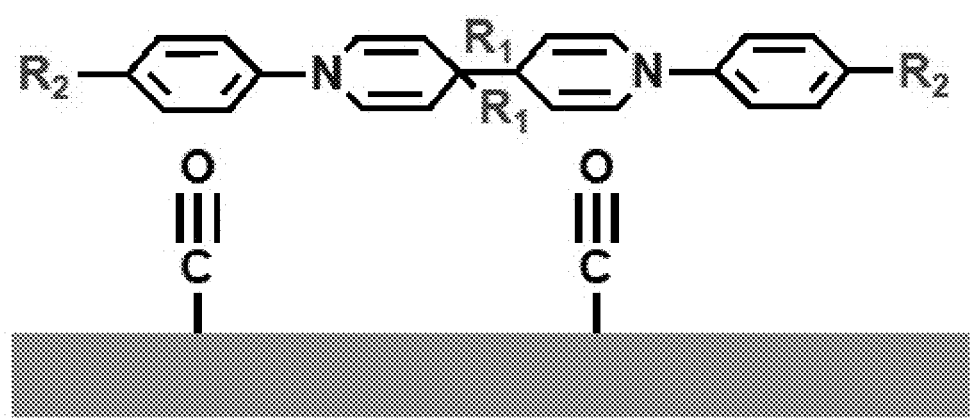

FIG. 74. Illustration of an exemplary coordination between a selectivity-determining organic material and a surface of an electrically conductive catalyst, such as Cu.

Figure 75A:
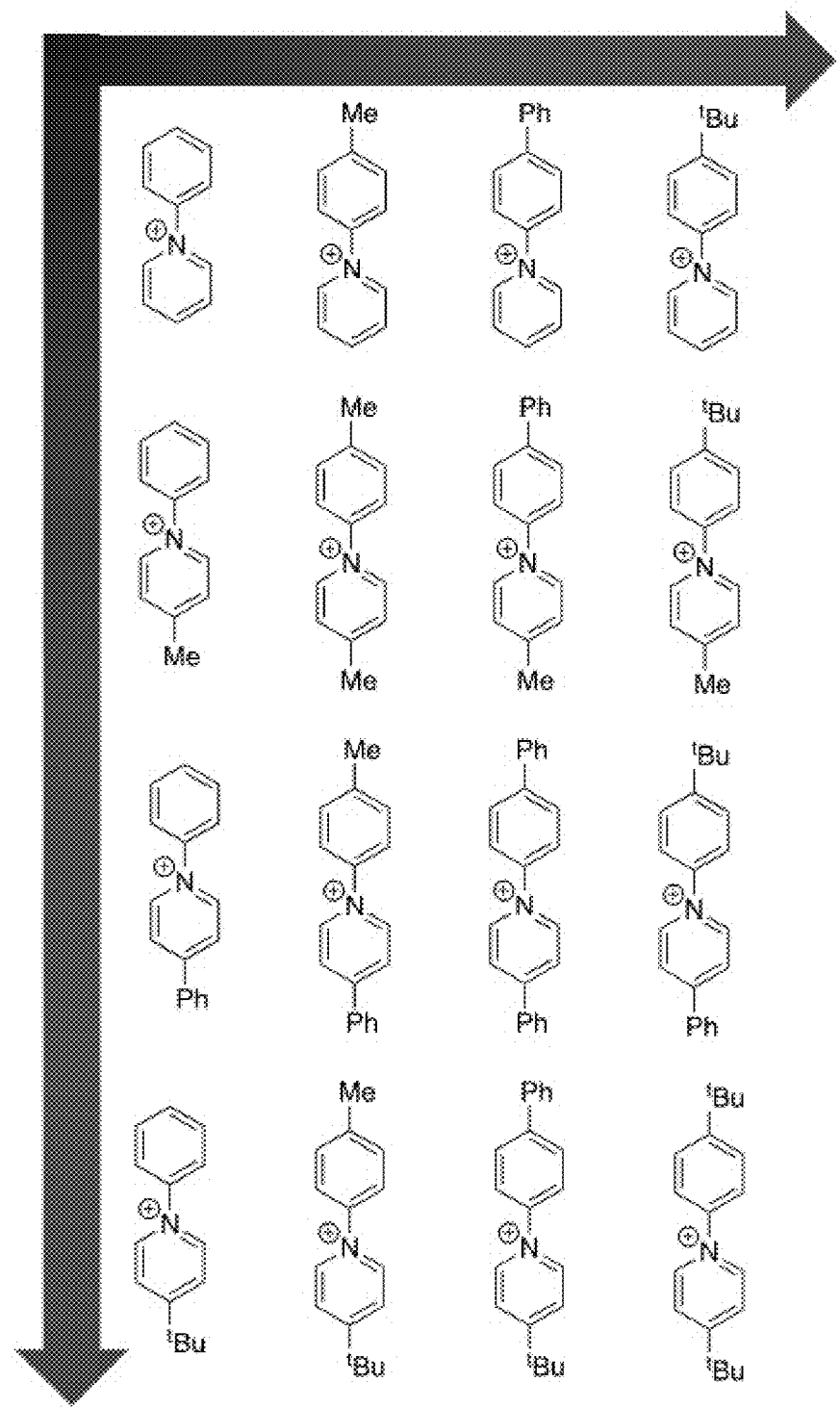
Figure 75B:
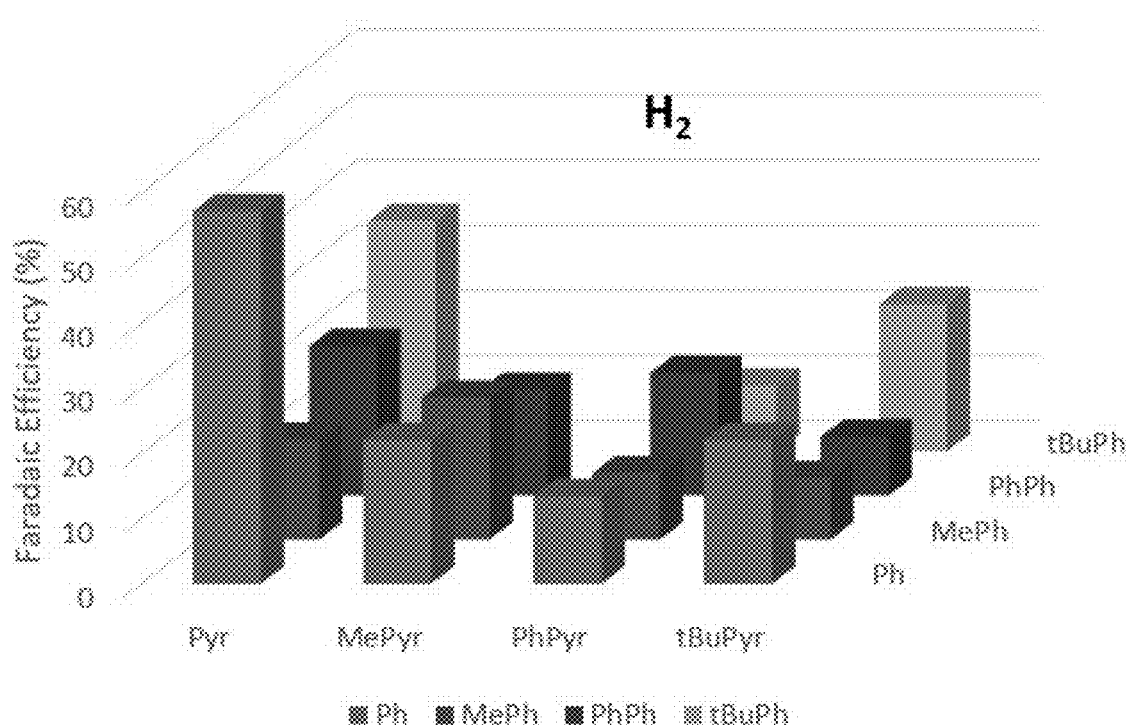
Figure 75C:
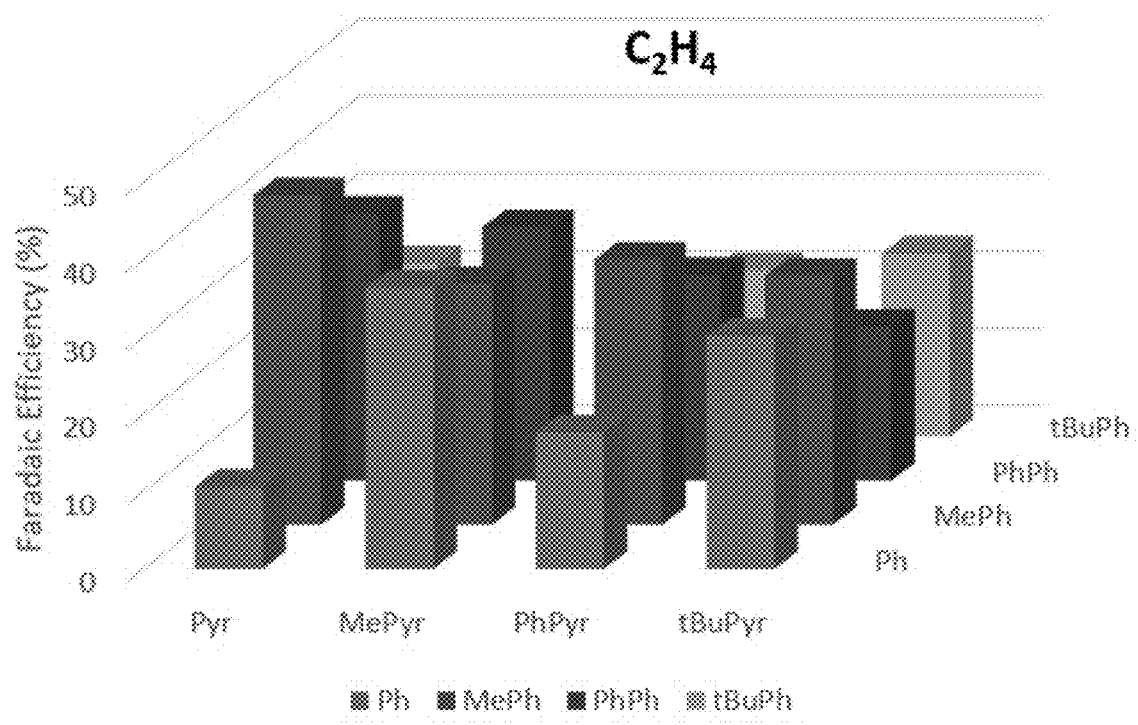

FIGS. 75A-75C. Library of additives with arrows corresponding to relatively increased degree of steric effects. FIG. 75A. FIG. 75B. Chart showing Faradaic efficiency for H$_2$ using a variety of deposited additives (to form selectivity-determining organic material on the catalyst.) FIG. 75C. Chart showing Faradaic efficiency for C$_2$H$_4$ using a variety of deposited additives (to form selectivity-determining organic material on the catalyst.)

Figure 76A:
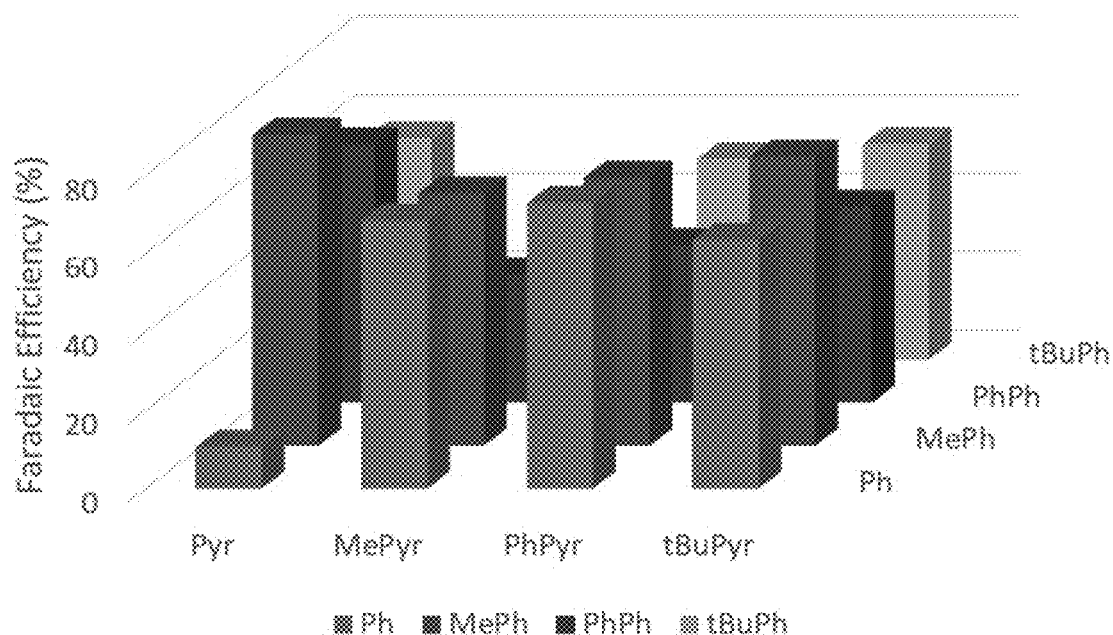
Figure 76B:
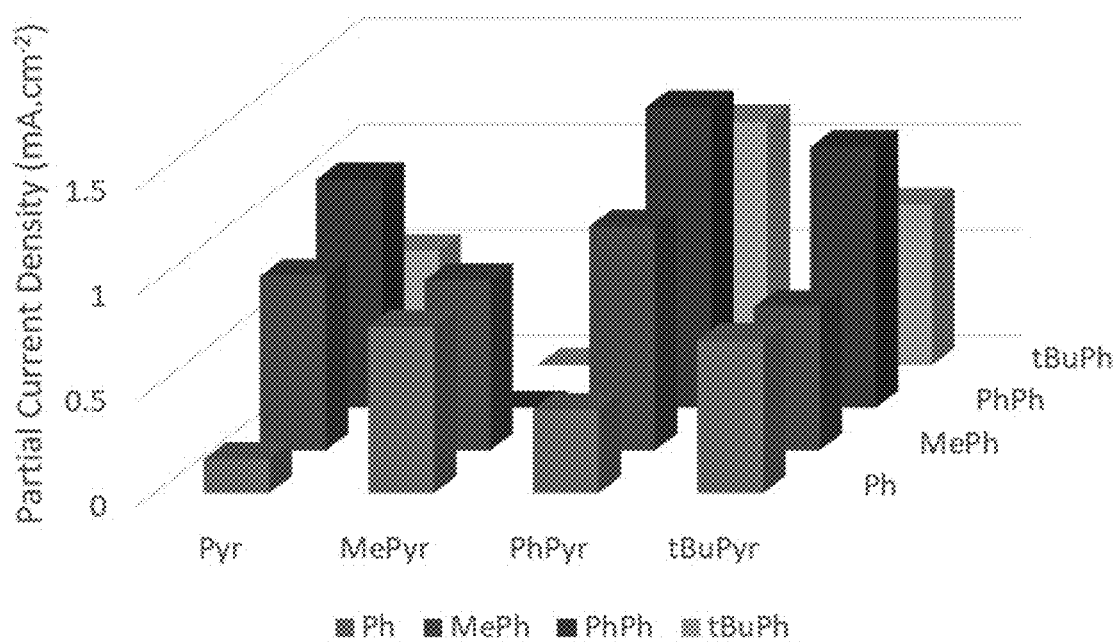

FIGS. 76A-76B. FIG. 76A. Chart showing Faradaic efficiency for C$_{\geq 2}$ products using a variety of deposited additives (to form selectivity-determining organic material on the catalyst.). FIG. 76B. Chart showing partial current density of C$_{\geq 2}$ products using a variety of deposited additives (to form selectivity-determining organic material on the catalyst.).

Figure 77:
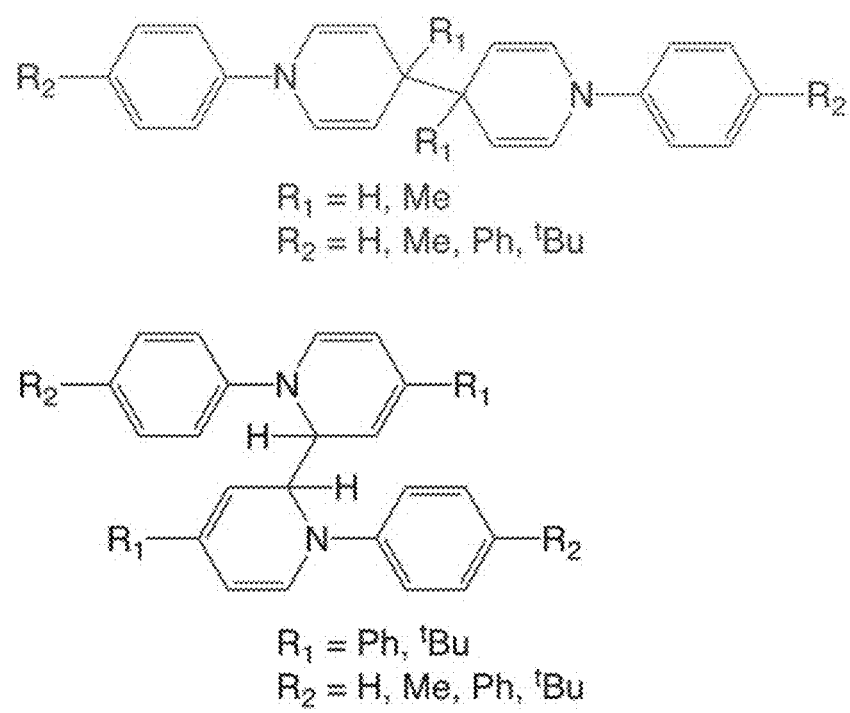

FIG. 77. Chemical formulas corresponding to exemplary compositions of selectivity-determining organic materials, according to certain embodiments here.

Figure 78:
Figure 78:
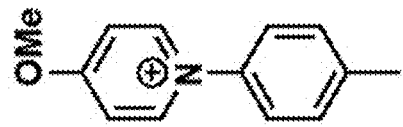
Figure 78:
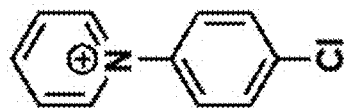
Figure 78:
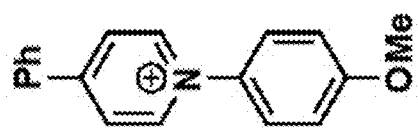
Figure 78:
Figure 78:
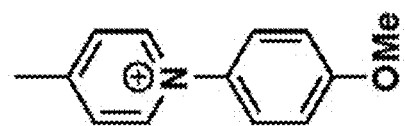
Figure 78:
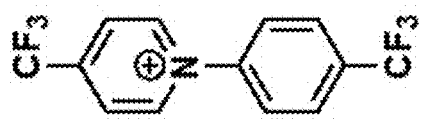
Figure 78:
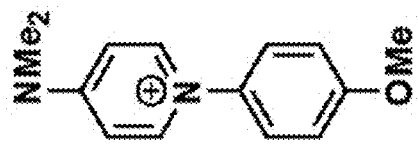
Figure 78:
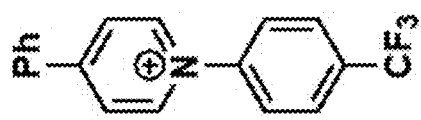
Figure 78:
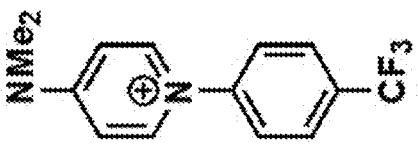
Figure 78:
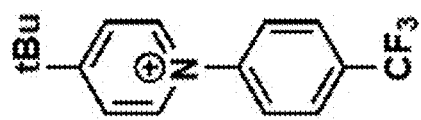
Figure 78:
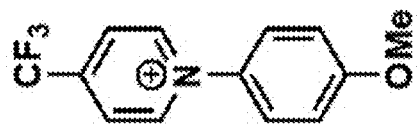
Figure 78:
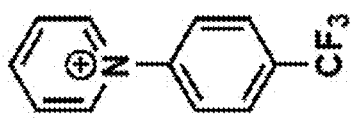
Figure 78:
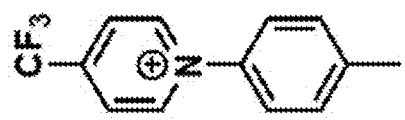

FIG. 78. A library of formulas of exemplary additives useful for forming selectivity-determining organic materials therefrom.

FIGS. 79A-79E. Electronic effects of additives on the CO$_2$ reduction selectivity profile of Cu at −1.1 V vs. RHE in 0.1 M KHCO$_3$. The selectivity of the CO$_2$ reduction towards different products (e.g. C$_1$, C$_{\geq 2}$, ethylene, alcohols) can be tuned by tailoring the electronic properties of the pyridinium and the phenyl moieties of the additives.

Figure 79A:
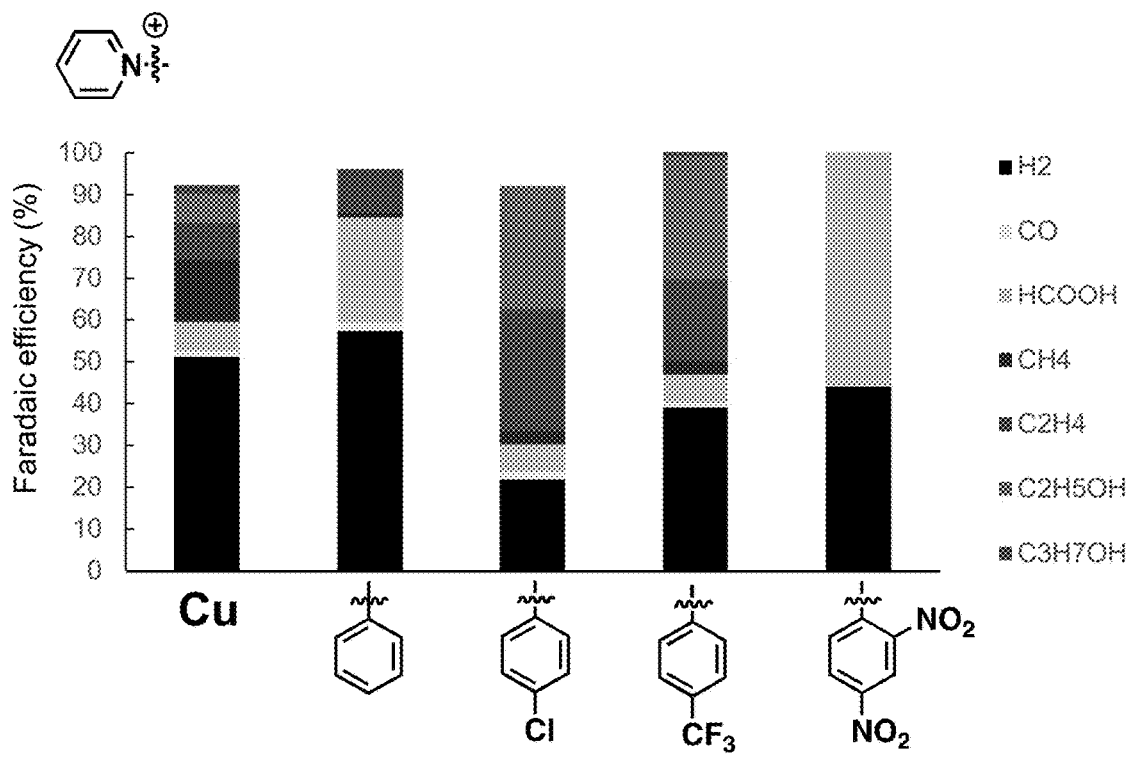
Figure 79B:
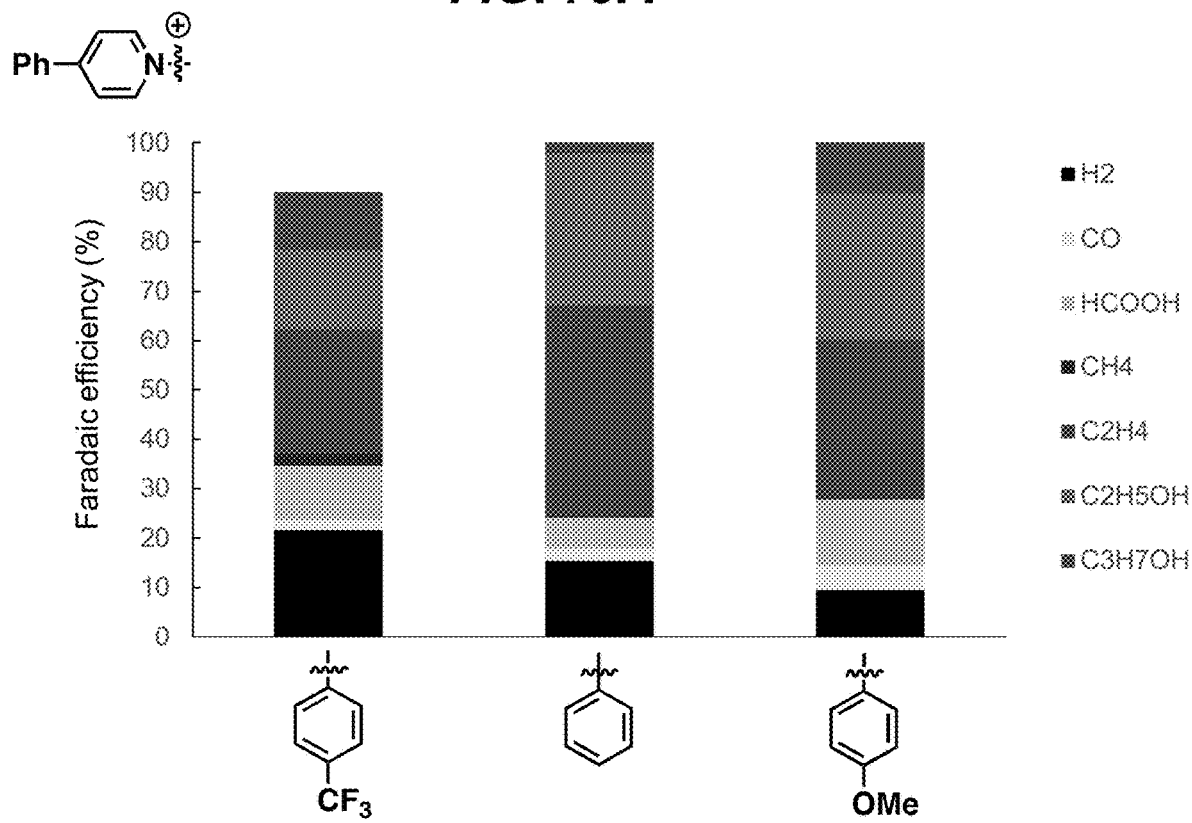
Figure 79C:
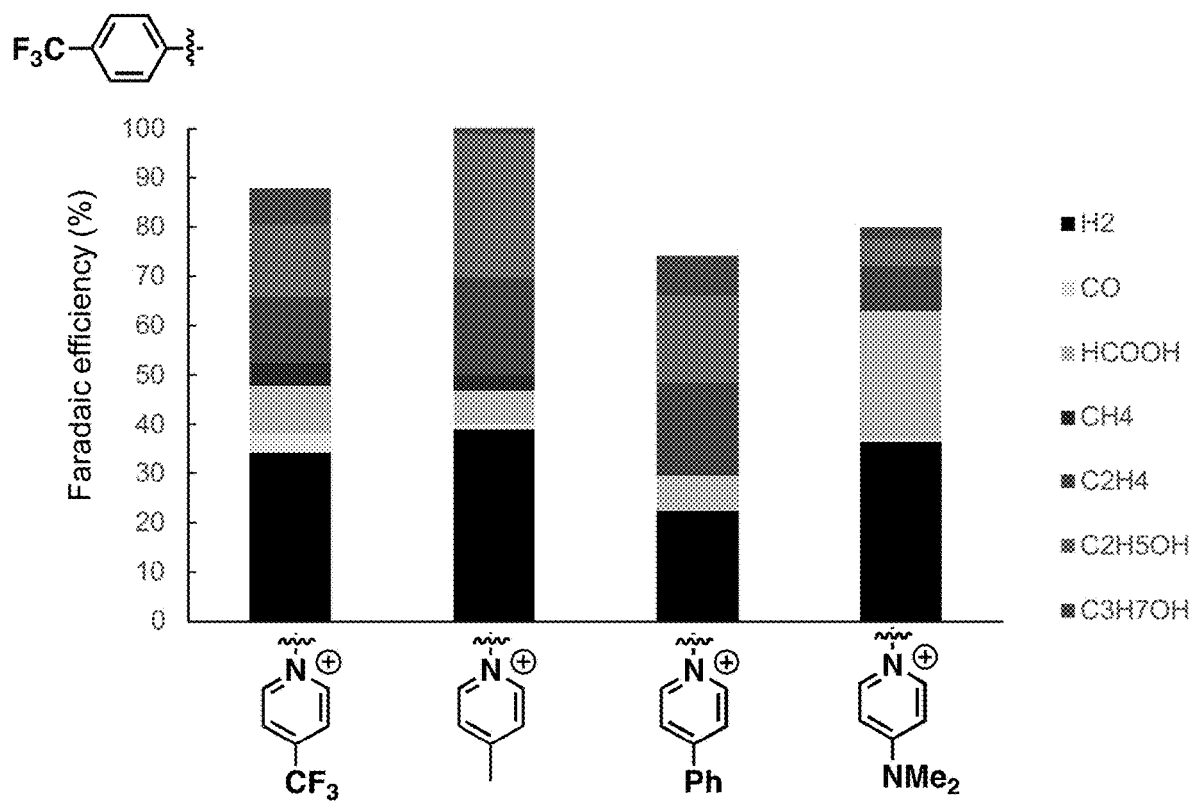
Figure 79D:
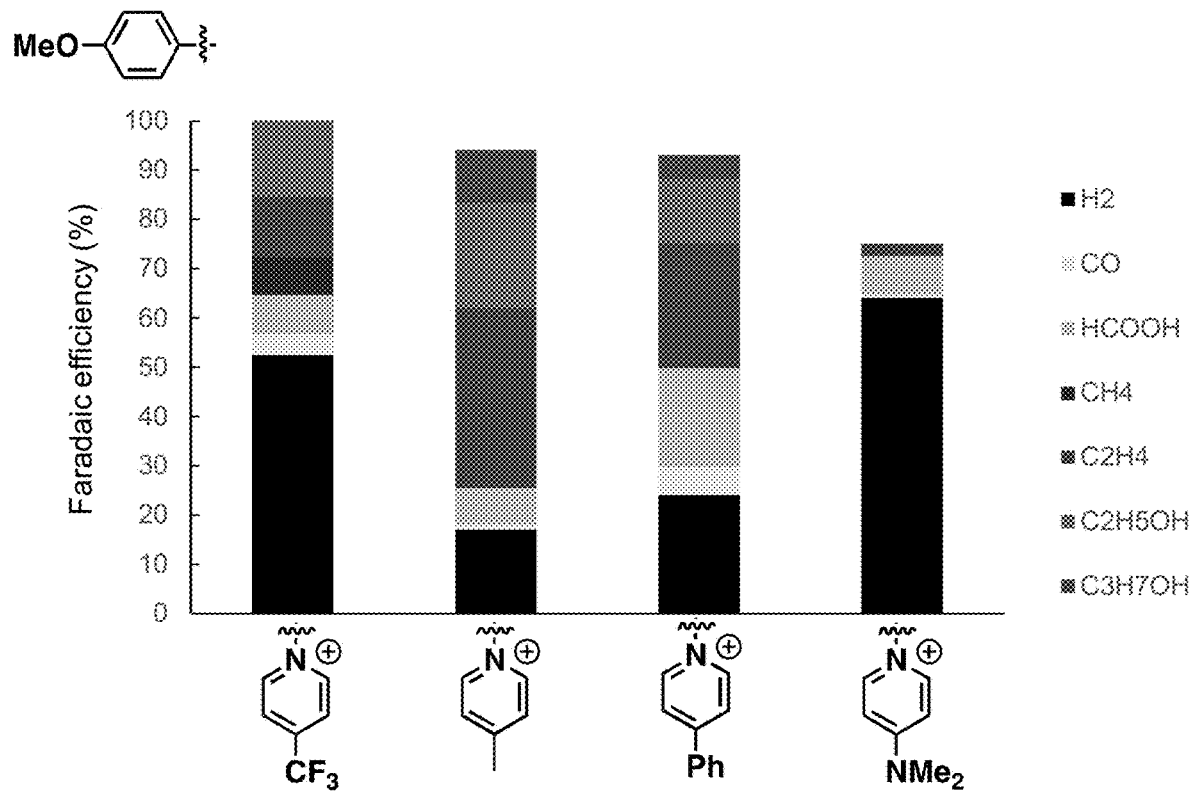
Figure 79E:
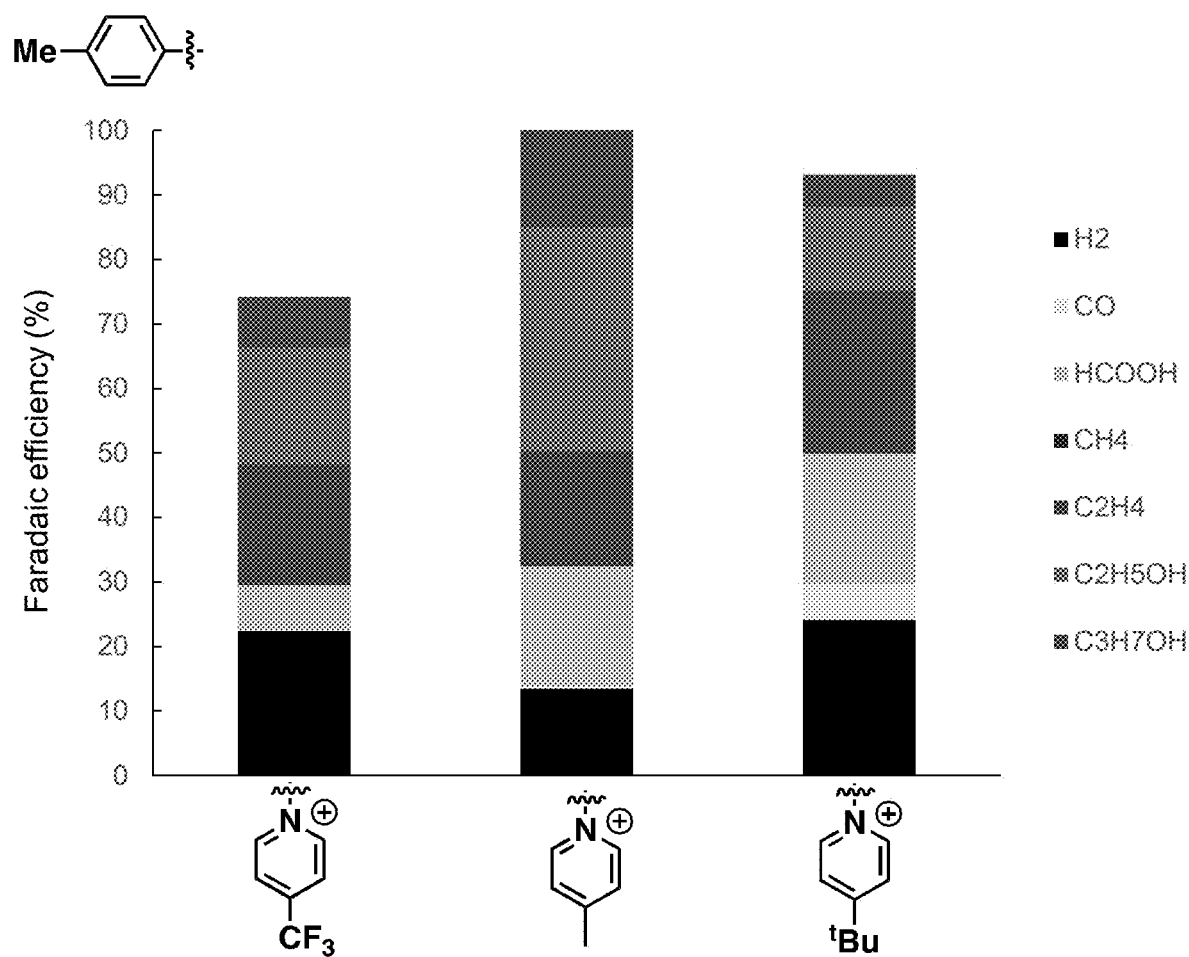

FIG. 79A. Chart comparing Faradaic efficiencies of the PyrPh, PyrClPh, PyrCF$_3$Ph and PyrNO$_2$NO$_2$Ph additives with Cu. FIG. 79B. Chart comparing Faradaic efficiencies of CF$_3$Ph, Ph and OMePh with PhPyr. FIG. 79C. Chart comparing Faradaic efficiencies of CF$_3$PyrCF$_3$Ph, MePyrCF$_3$Ph, PhPyrCF$_3$Ph and NMe$_2$PyrCF$_3$Ph. FIG. 79D. Chart comparing Faradaic efficiencies of CF$_3$PyrOMePh, MePyrOMePh, PhPyrOMePh and NMe$_2$PyrOMePh. FIG. 79E. Chart comparing Faradaic efficiencies of CF$_3$PyrMePh, MePyrMePh and tBuPyrMePh.

Figure 80A:
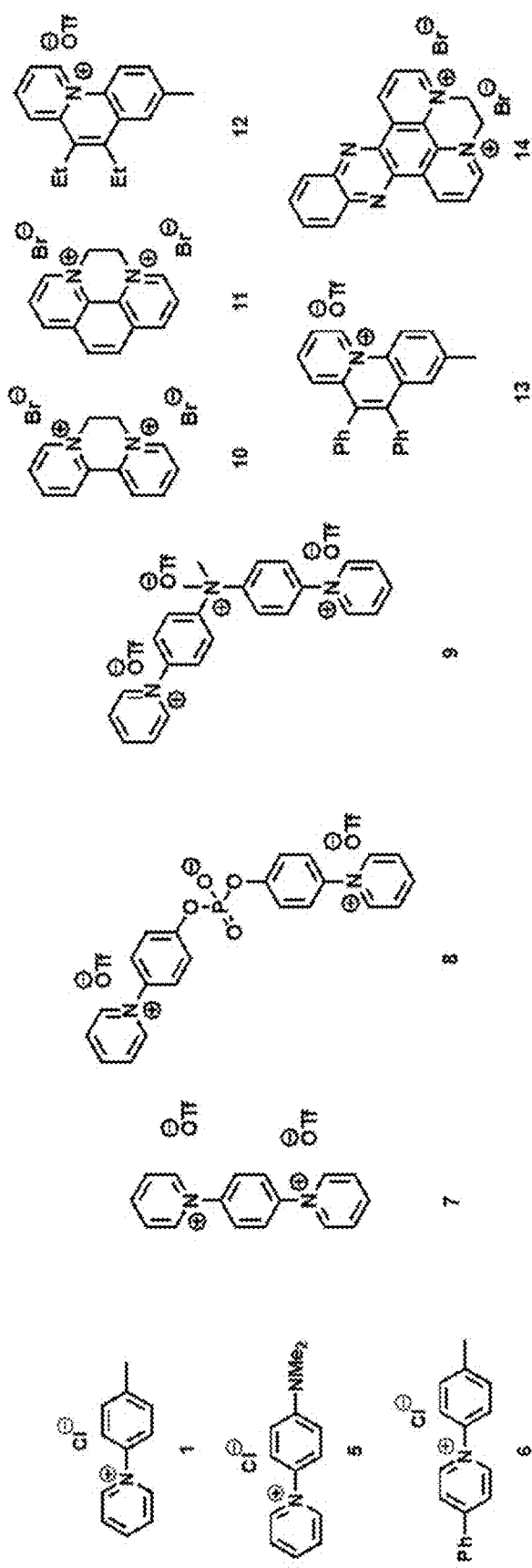
Figure 80B:

FIGS. 80A-80B. FIG. 80A. N-substituted pyridinium and bispyridinium additives useful according to some embodiments for forming selectivity-determining organic materials. FIG. 80B. Partial current density of products produced during $CO_2$ reduction at −1.1 V vs. RHE (* at −1.15 V vs. RHE). Some additives promote reaction rates for the formation of $C_{\geq 2}$ products which lead to the increasing of partial current densities for $C_{2+}$ products compared to unmodified Cu electrode. For all additives, $CH_4$ formation is inhibited or totally suppressed, leading to $C_{\geq 2}$ products/$CH_4$ ratios higher than 600. Hydrogen evolution reaction can either be inhibited (e.g. tertiary amines, ether moieties) or promoted (e.g. primary/secondary amine, alcohols) by changing functional groups on the additives.

Figure 81A:
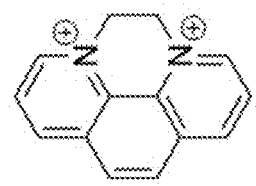
Figure 81A:
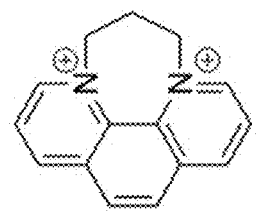
Figure 81A:
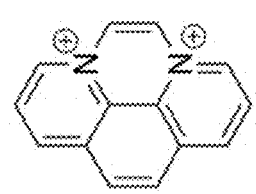
Figure 81A:
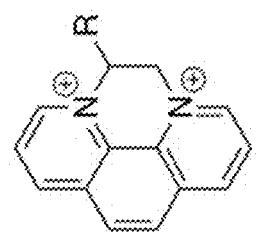
Figure 81A:
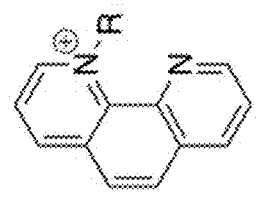
Figure 81B:
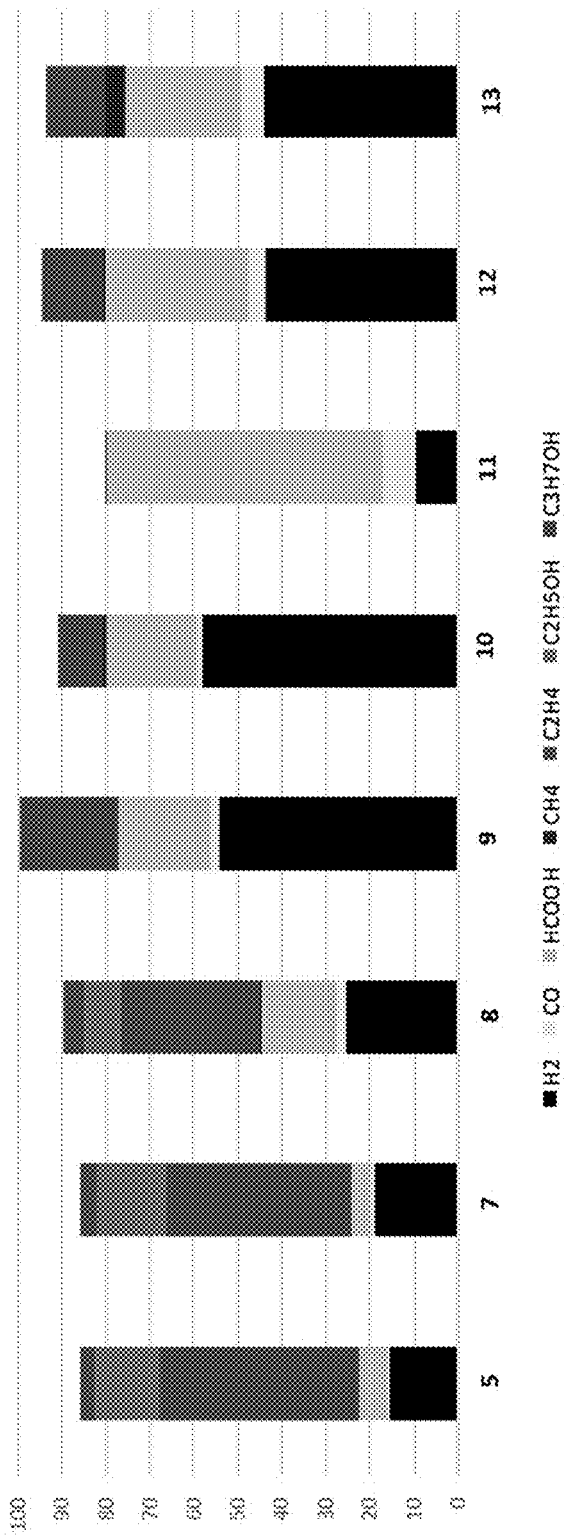

FIGS. 81A-81B. FIG. 81A. Various phenanthrolinium-based additives useful according to some embodiments for forming selectivity-determining organic materials.

Figure 82:
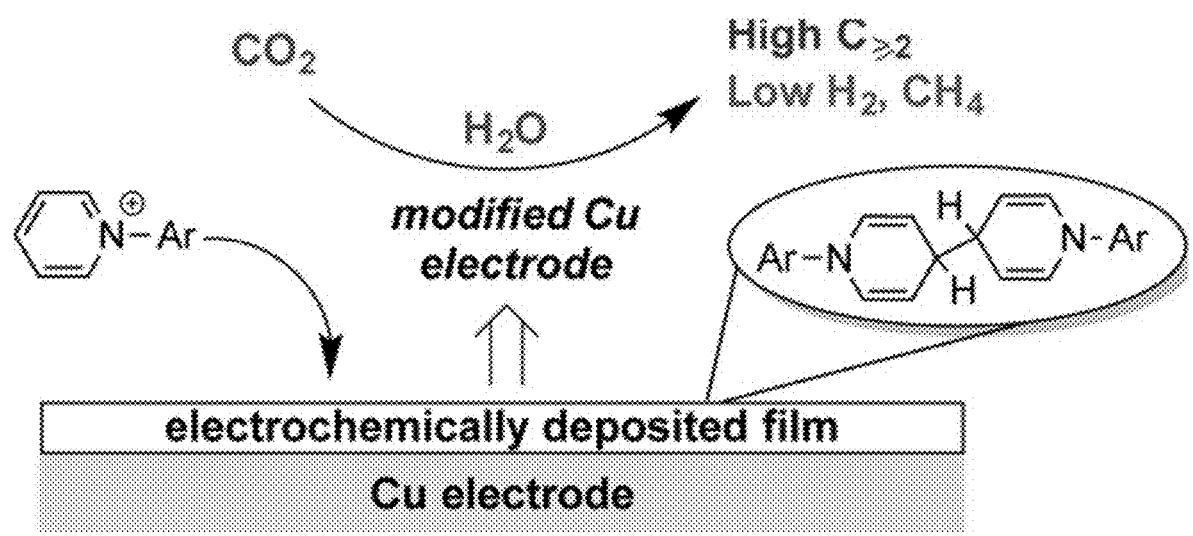

FIG. 81B. Chart shows the Faradaic efficiencies of Cu in presence of various phenanthrolinium-based additives at −1.1 V vs. RHE in 0.1 M $KHCO_3$. The selectivity of the $CO_2$ reduction towards different products (e.g. $C_1$, $C_{\geq 2}$, ethylene, alcohols) can be tuned by modifying the structure of the phenanthrolinium additive. Some additives promote the formation of $C_{2+}$ products. For all additives, $CH_4$ formation is totally suppressed. Hydrogen evolution reactions can either be inhibited (e.g. tertiary amines, ether moieties) or promoted (e.g. primary/secondary amine, alcohols) by changing functional groups on the additives FIG. 82. Schematic showing certain embodiments wherein additives electrodeposit into a layer of selectivity-determining organic material at a Cu surface.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

The term "electrochemical system" refers to devices and/or device components, such as one or more electrochemical cells, that perform electrochemistry. Electrochemistry refers to conversion of chemical energy into electrical energy or electrical energy into chemical energy. Chemical energy can correspond to a chemical change or chemical reaction. Electrochemistry can thus refer to a chemical change (e.g., a chemical reaction of one or more chemical species into one or more other species) generating electrical energy and/or electrical energy being converted into or used to induce a chemical change. An example of a chemical change or chemical reaction includes reduction of $CO_2$. Electrical energy refers to electric potential energy, corresponding to a combination of electric current and electric potential in an electrical circuit. An exemplary electrochemical system or electrochemical cell is an electrolytic cell. An electrolytic cell uses electrical energy to drive a non-spontaneous redox reaction. Electrochemical cells have two or more electrodes (e.g., negative and positive electrodes; e.g., cathode and anode) and one or more electrolytes. An anode is defined as the electrode at which oxidation occurs, or, in other words, a chemical change being an oxidation occurs at the anode. A cathode is defined as the electrode at which reduction occurs, such as $CO_2$ reduction, or, in other words, a chemical change being a reduction occurs at the cathode. An electrolyte may include chemical species that are oxidized and/or chemical species that are reduced during operation, such as charging or discharging, of the electrochemical cell. For example, the electrolyte is an aqueous solution. An electrochemical cell, such as an electrolytic cell, can have at least one electrolyte, such as at least one catholyte and/or at least one anolyte. Generally, a catholyte refers to an electrolyte that is in ionic and/or electrical communication, preferably direct ionic and/or electrical communication with the cathode and preferably in direct physical contact, with at least a portion of the cathode. Generally, an anolyte refers to an electrolyte that is in ionic and/or electrical communication, preferably direct ionic and/or electrical communication, with the anode and preferably in direct physical contact with at least a portion of the anode. Preferably, but not necessarily, a catholyte and an anolyte are physically separated in the electrochemical cell, such as via an ion exchange membrane, such as an anion exchange membrane. An electrochemical cell, such as an electrolytic cell, optionally has an anolyte and is free of a catholyte. Reactions occurring at the electrode, such as sorption and desorption of a chemical species or such as an oxidation or reduction reaction, contribute to charge transfer processes in the electrochemical cell. Electrochemical oxidation may occur at the anode, for example, and electrochemical reduction may occur at the cathode, for example. Electrochemical oxidation refers to a chemical oxidation reaction accompanied by a transfer of electrical energy (e.g., electrical energy input driving the oxidation reaction) occurring in the context an electrochemical cell. Similarly, electrochemical reduction refers to a chemical reduction reaction accompanied by a transfer of electrical energy occurring in the context an electrochemical cell. Electrochemical reduction preferably, but not necessarily, occurs at or on a surface of a cathode, or portion thereof, such as at or on a surface of an electrocatalyst which the cathode comprises. Electrochemical oxidation preferably, but not necessarily, occurs at or on a surface of a anode, or portion thereof, such as at or on a surface of an electrocatalyst which the anode comprises. The term "electrochemically" or "electrochemical" may describe a reaction, process, or a step thereof, as part of which chemical energy is converted into electrical energy or electrical energy is converted into chemical energy. For example, a product may be electrochemically formed when electrical energy is provided to help the chemical conversion of a reactant(s) to the product proceed. The term "non-electrochemical" refers to a reaction or process that does not include electrochemistry and/or does not require electrochemistry in order to be performed.

The term "electrocatalyst" refers to a catalyst that participates in or facilitates an electrochemical process or reaction. The term "electrocatalytic" refers to a material or item that is or is capable of being an electrocatalyst. For example, an electrocatalytic layer is a layer that is or is capable of being an electrocatalyst.

The term "porous" refers to a membrane, electrode, film, layer, coating, or any other material or item that has porosity. Thus, for instance, in a porous material, the pores are volumes within the body of the material where there is no material (e.g. voids). Pores in a material are not intended to include the space occupied by atoms, ions and/or molecules of a materials including monomers, oligomers and polymers, for example, of a membrane. The term "porosity" refers to the amount of a material or item, such of a membrane, corresponding to an absence of said material or item, such as absence corresponding to pores, such as apertures, channels, voids, etc. Generally, porosity refers to absence of said material or item within the physical bounds of said material or item, such as due to the material or item having a porous internal structure. Porosity may be expressed as the percentage of the volume of a material or item, which corresponds to pores, such as apertures, channels, voids, etc., relative to the total volume occupied by the material or item. For example, porosity may be expressed as the fraction of the volume of voids over the total volume, between 0 and 1, or as a percentage between 0% and 100%. "Pore volume per mass" refers to a characteristic of a porous material or porous structure corresponding to the ratio of the volume of pores (e.g., voids) to the mass of a material, for example, the ratio of the volume of pores in a sample of material to the mass of the sample. Pore volume per mass of material may be determined by a range of techniques known in the art including gas sorption measurements, Brunauer-Emmett-Teller (BET) surface measurements, optical measurements, gravimetric measurements, imbibition methods, thermoporosimetry methods, and the like.

Porosity can also be characterized by characterizing the pores of the porous material or item. In some embodiments, porous materials and pores may be characterized by a "pore characteristic" including, but not limited to, a size characteristic, size distribution, spatial distribution (e.g., uniform or random), pore type, directionality and/or composition. For example, pores can be characterized by a "size characteristic" or "characteristic pore size." For example, a size characteristic of pores is a "characteristic pore diameter," which may be an empirically-derived value. A characteristic pore diameter refers to an average cross-sectional diameter or cross-sectional width of the pores of a porous material or item. In some embodiments a size characteristic is a geometrical parameter such as a size dimension or average size dimension, including one or more cross sectional dimensions (e.g., diameter, effective diameter thickness, cross sectional length or width, etc.) and/or one or more longitudinal dimensions (e.g. channel or cavity length, channel or cavity pathway, etc.). Additional pore characteristics including a pore-type, directionality, being a continuous through-pore, a pore distribution and any combinations of these. Geometrical parameters of a pore may be exemplary size characteristics, including average size characteristics of the pores of a material. In an embodiment, for example, a size dimension is one or more, optional all of, cross sectional dimensions or an average cross sectional dimension. In an embodiment, a material is characterized by a uniform spatial distribution or random spatial distribution of pores throughout the material, for example, in contrast to a hollow pore configuration having a central pore.

The term "size characteristic" or "characteristic size" refers to a property, or set of properties, of a pore or particle that directly or indirectly relates to a size attribute of the pore or particle. According to some embodiments, a size characteristic corresponds to an empirically-derived size characteristic of a pore or particle(s) being detected, such as a size characteristic based on, determined by, or corresponding to data from any technique or instrument that may be used to determine a pore size or particle size, such as electron microscopy (e.g., for characterizing particles or pores; e.g., SEM and TEM), mercury intrusion porosimetry (e.g., for characterizing pores), a bubble gas transport technique (e.g., for characterizing pores), adsorption-desorption technique such as a Barett-Joyner-Halenda method (e.g., for characterizing pores), a permporometry technique (e.g., for characterizing pores), a thermoporometry technique (e.g., for characterizing pores), a gas permeability technique (e.g., for characterizing pores), optical microscopy (e.g., for characterizing pores or particles), mass transport technique (e.g., for characterizing pores), or a light scattering technique (e.g., for characterizing particle; e.g., DLS). For example, in reference to a particle, a size characteristic can correspond to a spherical particle exhibiting similar or substantially same properties, such as aerodynamic, hydrodynamic, optical, and/or electrical properties, as the particle(s) being detected). According to some embodiments, a size characteristic corresponds to a physical dimension, such as length, width, thickness, or diameter. Size characteristics of a pore include length, width, diameter, surface area, geometrical parameter, or void volume in the pore. A plurality of pores can be characterized by an average size characteristic, such as an empirically-derived numerical average of the respective size characteristic of each pore of the plurality of pores. A pore may be a longitudinal pore, for example. A longitudinal pore is one whose length is at least 20% greater than its diameter (or, than width of its void volume, for example, if diameter is not an appropriate characteristic).

The term "permeable to $CO_2$" refers a material or item, such as a membrane, through which, or through at least a portion of which, gaseous $CO_2$ is capable of diffusing and/or otherwise flowing. A gas-diffusion membrane, such as but not limited to a porous polytetrafluoroethylene gas diffusion layer, is a membrane characterized at least by the capability of having a gas, preferably $CO_2$ gas, diffuse and/or otherwise flow through at least a portion thereof. For example, the following references, each of which is incorporated herein in its entirety, include characterizations of and relevant techniques for characterizing gas, such as $CO_2$, permeability rate in membranes, such as a PTFE membrane: Pasternak, et al ("Diffusion and Permeation of Oxygen, Nitrogen, Carbon Dioxide, and Nitrogen Dioxide through Polytetrafluoroethylene," Macromolecules 1970, 3, 3, 366-371, doi 10.1021/ma60015a020), Nonoyama, et al. ("Analysis of Oxygen-Transport Diffusion Resistance in Proton-Exchange-Membrane Fuel Cells," Journal of The Electrochemical Society, Volume 158, Number 4, Published 2011, doi 10.1149/1.3546038), Burdyny, et al. ("CO2 reduction on gas-diffusion electrodes and why catalytic performance must be assessed at commercially-relevant conditions," Energy Environ. Sci., 2019, 12, 1442-1453, doi 10.1039/C8EE03134G), and Higgins, et al. ("Gas-Diffusion Electrodes for Carbon Dioxide Reduction: A New Paradigm," *ACS Energy Lett.* 2019, 4, 1, 317-324, doi 10.1021/acsenergylett.8b02035).

"Ionic communication" refers to the arrangement of two or more materials or items such that ions can be transported to, past, through, and/or from one material or item to another. Generally, ions can pass through ionically conducting materials such as ionically conducting liquids, such as water, or through solid ionic conductors. Preferably, but not necessarily exclusively, as used herein, transport or conduction of ions refers to transport or conduction of ions in an aqueous solution. For example, in some embodiments two materials or items are in ionic communication with one another if a path of ion flow is provided directly between the two materials or items. In some embodiments, two materials or items are in ionic communication with one another if an ion flow path is provided indirectly between the two materials or items, such as by including one or more other materials or items, such as an ion exchange membrane, or ion flow paths between the two materials or items. In one embodiment, two materials or items are not necessarily in ionic communication with one another unless ions from the first material or item are drawn to, past and/or through the second material or item, such as along an ion flow path.

The term "electrical communication" refers to the arrangement of two or more materials or items such that electrons can be transported to, past, through, and/or from one material or item to another. Electrical communication between two materials or items can be direct or indirect through another one or more materials or items. Generally, materials or items in electrical communication are (or comprise materials or components that are) electrically conducting or semiconducting.

The term "selectivity-determining organic material" refers to an organic material, or layer thereof, the presence of which influences or determines a selectivity characterizing a process or reaction with respect to said selectivity characterizing a process or reaction in the absence of said organic material under otherwise identical conditions and presence of otherwise identical materials and components. For example, the presence of selectivity-determining organic materials on copper electrodes change the selectivity characterizing the $CO_2$ reduction reaction with respect to the process occurring using copper electrodes in the absence of said organic materials under otherwise identical conditions and configuration. When such selectivity-determining organic materials are employed together with copper electrodes in $CO_2$ reduction, the concentration of a particular reaction product is increased as indicated by the spectroscopic and chromatographic methods used to analyze the resulting products from $CO_2$ reduction reactions. The Faradaic efficiency is the ratio of the electrochemical equivalent current density for a specific reaction product to the total applied current density. The Faradaic efficiency is an indicator of the degree of selectivity of $CO_2$ reduction reactions.

An "oligomer" refers to a molecule composed of repeating structural units, also referred to as base units, connected by covalent chemical bonds often characterized by a number of repeating units less than that of a polymer (e.g., equal to or less than 100 repeating units) and a lower molecular weights (e.g. less than or equal to 10,000 Da) than polymers. Oligomers may be the polymerization product of one or more monomers, or one or more monomer precursors. Polymerization of one or more monomers, or monomer precursors, resulting in formation of an oligomer may be referred to as oligomerization. An oligomer optionally includes 100 or less, 50 or less, 15 or less, 12 or less, 10 or less, 5 or less, 4 or less, 3 or less, or just 2 repeating units ("base units"). An oligomer may be characterized has having a molecular weight of 10,000 Da or less, 5,000 Da or less, 1,000 Da or less, 500 Da or less, or 200 Da or less. A dimer, a trimer, a tetramer, or a pentamer is an oligomer having two, three, four, or five, respectively, repeating units (base units).

The term "substantially" refers to a property or condition that is within 20%, within 10%, within 5%, within 1%, or is equivalent to a reference property or condition. The term "substantially equal," "substantially equivalent," or "substantially unchanged," when used in conjunction with a reference value describing a property or condition, refers to a value or condition that is within 20%, within 10%, within 5%, within 1%, within 0.1%, or optionally is equivalent to the provided reference value or condition. For example, a voltage that is substantially 500 mV (or, substantially equivalent to 500 mV) is within 20%, within 10%, within 5%, within 1%, or equal to 500 mV. The term "substantially greater," when used in conjunction with a reference value or condition describing a property or condition, refers to a value that is at least 2%, at least 5%, at least 10%, or at least 20% greater than the provided reference value or condition. For example, a voltage is substantially greater than 500 mV if the voltage is at least 20% greater than, at least 10% greater than, at least 5% greater than, or at least 1% greater than 500 mV. The term "substantially less," when used in conjunction with a reference value or condition describing a property or condition, refers to a value or condition that is at least 2%, at least 5%, at least 10%, or at least 20% less than the provided reference value. For example, a voltage is substantially less than 500 mV if the voltage is at least 20% less than, at least 10% less than, at least 5% less than, or at least 1 less than 500 mV.

The terms "analog" and "analogue" are used interchangeably and are used in accordance with their plain ordinary meaning within Chemistry and Biology and refers to a chemical compound that is structurally similar to another compound (i.e., a so-called "reference" compound) but differs in composition, e.g., in the replacement of one atom by an atom of a different element, or in the presence of a particular functional group, or the replacement of one functional group by another functional group, or the absolute stereochemistry of one or more chiral centers of the reference compound, including isomers thereof. Accordingly, an analog is a compound that is similar or comparable in function and appearance but not in structure or origin to a reference compound.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group, including, but not limited to: a halogen or halide, an alkyl, a cycloalkyl, an aryl, a heteroaryl, an acyl, an alkoxy, an alkenyl, an alkynyl, an alkylaryl, an arylene, a heteroarylene, an alkenylene, a cycloalkenylene, an alkynylene, a hydroxyl (—OH), a carbonyl (RCOR'), a sulfide (e.g., RSR'), a phosphate (ROP(=O)(OH)$_2$), an azo (RNNR'), a cyanate (ROCN), an amine (e.g., primary, secondary, or tertiary), an imine (RC(=NH)R'), a nitrile (RCN), a pyridinyl (or pyridyl), a diamine, a triamine, an azide, a diimine, a triimine, an amide, a diimide, or an ether (ROR'); where each of R and R' is independently a hydrogen or a substituted or unsubstituted alkyl group, aryl group, alkenyl group, or a combination of these. Optional substituent functional groups are also described below. In some embodiments, the term substituted refers to a compound wherein more than one hydrogen is replaced by another functional group, such as a halogen group.

As is customary and well known in the art, hydrogen atoms in formulas, such as in formula FX1, are not always explicitly shown, for example, hydrogen atoms bonded to the carbon atoms of aromatic, heteroaromatic, and alicyclic rings are not always explicitly shown. The structures provided herein, for example in the context of the description of formula (FX1) and schematics and structures in the drawings, are intended to convey to one of reasonable skill in the art the chemical composition of compounds of the methods and compositions of the invention, and as will be understood by one of skill in the art, the structures provided do not indicate the specific positions and/or orientations of atoms and the corresponding bond angles between atoms of these compounds.

The term "aliphatic group" refers to a non-aromatic hydrocarbon group. An aliphatic group can be saturated or unsaturated. An aliphatic group can be cyclic or non-cyclic. Alkyl groups and alkylene groups, for example, are aliphatic groups.

As used herein, "hydrocarbon" refers to an organic group composed of carbon and hydrogen, which can be saturated or unsaturated, and can include aromatic groups. The term "hydrocarbyl" refers to a monovalent or polyvalent (e.g., divalent or higher) hydrocarbon moiety. In some cases, a divalent hydrocarbyl group is referred to as a "hydrocarbylene" group.

As used herein, the terms "alkylene" and "alkylene group" are used synonymously and refer to a divalent group derived from an alkyl group as defined herein. The invention includes compounds having one or more alkylene groups. Alkylene groups in some compounds function as linking and/or spacer groups. Compounds of the invention may have substituted and/or unsubstituted $C_1$-$C_{20}$ alkylene, $C_1$-$C_{10}$ alkylene and $C_1$-$C_5$ alkylene groups, for example, as one or more linking groups (e.g. $L^1$-$L^6$).

As used herein, the terms "cycloalkenylene" and "cycloalkenylene group" are used synonymously and refer to a divalent group derived from a cycloalkenyl group as defined herein. The invention includes compounds having one or more cycloalkenylene groups. Cycloalkenylene groups in some compounds function as linking and/or spacer groups. Compounds of the invention may have substituted and/or unsubstituted $C_3$-$C_{20}$ cycloalkenylene, $C_3$-$C_{10}$ cycloalkenylene and $C_3$-$C_5$ cycloalkenylene groups, for example, as one or more linking groups (e.g. $L^1$-$L^6$).

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as linking and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups, for example, as one or more linking groups (e.g. $L^1$-$L^6$).

As used herein, the terms "heteroarylene" and "heteroarylene group" are used synonymously and refer to a divalent group derived from a heteroaryl group as defined herein. The invention includes compounds having one or more heteroarylene groups. In an embodiment, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as linking and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, heteroarylene and $C_3$-$C_5$ heteroarylene groups, for example, as one or more linking groups (e.g. $L^1$-$L^6$).

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as linking and/or spacer groups. Compounds of the invention include substituted and/or unsubstituted $C_2$-$C_{20}$ alkenylene, $C_2$-$C_{10}$ alkenylene and $C_2$-$C_5$ alkenylene groups, for example, as one or more linking groups (e.g. $L^1$-$L^6$).

Generally, a divalent linker group refers to a divalent functional group that covalently links two other moieties, such as any two base units of an oligomer, as disclosed in some embodiments herein, such that the divalent linker group is covalently bound to said two other moieties. Generally, said two other moieties are thus indirectly covalently linked two each other via said intervening divalent linker group. Exemplary divalent linker groups include, but are not limited to, a substituted or unsubstituted and functionalized or unfunctionalized alkylene, heteroalkylene, alkenylene, heteroalkenylene, cycloalkenylene, heterocycloalkenylene, alkynylene, heteroalkynylene, arylene, heteroarylene, any other divalent group described herein, and any combination of these. As used herein, a divalent linker group is optionally a $C_1$-$C_{100}$, optionally $C_1$-$C_{30}$, optionally $C_1$-$C_{10}$, divalent linker group.

As used herein, the prefix "hetero" used as a prefix to a root corresponding to a functional group, such as, but not limited to, in the terms heterocyclic, heteroarylene, heteroalkylene, and heteroalkenylene, refers to functional group corresponding to the root term but having one or more C (carbon) replaced with a non-carbon atom such as N, S, or O. For example, a heteroalkenylene is an alkenylene having at least one of its carbon atoms replaced with a non-carbon atom such as N, S, or O (e.g., —C—N(H)—C—).

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as linking and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups, for example, as one or more linking groups (e.g. $L^1$-$L^6$).

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as linking and/or spacer groups. Compounds of the invention include substituted and/or unsubstituted $C_2$-$C_{20}$ alkynylene, $C_2$-$C_{10}$ alkynylene and $C_2$-$C_5$ alkynylene groups, for example, as one or more linking groups (e.g. $L^1$-$L^6$).

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, threonine, asparagine, glutamine, tyrosine, cysteine, lysine, arginine, histidine, aspartic acid and glutamic acid. As used herein, reference to "a side chain residue of a natural α-amino acid" specifically includes the side chains of the above-referenced amino acids. Peptides are comprised of two or more amino-acid connected via peptide bonds.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7-, or 8-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—. Compositions of some embodiments of the invention comprise alkyl groups as terminating groups, such as polymer backbone terminating groups and/or polymer side chain terminating groups. Substituted alkyl groups may include substitution to incorporate one or more silyl groups, for example wherein one or more carbons are replaced by Si.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms. Compositions of some embodiments of the invention comprise alkenyl groups as terminating groups, such as polymer backbone terminating groups and/or polymer side chain terminating groups.

Aryl groups include groups having one or more 5-, 6-7-, or 8-member aromatic rings, including heterocyclic aromatic rings. The term heteroaryl specifically refers to aryl groups having at least one 5-, 6-7-, or 8-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents. Compositions of some embodiments of the invention comprise aryl groups as terminating groups, such as polymer backbone terminating groups and/or polymer side chain terminating groups.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms. Compositions of some embodiments of the invention comprise arylalkyl groups as terminating groups, such as polymer backbone terminating groups and/or polymer side chain terminating groups.

As to any of the groups described herein which contain one or more substituents, it is understood that such groups do not contain any substitution or substitution patterns which are sterically impractical and/or synthetically non-feasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine; pseudohalides, including —CN;
—COOR where R is a hydrogen or an alkyl group or an aryl group and more specifically where R is a methyl, ethyl, propyl, butyl, or phenyl group all of which groups are optionally substituted;
—COR where R is a hydrogen or an alkyl group or an aryl group and more specifically where R is a methyl, ethyl, propyl, butyl, or phenyl group all of which groups are optionally substituted;
—CON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—OCON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—N(R)$_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;
—SR, where R is hydrogen or an alkyl group or an aryl group and more specifically where R is hydrogen, methyl, ethyl, propyl, butyl, or a phenyl group, which are optionally substituted;
—SO$_2$R, or —SOR where R is an alkyl group or an aryl group and more specifically where R is a methyl, ethyl, propyl, butyl, or phenyl group, all of which are optionally substituted;
—OCOOR where R is an alkyl group or an aryl group;
—SO$_2$N(R)$_2$ where each R, independently of each other R, is a hydrogen, or an alkyl group, or an aryl group all of which are optionally substituted and wherein R and R can form a ring which can contain one or more double bonds and can contain one or more additional carbon atoms; and
—OR where R is H, an alkyl group, an aryl group, or an acyl group all of which are optionally substituted. In a particular example R can be an acyl yielding —OCOR" where R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible.

Many of the molecules disclosed herein contain one or more ionizable groups. Ionizable groups include groups from which a proton can be removed (e.g., —COOH) or added (e.g., amines) and groups that can be quaternized (e.g., amines). All possible ionic forms of such molecules and salts thereof are intended to be included individually in the disclosure herein. With regard to salts of the compounds herein, one of ordinary skill in the art can select from among a wide variety of available counterions that are appropriate for preparation of salts of this invention for a given application. In specific applications, the selection of a given anion or cation for preparation of a salt can result in increased or decreased solubility of that salt.

The compounds of this invention can contain one or more chiral centers. Accordingly, this invention is intended to include racemic mixtures, diastereomers, enantiomers, tautomers and mixtures enriched in one or more stereoisomer. The scope of the invention as described and claimed encompasses the racemic forms of the compounds as well as the individual enantiomers and non-racemic mixtures thereof.

As used herein, the term "isomers" refers to compounds having the same number and kind of atoms, and hence the same molecular weight, but differing in respect to the structural arrangement or configuration of the atoms.

The term "tautomer," as used herein, refers to one of two or more structural isomers which exist in equilibrium and which are readily converted from one isomeric form to another.

Where substituent groups are specified by their conventional chemical formulae, written from left to right, they equally encompass the chemically identical substituents that would result from writing the structure from right to left, e.g., —CH$_2$O— is equivalent to —OCH$_2$—.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The invention can be further understood by the following non-limiting examples.

Example 1: Overview of Select Embodiments

The electrochemical reduction of carbon dioxide to value-added fuels and feedstocks provides a sustainable and carbon-neutral approach to the storage of intermittent renewable electricity. The selective production of high energy density hydrocarbons such as ethylene remains a challenge in this reaction. Although copper-based electrodes have already shown promising selectivities for the generation of some hydrocarbon products, their overall energy efficiency (EE) values for ethylene production are still low under mild reaction conditions (pH-neutral media and low overpotential). In this work, we disclose an electrocatalytic system for the conversion of carbon dioxide into ethylene in a neutral electrolyte with a faradaic efficiency of 72% at a potential of –0.83 V vs RHE with partial current density of 230 mA cm$^{-2}$. The catalytic system is comprised of a porous polytetrafluoroethylene (PTFE) electrode with sputtered Cu and an organic film electrodeposited onto its surface. Several N-arylpyridinium salts were evaluated as precursors of such a molecular coating by galvanostatic methods. Upon applied bias, the corresponding organic additive led to the formation of a water-insoluble thin film (~10 nm thick) on the surface of the Cu electrode.

Spectroscopic characterizations revealed that the organic film is formed via reductive dimerization of the N-arylpyridinium salts. Furthermore, the incorporation of the organic film did not change the morphology nor the crystal properties of the Cu electrode. We observed stable ethylene electrosynthesis for 190 h in a membrane electrode assembly-based system that provides a full-cell EE of 20%. Operando spectroscopic measurements and computational studies showed that the molecular coating improve the stabilization of a CO-bound intermediate in an atop bound configuration, thereby favoring the reduction of $CO_2$ to ethylene. These combined findings indicate how molecular strategies can complement heterogenous catalysts by stabilizing intermediates via local molecular tuning.

Example 2A: Molecular Tuning of $CO_2$-to-Ethylene Conversion

The electrocatalytic reduction of carbon dioxide, powered by renewable electricity, to produce valuable fuels and feedstocks provides a sustainable and carbon-neutral approach to the storage of energy produced by intermittent renewable sources[1]. The highly selective generation of economically desirable products such as ethylene from the carbon dioxide reduction reaction ($CO_2RR$) remains a challenge[2]. Tuning the stabilities of intermediates to favour a desired reaction pathway can enhance selectivity[3-5], and this has recently been explored for the reaction on copper through control over morphology[6], grain boundaries[7], facets[8], oxidation state[9] and dopants[10]. Unfortunately, the Faradaic efficiency for ethylene is still low in neutral media (60 percent at a partial current density of 7 milliamperes per square centimetre in the best catalyst reported so far[9]), resulting in a low energy efficiency. Here we present a molecular tuning strategy—the functionalization of the surface of electrocatalysts with organic molecules—that stabilizes intermediates for enhanced $CO_2RR$ to ethylene. Using electrochemical, operando/in situ spectroscopic and computational studies, we investigate the influence of a library of molecules, derived by electro-dimerization of arylpyridiniums[11], adsorbed on copper. We find that the adhered molecules improve the stabilization of an atop-bound CO intermediate (that is, an intermediate bound to a single copper atom), thereby favouring further reduction to ethylene. As a result of this strategy, we report the $CO_2RR$ to ethylene with a Faradaic efficiency of 72 percent at a partial current density of 230 milliamperes per square centimetre in a liquid-electrolyte flow cell in neutral medium. We report stable ethylene electrosynthesis for 190 hours in a system based on a membrane-electrode assembly that provides a full-cell energy efficiency of 20 percent. These findings indicate how molecular strategies can complement heterogeneous catalysts by stabilizing intermediates via local molecular tuning.

Recently we found that an N-aryl-substituted tetrahydro-4,4"-bipyridine organic thin film, formed by reductive electro-dimerization of an N-aryl pyridinium additive (FIG. 1A; see Supplementary Information for details), facilitated selective $CO_2RR$ to multi-carbon products on Cu foils[11]. However, the selectivity and partial current density for ethylene are low (about 40% and 0.5 mA cm$^{-2}$) for practical applications. We sought to clarify factors contributing to the selectivity enhancement to enable further design of new functional molecules with better performance.

Noting that local environment plays a role in electrocatalysis through tuning interactions among reactants/intermediates[12-16], we postulated that the N-arylpyridinium-derived film may affect the selectivity of $CO_2RR$ by interacting with the reaction intermediate(s). To test this hypothesis, we first prepared a library of N-arylpyridinium salts (1-11, FIGS. 1B, 5A-5L and 6A-6E) expected to display different electronic properties. We then electrodeposited these N-arylpyridinium precursors onto a porous polytetrafluoroethylene gas diffusion layer[17] with a sputtered Cu layer serving as both current collector and catalyst. The as-electrodeposited thin film is water-insoluble and consists of a mixture of both constitutional isomers and stereo isomers of N-aryl-substituted tetrahydro-bipyridine species (FIG. 1A, Example 2B Note 1, FIGS. 7, 8A-8B and 9A-9M). As expected, Bader charge analysis points to different electron donating abilities of these tetrahydro-bipyridines (FIGS. 10A-10L). Coating of the tetrahydro-bipyridine film onto the Cu electrode does not substantially change its morphology, crystallinity, electronics or wettability, nor does it retard the transport of reactants, ions and products, needed in electrocatalytic processes (Example 2B Note 2, FIGS. 11A-11F, 12A-12D, 13 and 14).

Figure 1C:
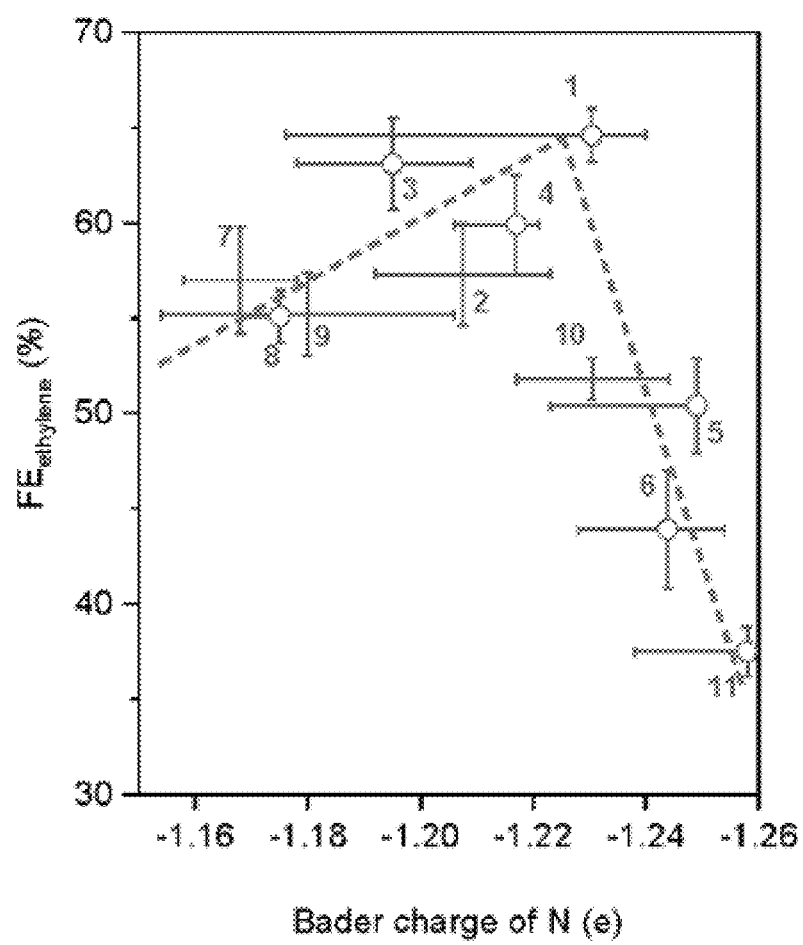

We evaluated $CO_2RR$ properties of these tetrahydro-bipyridine-functionalized electrodes in a liquid-electrolyte flow cell system (FIG. 15), using $CO_2$-saturated 1 M aqueous $KHCO_3$ as the supporting electrolyte. In this system, the abundant catalyst/electrolyte/$CO_2$ triple-phase interfaces overcome the $CO_2$ mass-transport limit[17,18] and thus enable commercially relevant current densities[19,20]. We note that, although the large achievable current densities in the flow cell drive up local pH (FIGS. 16A-16B), the tetrahydro-bipyridine layer does not create a further pH gradient near the active Cu surface (Example 2B Note 2). The layer is chemically robust to the locally alkaline environment (FIG. 17). The Faradaic efficiency (FE) for ethylene (Example 2B Table 1) on additive-modified Cu-x electrodes (x=1-11), at the optimal applied potentials, -0.82 V to -0.84 V versus the reversible hydrogen electrode (RHE; all potentials are with respect to this reference), was plotted against the Bader charge of the nitrogen atom of each tetrahydro-bipyridine structure (FIG. 1C). We found a volcano-shaped trend relating FE and Bader charge, with the tetrahydro-bipyridine of moderate electron-donating ability showing the highest ethylene selectivity.

Figure 2A:
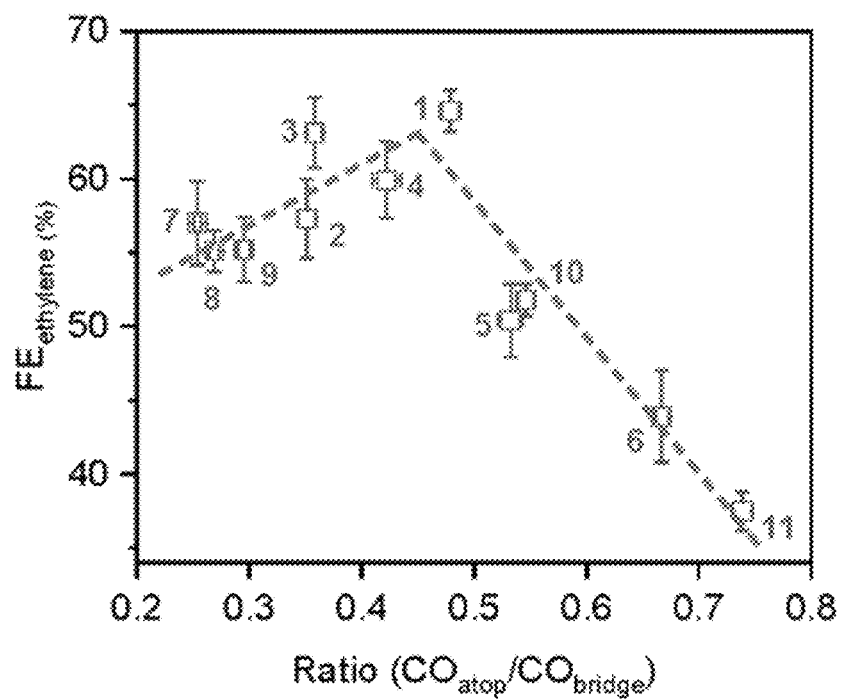
FIGS. 2A-2D. Mechanistic investigations of the stabilization of CO-bound intermediates.
Figure 2B:
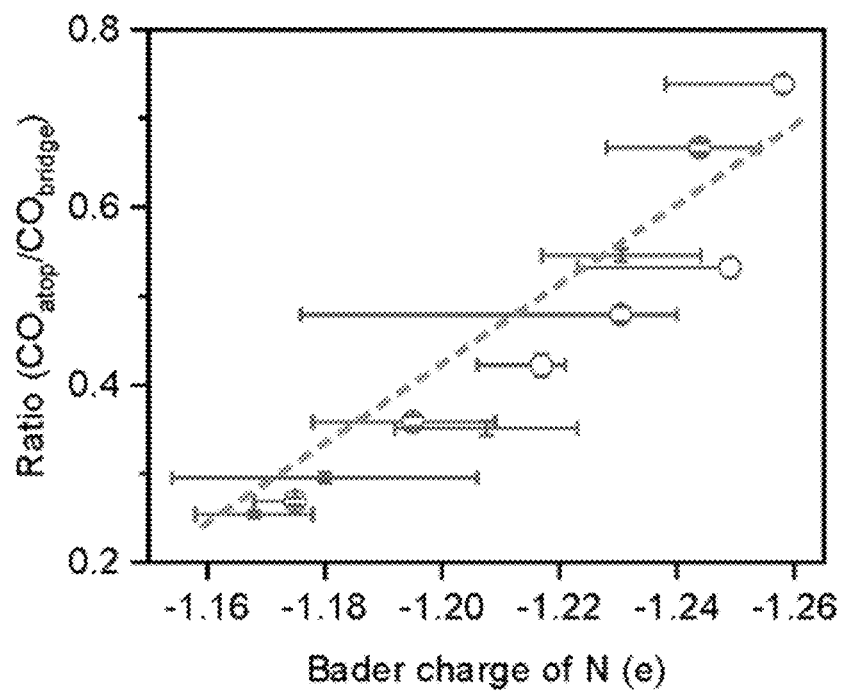
Figure 2C:
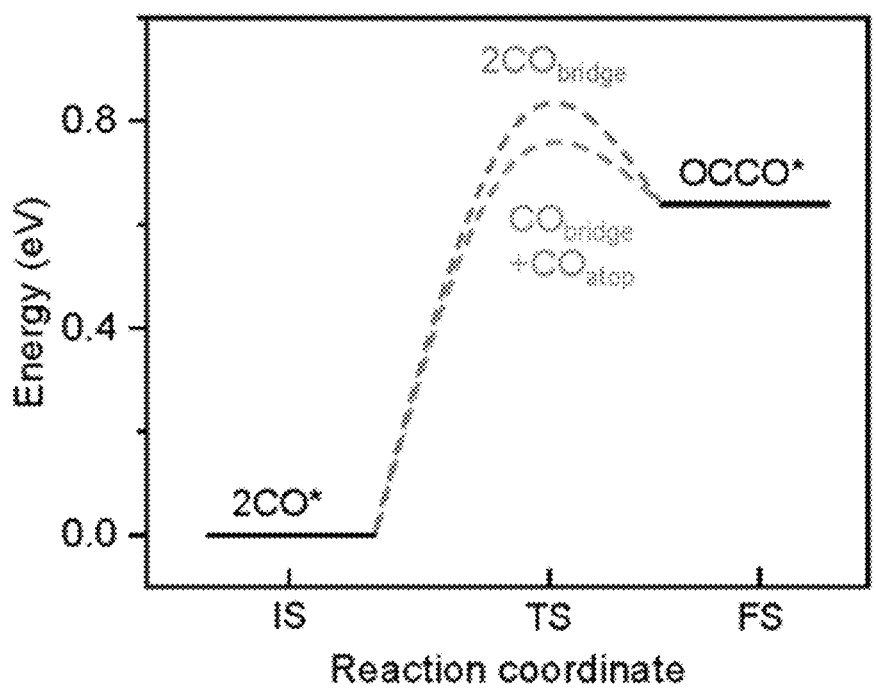

We further found a volcano-shaped relationship between the ethylene selectivity and the ratio of atop-bound CO ($CO_{atop}$) to bridge-bound CO (that is, CO bound to two Cu atoms, hereafter $CO_{bridge}$) on Cu-x surfaces (FIG. 2A). We identified and quantified these bound CO configurations through in situ Raman spectroscopic interrogation[21-24] of these surfaces (Example 2B Note 3, FIGS. 18 and 19A-19M, Example 2B Table 2). In all cases, the ratio of $CO_{atop}$ to $CO_{bridge}$ on Cu-x was increased relative to that on bare Cu. Noting a correlation between ethylene selectivity and electron-donation propensity (FIG. 1C), we hypothesized that the change of the relative population of $CO_{atop}$ and $CO_{bridge}$ could arise from the difference in electron-donating abilities of the tetrahydro-bipyridines. Indeed, we found that the ratio of $CO_{atop}$ to $CO_{bridge}$ was positively correlated with the Bader charge of the nitrogen atom in the tetrahydro-bipyridines (FIG. 2B). This finding suggests that electron donation to the *CO stabilizes the atop CO more than it does the bridge CO.

To gain molecular-level insight into the effect of CO binding, we calculated, using density functional theory (DFT), reaction barriers for the CO dimerization step, a critical step along the pathway to $C_2$ products[5] (that is, products with two carbon atoms, such as ethylene and ethanol), on Cu (111) with the initial configurations of two *CO on the atop:atop, atop:bridge and bridge:bridge sites (FIGS. 2C and 20A-20D). We found the lowest barrier of CO dimerization to be at the atop:bridge site with a barrier of 0.72 eV. In comparison, the barrier for the bridge:bridge site is 0.82 eV. The barrier for the atop:atop site could not be identified: one of the CO on atop site tends to relocate to bridge site, suggesting that atop:atop is not favourable for CO dimerization. These findings indicate that neither too large nor too small a population of atop CO favours $C_2$ selectivity.

We further calculated the adsorption of CO on Cu (111) (FIGS. 21A-21D, Example 2B Table 3). On bare Cu (111), the bridge site appears to be the most stable adsorption site for CO. In the presence of the tetrahydro-bipyridine formed from 1, the adsorption of CO on both bridge and (especially) atop sites is enhanced, and the atop site becomes favoured compared with the bridge site. The enhancement of CO binding energy decreases the desorption of *CO and increases the likelihood of further reduction of *CO to ethylene (FIGS. 22, 23A-23J and 24A-24J).

Figure 2D:
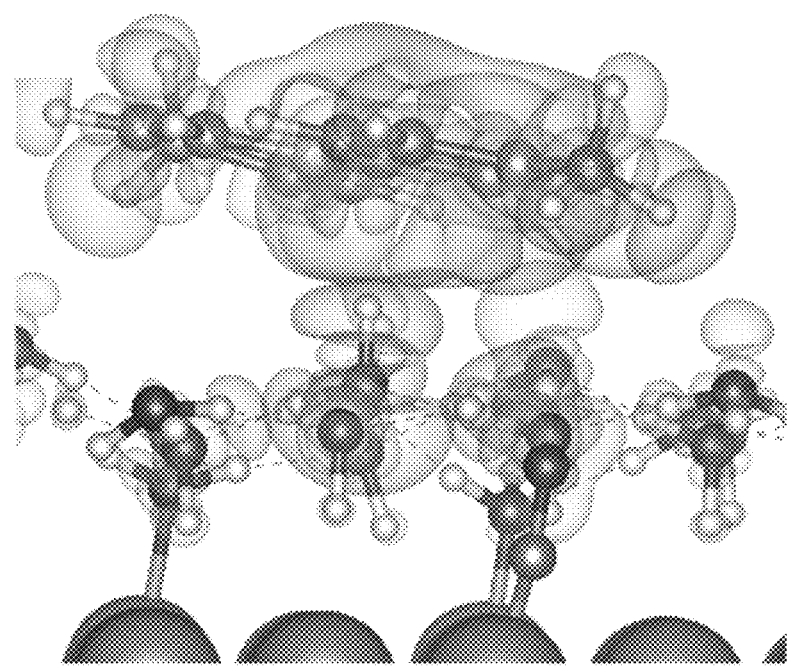

We visualized the interaction between the tetrahydro-bipyridine molecule and *CO through the electron density difference plot (FIG. 2D). The electron density appears to transfer from the molecule to nearby water molecules, changing the electronic distributions of water surrounding *CO, and enhancing CO adsorption in the favourable atop site.

In sum, our working model is that $H_2O$-mediated electron density transfer of the tetrahydro-bipyridine film to *CO stabilizes this intermediate, especially on the atop site, and therefore promotes the energy-favourable dimerization of bridge:atop bound CO, leading to enhanced ethylene selectivity. However, too strong an adsorption of CO caused by strong electron donation of some tetrahydro-bipyridines (right side of the volcano plot in FIG. 1C) results in overload of atop-bound CO and thus yields energy barriers too large for further reaction.

We found, by using operando X-ray absorption spectroscopy (XAS, FIGS. 25A-25C), that tetrahydro-bipyridine does not modulate the oxidation state or coordination environment of Cu—although such modulation is known to promote ethylene formation[9,25]. We also found, from in situ electrochemical electron paramagnetic resonance spectroscopic (EPR) and isotopic labelling studies (FIGS. 26A-26C, 27 and 28), that tetrahydro-bipyridine does not mediate electron transfers via its conversion to pyridinium radicals[16,26], nor does it mediate hydrogen-transfer steps.

Because the nitrogen atom of the N-aryl-substituted pyridine ring influences the binding of *CO, we posited that an N-aryl-pyridinium-derived molecule with more nitrogen sites and optimal electron-donating properties would stabilize more *CO on the Cu surface. Accordingly, we synthesized an N,N'''-(1,4-phenylene)bispyridinium salt (12, FIGS. 3A and 5A-5L). In contrast with 1-11, 12 underwent oligomerization to form an N-aryl-dihydropyridine-based oligomer under electrodeposition (FIGS. 3A and 9A-9M). The Bader charge of the nitrogen atom of the oligomer (FIGS. 10A-10L) is close to that of the tetrahydro-bipyridine from 1, and, as expected, the ratio of $CO_{atop}$ to $CO_{bridge}$ on Cu-12 (FIGS. 19A-19M, Example 2B Table 2) is also close to that on Cu-1. Based on the working hypotheses presented here, these findings suggest the Cu-12 catalyst should approach the top of the volcano plot.

We evaluated the $CO_2$RR performance of Cu-12 in the same flow cell system. The ethylene FE on Cu-12 is higher than that on bare Cu and other Cu-x across the entire applied potential range (−0.49 V to −0.84 V) and achieves a peak value of 72% at −0.83 V (FIG. 3B, Example 2B Tables 1 and 4), higher than previous selectivities reported for ethylene in neutral media (Example 2B Table 5). In contrast, the ethylene FE on bare Cu under similar conditions is below 40%. High selectivity and high current density combine for an ethylene production current of 232 mA cm$^{-2}$ at −0.83 V (FIGS. 29A-29B).

Figure 3A:
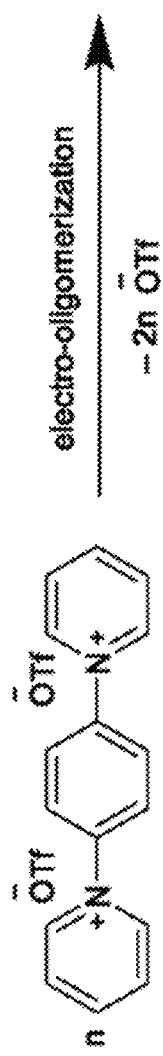
FIGS. 3A-3C. $CO_2$RR performance in liquid-electrolyte flow cells.
Figure 3A:
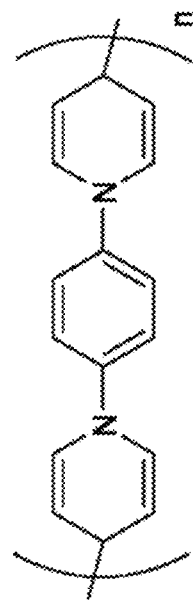
Figure 3C:
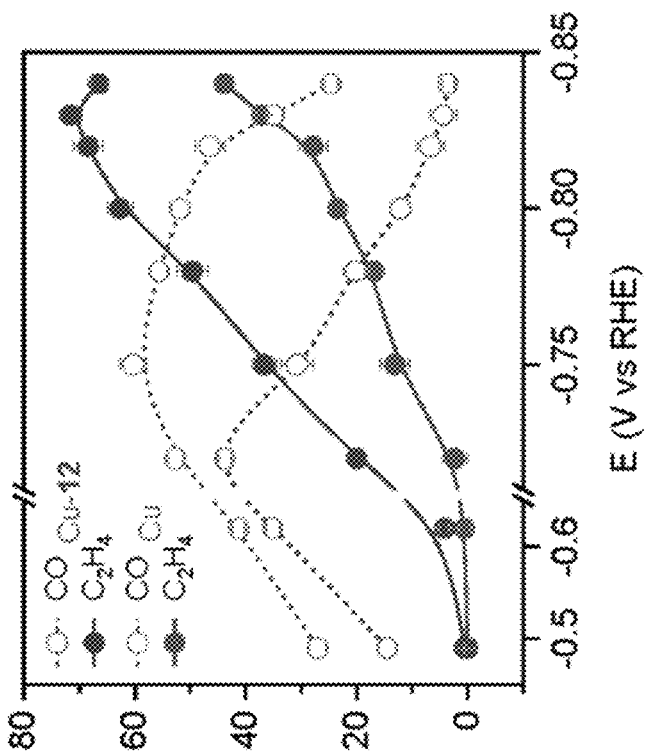
Figure 3B:
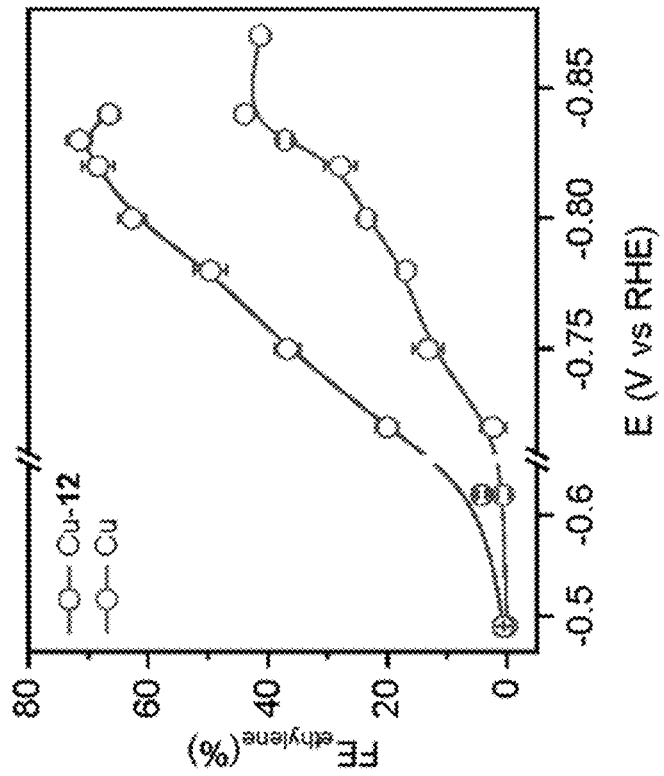

We examined the FEs of CO and ethylene across the applied potential range. Although the FE of CO follows the same trend of peaking at moderate potentials, more CO is converted to ethylene on Cu-12 than on pure Cu (FIG. 3C, Example 2 Table 4). Specifically, at the applied potential of −0.83 V, the FEs of CO and ethylene on Cu-12 electrode are 5% and 72%, respectively, whereas the values on bare Cu are 35% and 37%, respectively (FIGS. 29A-29B). The FEs of other $CO_2$RR products remain similar on both catalysts. These findings suggest that the increased ethylene selectivity arises primarily at the expense of CO evolution. This behaviour agrees with the in situ Raman spectroscopy and DFT calculations, where the *CO is well-stabilized for ongoing reduction on the molecularly functionalized Cu electrode. We confirmed by isotopic $CO_2$ studies (FIG. 30) that the products were from $CO_2$RR.

To evaluate the potential of the Cu-12 catalyst for practical applications, we integrated it into a membrane-electrode-assembly device (Example 2B Note 4, FIGS. 31, 32A-32C, 33A-33C, 34, 35, 36, 37A-37F and 38) for electrosynthesis of ethylene through the overall reaction: $2CO_2+2H_2O \rightarrow C_2H_4+3O_2$; E°=1.15 V, where E is the equilibrium potential for the reaction.

Figure 4:
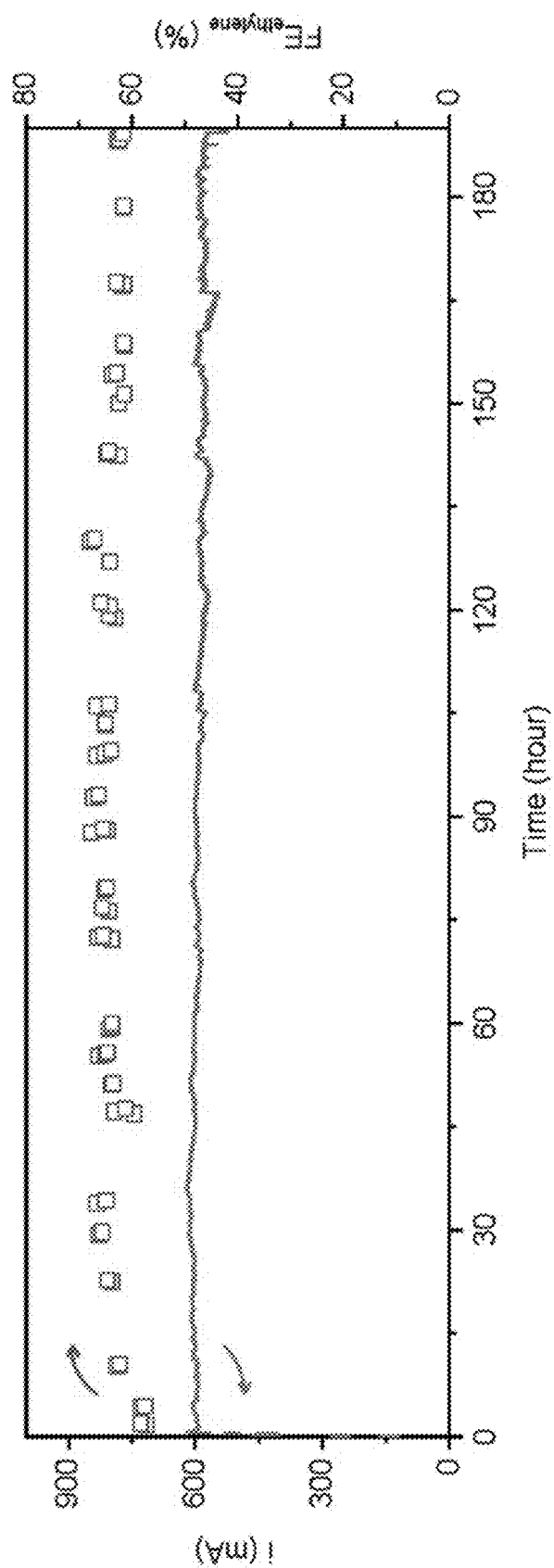
FIG. 4. Ethylene electrosynthesis in a membrane-electrode assembly device. The operating current and ethylene FE were monitored for the device. Cu-12 and iridium oxide supported on titanium mesh were used as the cathode and anode, respectively. Humidified $CO_2$ was flowed through the gas channels in the cathode, and 0.1 M aqueous $KHCO_3$ solution was flowed through channels in the anode. The anode and cathode were separated by an anion exchange membrane to form the membrane-electrode assembly. The total geometric area of the flow field in the cathode is 5 $cm^2$, of which 45% is the gas channel while the remaining 55% is the land area (FIGS. 31 and 32A-32C). Full-cell voltage was gradually increased from 3 V to 3.65 V and kept constant starting at time 0.
Figure 5E:
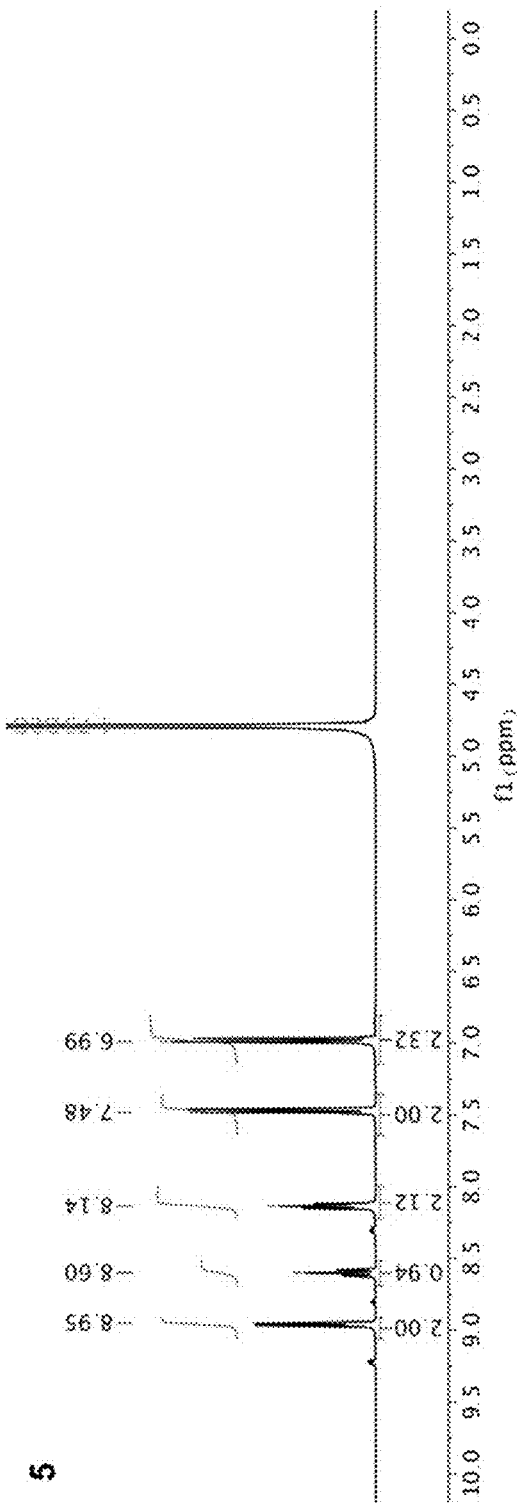
Figure 5F:
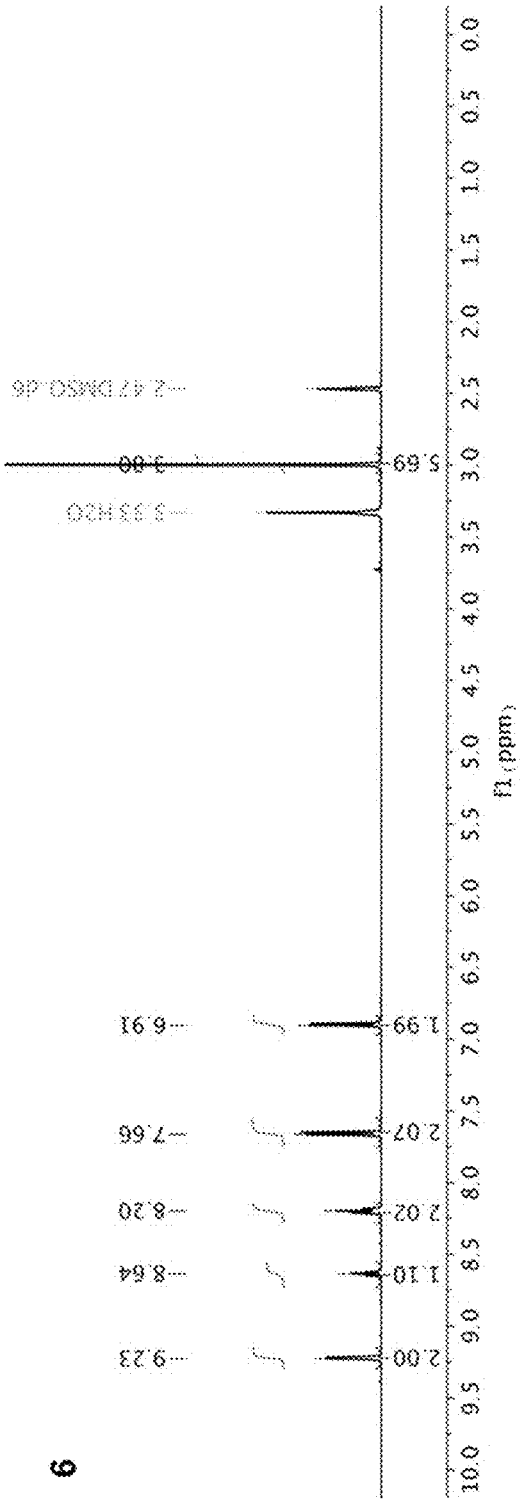
Figure 5G:
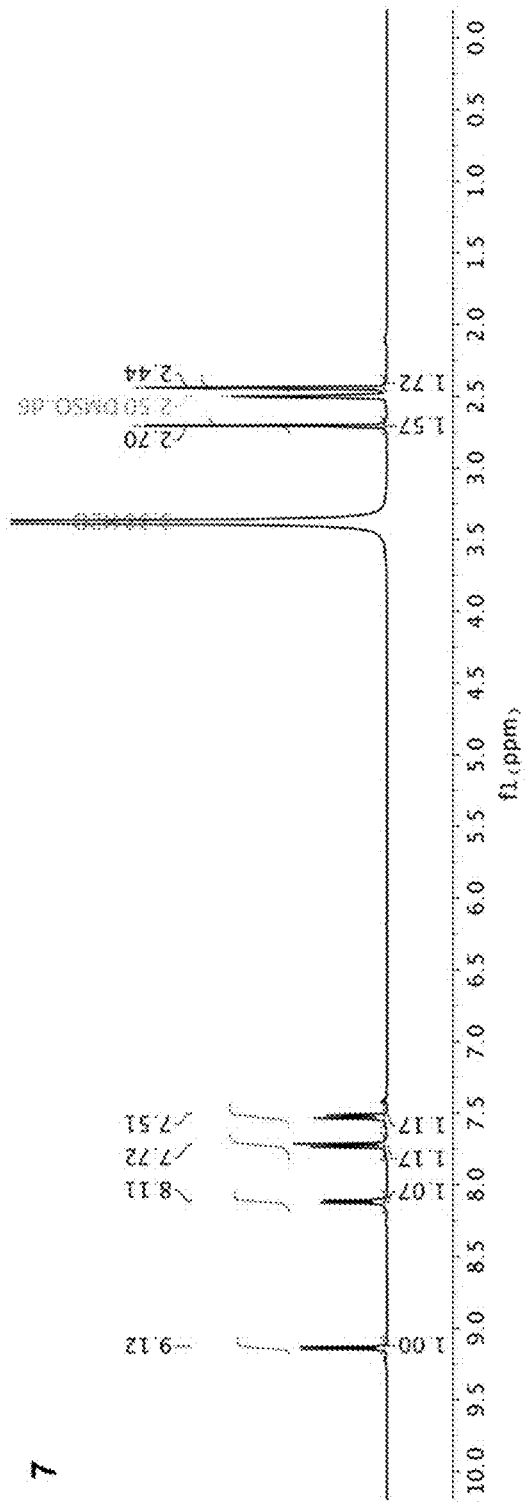
Figure 5H:
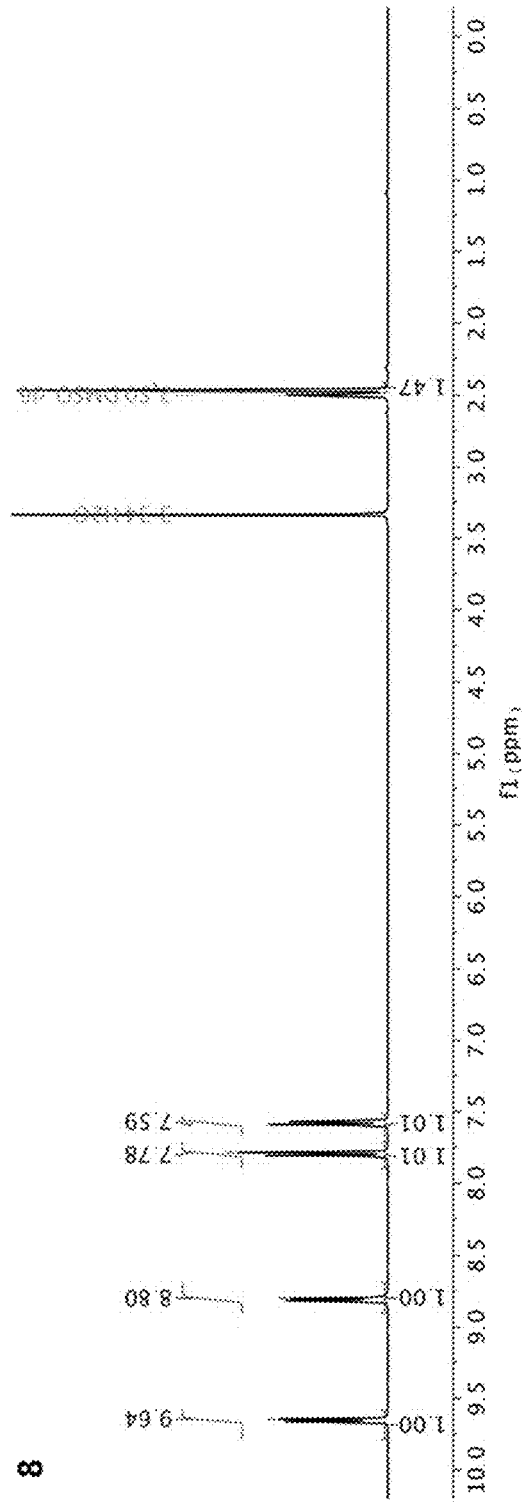
Figure 5I:
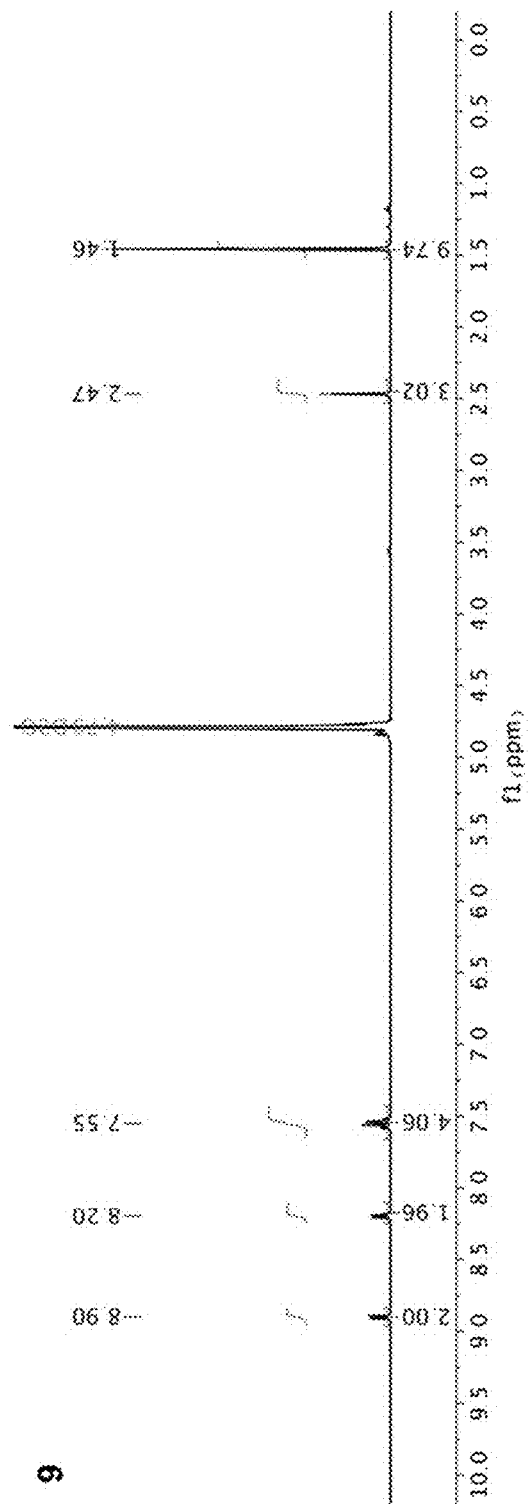
Figure 5J:
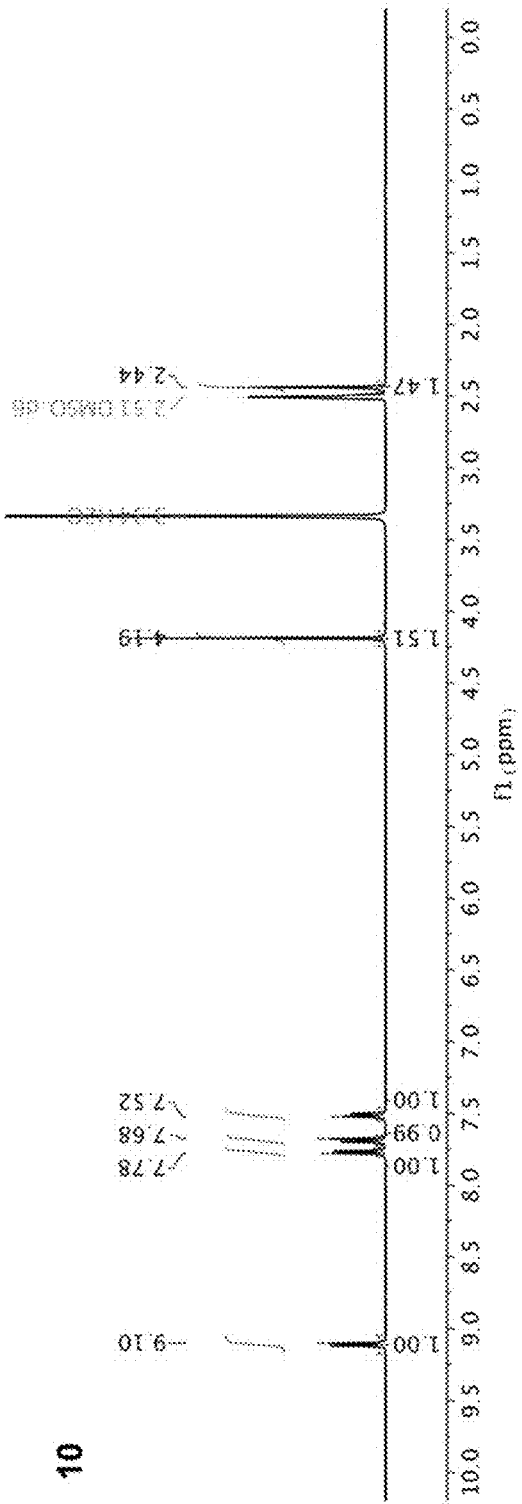
Figure 6C:
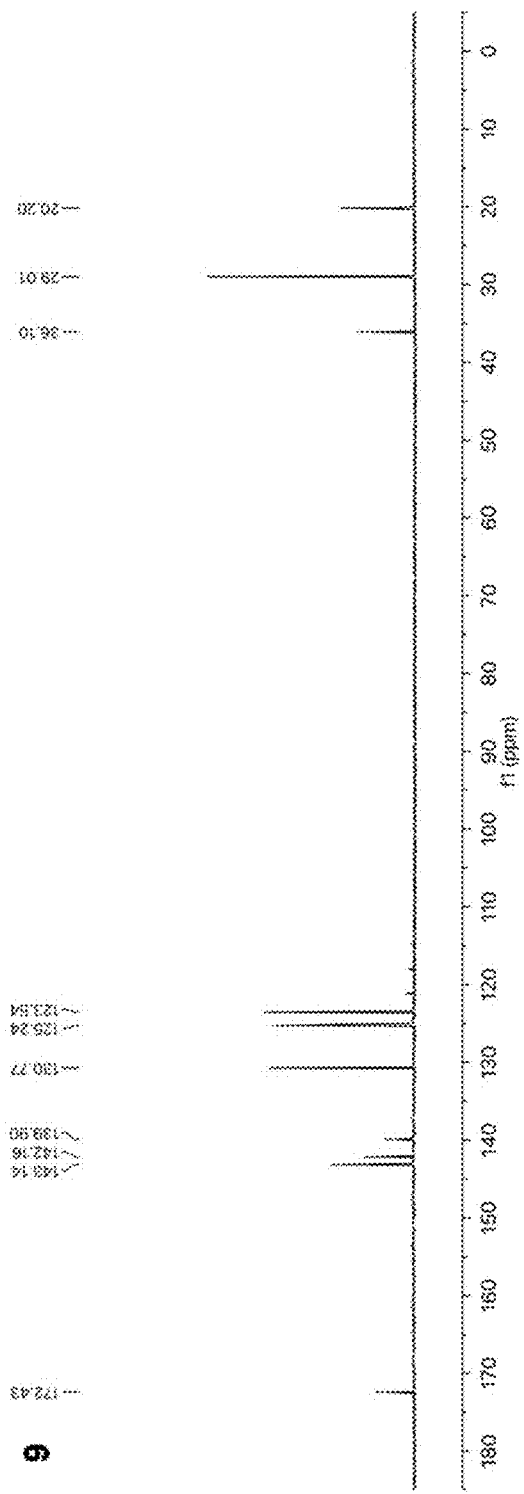
Figure 6D:
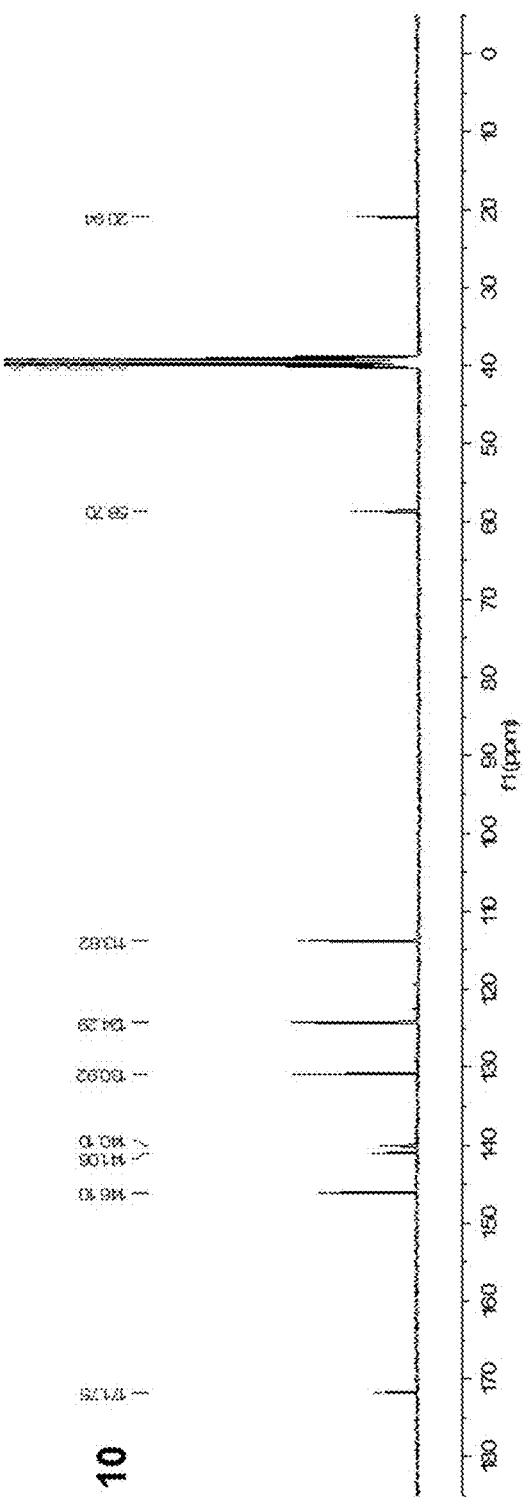
Figure 6E:
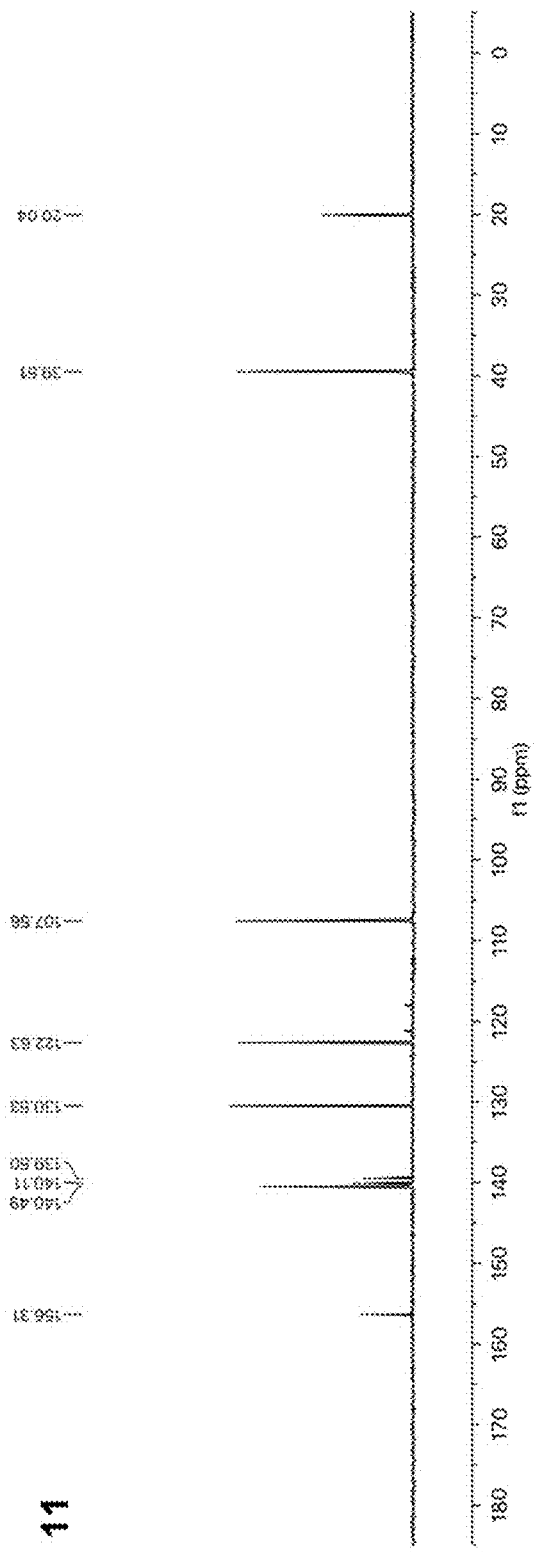

We operated the membrane-electrode-assembly system at a full-cell voltage of 3.65 V for 190 h. It exhibited a stable current (~600 mA) and a stable ethylene selectivity (64%) in neutral medium (FIG. 4). The energy efficiency (EE) of the system is determined to be 20% via: $EE_{full-cell}=(E° \times FE_{ethylene})/E_{full-cell}$.

Overall, this work presents a strategy to tune the stabilization of intermediates on heterogeneous electrocatalysts through the introduction of organic molecules. Using this strategy, implemented with N-aryl-substituted tetrahydro-bipyridine films and a related oligomeric film on a Cu catalyst, we achieved $CO_2$-to-ethylene conversion with an ethylene FE of 72% and a full-cell energy efficiency of 20% in neutral media. In light of this performance, in combination with the long-term operating stability, the strategy indicates a promising platform for $CO_2$ conversion into value-added chemicals, thus storing the renewable energy (solar, wind) in the form of chemical energy.

References Associated with Example 2A

1. Seh, Z. W. et al. Combining theory and experiment in electrocatalysis: insights into materials design. *Science* 355, eaad4998 (2017).
2. De Luna, P. et al. What would it take for renewably powered electrosynthesis to displace petrochemical processes? *Science* 364, eaav3506 (2019).
3. Li, Y. & Sun, Q. Recent advances in breaking scaling relations for effective electrochemical conversion of $CO_2$. *Adv. Energy Mater.* 6, 1600463 (2016).
4. Calle-Vallejo, F. & Koper, M. T. Theoretical considerations on the electroreduction of CO to $C_2$ species on Cu (100) electrodes. *Angew. Chem. Int. Ed.* 52, 7282-7285 (2013).
5. Montoya, J. H., Shi, C., Chan, K. & Nørskov, J. K. Theoretical insights into a CO dimerization mechanism in $CO_2$ electroreduction. *J. Phys. Chem. Lett.* 6, 2032-2037 (2015).
6. Yang, K. D. et al. Morphology-directed selective production of ethylene or ethane from $CO_2$ on a Cu mesopore electrode. *Angew. Chem. Int. Ed.* 56, 796-800 (2017).
7. Li, C. W., Ciston, J. & Kanan, M. W. Electroreduction of carbon monoxide to liquid fuel on oxide-derived nanocrystalline copper. *Nature* 508, 504-507 (2014).
8. Jiang, K. et al. Metal ion cycling of Cu foil for selective C—C coupling in electrochemical $CO_2$ reduction. *Nat. Catal.* 1, 111-119 (2018).
9. Mistry, H. et al. Highly selective plasma-activated copper catalysts for carbon dioxide reduction to ethylene. *Nat. Commun.* 7, 12123 (2016).
10. Zhou, Y. et al. Dopant-induced electron localization drives $CO_2$ reduction to $C_2$ hydrocarbons. *Nat. Chem.* 10, 974-980 (2018).
11. Han, Z., Kortlever, R., Chen, H. Y., Peters, J. C. & Agapie, T. $CO_2$ reduction selective for $C_{\geq 2}$ products on polycrystalline copper with N-substituted pyridinium additives. *ACS Cent. Sci.* 3, 853-859 (2017).
12. Rosen, B. A. et al. Ionic liquid-mediated selective conversion of $CO_2$ to CO at low overpotentials. *Science* 334, 643-644 (2011).
13. Masel, R. I. & Rosen, B. A. Catalyst mixtures. U.S. Pat. No. 8,956,990 (2015).
14. Masel, R. I. & Rosen, B. A. Electrochemical devices comprising novel catalyst mixtures. U.S. Pat. No. 9,464,359 (2016).
15. Masel, R. I. & Rosen, B. A. Catalyst mixtures. U.S. Pat. No. 9,566,574 (2017).
16. Barton Cole, E. et al. Using a one-electron shuttle for the multielectron reduction of $CO_2$ to methanol: kinetic, mechanistic, and structural insights. *J. Am. Chem. Soc.* 132, 11539-11551 (2010).

17. Dinh, C.-T. et al. $CO_2$ electroreduction to ethylene via hydroxide-mediated copper catalysis at an abrupt interface. *Science* 360, 783-787 (2018).
18. Li, J. et al. Efficient electrocatalytic $CO_2$ reduction on a three-phase interface. *Nat. Catal.* 1, 592-600 (2018).
19. Ma, S. et al. One-step electrosynthesis of ethylene and ethanol from $CO_2$ in an alkaline electrolyzer. *J. Power Sources* 301, 219-228 (2016).
20. Jouny, M., Luc, W. W. & Jiao, F. General techno-economic analysis of $CO_2$ electrolysis systems. *Ind. Eng. Chem. Res.* 57, 2165-2177 (2018).
21. Sheppard, N. & Nguyen, T. T. in *Advances in Infrared and Raman Spectroscopy* Vol. 5 (eds Hawes Clark, R. J. & Hester, R. E.) 67 (Heyden, 1978).
22. Gunathunge, C. M. et al. Spectroscopic observation of reversible surface reconstruction of copper electrodes under $CO_2$ reduction. *J. Phys. Chem. C* 121, 12337-12344 (2017).
23. Heyes, J., Dunwell, M. & Xu, B. $CO_2$ reduction on Cu at low overpotentials with surface-enhanced in situ spectroscopy. *J. Phys. Chem. C* 120, 17334-17341 (2016).
24. Akemann, W. & Otto, A. Vibrational modes of CO adsorbed on disordered copper films. *J. Raman Spectrosc.* 22, 797-803 (1991).
25. Xiao, H., Goddard, W. A., Cheng, T. & Liu, Y. Cu metal embedded in oxidized matrix catalyst to promote $CO_2$ activation and CO dimerization for electrochemical reduction of $CO_2$. *Proc. Natl Acad. Sci. USA* 114, 6685-6688 (2017).
26. Cole, E. B., Sivasankar, N., Parajuli, R. & Keets, K. A. Reducing carbon dioxide to products. U.S. Pat. No. 8,845,878 (2014).

Example 2B: Supplementary Information for Molecular Tuning of $CO_2$-to-Ethylene Conversion Methods Molecule Synthesis.

All solvents and reagents were obtained from commercial sources (Aldrich and Merck) and used as received, unless stated otherwise. $D_2O$ (D 99.5%), d-chloroform (D 99.8%) and $d_6$-DMSO (D 99.8%) were purchased from Cambridge Isotope Laboratories. The $^1H$ and $^{13}C$ NMR spectra were recorded on a Bruker 400 MHz instrument with a prodigy broadband cryoprobe. Shifts were reported relative to the residual solvent peak.

The $^1H$ and $^{13}C$ NMR spectra of all the reported salts and their corresponding precursors were in agreement with the reported literature[1-4]. Molecules 7, 8, 9, 10 and 11 are new and were fully characterized by multinuclear NMR spectroscopy. All the salts were recrystallized at least one time from MeOH/Ether (1:5) prior to use for electrochemical experiments.

In a typical procedure for the synthesis of aryl-pyridinium chloride salts[1,2], Zincke salt [1-(2,4-dinitrophenyl)-pyridinium chloride] (2.0 mmol, 1 equiv.), para-substituted aniline (4.0 mmol, 2 equiv.), were dissolved in EtOH/$H_2O$ (60/40, 10 mL) and charged into a microwave vial (40 mL) equipped with a magnetic stir bar. The vial was sealed, and the reaction was performed under microwaves at 130° C. for 35 min. After reaction, the mixture was concentrated under vacuum. The red solid was purified by flush column chromatography (silica; MeCN to MeOH). Yield: 0.35 g (62%).

Scheme 1. Synthesis aryliodonium triflate salts.

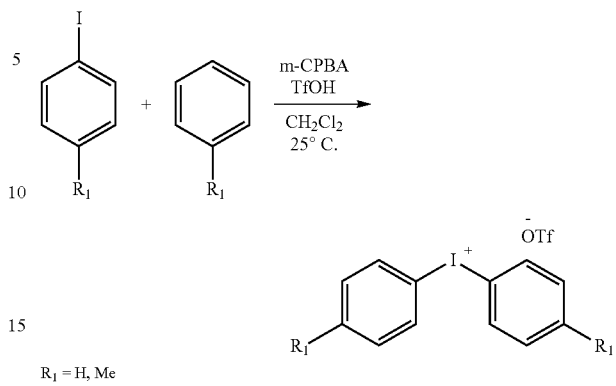

$R_1$ = H, Me

As shown in Scheme 1, in a typical procedure for the synthesis of aryliodonium triflate salts[5] for $R_1$=H or Me, the para-iodoaryl precursor (10 g, 1 equiv.), the corresponding arene (R=H: benzene; R=Me: toluene, 1.1 equiv.) and m-CPBA (70% active oxidant, 1.1 equiv.) were dissolved in DCM (100 mL) in a round bottom flask equipped with a magnetic stir bar. TfOH (2.1 equiv.) was added dropwise at 0° C. yielding a yellow solution. A precipitate was formed upon stirring the reaction for 4 h, at 25° C. The precipitate was filtered off and ether was added to the filtrate. The desired product crashed out as a white powder from the solution and was collected by filtration. The white powder was washed with ether (5×20 mL) and dried under vacuum. Yield: R=H, 76% (16 g, 37 mmol); R=Me, 85% (18 g, 40 mmol).

Scheme 2. Synthesis of aryl-pyridinium triflate salts.

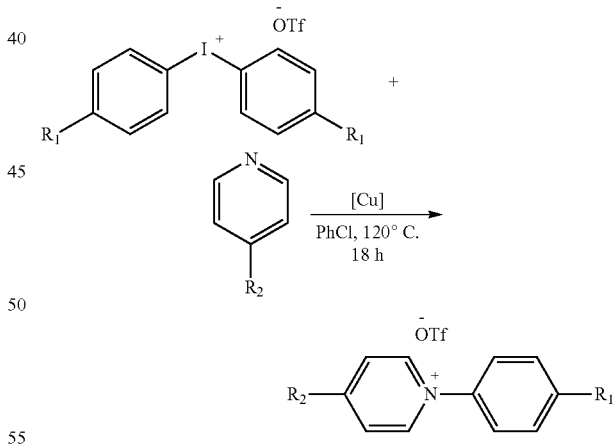

As shown in Scheme 2, in a typical procedure for the synthesis of aryl-pyridinium triflate salts[2], para-substituted diaryliodonium triflate salt (2 g, 1 equiv.), Cu(stearate)$_2$ and para-substituted pyridine were suspended in PhCl under $N_2$ in a flame dried round bottom flask charged with a magnetic stir bar. The mixture was heated at 110° C. for 16 h. The solution was cooled down to ambient temperature before the addition of diethylether (10 mL). The precipitate formed was isolated by filtration and was washed with diethylether (3×5 mL), acetone (3×5 mL). The final product was finally dried under vacuum. Yield: ~85%.

Molecule 7: $^1$H NMR (400 MHz, d$_6$-DMSO) δ(ppm) 9.05 (d, $^2J_{H-H}$=7.2 Hz, 2H), 8.06 (d, $^2J_{H-H}$=7.2 Hz, 2H), 7.68 (d, $^2J_{H-H}$=8.3 Hz, 2H), 7.51 (d, $^2J_{H-H}$=8.3 Hz, 2H), 2.68 (s, 3H), 2.42 (s, 3H). $^{13}$C{$^1$H} NMR (101 MHz, DMSO) δ(ppm): 160.6 (s), 143.7 (s), 141.6 (s), 140.5 (s), 130.1 (s), 128.8 (s), 124.4 (s), 21.9 (s), 21.0 (s).

Molecule 8: $^1$H NMR (400 MHz, D$_2$O) δ(ppm): 9.55 (d, $^2J_{H-H}$=7.7 Hz, 2H), 8.70 (d, $^2J_{H-H}$=7.7 Hz, 2H), 7.76 (d, $^2J_{H-H}$=8.7 Hz, 2H), 7.55 (d, $^2J_{H-H}$=8.7 Hz, 2H), 2.45 (s, 3H). $^{13}$C{$^1$H} NMR (101 MHz, D$_2$O) δ(ppm): 147.3 (s), 143.7 (q, $^3J_{C-F}$=36.7 Hz), 142.8 (s), 140.5 (s), 131.0 (s), 125.5 (s), 124.8 (s), 120.4 (q, $^1J_{C-F}$=107.7 Hz), 21.0 (s).

Molecule 9: $^1$H NMR (400 MHz, D$_2$O) δ(ppm): 8.87 (d, $^2J_{H-H}$=6.3 Hz, 2H), 8.18 (d, $^2J_{H-H}$=6.3 Hz, 2H), 7.52 (q, $^2J_{H-H}$=8.4 Hz, 2H), 2.44 (s, 3H), 1.43 (s, 9H). $^{13}$C{$^1$H} NMR (101 MHz, D$_2$O) δ(ppm): 172.4 (s), 143.1 (s), 142.2 (s), 139.9 (s), 130.8 (s), 125.2 (s), 123.5 (s), 36.1 (s), 29.0 (s), 20.2 (s).

Molecule 10: $^1$H NMR (400 MHz, d$_6$-DMSO) δ(ppm): 8.98 (d, $^2J_{H-H}$=7.5 Hz, 2H), 7.68 (d, $^2J_{H-H}$=7.5 Hz, 2H), 7.63 (d, $^2J_{H-H}$=8.5 Hz, 2H), 7.48 (d, $^2J_{H-H}$=8.6 Hz, 2H), 4.15 (s, 3H), 2.41 (s, 3H). $^{13}$C{$^1$H} NMR (101 MHz, d$_6$-DMSO) δ(ppm): 171.7 (s), 146.1 (s), 141.1 (s), 140.1 (s), 130.9 (s), 124.3 (s), 113.8 (s), 58.7 (s), 20.9 (s).

Molecule 11: $^1$H NMR (400 MHz, D$_2$O) δ(ppm): 8.13 (d, $^2J_{H-H}$=8.0 Hz, 2H), 7.37 (q, $^2J_{H-H}$=6.4 Hz, 4H), 6.94 (d, $^2J_{H-H}$=8.0 Hz, 2H), 3.22 (s, 6H), 2.37 (s, 3H). $^{13}$C{$^1$H} NMR (101 MHz, D$_2$O) δ(ppm): 156.3 (s), 140.5 (s), 140.1 (s), 139.5 (s), 130.5 (s), 122.6 (s), 107.6 (s), 39.5 (s), 20.0 (s).

N,N'-(1,4-phenylene)bispyridinium (12) was synthesized from slightly modified literature procedures (Scheme 3)[4]:

Scheme 3. Synthesis of N,N'-(1,4-phenylene)bispyridinium.

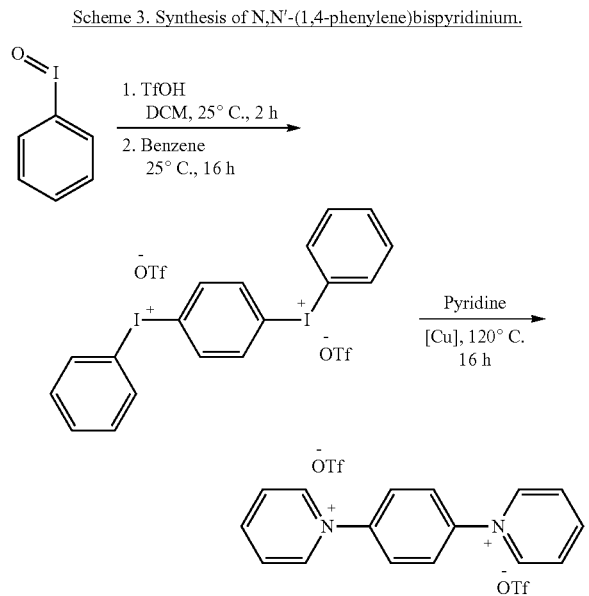

Iodosobenzene (5 g, 23 mmol, 1 equiv.) was suspended in DCM (50 mL) in a round bottom flask charged with a magnetic stir bar. TfOH (4 mL, 46 mmol, 2 equiv.) was added dropwise yielding an orange solution. After 4 h of stirring at 25° C., benzene (2 mL, 23 mmol, 1 equiv.) was added. The reaction was stirred for 2 h during which a precipitate was formed. The precipitate was collected by filtration to give a sticky solid. The product was rinsed abundantly with DCM (5×20 mL) and diethylether (3×10 mL) to afford a white solid which was dried under vacuum. Yield: 34% (6.4 g, 8.14 mmol).

(Para-phenylene)bis(aryliodonium) ditriflate (6 g, 8 mmol, 1 equiv.), and Cu(stearate)$_2$ (150 mg, 0.24 mmol, 0.03 equiv.) were dissolved in anhydrous pyridine (25 mL) in a flame dried round bottom flask charged with a magnetic stir bar under N$_2$. The brown solution was heated to reflux for 16 h during which a precipitate was formed. The precipitate was isolated by filtration after cooling down the reaction to ambient temperature. The product was washed with ether (3×5 mL) to afford a white solid and dried under vacuum. Yield: 37% (1.6 g, 3 mmol). Spectroscopic characterization was in agreement with the reported data[4].

Scheme 4. Synthesis of 1,1'-ditolyl-2.2'-dihydro-4.4'-diphenyl-2.2'-bipyridine.

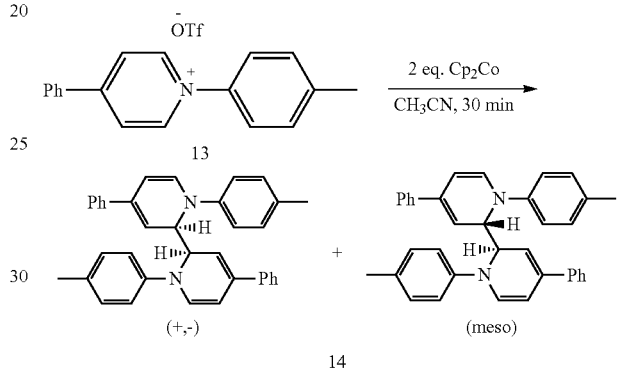

As shown in Scheme 4, in a typical procedure for the synthesis of 1,1'-ditolyl-2.2'-dihydro-4.4'-diphenyl-2.2'-bipyridine (14), a solution of bis(cyclopentadienyl)cobalt(II) (107.4 mg, 0.57 mmol) in CH$_3$CN (3 mL) was added to a solution of compound 1-(p-Me)C$_6$H$_4$-4-phenylpyridinium chloride (13, 80 mg, 0.28 mmol) in CH$_3$CN (2 mL), in a nitrogen glovebox. The homogenous mixture was stirred for 30 min whereafter the solvent was removed under reduced pressure to yield a dark blue solid. The solid was washed with dimethoxyethane (5×5 mL) and the yellow crude product (70 mg) was extracted with CH$_2$C$_{12}$. Single crystals amenable to X-ray diffraction studies can be grown from diffusion of Et$_2$O into a CH$_2$Cl$_2$ solution. Yield. 35 mg (51%). $^1$H NMR (300 MHz, CD$_2$Cl$_2$, 25° C.): δ=2.24 (s, 6H), 5.20 (m, 2H), 5.54 (m, 1H), 5.66 (m, 2H), 5.89 (t, 2H), 6.66 (d, 2H), 6.84 (d, 1H), 6.98 (m, 7H), 7.27-7.40 (m, 6H), 7.53 (d, 3H). $^{13}$C NMR (101 MHz, CD$_2$Cl$_2$) δ 144.26, 144.16, 139.82, 139.75, 136.44, 136.12, 131.39, 131.31, 130.68, 130.34, 129.96, 129.82, 128.80, 128.64, 127.79, 127.64, 126.47, 126.38, 117.48, 117.16, 111.93, 109.71, 105.21, 104.81, 56.98, 56.37, 20.58. HRMS (TOF-MS): calcd. for C$_{36}$H$_{31}$N$_2$: 491.2465 [M-H]$^+$; found: 491.2487.

Bader charge analysis and density functional theory calculations. The Bader charge was calculated using the Bader Charge Analysis script written by Henkelman and co-workers[6]. All the DFT calculations in this work were carried out with a periodic slab model using the Vienna ab initio simulation program (VASP)[7-16]. The generalized gradient approximation (GGA) was used with the Perdew-Burke-Ernzerhof (PBE) exchange-correlation functional[11]. The projector-augmented wave (PAW) method[12,13] was utilized to describe the electron-ion interactions, and the cut-off energy for the plane-wave basis set was 450 eV. The D3 correction method by Grimme et al[14] was employed to illustrate the long-range dispersion interactions between the organic molecule, water, and Cu surface. Brillouin zone integration was accomplished using 1×1×1 and 2×2×1 Monkhorst-Pack k-point mesh for organic molecule only and systems with surfaces.

All the adsorption geometries were optimized using a force-based conjugate gradient algorithm. For the modelling of Cu, the crystal structure was optimized, and the equilibrium lattice constants were found to be $a_{Cu}$=3.631 Å. For Cu (111), a 4-layer p (6×6) super cell model with 2 upper layers relaxed and 2 lower layers fixed was used. 15 Å vacuum layer was added to all the slab models. The organic molecules are all calculated in 20 Å×20 Å×20 Å unit cell to avoid the interaction between the nearby molecules. The reaction mechanism proposed by Goddard and co-workers[15] was used to calculate the entire reaction pathway from $CO_2$ to $C_2H_4$. One charged water layer was put on the surface to consider the solvent effect.

Materials characterization. Scanning electron microscopy (SEM) was performed using a Hitachi S-5200. Atomic force microscopy (AFM) measurements were conducted with an Asylum Research Cypher operating in tapping mode. X-ray photoelectron spectroscopy (XPS) measurements were carried out on PHI 5700 ESCA System using Al Kα X-ray radiation (1486.6 eV) for excitation. The powder X-ray diffraction patterns were recorded on Bruker D8 using Cu-Kα radiation (λ=0.15406 nm). Operando hard X-ray absorption spectroscopy (hXAS) measurements were performed at the 9BM beam line of the Advanced Photon Source Advanced Photon Source (APS) located in the Argonne National Laboratory (Lemont, Ill.). The X-band (9.88 GHz) continuous-wave (CW) electron paramagnetic resonance (EPR) spectra were recorded on a Bruker (Billerica, Mass.) EleXsys E500 spectrometer which is equipped with a super-high Q resonator (ER4122SHQE). In situ Raman measurements were carried out using a Renishaw inVia Raman Microscope in a modified liquid-electrolyte flow cell and a water immersion objective (63×) with a 785 nm laser, using a 5 s integration and averaging 20 scans per region. The spectra were recorded and processed using the Renishaw WiRE (version 4.4) software. A Ag/AgCl electrode was used as the reference electrode and a Pt wire was used as the counter electrode in all measurements. A graphite rod and 1 M $KHCO_3$ prepared by bubbling $CO_2$ to 0.5 M $K_2CO_3$ (99.99%) solution were additionally utilized to rule out the possible influence of electrodeposited metals from either Pt electrode or residual metals in $KHCO_3$[16].

Electrode Preparation.

The polytetrafluoroethylene (PTFE) electrode was prepared by sputtering 300 nm Cu onto a piece of PTFE membrane (pore size of 450 nm, with polypropylene support on backside) using a pure Cu target (99.99%) at a sputtering rate of 1 Å s$^{-1}$. The tetrahydro-bipyridine film was electrodeposited onto the PTFE electrode in 0.1 M $KHCO_3$ solution containing 10 mM corresponding additive in a three-electrode setup with PTFE electrode, Ag/AgCl electrode (3 M KCl) and Pt foil being working, reference and counter electrodes, respectively. A constant current of 0.75 mA cm$^{-2}$ was applied on the PTFE electrode (~2×2 cm$^2$ for liquid-electrolyte flow cell, ~3×3 cm$^2$ for MEA) by an Autolab PGSTAT204 (Metrohm-Autolab) for 120 s (the optimum duration. For molecule 12, 60 s). The additives dimerized through the reactions in FIG. 1A for 1-11 and in FIG. 3A for 12 in the main text. After electrodeposition, the electrode was rinsed with DI water, dried by a flow of $N_2$, and kept in dry environment for further use. For AFM measurement, the additive was electrodeposited on a silicon wafer ((100), 0.001-0.005 ohm cm$^{-1}$, University Wafer) using the same protocol. In the cases that Cu foil or Cu wire (diameter: 0.202 mm) were used, the additive was electrodeposited using the same protocol. The Cu foil electrodes were electro-polished by applying a constant voltage of +3 V (vs. Cu foil) for 900 seconds in concentrated $H_3PO_4$ and rinsed with Milli-Q water prior to use.

$CO_2RR$ and Product Analysis.

The $CO_2RR$ measurements were conducted in a gas-tight liquid-electrolyte flow cell or an MEA. The liquid-electrolyte flow cell consists of three compartments: gas chamber, catholyte chamber, and anolyte chamber. The PTFE electrode (with tetrahydro-bipyridine film functionalization) was sandwiched between $CO_2$ gas chamber and catholyte chamber with an exposure area of 1 cm$^2$. Catholyte and anolyte chambers were separated by an anion-exchange membrane (Fumapem FAA-3-PK-130). An Autolab PGSTAT204 in a potentiostatic mode was used as electrochemical workstation. The PTFE electrode, Ag/AgCl electrode (3 M KCl), and Ni foam (geometric area ~2 cm$^2$) were employed as working, reference and counter electrodes, respectively. The applied potentials were converted to the reversible hydrogen electrode (RHE) scale with iR correction through the following equation:

$$E_{RHE}=E_{vs\ Ag/AgCl}+0.059\times pH+0.210+iR$$

where i is the current at each applied potential and R (10.4 ohm) is the equivalent series resistance measured via electrochemical impedance spectroscopy (EIS) in the frequency range of 10$^5$-0.1 Hz with an amplitude of 10 mV.

Aqueous $KHCO_3$ electrolyte (1 M, saturated with $CO_2$) was used as both catholyte and anolyte and was circulated through the flow cell using peristaltic pumps with a silicone Shore A50 tubing. The electrolyte was bubbled with $CO_2$ during the entire electrolysis process. The electrolyte flow rate was kept at 10 mL min$^{-1}$. The flow rate of the $CO_2$ gas flowing into the gas chamber was kept at 50 standard cubic centimeters per minute (sccm) by a digital gas flow controller.

The MEA is a complete 5 cm$^2$ $CO_2$ electrolyzer (Dioxide Materials) which includes a titanium anode flow field, 904 L Stainless Steel cathode flow field and associated nuts, bolts and insulating kit. The PTFE electrode was attached on the cathode by copper tape at the edge of the electrode to electrically connect it with the cathode. The Cu side of the PTFE electrode faced outside. The copper tape was protected by Kapton tapes to avoid electrical contact with membranes or electrolytes. A Sustainion® membrane (Dioxide Materials) was activated in 1 M aqueous KOH solution for 24 hours, washed with water and used as the anion-exchange membrane. The anode consisted of iridium oxide supported on titanium mesh ($IrO_x$/Ti mesh) was prepared by a dip coating and thermal decomposition method[17]. A Ti mesh was dip coated into an isopropanol solution containing (10%, v/v) concentrated HCl and $IrCl_3 \cdot xH_2O$ (3 mg mL$^{-1}$), dried at 100° C. for 10 minutes and calcinated at 500° C. for 10 minutes in air. The procedure was repeated for a few times to increase the loading of iridium. The MEA was assembled in a way as illustrated in FIGS. 31 and 32A-32C. An Autolab PGSTAT204 in a potentiostatic mode with a current booster (10 A) was used as electrochemical workstation to apply voltage to the cathode and anode. No iR compensation was applied. Aqueous $KHCO_3$ electrolyte (0.1 M) was used as the anolyte and was circulated using a peristaltic pump with a robust soft PVC tubing (McMaster-Carr, 5231k134). The electrolyte flow rate was kept at 10 mL min$^{-1}$. The flow rate of the CO$_2$ gas flowing into the gas chamber was kept at 80 sccm by a digital gas flow controller. CO$_2$ was then flowed through a humidifier (⅞ full of Milli-Q water, room temperature) prior to the MEA. The full-cell voltage was gradually increased from 3 V to 3.65 V and then kept constant over the electrolysis course.

The gaseous products were analyzed by gas chromatography (PerkinElmer Clarus 600) equipped with a thermal conductivity detector (TCD) and a flame ionization detector (FID). High purity Argon (99.99%) was used as the carrier. Liquid products were quantified by $^1$H NMR spectroscopy (600 MHz Agilent DD2 NMR Spectrometer) using dimethyl sulfoxide (DMSO) as the internal standard.

Local Species Concentration Modelling.

The local concentrations of $CO_{2,aq}$, $CO_3^{2-}$, $HCO_3^-$, and $OH^-$ in an electrolyte solution under CO$_2$RR conditions were modelled in COMSOL 5.3a (COMSOL Multiphysics, Stockholm, Sweden) using the Transport of Dilute Species physics in a one-dimensional domain. This model is based on previous paper[18] and accounts for $CO_{2,aq}$, $CO_3^{2-}$, $HCO_3^-$, and $OH^-$ evolution as $CO_{2,aq}$ is reduced via electrocatalysis in either K$_2$CO$_3$ or KHCO$_3$. A time-dependent study is performed to simulate species evolution away from the interface. At the left boundary, the gas-catalyst-electrolyte interface, the $CO_{2,aq}$ concentration is specified according to Henry's Law and the Sechenov effect, with zero flux imposed for $CO_3^{2-}$, $HCO_3^-$, and $OH^-$. The right boundary concentrations are fixed at the bulk values for the given electrolyte. To model CO$_2$RR, a 300 nm catalyst layer is imposed over which the $CO_{2,aq}$ is reduced and $OH^-$ is produced according to the reactions:

$$R_{CO_2} = \frac{[CO_2]_{aq}}{[CO_2]_{aq,0}} \frac{j}{F} \frac{\epsilon}{L_{cat}} \sum \frac{FE_{CO_2RR}}{ne_{CO_2RR}}$$

$$R_{OH} = \frac{j}{F} \frac{\epsilon}{L_{cat}}$$

where $[CO_2]_{aq,0}$ is the equilibrium saturation $CO_{2,aq}$ concentration in the bulk electrolyte, j is the current density applied, F is Faraday's constant, E is the catalyst porosity (0.6), and $L_{cat}$ is the size of the catalyst layer, $FE_{CO_2RR}$ is the Faradaic efficiency of a given product of CO$_2$ reduction (based on experimental observations), and $ne_{CO_2RR}$ are the number of electrons required for the reduction reaction. The diffusion-reaction equations are found in the previous works[18,19] with diffusion constants of $D_{CO_2}=1.91 \cdot 10^{-9}$ m$^2$s$^{-1}$, $D_{OH^-}=5.27 \cdot 10^{-9}$ m$^2$s$^{-1}$, $D_{HCO_3^-}=1.19 \cdot 10^{-9}$ m$^2$s$^{-1}$, and $D_{CO_3^{2-}}=0.923 \cdot 10^{-9}$ m$^2$s$^{-1}$ (ref[20]).

XAS Fitting.

An IFEFFIT package was used to analyze the hXAS spectra[21,22]. Standard data-processing including energy calibration and spectral normalization of the raw spectra was performed using Athena software. To extract the Cu bonding information, a Fourier transform was applied to convert the hXAS spectra from an energy space to a radial distance space. Then, a standard fitting analysis of the first shell between 1.6 and 3.0 Å was carried out using Artemis software. The phase and amplitude functions of Cu—Cu was calculated with FEFF; S0/σ2 values of 0.89/0.00825 for Cu was determined from Cu foil, which was then applied to the Cu hXAS fitting.

Figure 7:
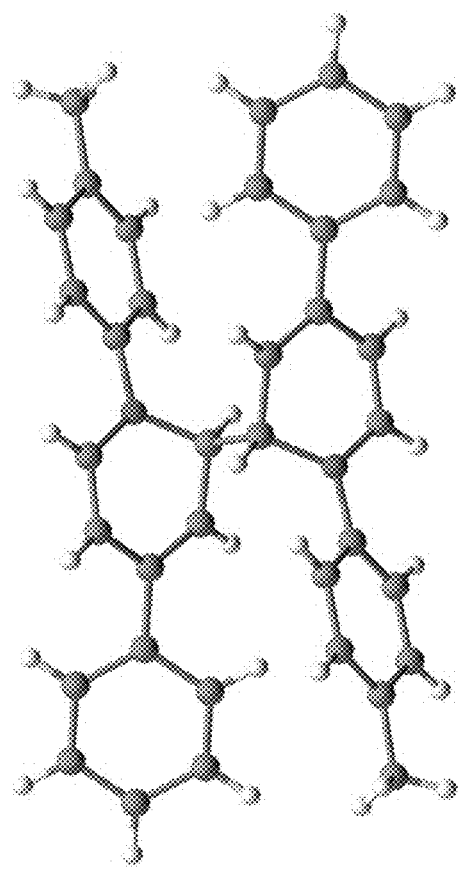
FIG. 7. Single-crystal X-ray structure of compound 14 (1,1'-ditolyl-2.2'-dihydro-4.4'-diphenyl-2.2'-bipyridine). Carbon atoms are depicted in gray, nitrogen in blue, and hydrogen in white.
Figure 8A:
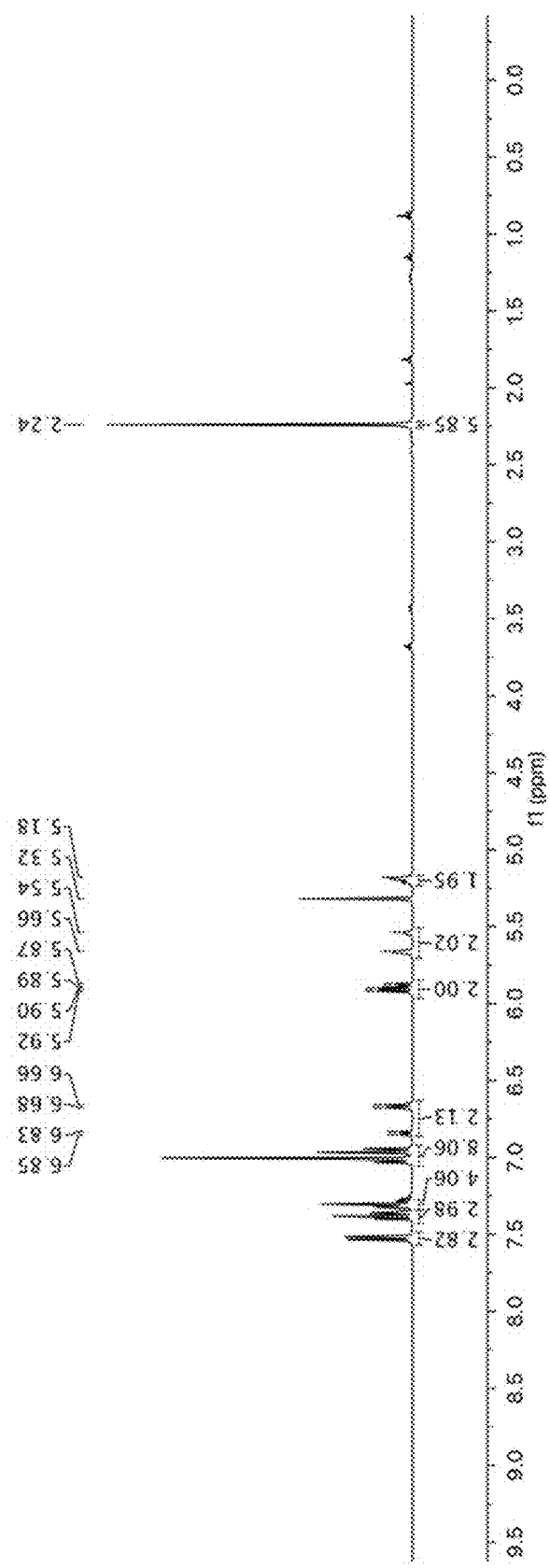
FIG. 8A. $^1$H NMR and COSY (FIG. 8B) spectra of compound 14 (1,1'-ditolyl-2.2'-dihydro-4.4'-diphenyl-2.2'-bipyridine). The spectra were recorded in $CD_2Cl_2$ (298 K).
Figure 8B:
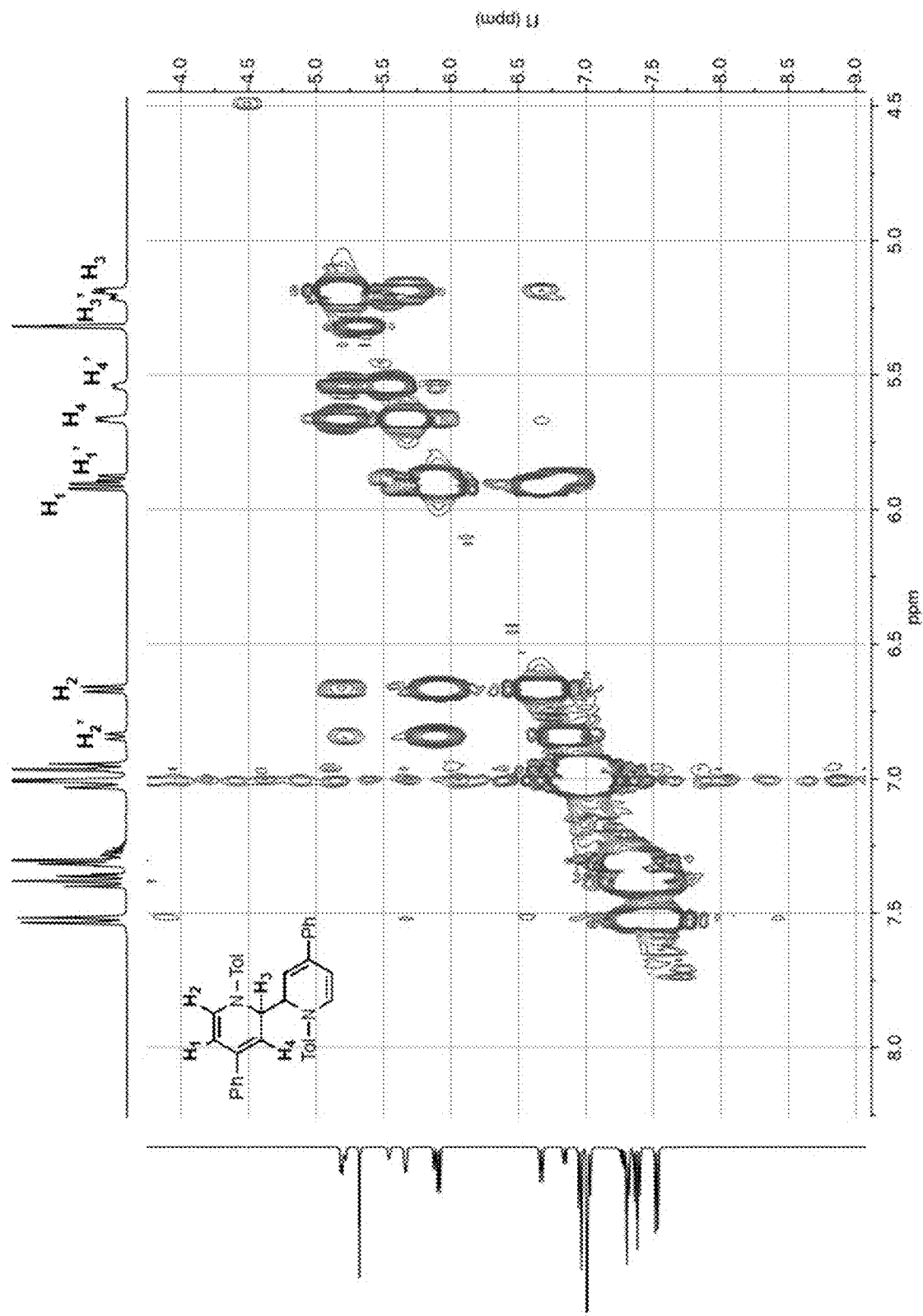
Figure 9C:
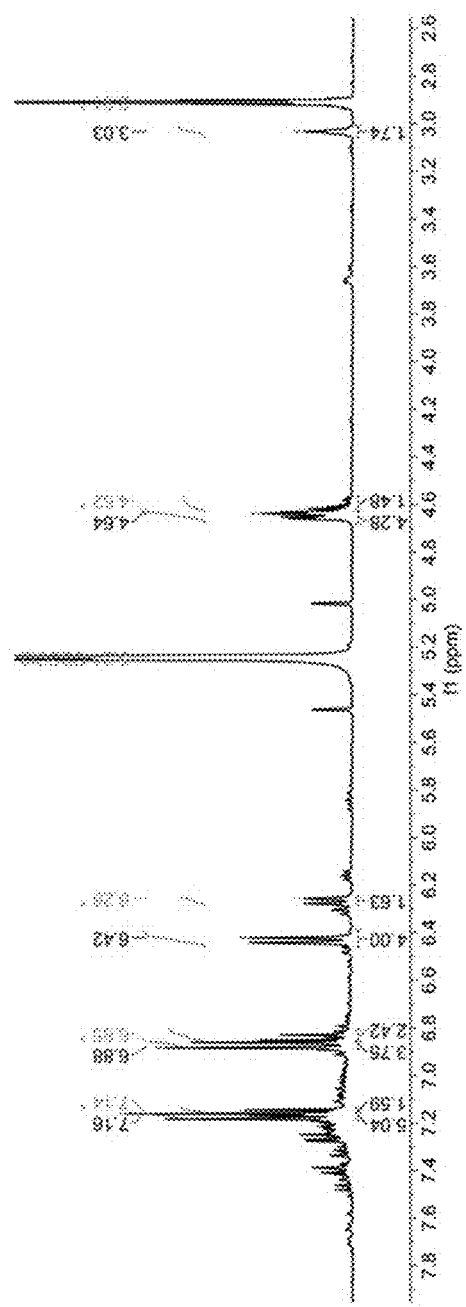
Figure 9C:
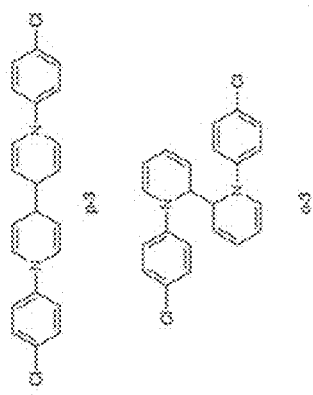
Figure 9D:
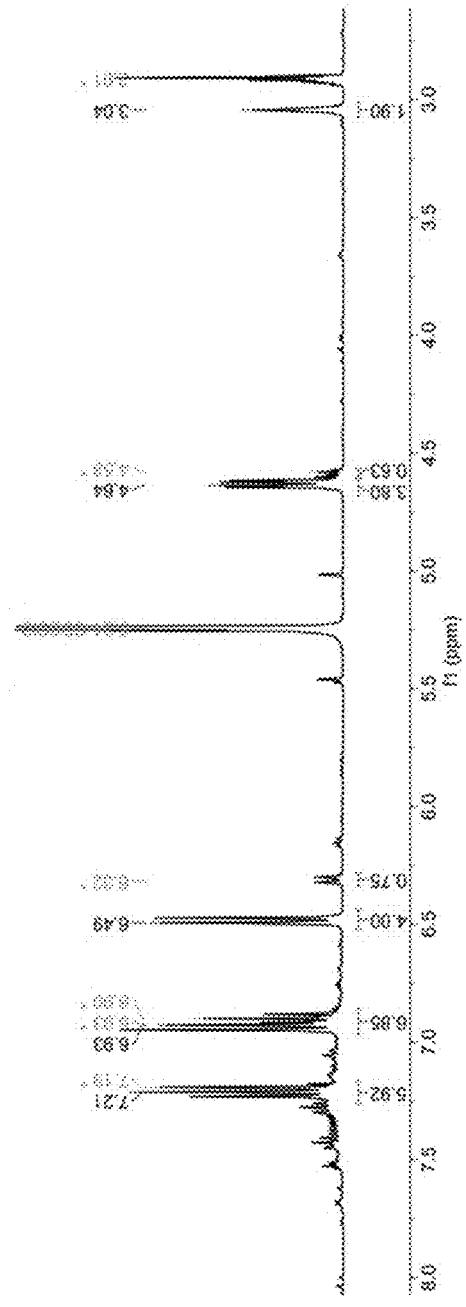
Figure 9D:
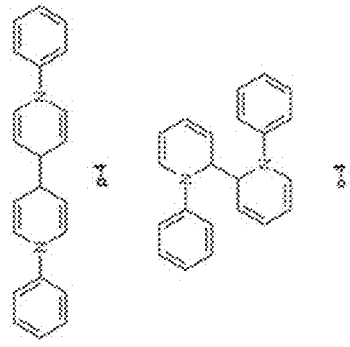
Figure 9E:
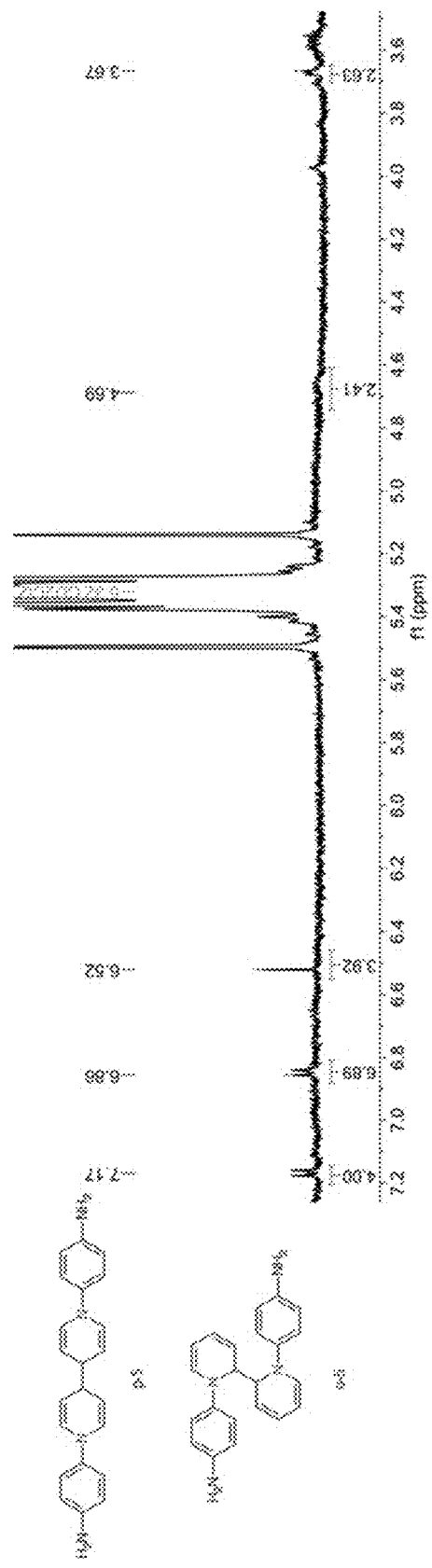
Figure 9F:
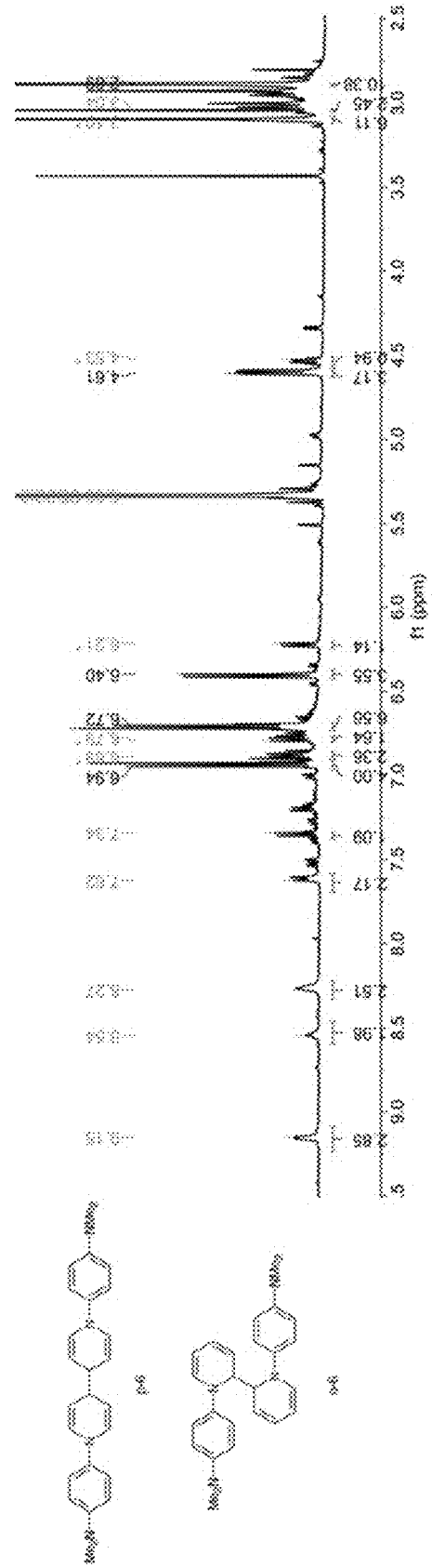
Figure 9G:
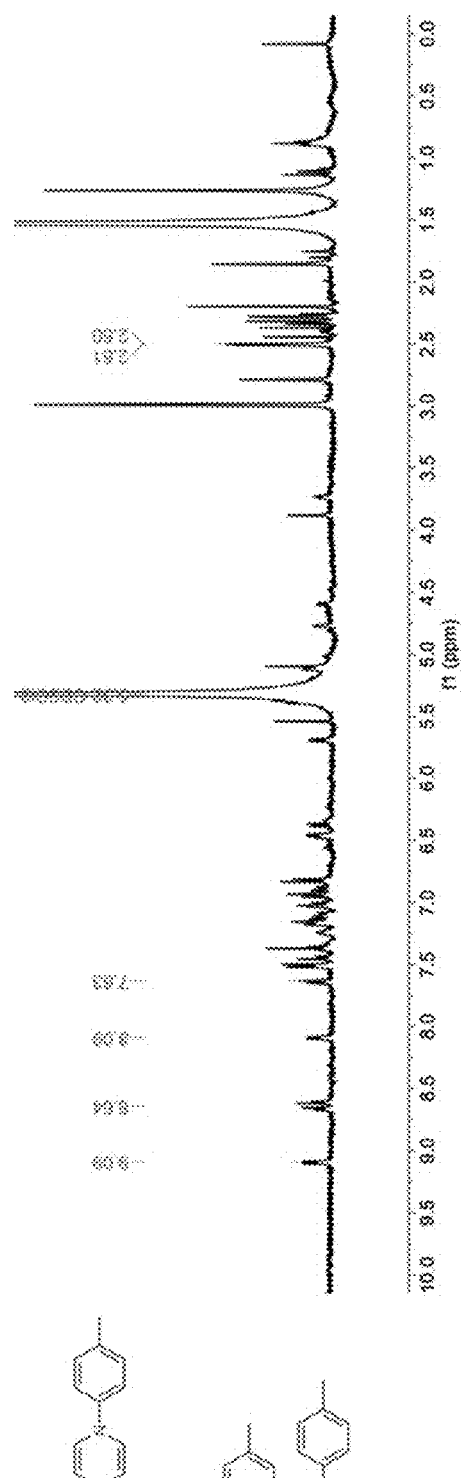
Figure 9H:
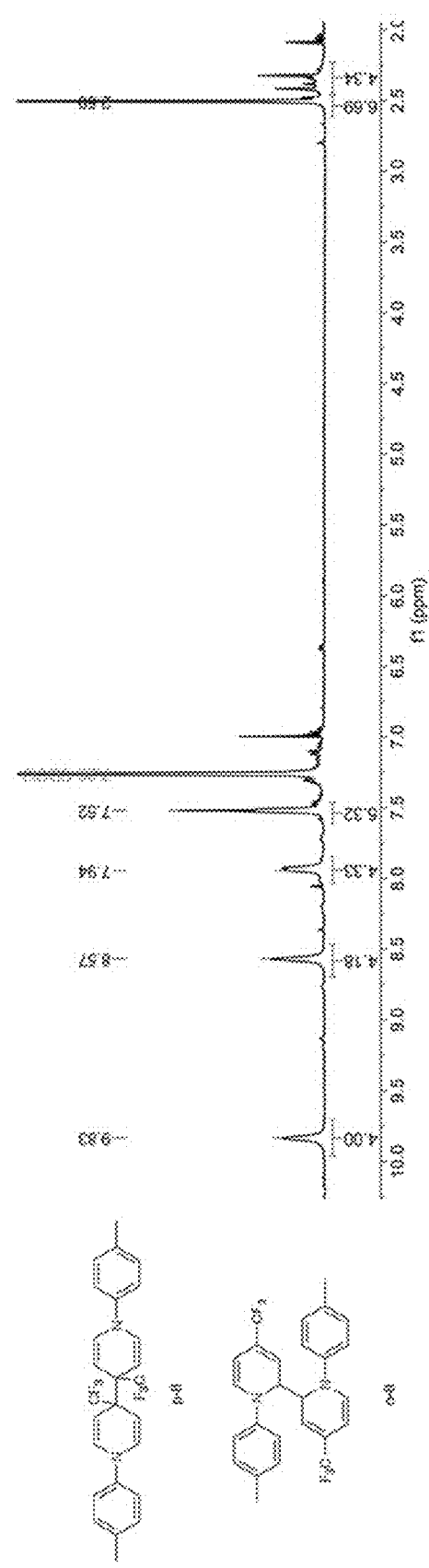
Figure 9K:
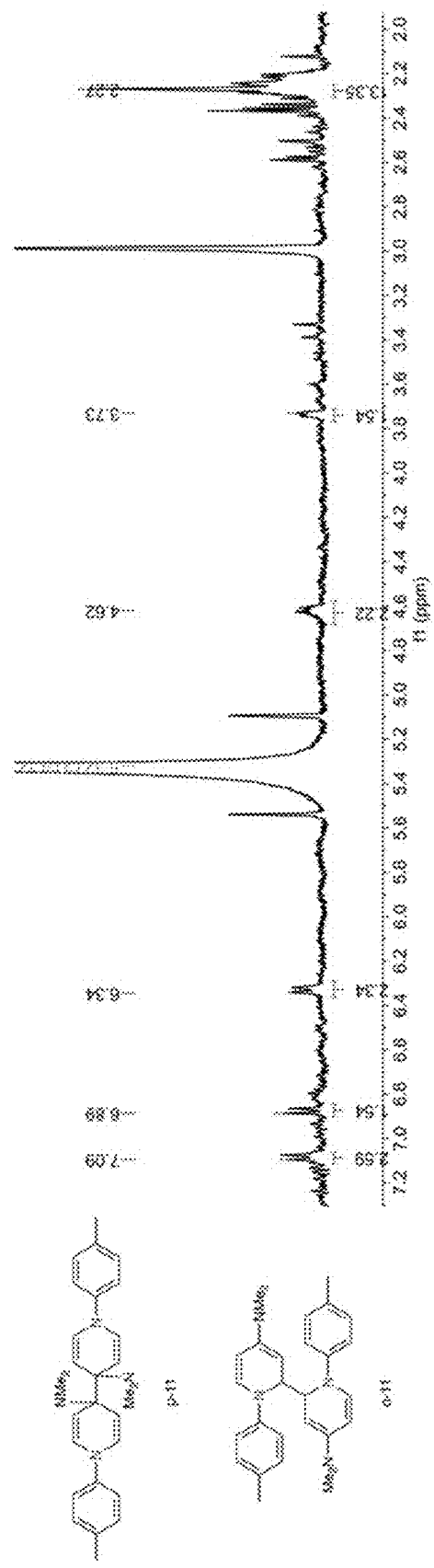
Figure 9L:
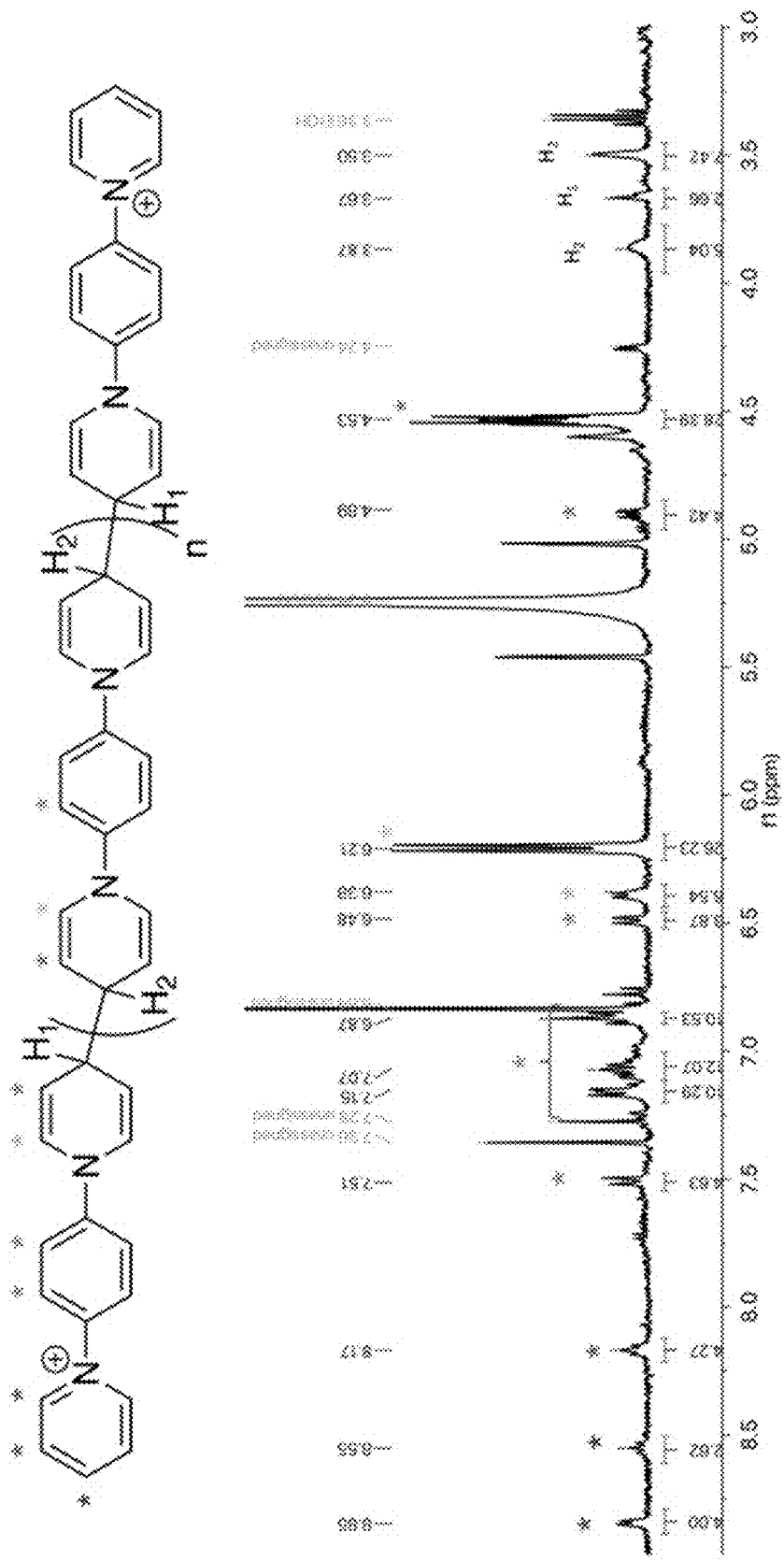
Figure 9M:
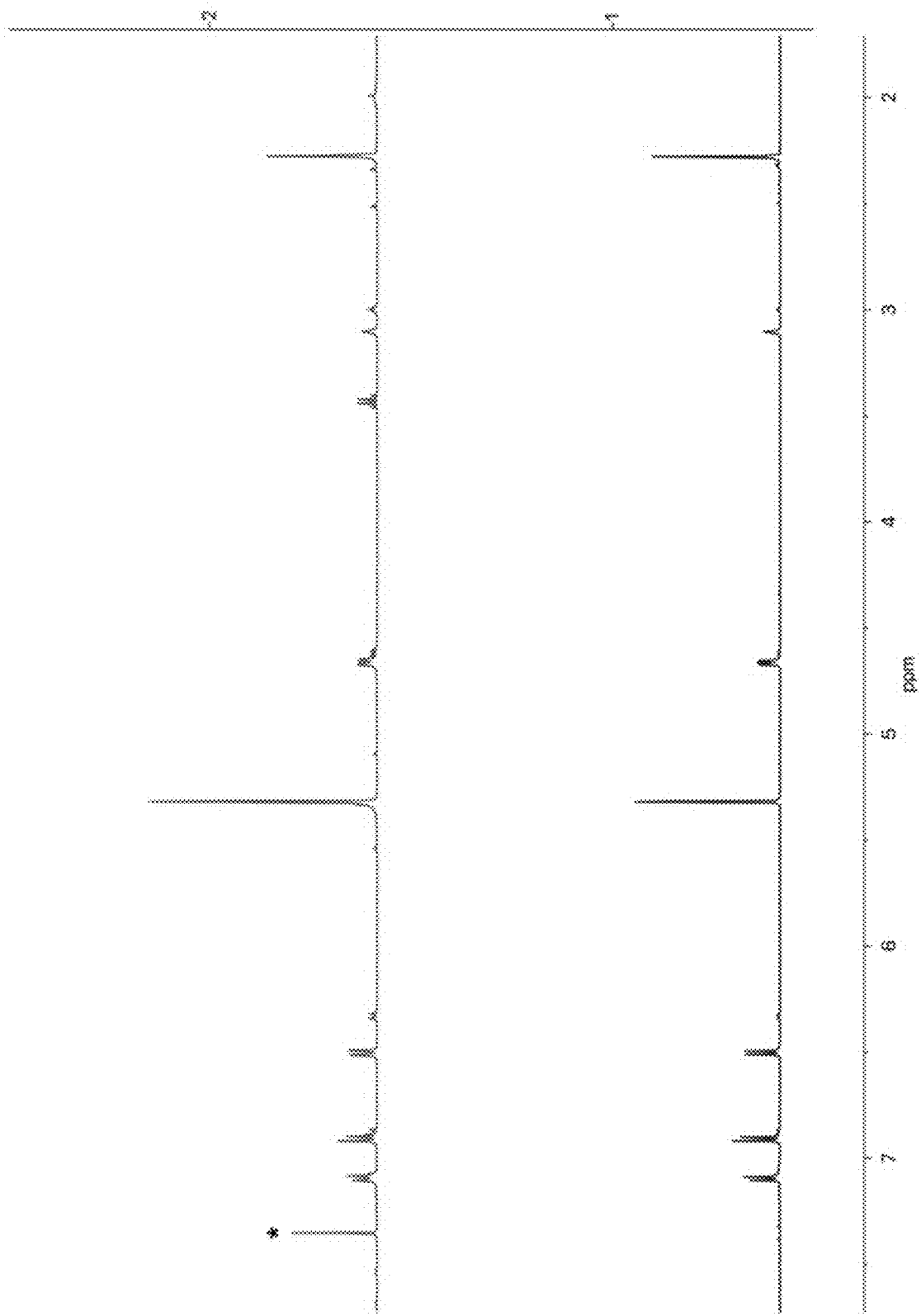
Figure 10L:
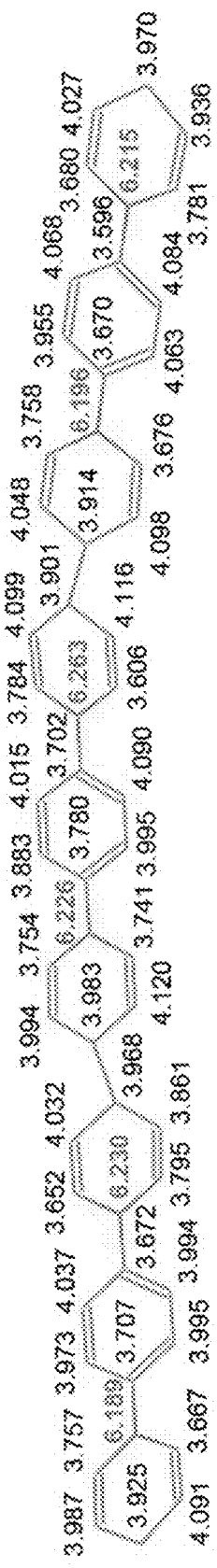

Example 2B Note 1. Quantification of the Para,Para:Ortho,Ortho Ratios of the Organic N-Aryl-Substituted Tetrahydro-Bipyridines An example of a para,para-coupled tetrahydro-bipyridine has been reported and spetroscopically characterized previously[1]. For the additives used in this study, coupling in both ortho and para positions is possible, potentially resulting in multiple constitutional isomers and stereoisomers. To firmly establish that an ortho,ortho-coupling mechanism is possible during the dimerization of the pyridinium additives, a chemical reduction experiment of a para-substituted pyridinium model compound (13) was carried out. Since the para position of such an additive is blocked by a phenyl group, a preferential ortho,ortho-coupled tetrahydro-bipyridine (14) was formed, as confirmed by a single-crystal X-ray diffraction study (FIG. 7). The resulting $^1$H NMR spectrum (FIGS. 8A-8B) is expectedly complicated due to the generation of a mixture of stereoisomers.

The $^1$H NMR spectra (FIGS. 9A-9M) of the film deposited from 1-11 at the surface of a Cu foil electrode suggest that all the films are principally made of two components, with the spectra being complicated by the presence of constitutional isomers and stereoisomers resulting from ortho,ortho-coupling, ortho,para-coupling, and minor organic byproducts. In most cases, the major component corresponds to the para,para-coupled product, with the minor component to the ortho,ortho-coupled product (labeled in blue or in grey with a *, respectively). The percentage of para,para-tetrahydro-bipyridine in the mixture could be quantified in most cases from the specific multiplicity of the resonances between 6 and 6.5 ppm (doublet vs. doublet of triplets, respectively). In both cases these protons have been assigned to the ortho-pyridinium ring, corresponding to two and one proton, respectively. The percentage was quantified from the following equation:

$$Percentage_{para} = \frac{\text{integral (doublet/2)}}{\text{integral (doublet of triple) + integral (doublet/2)}} \times 100\%$$

In some cases, some remaining unreacted pyridinium additive precursor are also present in the $^1$H NMR spectra and are labeled in grey (without a *). This is most likely because the film was not rinsed with sufficient water prior extraction. The $^1$H NMR spectra of the organic films from additives 2, 7, 9 and 10 could not be assigned due to the complexity of the spectra and the low amount of precipitate collected on the Cu electrode, and therefore the ratio could not be determined. The percentage was summarized below:

| Molecule | percentage para, para isomer in tetrahydro-bipyridines |
|---|---|
| 1 | 85% |
| 3 | 55% |
| 4 | 73% |
| 5 | 100% |
| 6 | 61% |
| 8 | 100% |
| 11 | 100% |

Example 2B Note 2|Influence of the N-Aryl-Substituted Tetrahydro-Bipyridines on Cu Electrodes As seen in the SEM images (FIGS. 11A-11B), the modification of the N-aryl-substituted tetrahydro-bipyridine dimerized from 1 did not change the morphology of Cu. The thickness of the as-formed film is about 10 nm (FIGS. 11C-11D). The modification also did not change the crystallinity of Cu substrate based on XRD characterization (FIG. 11E). Contact angle measurement on each tetrahydro-bipyridine-functionalized Cu electrode showed that the modification did not significantly affect the wettability of Cu surface. Further, no trend for the wettability of the electrode surface and ethylene selectivity (FIG. 11F) was found.

The influence of the N-aryl-substituted tetrahydro-bipyridine film on the local environment near the active Cu surface and transport properties of reactants and ions were further studied. The linear sweep voltammetry (LSV) curves of Cu and Cu-1 showed no difference at the normal hydrogen electrode (NHE) scale under either $N_2$ (FIG. 12A) or $CO_2$ (FIG. 12B) atmospheres. This indicates that the local pH near the Cu surface is similar in cases with or without the modification of the N-aryl-substituted tetrahydro-bipyridines, i.e., the as-formed films does not create a highly alkaline environment near the active Cu surface, since the water reduction reaction is pH-dependent at the NHE scale. This also indicates that the transport of water and $CO_2$ is not limited because a mass-transport limited current was not seen.

To further explore the transport of water through the N-aryl-substituted tetrahydro-bipyridine film, Cu-1 was electro-oxidized with $^{18}O$ labeled water ($H_2^{18}O$) or unlabeled water ($H_2^{18}O$) via the following equation:

The Raman spectrum shows a red shift on the as-formed $Cu_2^{18}O$ sample compared to that on the $Cu_2^{16}O$ sample (FIG. 12C), in agreement with the previous report[23]. This result confirms that water can penetrate the molecular coating layer to reach the Cu surface.

$OH^-$ adsorption was used to study whether the N-aryl-substituted tetrahydro-bipyridines affect the exposed crystal facets of Cu surface, where the $CO_2RR$ takes place (FIG. 12D). Three peaks were identified to associate with the $OH^-$ adsorption on Cu (100), Cu (110) and Cu (111)[24]. Their ratios on bare Cu and Cu-1 were quantified by integrating the charges of each peak. The values are 69:1.7:29 and 65:1.5:34, respectively. The similar ratios indicate that the deposited molecular layers do not change or selectively cover crystal orientations on Cu surfaces. Moreover, the $OH^-$ adsorption peaks on Cu and Cu-1 are at the same position, further confirming that pH near the Cu surface is the same with or without the modification of the tetrahydro-bipyridine dimerized from 1 because the $OH^-$ adsorption behavior is local pH-dependent[25].

To study a possible interaction between the terminal amine moieties in tetrahydro-bipyridines formed from 5, 6, and 11 with $CO_2$, we synthesized the corresponding dimeric species of the additives and they were exposed to isotopic labeled $^{13}CO_2$. Since additives 6 and 11 contain a more nucleophilic nitrogen atom (tertiary amine) compared to 5 (primary), we decided to investigate the reactivity of these two additives. Examination of the $^{13}C$ NMR spectra of the reaction mixture after exposure with $^{13}CO_2$ (FIGS. 13-14) rule out any involvement of the terminal amine moieties in the activation of $CO_2$ to form any carbamate species[26] (spectra do not show any intense resonances in the region of 160-180 ppm). This result suggests that these terminal amines do not interact with $CO_2$ molecules, which may affect the diffusion properties of $CO_2$ or provide additional binding sites for $CO_2$ or intermediates in the $CO_2RR$[27]. The result also suggests that it is safe to keep additive 5, 6 and 11 in the Bader charge analysis and the correlation in FIGS. 1A-1C in the main text is retained.

Example 2B Note 3. In Situ Raman Spectroscopic Measurements

Raman spectroscopy is able to identify species on a substrate with ultra-high sensitivity due to surface-enhanced Raman scattering (SERS)[29,30]. The SERS spectra were recorded at a range of applied potentials from the open circuit potential (OCP) to −0.75 V (FIG. 18). Three regions of interest were identified as relevant to surface adsorbed CO (*CO), the coupling of which has been considered a critical step in $CO_2RR$ to $C_{\geq 2}$ products[31-33]. The bands at 280 and 365 $cm^{-1}$ are associated with the frustrated rotational mode of CO and the Cu—CO stretch, respectively[34]. The asymmetric region at the range of 1900-2120 $cm^{-1}$ is attributed to the C≡O stretch of *CO[34,35]. This band is sensitive to the coordination of the *CO on the metal surface[35-37], which, in turn, may affect the activity and selectivity of the $CO_2RR$.

The in situ Raman spectra at the same applied potential, −0.72 V, on tetrahydro-bipyridine-modified Cu and pure Cu electrodes (FIGS. 19A-19M) was analyzed to assess the potential correlation among $CO_2RR$ selectivity, CO adsorption and the electron donating properties of the N-aryl-substituted tetrahydro-bipyridines. The C≡O stretch band was deconvolved into two bands: atop bound CO ($CO_{atop}$, >2000 $cm^{-1}$, peak at ~2071 $cm^{-1}$) and bridge bound CO ($CO_{bridge}$, 1900-2000 $cm^{-1}$, peak at ~1990 $cm^{-1}$)[35]. In atop, CO binds one Cu atom; in bridge, it binds two. The integrated areas of each band, which are proportional to the corresponding *CO coverage[36] was calculated to compare the relative population of these two kinds of Cu-bound CO.

Example 2B Note 4. $CO_2RR$ in MEA

The MEA device and associated chemical reactions are illustrated in FIGS. 31 and 32A-32C. A PTFE electrode with N-aryl-dihydropyridine-based oligomer modified Cu (Cu-12) and $IrO_x$/Ti mesh electrode were used as cathode and anode, respectively. A Sustainion® membrane was used as anion exchange membrane (AEM). The geometric area of flow field in cathode was 5 $cm^2$, of which 45% is gas channel while the rest 55% is land area (FIGS. 31 and 32A-32C). 0.1 M aqueous $KHCO_3$ was flowed through anode side as anolyte and recycled during the electrolysis course. Neutral media are advantageous in terms of $CO_2$ utilization compared to alkaline media: if alkaline electrolyte is recycled during $CO_2RR$, it becomes bicarbonate eventually, due to its reaction with excess $CO_2$; if a single pass scheme is adopted, $CO_2$ is continuously consumed by alkali. In both cases, the consumed $CO_2$ is not easily recoverable.

Electrolysis in MEA at a range of full-cell voltages was carried out using Cu and Cu-12 as cathodes, respectively (FIGS. 33A-33C). Similar to results in liquid-electrolyte flow cell, the functionalization of the oligomer improves the selectivity toward ethylene and this improvement comes from the decrease of FE toward CO.

The long-term stability measurement was carried at a full-cell voltage of 3.65 V. During the course of 190 hours, the current remained at ~600 mA and the average FE for ethylene was ~64%. The FEs of hydrogen and CO remain low. The pH of anolyte dropped from its initial value of 8.45 to around 7 after 20 hours, and remained at close to 7 over the whole electrolysis course (FIG. 34).

Several reactions take place during $CO_2RR$. At the cathode, $CO_2$ is reduced to ethylene via $$2CO_2 + 8H_2O + 12e^- \rightarrow C_2H_4 + 12OH^-$$

The locally generated $OH^-$ reacts with excess $CO_2$ via $$CO_2 + OH^- \rightarrow HCO_3^-$$

$$CO_2 + 2OH^- \rightarrow CO_3^{2-} + H_2O$$

The generated anions transport through the AEM to anolyte. At the anode, OER takes place via $$2H_2O \rightarrow O_2 + 4H^+ + 4e^-$$

The locally generated $H^+$ will react with $HCO_3^-$ and $CO_3^{2-}$ to form $CO_2$ via $$H^+ + HCO_3^- \rightarrow CO_2 + H_2O$$

$$2H^+ + CO_3^{2-} \rightarrow CO_2 + H_2O$$

On the basis of principles of mass conservation and charge balance, the consumed $CO_2$ at cathode by $OH^-$ is shuttled to the anode via $HCO_3^-$ and/or $CO_3^{2-}$ and released as $CO_2$ again, along with oxygen evolution, and the concentration of anolyte remains the same. The ratio of $CO_2$ to $O_2$ evolved from anolyte was quantified to be 69:31 by GC.

Since a large portion of $CO_2$ at anode was detected, the transport ions should not be $OH^-$ only. If the transport ions are bicarbonate, the ratio of $CO_2$ to $O_2$ at the anode side should be close to 4:1, on the basis of principles of mass conservation and charge balance; if the transport ions are carbonate, the ratio should be close to 2:1. According to GC result, the experimental $CO_2$:$O_2$ ratio is closer to 2:1. Therefore, the major species transporting through the membrane is carbonate while the minor species is bicarbonate. Further, the pH at the cathode/membrane interface should be about 12 based on the pKa of carbonate.

The dissolved $CO_2$ concentration is calculated to be 22 mM based on Henry law $$c = \frac{p}{p_0} \times c_0$$

where $p_0$ is 1 atm, $c_0$ is the solubility of $CO_2$ in 0.1 M $KHCO_3$ at 1 atm, room temperature (32 mM[42]) and p is partial pressure of $CO_2$ at anode side (0.69 atm based on GC result).

Then, based on the equilibrium of $CO_2/HCO_3^-/CO_3^{2-}$ (FIG. 35), we could read the pH of the species of $CO_2$: $HCO_3^-$ with a ratio of 22:100. The pH is 7.00. This value is very close the experimental result, indicating that our derived chemical relations are able to describe reactions during $CO_2RR$ in MEA.

We observed a decrease of ethylene FE and, at the same time, an increase of hydrogen FE after 190 hours (FIG. 36). To identify the possible reasons that account for this selectivity change, we characterized the cathode using XRD, XPS, SEM and energy-dispersive X-ray spectroscopic (EDS) elemental mapping (FIGS. 37A-37F). The XRD patterns of the post-electrolysis cathode are similar to those of the cathode before electrolysis, indicating that there was not significant crystalline reconstruction on a macro scale. XPS spectrum showed no iridium signal, suggesting that the increase of hydrogen FE was not caused by the deposition of iridium possibly leaching from the anode side. In the SEM image, we did see some fuzzy areas. The coupled EDS elemental analysis and mapping results indicate that these areas are potassium salts, which are likely to be $K_2CO_3$ based on above chemical equations and analysis. The formation of such salts is likely to be the reason for the selectivity degradation, which may block the diffusion pathway of $CO_2$ to the catalytic sites, decrease the local availability of $CO_2$, and thus increase competing hydrogen evolution reaction. We note that this is only one of the possible reasons. We also noticed liquid product crossover (FIG. 38). The influence of this crossover issue on the properties of the membrane, such as ion transport and mechanical robustness, and hence the selectivity of $CO_2RR$ products and stability of the device, warrants further study for practical applications.

TABLE 1

A summary of faradaic efficiency for all products on Cu-1 to Cu-11 at the optimum applied potential using 1M aqueous $KHCO_3$ (saturated with $CO_2$) as electrolyte. The data represent one standard deviation based on three independent samples.

| Electrode | Potential (V vs RHE) | Faradaic efficiency (%) | | | | | | | |
|---|---|---|---|---|---|---|---|---|---|
| | | $H_2$ | $HCOO^-$ | CO | $CH_4$ | $C_2H_4$ | $C_2H_5OH$ | $CH_3COO^-$ | $C_3H_7OH$ |
| Cu-1 | −0.83 | 7.9 ± 2.5 | 2.2 ± 0.1 | 5.3 ± 2.3 | 0.3 ± 0.0 | 64.6 ± 1.4 | 16.7 ± 0.3 | 3.5 ± 0.1 | 2.1 ± 0.1 |
| Cu-2 | −0.83 | 10.1 ± 2.1 | 2.1 ± 0.1 | 8.8 ± 1.2 | 0.5 ± 0.1 | 57.3 ± 2.7 | 16.2 ± 0.1 | 1.9 ± 0.1 | 1.8 ± 0.1 |
| Cu-3 | −0.83 | 5.1 ± 1.3 | 3.3 ± 0.1 | 6.3 ± 2.0 | 1.8 ± 0.0 | 63.1 ± 2.4 | 17.6 ± 0.4 | 1.1 ± 0.0 | 4.7 ± 0.1 |
| Cu-4 | −0.84 | 10.5 ± 1.0 | 1.4 ± 0.1 | 6.3 ± 2.1 | 0.5 ± 0.1 | 59.9 ± 2.6 | 15.6 ± 0.4 | 1.1 ± 0.1 | 2.5 ± 0.1 |
| Cu-5 | −0.82 | 22.2 ± 1.2 | 3.5 ± 0.1 | 4.8 ± 3.0 | 0.4 ± 0.0 | 50.4 ± 2.5 | 15.6 ± 0.4 | 2.8 ± 0.1 | 2.7 ± 0.1 |
| Cu-6 | −0.83 | 24.8 ± 2.3 | 1.6 ± 0.1 | 3.4 ± 2.3 | 2.2 ± 0.0 | 43.9 ± 3.1 | 18.7 ± 0.4 | 4.2 ± 0.2 | 1.1 ± 0.1 |
| Cu-7 | −0.83 | 7.5 ± 1.5 | 1.9 ± 0.1 | 10.1 ± 1.3 | 0.8 ± 0.0 | 57.0 ± 2.8 | 16.2 ± 0.4 | 2.1 ± 0.1 | 2.5 ± 0.0 |
| Cu-8 | −0.84 | 12.6 ± 2.9 | 1.6 ± 0.2 | 12.5 ± 2.2 | 0.7 ± 0.1 | 55.1 ± 1.4 | 11.7 ± 0.7 | 2.0 ± 0.1 | 2.3 ± 0.1 |
| Cu-9 | −0.83 | 13.4 ± 2.3 | 1.5 ± 0.2 | 12.6 ± 2.4 | 0.2 ± 0.0 | 55.2 ± 2.2 | 12.5 ± 0.5 | 1.4 ± 0.1 | 2.8 ± 0.1 |
| Cu-10 | −0.83 | 22.0 ± 1.6 | 1.4 ± 0.1 | 4.6 ± 2.2 | 1.1 ± 0.1 | 51.8 ± 1.1 | 13.6 ± 0.1 | 1.3 ± 0.1 | 2.4 ± 0.3 |
| Cu-11 | −0.82 | 36.7 ± 2.7 | 3.7 ± 0.2 | 3.5 ± 2.5 | 0.3 ± 0.0 | 37.5 ± 1.3 | 13.9 ± 0.1 | 0.9 ± 0.1 | 4.4 ± 0.1 |

TABLE 2

The ratio between the intensities of bands for atop CO and bridge CO. Two independent sets of samples were measured, and the average values were used for figure plotting and data analysis.

| Electrode | Ratio (atop/bridge) | | |
|---|---|---|---|
| | Tray 1 | Tray 2 | Average |
| Cu | 0.141 | 0.130 | 0.136 |
| Cu-1 | 0.487 | 0.470 | 0.479 |
| Cu-2 | 0.359 | 0.343 | 0.351 |
| Cu-3 | 0.352 | 0.364 | 0.358 |
| Cu-4 | 0.435 | 0.409 | 0.422 |
| Cu-5 | 0.521 | 0.543 | 0.532 |
| Cu-6 | 0.661 | 0.673 | 0.667 |
| Cu-7 | 0.257 | 0.251 | 0.254 |
| Cu-8 | 0.264 | 0.272 | 0.268 |
| Cu-9 | 0.301 | 0.289 | 0.295 |
| Cu-10 | 0.553 | 0.539 | 0.546 |
| Cu-11 | 0.729 | 0.748 | 0.739 |
| Cu-12 | 0.465 | 0.471 | 0.468 |

TABLE 3

CO adsorption energy by DFT calculations.

| CO adsorption site | CO adsorption energy (eV) | |
|---|---|---|
| | Cu(111) | Cu(111)-1 |
| atop | −0.13 | −0.69 |
| hollow (bridge) | −0.39 | −0.61 |

TABLE 4

A summary of faradaic efficiency for all products on Cu and Cu-12 using 1M aqueous $KHCO_3$ as supporting electrolyte. The data represent one standard deviation based on three independent samples.

| Electrode | Potential (V vs RHE) | Faradaic efficiency (%) | | | | | | |
|---|---|---|---|---|---|---|---|---|
| | | $H_2$ | $HCOO^-$ | CO | $CH_4$ | $C_2H_4$ | $C_2H_5OH$ | $CH_3COO^-$ | $C_3H_7OH$ |
| Cu | −0.49 | 45.5 ± 1.8 | n.m. | 27.1 ± 1.5 | 0.2 ± 0.0 | 0.0 ± 0.0 | n.m. | n.m. | n.m. |
| | −0.62 | 30.9 ± 1.4 | n.m. | 41.3 ± 1.1 | 0.1 ± 0.0 | 0.6 ± 0.1 | n.m. | n.m. | n.m. |
| | −0.72 | 18.4 ± 1.3 | n.m. | 52.7 ± 1.4 | 0.1 ± 0.0 | 2.3 ± 2.2 | n.m. | n.m. | n.m. |
| | −0.75 | 15.3 ± 1.6 | 9.0 ± 0.3 | 60.3 ± 2.5 | 0.0 ± 0.0 | 13.2 ± 2.6 | 1.9 ± 0.1 | 0.3 ± 0.0 | 1.0 ± 0.0 |
| | −0.78 | 10.9 ± 2.2 | 7.1 ± 0.2 | 55.6 ± 1.6 | 0.1 ± 0.0 | 16.9 ± 1.5 | 2.6 ± 0.1 | 0.2 ± 0.0 | 2.7 ± 0.0 |
| | −0.80 | 9.4 ± 1.5 | 4.4 ± 0.4 | 51.9 ± 1.7 | 0.1 ± 0.0 | 23.5 ± 1.3 | 5.9 ± 0.1 | 0.4 ± 0.0 | 3.4 ± 0.2 |
| | −0.82 | 6.6 ± 2.3 | 4.7 ± 0.4 | 46.5 ± 2.6 | 0.1 ± 0.0 | 27.9 ± 2.6 | 6.9 ± 0.1 | 0.4 ± 0.0 | 3.5 ± 0.1 |
| | −0.83 | 4.9 ± 2.8 | 3.7 ± 0.1 | 35.0 ± 1.6 | 0.1 ± 0.0 | 37.1 ± 1.1 | 10.5 ± 0.5 | 0.8 ± 0.0 | 4.5 ± 0.1 |
| | −0.84 | 5.5 ± 1.5 | 3.1 ± 0.1 | 24.7 ± 1.2 | 0.1 ± 0.0 | 43.9 ± 1.6 | 15.5 ± 0.3 | 1.2 ± 0.0 | 3.9 ± 0.0 |
| | −0.87 | 12.7 ± 2.0 | 3.0 ± 0.2 | 24.7 ± 2.1 | 0.1 ± 0.0 | 41.2 ± 1.6 | 10.4 ± 0.2 | 1.1 ± 0.0 | 3.8 ± 0.1 |
| Cu-12 | −0.49 | 69.1 ± 3.0 | n.m. | 14.6 ± 1.7 | 0.1 ± 0.0 | 0.6 ± 0.0 | n.m. | n.m. | n.m. |
| | −0.62 | 51.3 ± 5.5 | n.m. | 35.2 ± 1.3 | 0.1 ± 0.0 | 4.2 ± 0.8 | n.m. | n.m. | n.m. |
| | −0.72 | 18.8 ± 2.6 | n.m. | 43.8 ± 1.2 | 0.1 ± 0.0 | 20.0 ± 1.7 | n.m. | n.m. | n.m. |
| | −0.75 | 14 ± 2.7 | 7.8 ± 0.4 | 30.8 ± 2.9 | 0.2 ± 0.0 | 36.7 ± 2.1 | 6.5 ± 0.3 | 0.3 ± 0 | 3.4 ± 0.1 |
| | −0.78 | 11.3 ± 1.0 | 6.2 ± 0.1 | 20.2 ± 2.3 | 0.3 ± 0.0 | 49.6 ± 2.8 | 8.6 ± 0.2 | 0.9 ± 0 | 3.8 ± 0.2 |
| | −0.80 | 9.7 ± 1.8 | 4.1 ± 0.1 | 12.2 ± 1.7 | 0.5 ± 0.0 | 62.7 ± 2.3 | 9.1 ± 0.1 | 1.0 ± 0.1 | 2.6 ± 0.2 |
| | −0.82 | 8.0 ± 2.3 | 3.7 ± 0.1 | 6.7 ± 2.4 | 0.4 ± 0.0 | 68.4 ± 2.6 | 9.6 ± 0.1 | 1.3 ± 0.0 | 3.9 ± 0.1 |
| | −0.83 | 6.6 ± 2.3 | 1.2 ± 0.1 | 4.5 ± 2.4 | 0.5 ± 0.0 | 71.5 ± 2.1 | 10.5 ± 0.4 | 1.5 ± 0.1 | 2.1 ± 0.0 |
| | −0.84 | 11.1 ± 2.6 | 1.2 ± 0.1 | 3.7 ± 1.2 | 0.6 ± 0.0 | 66.5 ± 1.7 | 12.1 ± 0.4 | 1.7 ± 0.0 | 2.2 ± 0.2 | n.m. not measured

TABLE 5

Comparision of $CO_2RR$ to $C_2H_4$ performance with state-of-the-art catalysts in neural media.

| Catalyst | Electrolyte | $FE_{C2H4}$ (%) | E (V vs RHE) | $j_{C2H4}$ (mA cm$^{-2}$) | Ref. |
|---|---|---|---|---|---|
| Cu-12 | 1M $KHCO_3$ | 72 | −0.83 | 232 | This work |
| Cu | 1M $KHCO_3$ | 44 | −0.84 | 160 | |
| Plasma-activated Cu | 0.1M $KHCO_3$ | 60[a] | −0.9 | 7.2 | 44 |
| Boron-doped Cu | 0.1M KCl | 52 | −1.1 | 36 | 45 |
| Cu-1, H-cell | 0.1M $KHCO_3$ | 41 | −1.1 | 0.4 | 1 |
| Anodized Cu | 0.1M $KHCO_3$ | 38 | −1.08 | 7.3 | 46 |
| Mesoporous Cu | 0.1M $KHCO_3$ | 38 | −1.3 | 7.2 | 47 |
| Electro-redeposited Cu | 0.1M $KHCO_3$ | 36 | −1.2 | 161 | 48 |

[a]'Faradaic selectivity' (amount of specific product/amount of total detected products) instead of FE was reported, which overestimates the FE for ethylene.

References Associated with Example 2B

1. Han, Z., Kortlever, R., Chen, H. Y., Peters, J. C. & Agapie, T. CO2 reduction selective for $C_{\geq 2}$ products on polycrystalline copper with N-substituted pyridinium additives. *ACS Cent. Sci.* 3, 853-859 (2017).
2. Ge, Q., Hu, Y., Li, B. & Wang, B. Synthesis of conjugated polycyclic quinoliniums by rhodium(III)-catalyzed multiple C—H activation and annulation of arylpyridiniums with alkynes. *Org. Lett.* 18, 2483-2486 (2016).
3. Zhao, S., Xu, X., Zheng, L. & Liu, H. An efficient ultrasonic-assisted synthesis of imidazolium and pyridinium salts based on the Zincke reaction. *Ultrason. Sonochem.* 17, 685-689 (2010).
4. Kitamura, T., Furuki, R., Nagata, K., Taniguchi, H. & Stang, P. J. Preparation of (p-phenylene)bis(aryliodonium) ditriflates and their double substitution by some nucleophiles. *J. Org. Chem.* 57, 6810-6814 (1992).
5. Bielawski, M., Zhu, M. & Olofsson, B. Efficient and general one-pot synthesis of diaryliodonium triflates: Optimization, scope and limitations. *Adv. Synth. Catal.* 349, 2610-2618 (2007).

6. Henkelman, G., Arnaldsson, A. & Jónsson, H. A fast and robust algorithm for Bader decomposition of charge density. *Comput. Mater. Sci.* 36, 354-360 (2006).
7. Kresse, G. & Furthmüller, J. Efficient iterative schemes for ab initio total-energy calculations using a plane-wave basis set. *Phys. Rev. B* 54, 11169-11186 (1996).
8. Kresse, G. & Furthmüller, J. Efficiency of ab-initio total energy calculations for metals and semiconductors using a plane-wave basis set. *Comput. Mater. Sci.* 6, 15-50 (1996).
9. Kresse, G. & Hafner, J. Ab initio molecular-dynamics simulation of the liquid-metal-amorphous-semiconductor transition in germanium. *Phys. Rev. B* 49, 14251-14269 (1994).
10. Kresse, G. & Hafner, J. Ab initio molecular dynamics for liquid metals. *Phys. Rev. B* 47, 558-561 (1993).
11. Perdew, J. P., Burke, K. & Ernzerhof, M. Generalized gradient approximation made simple. *Phys. Rev. Lett.* 77, 3865-3868 (1996).
12. Kresse, G. & Joubert, D. From ultrasoft pseudopotentials to the projector augmented-wave method. *Phys. Rev. B* 59, 1758-1775 (1999).
13. Blöchl, P. E. Projector augmented-wave method. *Phys. Rev. B* 50, 17953-17979 (1994).
14. Grimme, S., Antony, J., Ehrlich, S. & Krieg, H. A consistent and accurate ab initio parametrization of density functional dispersion correction (DFT-D) for the 94 elements H—Pu. *J. Chem. Phys.* 132, 154104 (2010).
15. Lum, Y., Cheng, T., Goddard, W. A. & Ager, J. W. Electrochemical CO reduction builds solvent water into oxygenate products. *J. Am. Chem. Soc.* 140, 9337-9340 (2018).
16. Dunwell, M., Yang, X., Yan, Y. & Xu, B. Potential routes and mitigation strategies for contamination in interfacial specific infrared spectroelectrochemical studies. *J. Phys. Chem. C* 122, 24658-24664 (2018).
17. Luc, W., Rosen, J. & Jiao, F. An Ir-based anode for a practical $CO_2$ electrolyzer. *Catal. Today* 288, 79-84 (2017).
18. Gupta, N., Gattrell, M. & MacDougall, B. Calculation for the cathode surface concentrations in the electrochemical reduction of $CO_2$ in $KHCO_3$ solutions. *J. Appl. Electrochem.* 36, 161-172 (2006).
19. Dinh, C.-T. et al. $CO_2$ electroreduction to ethylene via hydroxide-mediated copper catalysis at an abrupt interface. *Science* 360, 783-787 (2018).
20. Rumble, J. R. *CRC Handbook of Chemistry and Physics, 99th Edition (Internet Version* 2018). (CRC Press/Taylor & Francis, Boca Raton, Fla., 2018).
21. Ravel, B. & Newville, M. ATHENA, ARTEMIS, HEPHAESTUS: data analysis for X-ray absorption spectroscopy using IFEFFIT. *J. Synchrotron Rad.* 12, 537-541 (2005).
22. Li, J. et al. Revealing the synergy of mono/bimetallic $PdPt/TiO_2$ heterostructure for enhanced photoresponse performance. *J. Phys. Chem. C* 121, 24861-24870 (2017).
23. Lum, Y. & Ager, J. W. Stability of residual oxides in oxide-derived copper catalysts for electrochemical $CO_2$ reduction investigated with 180 labeling. *Angew. Chem. Int. Ed.* 57, 551-554 (2018).
24. Droog, J. M. M. & Schlenter, B. Oxygen electrosorption on copper single crystal electrodes in sodium hydroxide solution. *J. Electroanal. Chem. Interf. Electrochem.* 112, 387-390 (1980).
25. Protopopoff, E. & Marcus, P. Potential—pH diagrams for hydroxyl and hydrogen adsorbed on a copper surface. *Electrochim. Acta* 51, 408-417 (2005).
26. Cole, E. B. et al. Using a one-electron shuttle for the multielectron reduction of CO2 to methanol: kinetic, mechanistic, and structural insights. *J. Am. Chem. Soc.* 132, 11539-11551 (2010).
27. Chen, C.-H. et al. The "missing" bicarbonate in $CO_2$ chemisorption reactions on solid amine sorbents. *J. Am. Chem. Soc.* 140, 8648-8651 (2018).
28. Zhuang, T.-T. et al. Copper nanocavities confine intermediates for efficient electrosynthesis of C3 alcohol fuels from carbon monoxide. *Nat. Catal.* 1, 946-951 (2018).
29. Figueiredo, M. C., Ledezma-Yanez, I. & Koper, M. T. M. In situ spectroscopic study of $CO_2$ electroreduction at copper electrodes in acetonitrile. *ACS Catal.* 6, 2382-2392 (2016).
30. Heyes, J., Dunwell, M. & Xu, B. $CO_2$ reduction on Cu at low overpotentials with surface-enhanced in situ spectroscopy. *J. Phys. Chem. C* 120, 17334-17341 (2016).
31. Calle-Vallejo, F. & Koper, M. T. Theoretical considerations on the electroreduction of CO to $C_2$ species on Cu (100) electrodes. *Angew. Chem. Int. Ed.* 52, 7282-7285 (2013).
32. Perez-Gallent, E., Figueiredo, M. C., Calle-Vallejo, F. & Koper, M. T. Spectroscopic observation of a hydrogenated CO dimer intermediate during CO reduction on Cu (100) electrodes. *Angew. Chem. Int. Ed.* 56, 3621-3624 (2017).
33. Xiao, H., Goddard, W. A., Cheng, T. & Liu, Y. Cu metal embedded in oxidized matrix catalyst to promote $CO_2$ activation and CO dimerization for electrochemical reduction of $CO_2$. *Proc. Natl. Acad. Sci.* 114, 6685-6688 (2017).
34. Akemann, W. & Otto, A. Vibrational modes of CO adsorbed on disordered copper films. *J. Raman Spectrosc.* 22, 797-803 (1991).
35. Sheppard, N. & Nguyen, T. T. *Advances in Infrared and Raman Spectroscopy*. Vol. 5 67 (Heyden, London, 1978).
36. Gunathunge, C. M. et al. Spectroscopic observation of reversible surface reconstruction of copper electrodes under $CO_2$ reduction. *J. Phys. Chem. C* 121, 12337-12344 (2017).
37. Gunathunge, C. M., Ovalle, V. J., Li, Y., Janik, M. J. & Waegele, M. M. Existence of an electrochemically inert CO population on Cu electrodes in alkaline pH. *ACS Catal.* 8, 7507-7516 (2018).
38. Montoya, J. H., Shi, C., Chan, K. & Nørskov, J. K. Theoretical insights into a CO dimerization mechanism in $CO_2$ electroreduction. *J. Phys. Chem. Lett.* 6, 2032-2037 (2015).
39. Guo, C., Wang, Z., Wang, D., Wang, H.-F. & Hu, P. First-principles determination of CO adsorption and desorption on Pt (111) in the free energy landscape. *J. Phys. Chem. C* 122, 21478-21483 (2018).
40. Nørskov, J. K. et al. Origin of the overpotential for oxygen reduction at a fuel-cell cathode. *J. Phys. Chem. B* 108, 17886-17892 (2004).
41. Gerson, F. & Huber, W. *Electron Spin Resonance Spectroscopy of Organic Radicals*. (John Wiley & Sons, 2003).
42. Wong, C. S., Tishchenko, P. Y. & Johnson, W. K. Solubility of carbon dioxide in aqueous HCl and $NaHCO_3$ solutions from 278 to 298 K. *J. Chem. Eng. Data* 50, 817-821 (2005).
43. Zhong, H., Fujii, K., Nakano, Y. & Jin, F. Effect of $CO_2$ bubbling into aqueous solutions used for electrochemical reduction of $CO_2$ for energy conversion and storage. *J. Phys. Chem. C* 119, 55-61 (2015).

44. Mistry, H. et al. Highly selective plasma-activated copper catalysts for carbon dioxide reduction to ethylene. *Nat. Commun.* 7, 12123 (2016).
45. Zhou, Y. et al. Dopant-induced electron localization drives $CO_2$ reduction to $C_2$ hydrocarbons. *Nat. Chem.* 10, 974-980 (2018).
46. Lee, S. Y. et al. Mixed copper states in anodized Cu electrocatalyst for stable and selective ethylene production from $CO_2$ reduction. *J. Am. Chem. Soc.* 140, 8681-8689 (2018).
47. Yang, K. D. et al. Morphology-directed selective production of ethylene or ethane from $CO_2$ on a Cu mesopore electrode. *Angew. Chem. Int. Ed.* 56, 796-800 (2017).
48. De Luna, P. et al. Catalyst electro-redeposition controls morphology and oxidation state for selective carbon dioxide reduction. *Nat. Catal.* 1, 103-110 (2018).

Example 3A: In-Situ Nanostructuring and Stabilization of Polycrystalline Copper by an Organic Salt Additive Promotes Electrocatalytic $CO_2$ Reduction to Ethylene Abstract: Bridging homogeneous molecular systems with heterogeneous catalysts is a promising approach for the development of new electrodes, combining the advantages of both approaches. In the context of $CO_2$ electroreduction, molecular enhancement of planar copper electrodes has enabled promising advancement towards high Faradaic efficiencies for multicarbon products. Besides, nanostructured copper electrodes have also demonstrated enhanced performance at comparatively low overpotentials. Herein, we report a novel and convenient method for nanostructuring copper electrodes using N,N'-ethylene-phenanthrolinium dibromide as molecular additive. Selectivities up to 70% for $C_{\geq 2}$ products are observed for more than 40 h without significant change in the surface morphology. Mechanistic studies reveal several roles for the organic additive, including: the formation of cube-like nanostructures by corrosion of the copper surface, the stabilization of these nanostructures during electrocatalysis by formation of a protective organic layer, and the promotion of $C_{\geq 2}$ products.

Introduction: Borrowing concepts from molecular catalysts to tailor the active sites of metallic surfaces and enhance activity, selectivity, and stability has been a long-standing interest in the catalysis community.[1-4] In the context of the electrochemical $CO_2$ reduction reaction ($CO_2$RR), small molecule additives have been employed to tune the reactivity of heterogeneous catalysts by stabilizing intermediates, inhibiting proton diffusion, or acting as redox mediators. For example, organic species such as N-aryl pyridinium salts,[5] imidazole,[6-8] thiol[9] and cysteamine[10] have been reported to alter the surface of the electrode, yielding catalytic systems with increased selectivities for specific products.[11,12]

Germane to the present study, our research team disclosed a simple method for increasing the selectivity of $CO_2$RR towards $C_{\geq 2}$ products by combining a polycrystalline copper electrode with an N-aryl pyridinium salt additive in bicarbonate aqueous solutions.[5] Upon in-situ electroreduction of these water-soluble additives, an organic film is deposited onto the electrode, altering the catalytic properties of the Cu surface. Selective inhibition of $CH_4$ and $H_2$ production was observed, resulting in an improved selectivity for $C_{\geq 2}$ products with Faradaic efficiencies (FE) higher than 60%.

In a complementary approach, nanostructured metal electrodes have played an important role in the development of selective electrocatalysts towards particular products at comparatively low overpotentials.[13-15] A variety of methods are available to form nanostructures at the surface of electrodes, including reduction of copper oxides, wet chemistry synthesis, and electrodeposition. However, most of these methods require high-temperature or high-energy treatments and the resulting structures generally exhibit a poorly defined surface morphology.

Specifically, alkali halide salts are known to promote nanostructuring process in planar Cu electrodes. By exposing the copper surface to an aqueous solution of an alkali halide salt under oxidative potentials or acidic media, nano-cube-like structures are obtained. The resulting electrocatalysts show higher current densities and selectivities for ethylene (20%<$FE_{C2H4}$<45%) and oxygenated products compared to a planar electrode, although hydrogen is still the predominant product (40%<$FE_{H2}$<60%). Unfortunately, these systems suffer from fast structural reconstruction/degradation and performance decay during catalysis, possibly due to the applied electrochemical bias.[16-18] As a consequence, the sustained influence of Cu morphology on the resulting products still remains elusive. Therefore, preserving the nanostructures under electrocatalytic conditions is of particular interest as more predictable systems can be developed with increased durability.[19-26]

To understand the interaction of organic films with Cu electrodes and their impact on catalysis, we have been undertaking structure-function studies on a variety of molecular additives. Herein, we report that combining polycrystalline copper electrodes with N,N'-ethylene-phenanthrolinium dibromide (abbreviated herein as 1-$Br_2$) provides a particularly robust and conveniently prepared catalytic system that shows improved activity with current densities up to −7 mA/cm² and selectivities for $C_{\geq 2}$ products up to 70%, when compared with an analogous bare polycrystalline copper electrode, or one as previously disclosed using an electrodeposited film derived from N-tolylpyridinium chloride (tolyl-pyr). Mechanistic studies demonstrate that 1-$Br_2$ plays multiple functions, including the generation of cube-like copper nanostructures, stabilization of the electrode morphology for up to 40 h of electrocatalysis, and to facilitate C—C coupled product formation.

Results and Discussion: Bulk electrolysis experiments were performed on a polycrystalline copper electrode with $CO_2$-saturated 0.1 M $KHCO_3$ electrolyte at pH 6.8 using a recently reported custom flow cell.[27] Potentials were measured versus a leakless Ag/AgCl electrode and converted to the RHE scale. In the absence of additive and at potential of −1.09 $V_{RHE}$, the copper electrode primarily produces hydrogen and methane, with relatively low generation of $C_{\geq 2}$ products, consistent with previous reports ($FE_{H2}$=43%, $FE_{CH4}$=20%, $FE_{C\geq 2}$=22%, FIG. 39B and Table 7).[5,27-29] However, when $CO_2$RR is performed using an electrolyte containing 10 mM of 1-$Br_2$ (FIGS. 39A, 45), the selectivity is markedly shifted towards $C_{\geq 2}$ products ($FE_{C\geq 2}$=64%). The selectivity for ethylene is especially enhanced, while methane production is dramatically suppressed ($FE_{C2H4}$=45%, $FE_{CH4}$=0.5% FIG. 39B, Table 7).

The use of isotopically labelled $^{13}CO_2$ confirmed that the sole source of carbon for the observed products is carbon dioxide, ruling out the possibility of degradation products from the organic additive acting as carbon source (FIGS. 46A-46C). Although the selectivity of 1-$Br_2$ is similar to that we previously reported with tolyl-pyr as organic additive (FIG. 39B, FE $C_{\geq 2}$=78%, j=−1.0 mA/cm²),[5] the total current density using 1-$Br_2$ is almost four times higher and similar to that observed with the bare Cu electrode (j=−3.8 mA/cm$^2$ with 1-Br$_2$; j=−4.4 mA/cm$^2$ with bare Cu). This is a drastic difference compared to the first generation of aryl-pyridinium additives we had explored,[5] where the partial current density for C$_{\geq 2}$ products is essentially the same as that of bare Cu, and the shift in selectivity derives from the suppression of H$_2$ and CH$_4$ production. For the case of 1-Br$_2$, the partial current density for C$_{\geq 2}$ products, and especially C$_2$H$_4$, is enhanced almost by a factor of 4 (FIG. 39C).

Figure 40B:
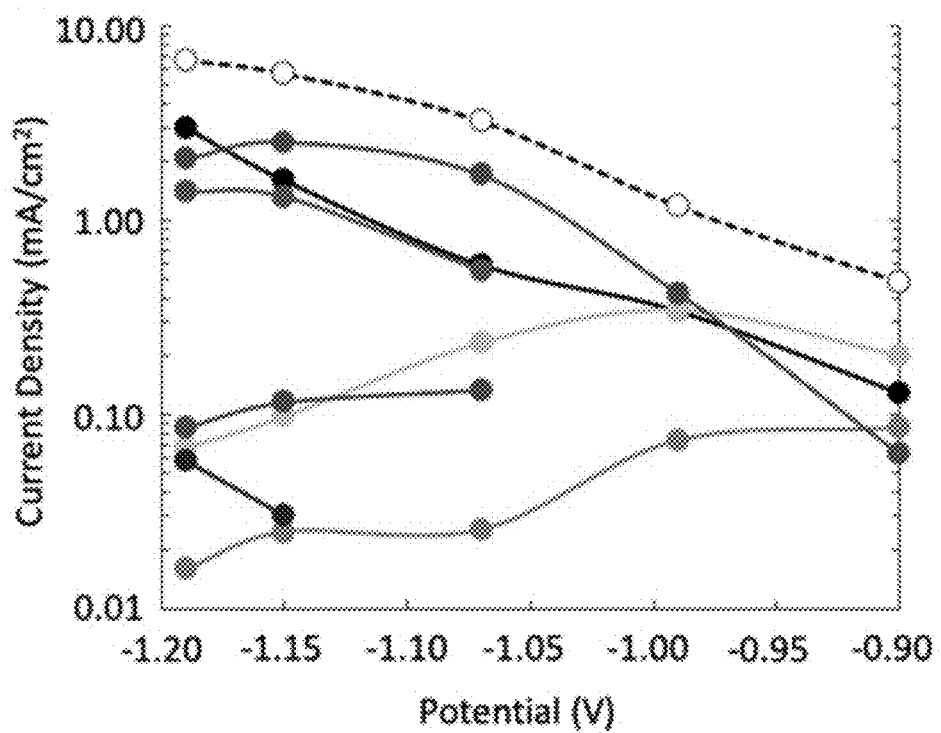

Higher current densities were achieved at −1.15 V$_{RHE}$=−6.4 mA/cm$^2$, Table 8, FIG. 47) while maintaining similar selectivities for ethylene and C$_{\geq 2}$ products (FE$_{C2H4}$=40%, FE$_{C\geq 2}$ 63%, FIGS. 40A-40B, Table 8). Applying additional bias leads to substantial H$_2$ generation (FE$_{H2}$=41% at −1.19 V). At lower bias (−0.99 V), ethylene is still a dominant product, together with formic acid (FE$_{C2H4}$=27% and FE$_{HCOOH}$=22%). The CO Faradaic efficiency is still very low at this potential, indicating that the majority of intermediate CO generated is converted to C—C coupled products (FE$_{CO}$=4.7%). At −0.90 V, ethylene is still produced but with far lower selectivity (FE$_{C2H4}$=11%). The FE of CO correspondingly increases, and formic acid becomes the major product generated (FE$_{CO}$=15% and FE$_{HCOOH}$=35%). Most notably, at all of these potentials, methane production is almost completely suppressed.

A rather similar product profile is obtained at −1.07 V$_{RHE}$ using concentrations of 1-Br$_2$ as low as 0.1 mM (Table 9, FIG. 48; FE$_{C2H4}$=35%, FE$_{C\geq 2}$=54%), with a similar current density. This observation highlights the strength of the additive effect, even at very low concentrations, on the overall product profile. In addition, the catalytic system showed a sustained high selectivity for ethylene production during longer bulk electrolysis experiments (monitored up to 43 h). A decrease of 10% in ethylene selectivity occurred over this time (FIGS. 49-52). This degradation of selectivity potentially comes from deposition of trace metals ion impurities present in the electrolyte, as previously observed.[30]

Analysis of the electrode surface, after bulk electrolysis using an electrolyte containing 1-Br$_2$, by X-ray photoelectron spectroscopy (XPS), showed nitrogen enrichment (FIG. 53). The spectrum consists of two peaks of similar area, located at 400.2 eV and 402.5 eV, characteristic of tertiary amine and quaternary ammonium nitrogen atoms, respectively.[31,32] In addition, the surface of the electrode was rinsed several times with deionized water and then by DMSO-d$_6$. The organic fraction was collected and analyzed by NMR spectroscopy. The $^1$H and $^1$H-$^1$H COSY NMR spectra (FIGS. 54-55) acquired are consistent with the formation of two independent dimeric structures, para-para (1-Br)$_2$ and ortho-ortho (1-Br)$_2$ depicted in FIG. 39A, derived from the coupling of two mono-reduced phenanthrolinium species (1'-Br) at para or ortho position, respectively. The amount of para-para coupled product is higher than the ortho-ortho product, as expected from the higher spin density at the para position of the precursor radical (FIG. 54).[33] Combined, these species account for >95% of the organic material that could be extracted from the copper electrode.[34] The results from XPS and NMR analyses are in agreement with the electrodeposition of an organic film onto the surface of the copper electrode as previously observed in the case of tolyl-pyr.[5]

The dimer (1-Br)$_2$ is a dicationic compound and displays two tertiary and two quaternary amine N-atoms, consistent with the aforementioned XPS results. The copper surface appears to be critical for the dimerization process of the one-electron reduced species of 1-Br$_2$ (see ESI for further discussion). When the one-electron reduced radical 1'-Br is generated in solution using zinc dust as chemical reductant, dimerization reaction is not observed. Furthermore, the stability of 1'-Br in the presence of CO$_2$ was studied by EPR and UV-VIS spectroscopies (FIGS. 68, 69, 70A-70B). The obtained results suggest that radical 1'-Br does not interact with CO$_2$, ruling out a possible involvement of such radical during electrocatalysis. Furthermore, when a copper electrode, with dimer (1-Br)$_2$ previously electrodeposited on its surface, is used in bulk electrolysis with an electrolyte free of molecular additive 1-Br$_2$, the expected high selectivity for C$_{\geq 2}$ products is observed (Table 10).

As an organic film is formed on the surface of the electrode, the mass transport limitation of the reactants was studied by chronoamperometry experiments at −1.10 V with a rotating disk electrode using either a CO$_2$ or a N$_2$-saturated 0.1 M KHCO$_3$ electrolyte with or without 10 mM of 1-Br$_2$ (FIGS. 56-57). Under N$_2$, the hydrogen current densities are not altered by the rotation speed both on bare Cu or in presence of 1-Br$_2$. More interestingly, the hydrogen current density is fivefold lower when the organic film is present, indicating that the film severely inhibits hydrogen production. Under CO$_2$, the current densities with and without the film are similar at low rotation speed, in agreement with catalytic results. Surprisingly, while the current density increases linearly with the rotation speed on bare Cu, it stays unchanged in presence of 1-Br$_2$. These results demonstrate that there is no apparent mass transport limitation of reactants due to the organic film. These peculiar results could reflect different rate determining steps in presence of the film compare to bare Cu, a phenomenon that will be further investigated but are out of the scope of this study.

Figure 41A:
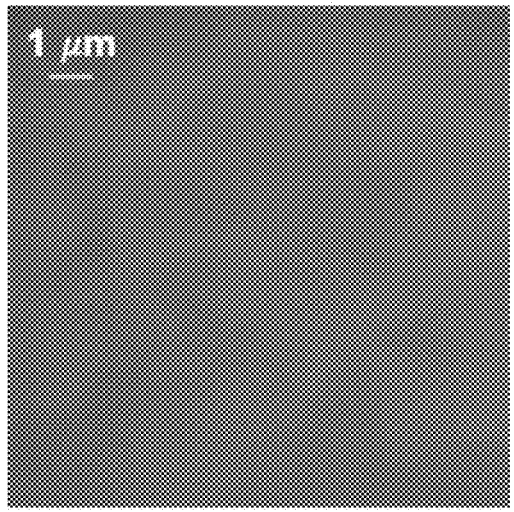
Figure 41B:
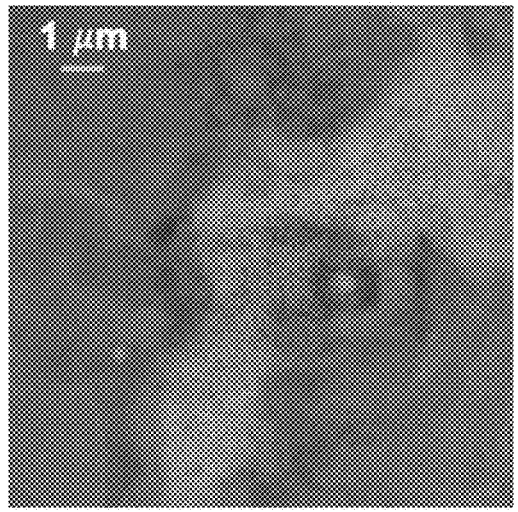
Figure 41C:
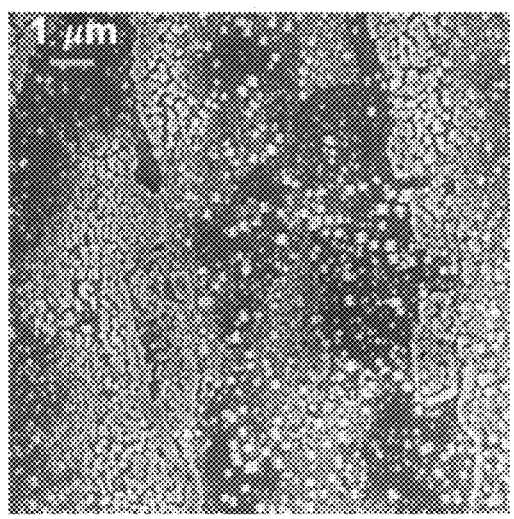
Figure 41D:
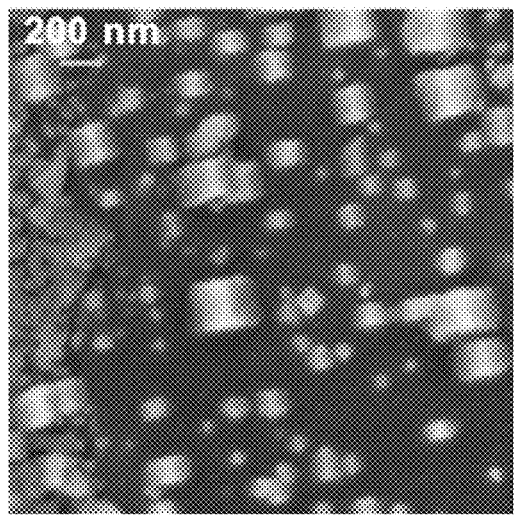

To gain information about possible changes in surface morphology of the copper electrode, ex situ scanning electron microscope (SEM) images were taken after different electrocatalytic experiments (FIGS. 41A-41D). A smooth and flat surface is consistently observed after electropolishing and prior to electrocatalysis (FIG. 41A). When a CO$_2$RR experiment is performed in the absence of molecular additive, the morphology of the copper electrode after the reaction changes to a rougher surface, as previously reported (FIG. 41B).[35] Notably, when CO$_2$RR is carried out in the presence of 1-Br$_2$, well-defined cubic nanostructures are observed across the entire surface of the copper electrode after catalysis (FIGS. 41C-41D). At higher magnification, the ridge of the cubes can be observed and appears to be all parallel to the bulk of the electrode. This suggests that all the nanocubes are growing along the <110> direction. In addition, as Cu has a face-centered cubic (FCC) packing structure, the exposed surface of such nanostructures has to be dominated by the {100} facet. This could not unambiguously be confirmed by analyzing the post-catalysis electrode by bulk XRD as the change in the surface morphology is too small compared to the resolution of the instrument. Nevertheless, by comparing the peak heights of XRD spectra of a freshly electropolished Cu electrode with post catalysis Cu electrodes with and without 1-Br$_2$, an increase of the Cu (100) peak is observed in the post-catalysis Cu electrode with 1-Br2 (FIGS. 59A-59C).

In term of size, the cubic nanostructures display average widths of 275 nm for the biggest ones and 100 nm for the smallest. According to atomic force microscopic (AFM) images, the nanocubes present an average high of 80-90 nm (FIG. 58C). SEM Energy Dispersive X-ray (EDX) analysis confirms that the nanostructures are mainly comprised of copper (FIG. 58D).

These structural observations contrast with previous reports on nanostructured copper electrodes.[16-18] This is the first example of stable copper nanocubes under electrocatalytic conditions over prolonged reaction times (>40 h, FIGS. 60A-60B). Also, the observed nanocubes after electrocatalysis are well defined and oriented in the same direction, contrasting with the typical morphologies of copper electrodes after catalysis displaying agglomerated nanofeatures.

Inorganic halide salts are well known for inducing nanostructuring process in copper surfaces.[36] Thus, we decided to study the influence of the bromide counteranion in 1-Br$_2$ on the formation of the observed nanocubes at the electrode surface. When a polycrystalline copper electrode was left in contact with an aqueous solution of KBr (20 mM) for 5 min, and then subjected to 3 measurements of potentiostatic electrochemical impedance spectroscopy (PEIS), AFM images showed the presence of nanocubes similar in shape to those formed with additive 1-Br$_2$, with a height of ca. 80-90 nm (FIG. 61A). This observation suggests that the bromide anion can promote the formation of nanostructures, by a corrosive process,[37] under our catalytic conditions. It is worth noting that the PEIS measurements were performed at open circuit voltage, resulting in a nanostructuring process under mild conditions. This approach contrasts with the previous reports where high oxidative potentials have been used during the nanostructuring of Cu electrodes.[37,38]

When KBr (20 mM) was tested as an additive for CO$_2$RR at −1.07 V$_{RHE}$, the product profile (Table 11) was similar to that of bare Cu, with hydrogen and methane being the dominant products (FE$_{H2}$=56%, FE$_{CH4}$=20%). Ex-situ post-catalysis AFM images of the electrode indicated a lower level of nanostructuring compared to the case of 1-Br$_2$ as additive (FIG. 61B). These observations allow us to infer that although the organic film is not required for the nanostructuring step, it is critical to preserve the nanocubes during electrocatalysis.

Figure 42A:
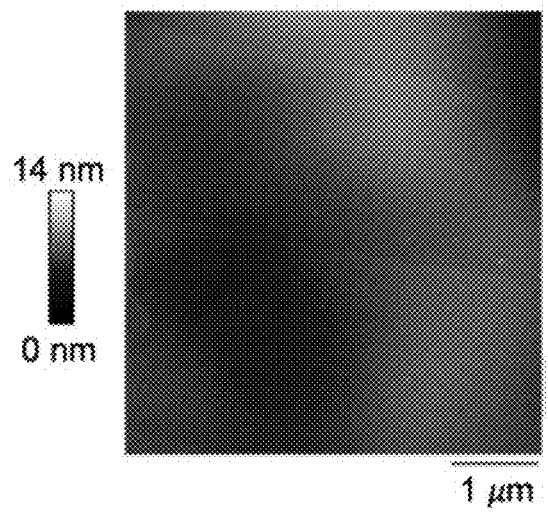
Figure 42B:
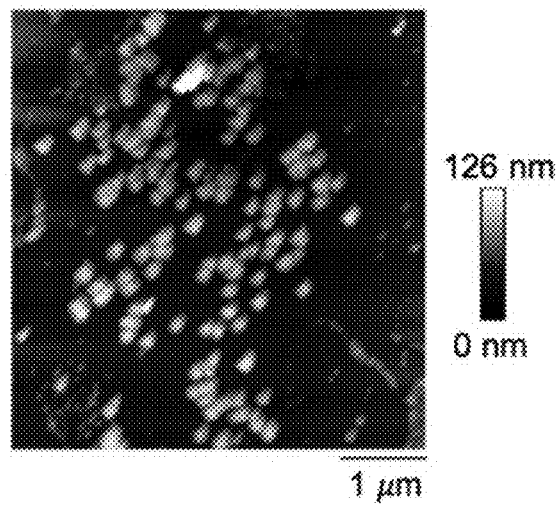
Figure 42C:
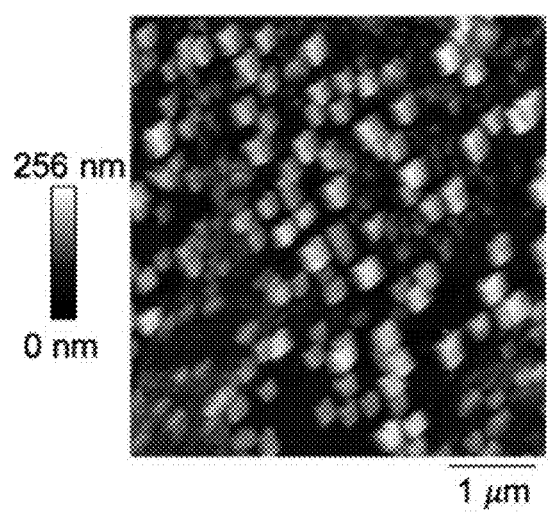
Figure 42D:
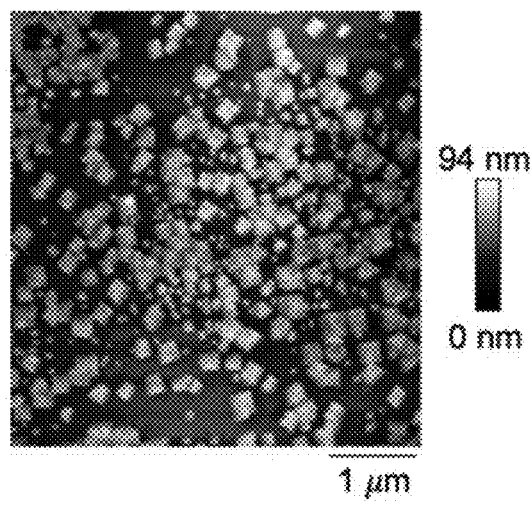

To further explore the role of bromide anion in the nanostructuring process, the surface of a copper electrode was analyzed by AFM before and after electrocatalysis in the presence of 10 mM of 1-Br$_2$ (FIGS. 42A-42D). After 5 min of contact between the electrode and the electrolyte, AFM images already show some degree of well-defined nanostructuring (FIG. 42B), indicating that the bromide anion of the 1-Br$_2$ additive is effective in corroding the electrode surface. After three cycles of PE IS, AFM images clearly show the presence of well-defined nanostructures (FIG. 42C). These observations confirm that the nanostructuring process occurs via corrosion of the copper surface, even before electrocatalysis. As expected, the AFM image taken after electrocatalysis (FIG. 42D) show well-defined cubic nanostructures, consistent with the previously discussed SEM images.

Figure 62A:
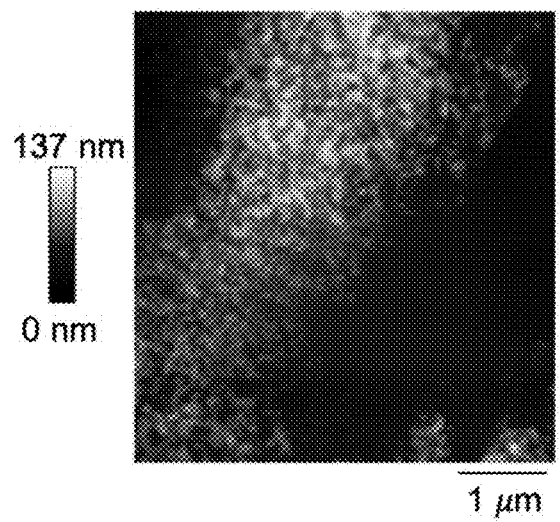
Figure 62B:
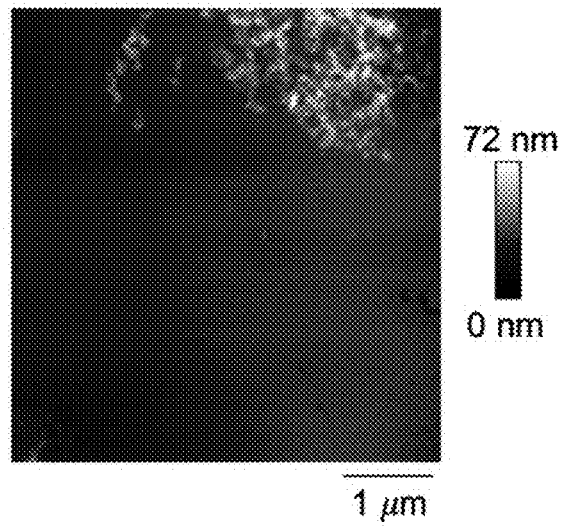
Figure 62C:
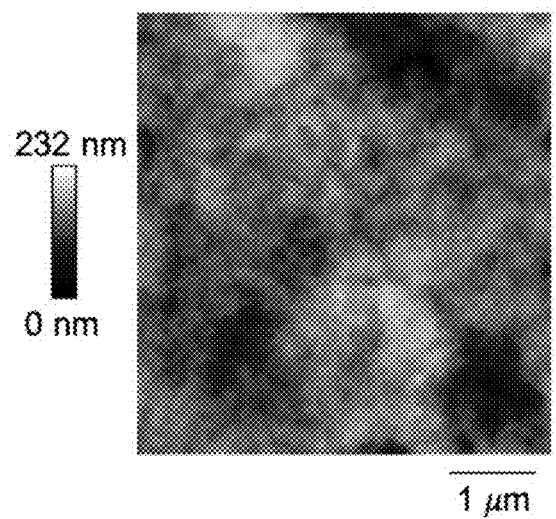
Figure 62D:
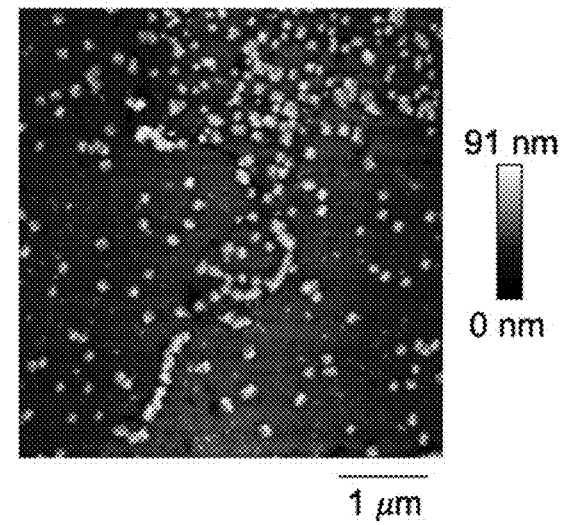

To study the effect of the counteranion in the molecular additive, the corresponding phenanthrolinium ditriflate, dichloride and diiodide molecules were synthesized and tested in CO$_2$RR ([1-X2]=10 mM, X=OTf$^-$, Cl$^-$ and I$^-$, Tables 6 and 12). The 1-(OTf)$_2$ and 1-Cl$_2$ derivatives showed lower values of total current densities compared with that of 1-Br$_2$. Also, the FE for ethylene production decreased 10-15%. Ex-situ post-catalysis AFM images of the electrodes from the experiments with 1-(OTf)$_2$ and 1-Cl$_2$ do not show well-defined nanostructures (FIGS. 62A-62B). On the other hand, the selectivity of 1-I2 with respect to ethylene generation is very similar to that with 1-Br$_2$ (FE$_{C2H4}$=43%, j$_{C2H4}$=−1.07 mA/cm$^2$). The overall current density is, however, lower and comparable to that obtained with 1-(OTf)$_2$ and 1-Cl$_2$. Compared to the organic film derived from 1-Br$_2$, a thicker film was observable on the electrode when 1-I2 was used, accounting for the decrease in total current density (FIG. 62C). Well-defined nanostructures are observed by AFM after dissolving the film with DMSO (FIG. 62D). These observations support previous reports on the incapacity of Cl$^-$ and OTf$^-$ anions to effectively corrode copper surfaces, whereas Br$^-$ and I$^-$ can.[39,40] Nevertheless, despite the absence of nanostructuring with additives 1-Cl$_2$ and 1-(OTf)$_2$, the improved ethylene selectivity in these systems, compared to bare Cu electrodes, highlights the beneficial effect of the electrodeposition of the organic film onto the surface of the electrode.

TABLE 6

Faradaic efficiency for major products formed during CO$_2$RR at −1.07 V in CO$_2$-saturated 0.1M KHCO$_3$ without or with 10 mM of 1-X$_2$ (X = Br, OTf, Cl, I).[a]

| Additive] | Faradaic Efficiency (%) | | | | j |
|---|---|---|---|---|---|
| | H$_2$ | C$_2$H$_4$ | C$_2$H$_5$OH | C$_3$H$_7$OH | (mA/cm$^2$) |
| None | 42.8 | 12.3 | 5.9 | 2.6 | −4.5 |
| 1-Br$_2$ | 15.5 | 45.4 | 14.6 | 3.6 | −3.8 |
| 1-(OTf)$_2$ | 24.1 | 37.4 | 14.1 | 4.9 | −2.4 |
| 1-Cl$_2$ | 25.6 | 33.8 | 8.4 | 5.4 | −2.4 |
| 1-I$_2$ | 21.4 | 42.0 | 12.6 | 4.0 | −2.5 |

[a]All values represent an average of at least two runs. Refer to Table 14 for the complete table.

Figure 43A:
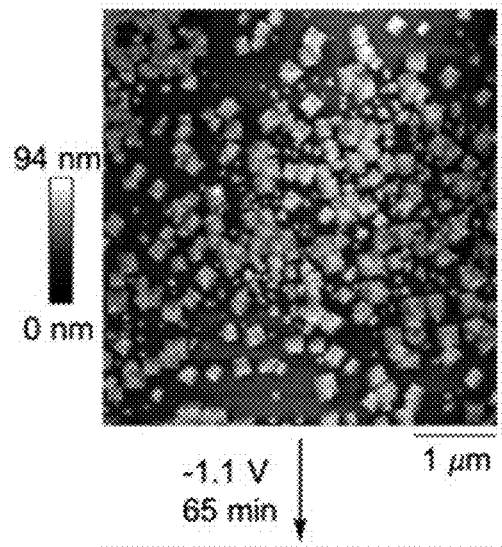
Figure 43B:
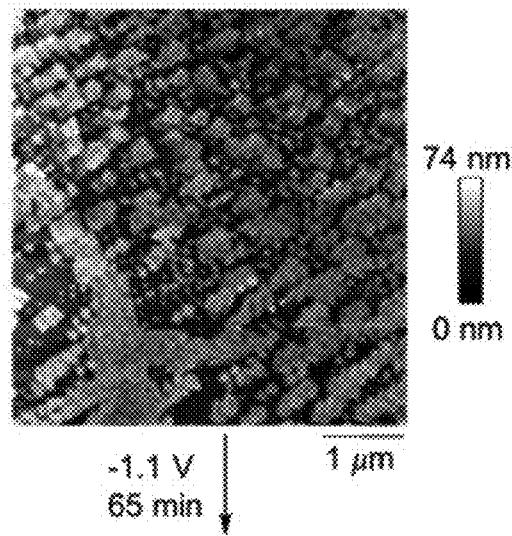
Figure 43C:
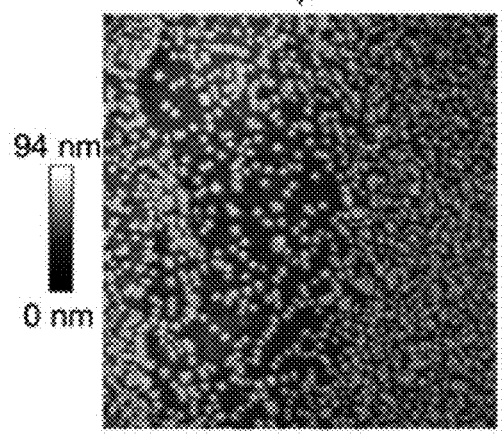
Figure 43D:
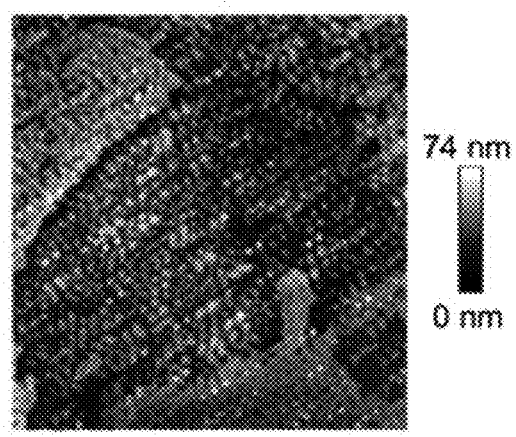

To investigate the role of the molecular coating in the stabilization of the observed nanocubes, the organic film from a copper electrode previously subjected to bulk electrolysis in the presence of 1-Br$_2$ was removed by treatment with DMSO. AFM analysis of the resulting electrode show a decrease in the average height of the nanostructures by ca. 20 nm, potentially due to the removal of the film (FIG. 43B). This result suggests that the film thickness is small compared to the size of the copper nanostructures. This nanostructured coating-free electrode was then used in a second bulk electrolysis experiment with an additive-free electrolyte. The product distribution of this catalytic run showed a considerable reduction in the selectivity for C$_{≥2}$ products, similar to a polycrystalline copper electrode (Table 13). In addition, AFM images of the electrode after the second catalytic run, show degradation of the well-defined nanostructures on the copper surface (FIG. 43D). This observation confirms that the electrodeposited organic film plays a critical role in stabilizing the nanostructuring of the electrode under electrocatalytic conditions. This hypothesis is further supported by the finding that the nanostructures are preserved after submitting an electrode functionalized with the organic film to a second catalytic run using an additive-free electrolyte (FIG. 43C). As expected, in this experiment not only the nanostructures are preserved, but also the selectivity for C$_{≥2}$ products is similar to the case of the additive-containing electrolyte (Table 14).

The collective observations presented in this work support the conclusion that nanostructuring of the copper electrode, in combination with the electrodeposited organic film, enhances the generation of C$_{≥2}$ products in CO$_2$RR. This is in agreement with previous studies that have demonstrated the importance of nanostructured Cu surfaces in enhancing selectivity for C$_{≥2}$ products.[41-43] In contrast to previous reports, using the method reported herein, well-defined cubic nanostructures with exposed {100} facets, known to effectively promote the generation of C—C coupled products,[44] are not only easily generated but their morphology is also preserved under electrocatalytic conditions over prolonged reaction times (>40 h). Besides the stabilizing effect, the molecular coating also plays a role in the shifting of selectivity for C—C coupled products as observed when molecule 1-$Cl_2$ was used as additive. In this case, since the chloride counteranion failed to corrode the electrode surface to form nanostructures, the increasing in the selectivity for ethylene production is due only to the presence of the electrodeposited film.

FIG. 44 outlines our working model for the formation and stabilization of the nanostructured copper electrode by a molecular coating derived from 1-$Br_2$. Starting from a smooth electrode surface, bromide anions initiate the nanostructuring process by corroding the copper surface and creating nucleation sites. The degree of corrosion is enhanced via PEIS cycles, forming well-defined nanocubes. Upon application of a bias of −1.07 $V_{RHE}$, reductive dimerization of the phenanthrolinium dication occurs through coupling of the generated radical (1'-Br) which is facilitated by the copper surface. This results in the deposition of an organic film onto the electrode. As observed in the SEM and AFM images, this film helps to stabilize the nanostructured surface during electrocatalysis. In addition, the organic film also plays a role in the enhancement of C—C coupling activity.

Conclusion for Example 3A: This study underscores that the combination of an organic halide salt additive, in this case phenanthrolinium dibromide, with a polycrystalline copper electrode, affords a simple and convenient means to generate and stabilize a nanostructured copper surface for $CO_2$RR with marked enhancement for C—C coupling, and substantial attenuation of $H_2$ and especially $CH_4$. This simple and inexpensive methodology opens promising opportunities for improving $CO_2$RR through the interaction of organic additives and metal electrodes. Preserving nanostructures during catalysis, as demonstrated here, is important beyond $CO_2$RR and may find applications to a variety of electrocatalysts already reported in the literature.

References Associated with Example 3A

[1] X. Cui, W. Li, P. Ryabchuk, K. Junge, M. Beller, *Nat. Catal.* 2018, 1, 385-397.
[2] C. Copéret, F. Allouche, K. W. Chan, M. P. Conley, M. F. Delley, A. Fedorov, I. B. Moroz, V. Mougel, M. Pucino, K. Searles, et al., *Angew. Chem. Int. Ed.* 2018, 57, 6398-6440.
[3] J. D. A. Pelletier, J.-M. Basset, *Acc. Chem. Res.* 2016, 49, 664-677.
[4] C. Copéret, M. Chabanas, R. Petroff Saint-Arroman, J.-M. Basset, *Angew. Chem. Int. Ed.* 2003, 42, 156-181.
[5] Z. Han, R. Kortlever, H.-Y. Chen, J. C. Peters, T. Agapie, *ACS Cent. Sci.* 2017, 3, 853-859.
[6] B. A. Rosen, A. Salehi-Khojin, M. R. Thorson, W. Zhu, D. T. Whipple, P. J. A. Kenis, R. I. Masel, *Science* 2011, 334, 643-644.
[7] Z. Cao, J. S. Derrick, J. Xu, R. Gao, M. Gong, E. M. Nichols, P. T. Smith, X. Liu, X. Wen, C. Copéret, et al., *Angew. Chem. Int. Ed.* 2018, 57, 4981-4985.
[8] G. P. S. Lau, M. Schreier, D. Vasilyev, R. Scopelliti, M. Grätzel, P. J. Dyson, *J. Am. Chem. Soc.* 2016, 138, 7820-7823.
[9] C. Kim, H. S. Jeon, T. Eom, M. S. Jee, H. Kim, C. M. Friend, B. K. Min, Y. J. Hwang, *J. Am. Chem. Soc.* 2015, 137, 13844-13850.
[10] C. Kim, T. Eom, M. S. Jee, H. Jung, H. Kim, B. K. Min, Y. J. Hwang, *ACS Catal.* 2017, 7, 779-785.
[11] M. Gong, Z. Cao, W. Liu, E. M. Nichols, P. T. Smith, J. S. Derrick, Y.-S. Liu, J. Liu, X. Wen, C. J. Chang, *ACS Cent. Sci.* 2017, 3, 1032-1040.
[12] S. Ponnurangam, I. V. Chernyshova, P. Somasundaran, *Adv. Colloid Interface Sci.* 2017, 244, 184-198.
[13] L. Zhang, Z.-J. Zhao, J. Gong, *Angew. Chem. Int. Ed.* 2017, 56, 11326-11353.
[14] M. Ma, W. A. Smith, in *Anisotropic Shape-Sel. Nanomater. Struct.-Prop. Relatsh.* (Eds.: S. E. Hunyadi Murph, G. K. Larsen, K. J. Coopersmith), Springer International Publishing, Cham, 2017, pp. 337-373.
[15] H. Mistry, A. S. Varela, S. Kühl, P. Strasser, B. R. Cuenya, *Nat. Rev. Mater.* 2016, 1, 16009.
[16] P. Grosse, D. Gao, F. Scholten, I. Sinev, H. Mistry, B. Roldan Cuenya, *Angew. Chem. Int. Ed.* 2018, 57, 6192-6197.
[17] D. Gao, F. Scholten, B. Roldan Cuenya, *ACS Catal.* 2017, 7, 5112-5120.
[18] C. Reller, R. Krause, E. Volkova, B. Schmid, S. Neubauer, A. Rucki, M. Schuster, G. Schmid, *Adv. Energy Mater.* 2017, 7, 1602114.
[19] R. M. Arán-Ais, D. Gao, B. Roldan Cuenya, *Acc. Chem. Res.* 2018, 51, 2906-2917.
[20] C. W. Li, M. W. Kanan, *J. Am. Chem. Soc.* 2012, 134, 7231-7234.
[21] H. Mistry, A. S. Varela, C. S. Bonifacio, I. Zegkinoglou, I. Sinev, Y.-W. Choi, K. Kisslinger, E. A. Stach, J. C. Yang, P. Strasser, et al., *Nat. Commun.* 2016, 7, 12123.
[22] D. Gao, I. Zegkinoglou, N. J. Divins, F. Scholten, I. Sinev, P. Grosse, B. Roldan Cuenya, *ACS Nano* 2017, 11, 4825-4831.
[23] H. S. Jeon, S. Kunze, F. Scholten, B. Roldan Cuenya, *ACS Catal.* 2018, 8, 531-535.
[24] D. Kim, C. S. Kley, Y. Li, P. Yang, *Proc. Natl. Acad. Sci.* 2017, 114, 10560-10565.
[25] A. S. Hall, Y. Yoon, A. Wuttig, Y. Surendranath, *J. Am. Chem. Soc.* 2015, 137, 14834-14837.
[26] Y. Li, F. Cui, M. B. Ross, D. Kim, Y. Sun, P. Yang, *Nano Lett.* 2017, 17, 1312-1317.
[27] P. Lobaccaro, M. R. Singh, E. L. Clark, Y. Kwon, A. T. Bell, J. W. Ager, *Phys. Chem. Chem. Phys.* 2016, 18, 26777-26785.
[28] K. P. Kuhl, E. R. Cave, D. N. Abram, T. F. Jaramillo, *Energy Environ. Sci.* 2012, 5, 7050-7059.
[29] Y. Hori, in Mod. Asp. Electrochem. (Eds.: C. G. Vayenas, R. E. White, M. E. Gamboa-Aldeco), Springer, New York, 2008, pp. 89-189.
[30] A. Wuttig, Y. Surendranath, *ACS Catal.* 2015, 5, 4479-4484.
[31] S. Men, D. S. Mitchell, K. R. J. Lovelock, P. Licence, *Chem Phys Chem* 2015, 16, 2211-2218.
[32] Y. Zhao, X. Liu, Y. Han, *RSC Adv.* 2015, 5, 30310-30330.
[33] A. P. Shaw, B. L. Ryland, M. J. Franklin, J. R. Norton, J. Y.-C. Chen, M. L. Hall, *J. Org. Chem.* 2008, 73, 9668-9674.
[34] The balance of the organic material could correspond to unidentified by-products and other diastereoisomers of the ortho-ortho and para-para dimers (1-Br)$_2$.
[35] A. N. Karaiskakis, E. J. Biddinger, *Energy Technol.* 2017, 5, 901-910.
[36] S. Ogata, N. Kobayashi, T. Kitagawa, S. Shima, A. Fukunaga, C. Takatoh, T. Fukuma, *Corros. Sci.* 2016, 105, 177-182.
[37] Y. Kwon, Y. Lum, E. L. Clark, J. W. Ager, A. T. Bell, *Chem Electro Chem* 2016, 3, 1012-1019.

[38] F. S. Roberts, K. P. Kuhl, A. Nilsson, *Angew. Chem. Int. Ed.* 2015, 54, 5179-5182.
[39] I. T. McCrum, S. A. Akhade, M. J. Janik, *Electrochimica Acta* 2015, 173, 302-309.
[40] A. S. Varela, W. Ju, T. Reier, P. Strasser, *ACS Catal.* 2016, 6, 2136-2144.
[41] T. Saberi Safaei, A. Mepham, X. Zheng, Y. Pang, C.-T. Dinh, M. Liu, D. Sinton, S. O. Kelley, E. H. Sargent, *Nano Lett.* 2016, 16, 7224-7228.
[42] M. Ma, K. Djanashvili, W. A. Smith, *Angew. Chem. Int. Ed.* 2016, 55, 6680-6684.
[43] P. D. Luna, R. Quintero-Bermudez, C.-T. Dinh, M. B. Ross, O. S. Bushuyev, P. Todorović, T. Regier, S. O. Kelley, P. Yang, E. H. Sargent, *Nat. Catal.* 2018, 1, 103-110.
[44] C. Hahn, T. Hatsukade, Y.-G. Kim, A. Vailionis, J. H. Baricuatro, D. C. Higgins, S. A. Nitopi, M. P. Soriaga, T. F. Jaramillo, *Proc. Natl. Acad. Sci.* 2017, 114, 5918-5923.

Example 3B: Supplemental Information for In-Situ Nanostructuring and Stabilization of Polycrystalline Copper by an Organic Salt Additive Promotes Electrocatalytic $CO_2$ Reduction to Ethylene Materials: All solvents and reagents were obtained from commercial sources (Aldrich and Merck) and used as received, unless stated otherwise. Phenanthrolinium additives were synthesized according to previous literature procedures,[1-5] and recrystallized from MeOH/Ether (1:5) prior to use.

Copper foil (product number 266744, 99.999% Cu, 25 mm×50 mm×1 mm), phosphoric acid (85%, TraceSelect), potassium carbonate (99.995%), potassium hydroxide (semiconductor grade, 99.99% trace metals basis) and $^{13}CO_2$ (99 atom % $^{13}C$, <3 atom % $^{18}O$) were purchased from Sigma-Aldrich. Carbon rods (99.999% C) were purchased from Strem Chemicals. Natural abundance $CO_2$ (Research grade) was purchased from Airgas. Deuterium dioxide (D 99.96%), d-chloroform (D 99.8%) and d-dimethylsulfoxide (D 99.8%) were purchased from Cambridge Isotope Laboratories.

Water was purified by a Nanopure Analytical Ultrapure Water System (Thermo Scientific) or a Milli-Q Advantage A10 Water Purification System (Millipore) with specific resistance of 18.2 MΩ·cm at 25° C.

$^1H$ and $^{13}C$ NMR spectra were recorded on a Bruker 400 MHz instrument with a prodigy broadband cryoprobe. Shifts were relative to the residual solvent peak.

Upon receiving, copper foil was polished to a mirror-like finish using alumina paste (0.05 μm, Buehler) followed by rinsing and sonicating in water to remove residual alumina. Before each experiment, the copper foil was electropolished using a method similar to the one employed by Kuhl et al.[6] In an 85% phosphoric acid bath, +2.1 V versus a carbon rod counter electrode was applied to the Cu foil for 5 minutes and the foil was subsequently washed with ultra-pure water and dried under a stream of nitrogen gas.

Potassium bicarbonate electrolyte ($KHCO_3$(aq), 0.1 M) was prepared by sparging an aqueous solution of potassium carbonate ($K_2CO_3$(aq), 0.05 M) with $CO_2$ for at least 1 hour prior to electrolysis. This process converts $K_2CO_3$ into $KHCO_3$ and saturates the electrolyte solution with $CO_2$. The proper organic salt additive was added to the 0.1 M $KHCO_3$(aq) catholyte (unless otherwise stated [additive]=10 mM) whereas 0.1 M $KHCO_3$(aq) without any additives was used as the anolyte.

Synthetic Procedures

Synthesis of N,N'-ethylene-phenanthrolinium dibromide (1-$Br_2$)

In a round bottom flask charged with a magnetic stir bar, phenanthroline (500 mg, 2.8 mmol, 1 equiv.) was dissolved in dibromoethane (5 mL, 67.4 mmol, >24 equiv.) and the final mixture was heated to 110° C. for 18 h. The precipitate formed was collected by filtration and washed with hexane (3×10 mL) and acetone (3×10 mL) to afford the final product. Yield: 970 mg (94%, 2.6 mmol). $^1H$ and $^{13}C$ NMR spectra were in accordance with reported values.[1-3]

Synthesis of N,N'-ethylene-phenanthrolinium ditriflate [1-$(OTf)_2$]

In a flame dried Schlenk flask charged with a magnetic stir bar, under $N_2$ and in absence of light, phenanthrolinium dibromide (200 mg, 0.5 mmol, 1 equiv.) was dissolved in dry acetonitrile (10 mL). Silver triflate (280 mg, 1.0 mmol, 2 equiv.) was added and the final mixture was stirred for 18 h, at 25° C. The AgBr precipitate was discarded by filtration. The solvent was evaporated yielding a brown powder. Yield: 212 mg (84%, 0.4 mmol). $^1H$ and $^{13}C$ NMR spectra were in accordance with reported values.[4]

Synthesis of N,N'-ethylene-phenanthrolinium dichloride

Phenanthrolinium dibromide (100 mg, 0.25 mmol, 1 equiv.) was dissolved in 1.0 mL of water and eluted several times through an ion exchange resin (Amberlite IRA-400 chloride form). Yield: 70 mg (100%, 0.25 mmol). $^1H$ and $^{13}C$ NMR spectra were in accordance with reported literatures.[5]

Synthesis of N,N'-ethylene-phenanthrolinium diiodide

Phenanthrolinium dibromide (100 mg, 0.27 mmol) was dissolved in 10 mL of water and eluted several times through a pre-washed ion exchange resin (Amberlite IRA-400 chloride form) with HI. After removal of the water under vacuum, 112 mg of a red solid were obtained (91% yield). $^1H$ NMR (400 MHz, $D_2O$) δ (ppm): 8.78 (dd, $^2J_{H-H}$=4.5 Hz, $^3J_{H-H}$=1.7 Hz, 2H), 8.10 (dd, $^2J_{H-H}$=8.31 Hz, $^3J_{H-H}$=1.7 Hz, 2H), 7.53 (m, 2H), 7.45 (s, 2H), 4.42 (m, 1H), 3.88 (m, 1H), 3.68 (m, 2H), 3.29 (m, 2H). $^{13}C$ NMR (101 MHz, $D_2O$) δ (ppm): 148.2 (s), 141.1 (s), 137.7 (s), 127.9 (s), 125.9 (s), 123.6 (s), 46.3 (s), 44.1 (s), 32.9 (s).

Electrochemical Measurements:

Chronoamperometry measurements were carried out in a custom-made PEEK flow cell setup similar to the one reported by Ager et al.[7] using a copper foil as the working electrode and a platinum foil as the counter electrode. The cathode compartment was separated from the anode compartment by a Selemion AMV anion-exchange membrane (AGC Engineering Co.). All potentials were measured versus a leakless Ag/AgCl reference electrode (Innovative Instruments) with an outer diameter of 5 mm that was inserted into the cathode compartment. The reference electrode was calibrated against ferrocenecarboxylicacid in a 0.2 M phosphate buffer solution at pH 7.0 (+0.239 V vs. Ag/AgCl). All electrochemical measurements were carried out using a Biologic VMP3 multichannel potentiostat.

Potentiostatic electrochemical impedance spectroscopy (PEIS) measurements were carried out prior to each electrolysis experiment to determine the Ohmic resistance of the flow cell. The impedance measurements were carried out at frequencies ranging from 200 kHz to 100 MHz to measure the solution resistance. A Nyquist plot was plotted and in the high-frequency part a linear fit was performed and the axis intersection was calculated. The value of this intersection represents the Ohmic resistance of the cell. An average of 3 measurements was taken to calculate the value of R. Typically, small resistances were measured, ranging from 40 to 60Ω.

All chronoamperometric experiments were performed for 65 min at 25° C. using $CO_2$-saturated 0.1 M $KHCO_3$ as electrolyte. The potentiostat was set to compensate for 85% of the Ohmic drop, with the remaining 15% being compensated for after the measurements. The effluent gas stream coming from the flow cell (5 mL/min) was flowed into the sample loops of a gas chromatograph (GC-FID/TCD, SRI 8610C, in Multi Gas 5 configuration) equipped with HayeSep D and Molsieve 5 Å columns. Methane, ethylene, ethane and carbon monoxide were detected by a methanizer-flame ionization detector (FID) and the hydrogen was detected by a thermal conductivity detector (TCD). Every 15 minutes, 2 mL of gas was sampled to determine the concentration of gaseous products. After electrolysis, the liquid products in both catholytes and anolytes were quantified by both HPLC (Thermo Scientific Ultimate 3000) and $^1H$ NMR.

For $^1H$ NMR, solutions containing 90% electrolyte and 10% $D_2O$ (v/v) with internal standard (N,N-dimethylformamide or dimethylsulfoxide) were prepared and measured using a water suppression technique on a Bruker 400 MHz NMR spectrometer.

All potentials were converted from the Ag/AgCl scale to the reversible hydrogen electrode (RHE) scale by using $V_{RHE}=V_{(Ag/AgCl)measured}-0.197-0.059 \times pH$, where $V_{RHE}$, $V_{(Ag/AgCl)measured}$ and pH are potential vs RHE, measured potential vs Ag/AgCl reference electrode and pH of the electrolyte (6.8).

Cyclic voltammetry (CV) measurements were recorded at 25° C. using a one-compartment cell with a Cu or a glassy carbon disk working electrodes (diameter 3 mm), Pt counter electrode, and a Ag/AgCl reference electrode. The electrolyte solutions were either $CO_2$ or $N_2$ saturated 0.1 M $KHCO_3$ in $H_2O$ and were stirred during all measurements.

For isotopic labeling experiments the same experimental configurations as described above were employed except $KH^{13}CO_3$(aq) solution and $^{13}CO_2$ were used as the electrolyte and $CO_2$ source, respectively. To prepare the 0.1 M $KH^{13}CO_3$(aq) solution, 50 mL of nanopure water was sparged with nitrogen for 1 h and was added to potassium hydroxide (0.32 g containing 12.6% water) in a Schlenk flask under nitrogen atmosphere. The headspace was evacuated for a few seconds, and $^{13}CO_2$ was introduced. The solution was stirred vigorously for 5 h and an aliquot was extracted to make sure the pH was ~7. The solution was then added to a pre-evacuated 4 mL vial containing 1-$Br_2$ to yield the final electrolyte solution of 0.1 M $KH^{13}CO_3$(aq) and 10 mM 1-$Br_2$. During the electrolysis, $^{13}CO_2$ was introduced from the bottom of the flow cell at 5 ml/min. The outlet was connected to the inlet of the sample loop of the GC-FID/TCD for quantitative analyses every 15 min. To collect the gaseous products for GC-MS and NMR analyses, the outlet of the GC sample loops was connected to a syringe with rubber plunger pulled by a syringe pump set to the same rate as the gas flow. GC-MS analyses was performed using an Agilent 7820 Å GC coupled with a 5977E MS with a heated cold quadrupole detector and a capillary CarbonPLOT column for identification of the mass fragmentation of ethylene. The background signal was subtracted.

X-Ray Photoelectron Spectroscopy (XPS):

X-ray photoelectron spectroscopy (XPS) data were collected using a Surface Science Instruments M-Probe ESCA controlled by Hawk Data Collection software (Service Physics, Bend Oreg.; V7.04.04). The monochromatic X-ray source was the Al Kα line at 1486.6 eV, directed at 35° to the sample surface (55° off normal). Emitted photoelectrons were collected at an angle of 35° with respect to the sample surface (55° off normal) by a hemispherical analyzer. The angle between the electron collection lens and X-ray source is 71°. Low-resolution survey spectra were acquired between binding energies of 1-1000 eV. Higher-resolution detailed scans, with a resolution of ~0.8 eV, were collected on individual XPS lines of interest. The sample chamber was maintained at $<2 \times 10^{-9}$ Torr. The XPS data were analyzed using the CasaXPS software. Copper foils after electropolishing or electrolysis were rinsed with copious amount of water, dried under a stream of nitrogen and immediately transferred to a nitrogen glove box before XPS measurements.

Atomic Force Microscopy (AFM):

All AFM images were recorded on a Bruker Dimension Icon using the ScanAssyst mode. A scanassyst-air canteliver was used with a spring constant of 0.4 N/m and a resonant frequency of 70 KHz. AFM images were acquired at a scan rate of 0.977 Hz applying a peak force of 1.2 nm over 10 μm with 512 samples per line.

Scanning Electron Microscopy (SEM) and Energy Dispersive X-Ray (EDX):

All SEM images were recorded on a ZEISS 1550VP FESEM instrument, equipped with in-lens SE, below-lens SE, variable pressure SE and Robinson-type BSE detectors. EDX measurements were done on an Oxford X-Max SDD X-ray Energy Dispersive Spectrometer (EDS) system.

X-Ray Diffraction (XRD):

The crystal structures were determined through XRD measurements using a Bruker DISCOVER D8 diffractometer with Cu Kα radiation from a Bruker ImS source (50 kV voltage and 1000 μA current). With a 0.3 mm collimator and 6° incident angle, a two theta scan mode was used and the effective thin film measurement foot print was approximately 3 mm. The grazing x-ray diffraction was measured using the same two theta scan mode but with a 0.1 mm collimator and 0.5° incident angle. Diffraction images were collected using a two-dimensional VANTEC-500 detector and integrated into one-dimensional patterns using DIFFRAC.SUITE™ EVA software.

TABLE 7

Faradaic efficiency (%) for CO$_2$RR products and hydrogen obtained during CO$_2$RR without and with 10 mM 1-Br$_2$ in a CO$_2$ saturated 0.1M KHCO$_3$ electrolyte at −1.07 V.

| Additive | Run | H$_2$ | CO | HCOOH | CH$_4$ | C$_2$H$_4$ | C$_2$H$_5$OH | C$_3$H$_7$OH | C$_2$ | Total | j (mA/cm$^2$) |
|---|---|---|---|---|---|---|---|---|---|---|---|
| — | 1 | 36.4 | 1.1 | 3.4 | 22.0 | 15.8 | 8.2 | 3.2 | 29.7 | 92.6 | −5.0 |
|  | 2 | 49.4 | 2.9 | 2.7 | 14.0 | 11.1 | 7.6 | 2.7 | 25.2 | 97.1 | −4.2 |
|  | 3 | 42.5 | 2.6 | 2.6 | 24.7 | 10.1 | 5.9 | 2.6 | 23.0 | 96.6 | −4.2 |
|  | Average | 42.8 | 2.2 | 2.9 | 20.2 | 12.3 | 7.2 | 2.8 | 26.0 | 95.4 | −4.5 |
| 1-Br$_2$ | 1 | 17.8 | 0.3 | 6.2 | 0.0 | 45.2 | 14.7 | 3.1 | 63.1 | 87.3 | −3.9 |
|  | 2 | 13.6 | 1.0 | 6.1 | 0.1 | 45.6 | 15.4 | 3.8 | 64.7 | 85.5 | −3.5 |
|  | 3 | 15.2 | 0.7 | 6.3 | 0.0 | 45.4 | 13.8 | 3.8 | 62.9 | 85.1 | −3.8 |
|  | Average | 15.5 | 0.7 | 6.2 | 0.1 | 45.4 | 14.6 | 3.6 | 63.6 | 86.0 | −3.8 |

TABLE 8

Faradaic efficiencies for CO$_2$RR products and hydrogen obtained during catalytic runs in the presence of 10 mM 1-Br$_2$ at different potentials. The results are from the average of three runs.

| Potential (V) | H$_2$ | CO | HCOOH | CH$_4$ | C$_2$H$_4$ | C$_2$H$_5$OH | C$_3$H$_7$OH | C$_2$ | Total | j (mA cm$^{-2}$) |
|---|---|---|---|---|---|---|---|---|---|---|
| −1.19 | 40.5 | 0.2 | 0.1 | 0.8 | 28.0 | 19.0 | 1.2 | 48.2 | 90.7 | −7.4 |
| −1.15 | 25.2 | 0.4 | 1.5 | 0.4 | 39.7 | 20.7 | 1.8 | 62.2 | 89.8 | −6.4 |
| −1.11 | 19.1 | 0.6 | 2.5 | 0.3 | 44.0 | 17.9 | 2.0 | 64.0 | 86.5 | −6.9 |
| −1.07 | 15.5 | 0.7 | 6.2 | 0.1 | 45.4 | 14.6 | 3.6 | 63.6 | 86.0 | −3.8 |
| −0.99 | 21.6 | 4.7 | 21.8 | n.d. | 26.9 | n.d. | n.d. | 26.9 | 75.0 | −1.6 |
| −0.90 | 22.3 | 14.9 | 35.1 | n.d. | 11.0 | n.d. | n.d. | 11.0 | 83.2 | −0.6 |

TABLE 9

Faradaic efficiency (%) for CO$_2$RR products and hydrogen obtained at −1.07 V using different concentration of 1-Br$_2$.

| Concentration | H$_2$ | CO | HCOOH | CH$_4$ | C$_2$H$_4$ | C$_2$H$_5$OH | C$_3$H$_7$OH | C$_2$ | Total | j (mA cm$^{-2}$) |
|---|---|---|---|---|---|---|---|---|---|---|
| 10 mM | 15.5 | 0.7 | 6.2 | 0.1 | 45.4 | 14.6 | 3.6 | 63.6 | 86.0 | −3.8 |
| 1 mM | 25.0 | 1.1 | 5.9 | 0.1 | 41.6 | 16.5 | 8.1 | 66.2 | 97.2 | −3.2 |
| 0.1 mM | 28.9 | 0.8 | 7.4 | 0.4 | 34.3 | 13.8 | 6.3 | 54.4 | 91.9 | −3.7 |

TABLE 10

Faradaic efficiency (%) towards different CO$_2$RR products during recycling experiments in a CO$_2$ saturated 0.1M KHCO$_3$ electrolyte at −1.07 V.[a]

| Run | H$_2$ | CO | HCOOH | CH$_4$ | C$_2$H$_4$ | C$_2$H$_5$OH | C$_3$H$_7$OH | C$_2$ | Total | j (mA cm$^{-2}$) |
|---|---|---|---|---|---|---|---|---|---|---|
| 1* | 23.1 | 1.0 | 8.4 | 0.3 | 38.2 | 15.3 | 3.8 | 57.3 | 90.1 | −3.8 |
| 2** | 32.0 | 0.7 | 9.7 | 0.4 | 36.5 | 14.9 | 3.5 | 54.9 | 97.7 | −3.4 |
| 3*** | 27.5 | 1.7 | 9.6 | 2.9 | 38.4 | 15.4 | 3.7 | 57.5 | 99.2 | −4.2 |

*10 h reaction;
**1 h reaction;
***3 h reaction.

[a]Before the first run, the Cu electrode was functionalized with a thick layer of the organic film. This was done by performing electrocatalysis at −1.4 V for 1 h in 0.1M KHCO$_3$ in presence of 10 mM of 1-Br$_2$. The cell was then cleaned and the functionalized electrode was rinsed gently with water to remove the solution but avoid mechanically disturbing the insoluble film. All the runs were performed using the same functionalized Cu electrode. The cell was cleaned between each run and the electrode was washed gently with water and kept in air. Fresh 0.1M KHCO$_3$ electrolyte was used for each run (no additive).

TABLE 11

Faradaic efficiency (%) for $CO_2RR$ products and hydrogen obtained during catalytic runs in a $CO_2$-saturated 0.1M $KHCO_3$ electrolyte at −1.07 V with 20 mM of KBr.

| | | Faradaic Efficiency (%) | | | | | | | | |
|---|---|---|---|---|---|---|---|---|---|---|
| Additive | Run | $H_2$ | CO | HCOOH | $CH_4$ | $C_2H_4$ | $C_2H_5OH$ | $C_3H_7OH$ | $C_2$ | Total | j (mA cm$^{-2}$) |
| KBr | 1 | 55.7 | 1.1 | 8.0 | 19.7 | 8.2 | 3.8 | 3.1 | 15.1 | 99.6 | −5.3 |
| KBr | 2 | 47.5 | 1.8 | 17.4 | 15.8 | 11.5 | 3.9 | 3.1 | 18.5 | 101.6 | −5.8 |
| | Average | 51.6 | 1.5 | 12.9 | 17.7 | 9.8 | 3.8 | 3.1 | 16.8 | 100.6 | −5.5 |

TABLE 12

Faradaic efficiency (%) for $CO_2RR$ products and hydrogen obtained during catalytic runs in a $CO_2$ saturated 0.1M $KHCO_3$ electrolyte at −1.07 V with 10 mM 1-$X_2$ (X = Br$^-$, Cl$^-$, OTf$^-$ or I$^-$).

| | | Faradaic Efficiency (%) | | | | | | | | | |
|---|---|---|---|---|---|---|---|---|---|---|---|
| Additive | Run | $H_2$ | CO | HCOOH | $CH_4$ | $C_2H_4$ | $C_2H_5OH$ | $C_3H_7OH$ | $C_2$ | Total | j (mA cm$^{-2}$) |
| 1-Br$_2$ | Average | 15.5 | 0.7 | 6.2 | 0.1 | 45.4 | 14.6 | 3.6 | 63.6 | 86.0 | −3.8 |
| 1-(OTf)$_2$ | 1 | 26.7 | 2.0 | 13.9 | 0.2 | 36.4 | 15.2 | 5.2 | 56.8 | 99.7 | −2.4 |
| | 2 | 21.5 | 1.2 | 13.9 | 0.1 | 38.4 | 12.9 | 4.7 | 56.0 | 92.7 | −2.5 |
| | Average | 24.1 | 1.6 | 13.9 | 0.1 | 37.4 | 14.1 | 4.9 | 56.4 | 96.2 | −2.4 |
| 1-Cl$_2$ | 1 | 23.6 | 1.1 | 20.0 | 0.1 | 35.0 | 7.5 | 4.0 | 46.5 | 91.0 | −2.5 |
| | 2 | 27.6 | 1.9 | 21.2 | 0.2 | 32.7 | 9.3 | 6.8 | 48.5 | 99.6 | −2.4 |
| | Average | 25.6 | 1.5 | 20.6 | 0.1 | 33.8 | 8.4 | 5.4 | 47.5 | 95.3 | −2.4 |
| 1-I$_2$ | 1 | 18.9 | 1.3 | 13.0 | 0.1 | 42.5 | 12.3 | 3.3 | 58.1 | 91.2 | −2.6 |
| | 2 | 23.8 | 2.2 | 13.9 | 0.1 | 41.5 | 12.9 | 4.7 | 59.1 | 99.0 | −2.5 |
| | Average | 21.4 | 1.7 | 13.4 | 0.1 | 42.0 | 12.6 | 4.0 | 58.6 | 95.1 | −2.5 |

TABLE 13

Faradaic efficiency (%) for $CO_2RR$ products and hydrogen obtained during a catalytic run in a $CO_2$-saturated 0.1M $KHCO_3$ electrolyte at −1.07 V in the presence of 1-Br$_2$ (run 1); after removing the electrodeposited film and resubmitting the same electrode with no additive in the electrolyte (run 2).

| | | Faradaic Efficiency (%) | | | | | | | | | |
|---|---|---|---|---|---|---|---|---|---|---|---|
| Additive | Run | $H_2$ | CO | HCOOH | $CH_4$ | $C_2H_4$ | $C_2H_5OH$ | $C_3H_7OH$ | $C_2$ | Total | j (mA · cm$^{-2}$) |
| 1-Br$_2$ | 1 | 12.2 | 1.8 | 6.2 | 0.1 | 44 | 14.6 | 3.6 | 62.1 | 82.2 | −3.2 |
| — | 2 | 59.6 | 0.6 | 11.3 | 9.4 | 10.2 | 5.0 | 4.4 | 19.6 | 97.8 | −3.7 |

TABLE 14

Faradaic efficiency (%) for $CO_2RR$ products and hydrogen obtained during a catalytic run in a $CO_2$-saturated 0.1M $KHCO_3$ electrolyte at −1.07 V with 1-Br$_2$ (run 1); without additive in the electrolyte and using the resulting electrode from run 1 (run 2).

| | | Faradaic Efficiency (%) | | | | | | | | | |
|---|---|---|---|---|---|---|---|---|---|---|---|
| Additive | Run | $H_2$ | CO | HCOOH | $CH_4$ | $C_2H_4$ | $C_2H_5OH$ | $C_3H_7OH$ | $C_2$ | Total | j (mA cm$^{-2}$) |
| 1-Br$_2$ | 1 | 12.2 | 1.8 | 6.2 | 0.1 | 44 | 14.6 | 3.6 | 62.1 | 82.23 | −3.2 |
| — | 2 | 20.1 | 2.3 | 10.4 | 0.1 | 40 | 14.4 | 3.2 | 57.7 | 90.5 | −3.8 |

Dimerization Mechanism:

Intrigued by the formation of the para-para and ortho-ortho dimers resulting from the electroreduction of 1-Br$_2$ by a polycrystalline copper electrode, the reduction of 1-Br$_2$ was investigated by cyclic voltammetry (CV) using a Cu disk as the working electrode and a platinum wire as the counter electrode (FIGS. 59A-59C). Under a $CO_2$ atmosphere, two irreversible reductive waves at −0.1 V and −0.4 V are present in the first scan and disappear completely in the second scan. This suggests that the electrode is insulated from the electrolyte by the organic film. The same ratio of ortho-ortho and para-para dimers is present as that observed via extraction of the copper electrode after a bulk electrolysis experiment, as described in the main text. In the present instance, the mixture of dimers can be observed by dissolving and analyzing by $^1$H NMR spectrum of the film deposited on the electrode during the CV experiments (FIGS. 60A-60B). This indicates that film formation occurs in the initial stages of the electrocatalysis. Another chronoamperometry experiment was performed on a copper working electrode with a carbon rod counter electrode for 1 h under an $N_2$ atmosphere using a deuterated electrolyte and with 30 mM of 1-$Br_2$. The solution rapidly changes color from pale yellow to deep red upon applying a potential of −1.07 V, characteristic of the formation of a phenanthrolinium radical (FIGS. 61A-61B). After 1 h of reaction time, both films formed on the Cu and the carbon rod electrode were dissolved in DMSO-$d_6$ to be analyzed, together with analysis of the electrolyte by $^1$H NMR spectroscopy (FIGS. 62A-62D). The ortho-ortho and para-para dimers are the only products observable on the Cu surface. These products are not detected in the electrolyte, or from attempted extraction of the carbon rod. In the electrolyte, mainly the starting phenanthrolinium additive 1-$Br_2$ is observed after 1 h reaction time. Other side products are also observed in the electrolyte and via extraction of the carbon rod, which may be oligomeric/polymeric species that result from multiple couplings of phenanthrolinium radicals. When the same CV or chronoamperometry experiments is repeated using a glassy carbon rod as the working electrode, the ortho-ortho and para-para dimers are not detected on the surface of the electrode after extracting with DMSO-$d_6$ and analyzing the solution by $^1$H NMR spectroscopy (FIG. 63). Notably, when the one-electron reduced radical 1•-Br is generated in solution using zinc dust as a chemical reductant, dimerization is not observed. All of these observations lead to the conclusion that the dimerization process of the one-electron reduced form of 1-$Br_2$ is facilitated by the copper electrode surface.

Reactivity Studies of 1˙-Br with $CO_2$:

Pyridinium radicals have been proposed to play a crucial role in the selectivity shift during $CO_2$RR by reacting with $CO_2$ to form a carbamate intermediate.[10-13] To rule out the possibility of a direct interaction between the molecule of $CO_2$ and the one-electron reduced species of 1-$Br_2$ without the involvement of Cu, the reactivity of 1'-Br was studied by EPR and UV-VIS spectroscopy (FIGS. 64, 65A-65B and 66). Upon addition of an excess of Zn dust to a 10 mM aqueous solution of 1'-Br under $N_2$ atmosphere, a rapid change in color to deep red was observed, characteristic of the formation of radical 1'-Br, as previously reported.[1,2] Then, the solution was treated with $CO_2$ and the corresponding EPR and UV-VIS spectra were recorded. No differences in the spectra were observed before and after the addition of carbon dioxide, suggesting that radical 1'-Br does not react with $CO_2$ and thus, such a species is not involved directly in the $CO_2$RR mechanism.

The EPR spectrum of 1'-Br in water shows low intensity signals for both the sample under $N_2$ and $CO_2$, at 77 K. At room temperature no EPR signal was observed. The EPR signals under $N_2$ and $CO_2$ were similar indicating that the $CO_2$ is not reacting with 1'-Br.

References Associated with Example 3B

[1] L. A. Summers, *Tetrahedron* 1968, 24, 5433-5437.
[2] L. A. Summers, *Nature* 1967, 215, 1410-1411.
[3] A. L. Black, L. A. Summers, *Tetrahedron* 1968, 24, 6453-6457.
[4] B. J. Coe, N. R. M. Curati, E. C. Fitzgerald, *Synthesis* 2006, 2006, 146-150.
[5] K. Jackson, J. H. Ridd, M. L. Tobe, *J. Chem. Soc. Perkin Trans. 2* 1979, 0, 607-610.
[6] K. P. Kuhl, E. R. Cave, D. N. Abram, T. F. Jaramillo, *Energy Environ. Sci.* 2012, 5, 7050-7059.
[7] P. Lobaccaro, M. R. Singh, E. L. Clark, Y. Kwon, A. T. Bell, J. W. Ager, *Phys. Chem. Chem. Phys.* 2016, 18, 26777-26785.
[8] S. Men, D. S. Mitchell, K. R. J. Lovelock, P. Licence, *Chem Phys Chem* 2015, 16, 2211-2218.
[9] Y. Zhao, X. Liu, Y. Han, *RSC Adv.* 2015, 5, 30310-30330.
[10] A. B. Bocarsly, Q. D. Gibson, A. J. Morris, R. P. L'Esperance, Z. M. Detweiler, P. S. Lakkaraju, E. L. Zeitler, T. W. Shaw, *ACS Catal.* 2012, 2, 1684-1692.
[11] E. E. Barton Cole, M. F. Baruch, R. P. L'Esperance, M. T. Kelly, P. S. Lakkaraju, E. L. Zeitler, A. B. Bocarsly, *Top. Catal.* 2015, 58, 15-22.
[12] S. I. Rybchenko, D. Touhami, J. D. Wadhawan, S. K. Haywood, *Chem Sus Chem* 2016, 9, 1660-1669.
[13] P. K. Giesbrecht, D. E. Herbert, *ACS Energy Lett.* 2017, 2, 549-555.

Example 4: Additional Embodiments

Additional embodiments, including characteristics, configurations, components, systems, methods, application, and descriptions, are found in International Patent Pub. WO 2019/185622 (Sargent, et al.) and U.S. Patent Pub. 2018/0291515 (Han, et al.), each of which is incorporate herein by reference in its entirety to the extent not inconsistent herewith. Other useful descriptions and configurations may be also be found in U.S. Patent Pub. 2016/0108530 (Masel, et al.) and U.S. Patent Pub. 2016/0369415 (Masel, et al.), each of which is incorporate herein by reference in its entirety to the extent not inconsistent herewith.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, cell, layer, electrode, formulation, combination of components, and method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electrolytic system for electrochemical reduction of carbon dioxide, the system comprising:
   an anode;
   a cathode in electrical communication with the anode, the cathode comprising:

a first current collector;

a porous gas-diffusion membrane having a first side and a second side; wherein the porous gas-diffusion membrane is permeable to $CO_2$; and an electrocatalyst layer adjacent to the second side of the gas-diffusion membrane and in electrical communication with the first current collector; the electrocatalyst layer comprising:

an electrically conductive catalyst; and a selectivity-determining organic material attached to at least a portion of the electrically conductive catalyst; wherein:

the organic material is formed of a plurality of oligomers;

each oligomer comprises a plurality of covalently bonded base units; and each base unit comprises at least one heterocyclic group having at least one nitrogen in its ring structure;

an anion exchange membrane adjacent to the electrocatalyst layer and positioned between the anode and the cathode; wherein anion exchange membrane is characterized by anion conductivity and the cathode is in ionic communication with the anode via the anion exchange membrane;

a catholyte in contact with the cathode and the anion exchange membrane, the catholyte comprising dissolved $CO_2$ and $HCO_3^-$ anions and/or $CO_3^{2-}$ anions; and an anolyte in contact with the anode and the anion exchange membrane, the anolyte comprising dissolved $CO_2$ and $HCO_3^-$ anions and/or $CO_3^{2-}$ anions;

wherein $CO_2$ is formed in the anolyte according to reaction Eq. 1 and/or reaction Eq. 2:

$$H^+ + HCO_3^- \rightarrow CO_2 + H_2O \quad \text{(Eq. 1) and/or}$$

$$2H^+ + CO_3^{2-} \rightarrow CO_2 + H_2O \quad \text{(Eq. 2); and}$$

wherein each of the anolyte and the catholyte comprises a carbonate and/or bicarbonate electrolyte saturated with $CO_2$.

2. The electrolytic system of claim 1, wherein the anolyte is in physical contact and in ionic communication with at least a portion of the anode; wherein the anion exchange membrane physically separates the anolyte from the cathode.

3. The electrolytic system of claim 2, wherein each of the anolyte and the catholyte is characterized by a pH selected from the range of 6 to 14.

4. The electrolytic system of claim 1 comprising a first gas volume adjacent to the first side of the porous gas-diffusion membrane; wherein the first gas volume is in operable contact with the gas-diffusion membrane such that $CO_2$ from the first gas volume can penetrate into the first side of the gas-diffusion membrane and such that at least one product gas can enter the first gas volume from the gas-diffusion membrane.

5. The electrolytic system of claim 4 being configured such that:

$CO_2$ gas is provided to the first gas volume;

the $CO_2$ gas penetrates the first side of the gas-diffusion membrane and diffuses through the gas-diffusion membrane to the electrocatalyst layer;

the $CO_2$ gas is reduced at the electrocatalyst layer to produce the at least one product gas, the at least one product gas having a composition comprising at least two carbon atoms ($C_{\geq 2}$);

the at least one product gas diffuses through the gas-diffusion membrane and out of the first side of the gas-diffusion membrane.

6. The electrolytic system of claim 1, wherein the electrically conductive catalyst comprises Cu.

7. The electrolytic system of claim 1, wherein gas-diffusion membrane is hydrophobic.

8. The electrolytic system of claim 1, wherein the gas-diffusion membrane comprises a fluorocarbon polymer.

9. The electrolytic system of claim 1, wherein the gas-diffusion membrane has:

a porosity characterized by pores having a characteristic pore size selected from the range of 10 nm to 2 μm and a thickness selected from the range of 20 nm to 500 μm.

10. The electrolytic system of claim 1, wherein each of the oligomers comprises 2, 3, or 4 of the base units.

11. The electrolytic system of claim 1, wherein each of the oligomers is positively charged.

12. The electrolytic system of claim 1, wherein each of the base units comprises at least one substituted or unsubstituted pyridinium group, at least one substituted or unsubstituted arylpyridinium group, and/or at least one substituted or unsubstituted phenanthrolinium group.

13. The electrolytic system of claim 1, wherein each of the base units is independently characterized by Formula FX1A, FX1B, FX1C, FX1D, FX2A, FX2B, FX2C, FX2D, FX2E, FX3A, FX3B, FX3C, FX3D, or any combination of these:

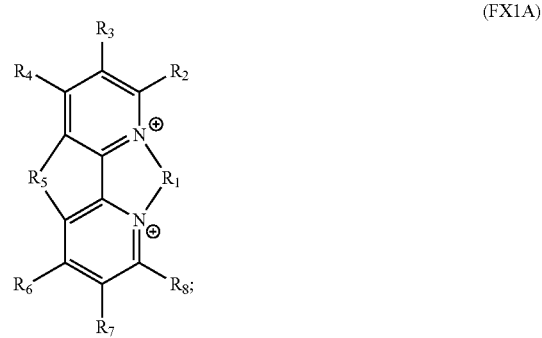

(FX1A)

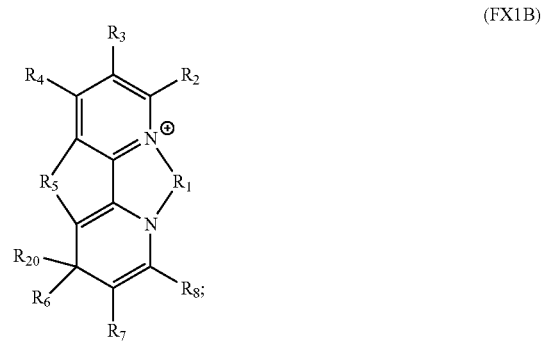

(FX1B)

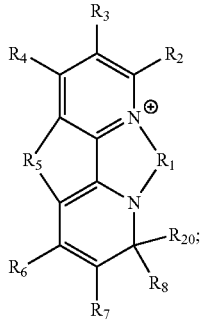
(FX1C)

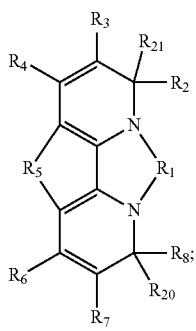
(FX1D)

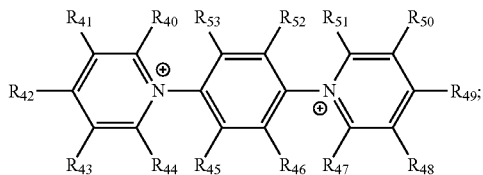
(FX2A)

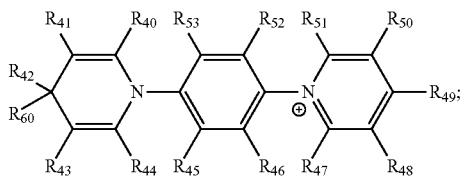
(FX2B)

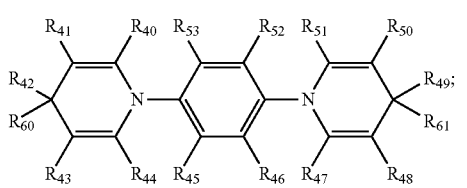
(FX2C)

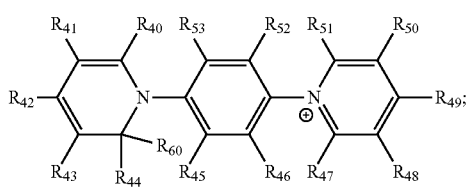
(FX2D)

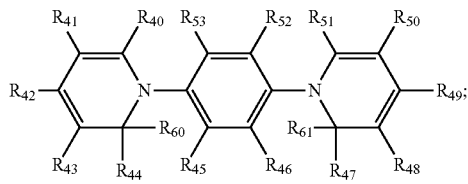
(FX2E)

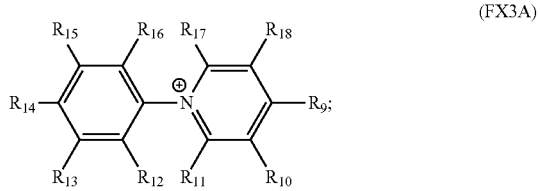
(FX3A)

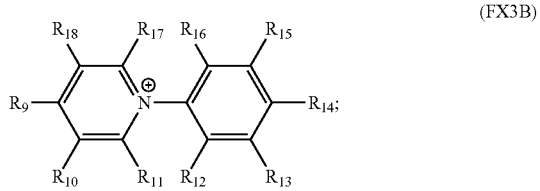
(FX3B)

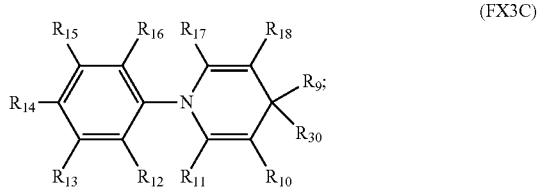
(FX3C)

(FX3D)

wherein:
each of $R_1$ and $R_5$ is a substituted or unsubstituted $C_2$ to $C_n$ alkylene group, a substituted or unsubstituted $C_2$ to $C_n$ heteroalkylene group, a substituted or unsubstituted $C_2$ to $C_n$ alkenylene group, or substituted or unsubstituted $C_2$ to $C_n$ heteroalkenylene group;

n is an integer selected from the range of 2 to 100;

each of $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$ is independently a single bond to another base unit of the respective oligomer, a divalent linker group to another base unit of the respective oligomer, a hydrogen, a halogen, or is selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium and any combination of these; and each of $R_3$, $R_7$, $R_{10}$, $R_{12}$-$R_{16}$, $R_{18}$-$R_{21}$, $R_{30}$, $R_{41}$, $R_{43}$, $R_{45}$-$R_{46}$, $R_{48}$, $R_{50}$, $R_{52}$-$R_{53}$, and $R_{61}$ is independently a hydrogen, a halogen, or is selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium and any combination of these.

14. The electrolytic system of claim 1, wherein each of the base units is independently characterized by Formula FX1E, FX1F, FX1G, FX1H, FX2F, FX2G, FX3E, FX3F, FX3G, FX3H, or any combination of these:

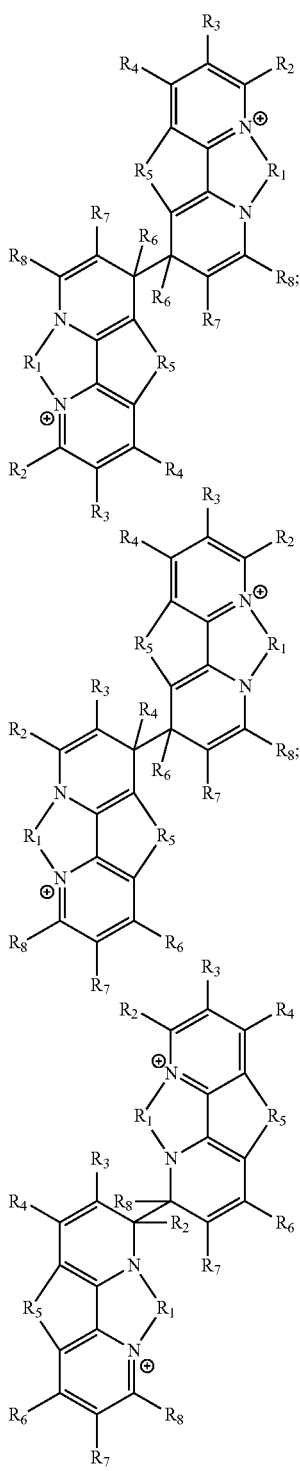

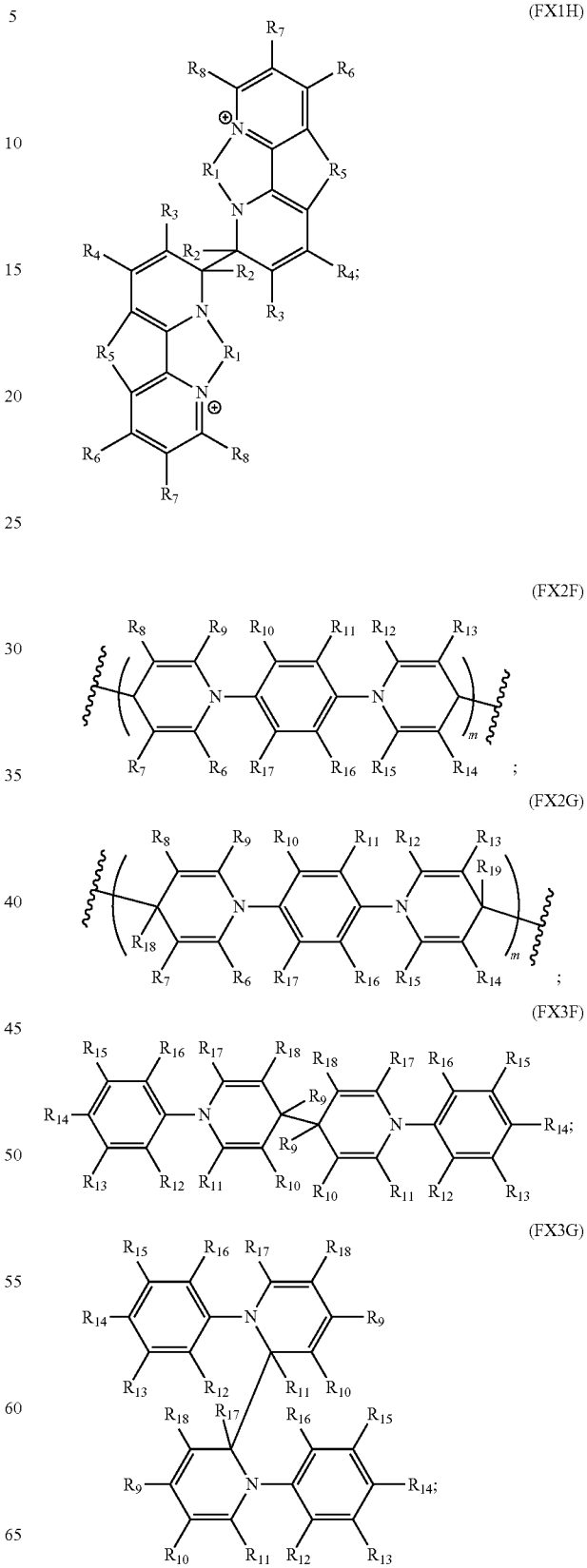

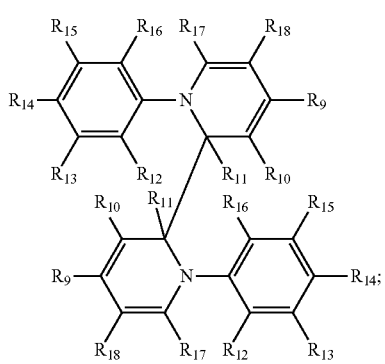

(FX3H)

wherein:
each of $R_1$ and $R_5$ is a substituted or unsubstituted $C_2$ to $C_n$ alkylene group, a substituted or unsubstituted $C_2$ to $C_n$ heteroalkylene group, a substituted or unsubstituted $C_2$ to $C_n$ alkenylene group, or substituted or unsubstituted $C_2$ to $C_n$ heteroalkenylene group;

n is an integer selected from the range of 2 to 100;

m is an integer selected from the range of 2 to 100;

each of $R_2$, $R_4$, $R_6$, $R_8$, $R_9$, $R_{11}$, $R_{17}$, $R_{40}$, $R_{42}$, $R_{44}$, $R_{47}$, $R_{49}$, and $R_{51}$ is independently a single bond to another base unit of the respective oligomer, a divalent linker group to another base unit of the respective oligomer, a hydrogen, a halogen, or is selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium and any combination of these; and each of $R_3$, $R_7$, $R_{10}$, $R_{12}$-$R_{16}$, $R_{18}$-$R_{21}$, $R_{30}$, $R_{41}$, $R_{43}$, $R_{45}$-$R_{46}$, $R_{48}$, $R_{50}$, $R_{52}$-$R_{53}$, and $R_{61}$ is independently a hydrogen, a halogen, or is selected from the group consisting of a substituted or unsubstituted: alkyl group, aryl group, cycloalkyl group, aryl group, heteroaryl group, hydroxyl group, alkoxy group, alkenyl group, acyl group, hydrocarbyl group, alkynyl group, alkynyl group, alkylaryl group, halocarbon group, thiol group, amine group, amide group, aminyl group, phosphorous-containing group, silicon-containing group, a boron-containing group, pyridinium and any combination of these.

15. The electrolytic system of claim 1, wherein the electrocatalyst layer provides for selectivity of at least 70% for $C_{\geq 2}$ products of $CO_2$ reduction.

16. The electrolytic system of claim 1, wherein the electrocatalytic system is characterized by a current density of at least 230 mA/cm² and a selectivity of at least 72% for ethylene production via $CO_2$ reduction for at least 190 hours.

17. The electrolytic system of claim 1, wherein the electrocatalytic system is characterized by an energy efficiency of at least 20%.

18. A method for reducing $CO_2$ gas using an electrolytic system, the method comprising steps of:

applying a voltage between an anode and a cathode of the electrolytic system; wherein the electrolytic system comprises:
the anode;
the cathode in electrical communication with the anode, the cathode comprising:
a first current collector;
a porous gas-diffusion membrane having a first side and a second side; wherein the porous gas-diffusion membrane is permeable to $CO_2$; and
an electrocatalyst layer adjacent to the second side of the gas-diffusion membrane and in electrical communication with the first current collector; the electrocatalyst layer comprising:
an electrically conductive catalyst; and
a selectivity-determining organic material attached to at least a portion of the electrically conductive catalyst; wherein:
the organic material is formed of a plurality of oligomers;
each oligomer comprises a plurality of covalently bonded base units; and
each base unit comprises at least one heterocyclic group having at least one nitrogen in its ring structure;
an anion exchange membrane adjacent to the electrocatalyst layer and positioned between the anode and the cathode; wherein anion exchange membrane is characterized by anion conductivity and the cathode is in ionic communication with the anode via the anion exchange membrane;
a catholyte in contact with the cathode and the anion exchange membrane, the catholyte comprising dissolved $CO_2$ and $HCO_3^-$ anions and/or $CO_3^{2-}$ anions; and
an anolyte in contact with the anode and the anion exchange membrane, the anolyte comprising dissolved $CO_2$ and $HCO_3^-$ anions and/or $CO_3^{2-}$ anions;
delivering the $CO_2$ gas to the first side of the gas-diffusion membrane such that the $CO_2$ gas diffuses through the gas-diffusion membrane to the electrocatalyst layer;
reducing the $CO_2$ gas at the electrocatalyst layer to produce at least one product gas at the electrocatalyst layer, the at least one product gas having a composition comprising at least two carbon atoms ($C_{\geq 2}$); wherein the organic material increases a selectivity for the at least one product gas with respect to reducing the $CO_2$ gas at the electrically conductive catalyst free of the organic material;
forming $CO_2$ in the anolyte according to reaction Eq. 1 and/or reaction Eq. 2:

$$H^+ + HCO_3^- \rightarrow CO_2 + H_2O \quad \text{(Eq. 1) and/or}$$

$$2H^+ + CO_3^{2-} \rightarrow CO_2 + H_2O \quad \text{(Eq. 2); and}$$

removing the at least one product gas from the gas-diffusion membrane; and
wherein each of the anolyte and the catholyte comprises a carbonate and/or bicarbonate electrolyte saturated with $CO_2$.

19. The electrolytic system of claim 1, wherein $HCO^{3-}$ anions are generated in the catholyte by consuming $CO_2$, and wherein $HCO^{3-}$ anions are consumed in the anolyte to generate $CO_2$.

20. The electrolytic system of claim 1, wherein the $CO_2$ gas is reduced at the cathode to generate at least one product gas and OH⁻, the at least one product gas having a composition comprising at least two carbon atoms ($C_{\geq 2}$); and wherein the OH⁻ generated at the cathode reacts with $CO_2$ in the presence of the catholyte to form the $HCO^{3-}$ anions and/or the $CO_3^{2-}$ anions in the catholyte according to reaction Eq. 3 and/or reaction Eq. 4:

$$CO_2 + OH^- \rightarrow HCO_3^- \quad \text{(Eq. 3) and/or}$$

$$CO_2 + 2OH^- \rightarrow CO_3^{2-} + H_2O \quad \text{(Eq. 4)}.$$

21. The electrolytic system of claim 1, wherein an oxygen evolution reaction occurs at the anode according to reaction Eq. 5 to generate the H⁺ required in Eq. 1 and Eq. 2:

$$2H_2O \rightarrow O_2 + 4H^+ + 4e^- \quad \text{(Eq. 5)}.$$

22. The electrolytic system of claim 1, wherein each of the anolyte and the catholyte has a neutral pH.

23. The electrolytic system of claim 1, wherein each of the anolyte and the catholyte is not an alkaline electrolyte.

24. The electrolytic system of claim 1, wherein each of the anolyte and the catholyte is characterized by a pH selected from the range of 5.6 to 8.4.

25. The electrolytic system of claim 1, wherein each of the anolyte and the catholyte comprises at least 0.1 M of the carbonate and/or bicarbonate electrolyte.

26. The electrolytic system of claim 1, wherein the carbonate and/or bicarbonate electrolyte is $KHCO_3$ and/or $KCO_3$, respectively.

27. The electrolytic system of claim 1, wherein each of the anolyte and the catholyte independently comprises at least 0.1 M $KHCO_3$, is characterized by a pH selected from the range of 5.6 to 8.4, and is saturated with dissolved $CO_2$.

28. The electrolytic system of claim 1, wherein the catholyte and/or anolyte comprises a concentration of dissolved $CO_2$ greater than a solubility limit of dissolved $CO_2$ in 1 M KOH at otherwise equivalent conditions.

29. The electrolytic system of claim 1, wherein the catholyte and/or anolyte comprises a concentration of $HCO^{3-}$ anions greater than a solubility limit of $HCO^{3-}$ anions in 1 M KOH at otherwise equivalent conditions.

30. The electrolytic system of claim 1, comprising a first gas volume adjacent to the first side of the porous gas-diffusion membrane; wherein $CO_2$ is humidified and the humidified $CO_2$ is provided to the first gas volume.

31. The electrolytic system of claim 1, wherein each oligomer is independently according to formula FX12:

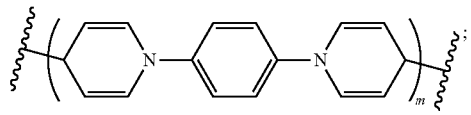

(FX12)

wherein m is 2, 3, or 4; and wherein the electron conducting catalyst comprises copper and each oligomer is independently attached to copper via physisoprtion.

32. An electrolytic system for electrochemical reduction of carbon dioxide, the system comprising:

an anode;

a cathode in electrical communication with the anode, the cathode comprising:

a first current collector;

a porous gas-diffusion membrane having a first side and a second side; wherein the porous gas-diffusion membrane is permeable to $CO_2$; and an electrocatalyst layer adjacent to the second side of the gas-diffusion membrane and in electrical communication with the first current collector; the electrocatalyst layer comprising:

an electrically conductive catalyst; and a selectivity-determining organic material attached to at least a portion of the electrically conductive catalyst; wherein:

the organic material is formed of a plurality of oligomers;

each oligomer comprises a plurality of covalently bonded base units; and each base unit comprises at least one heterocyclic group having at least one nitrogen in its ring structure;

an anion exchange membrane adjacent to the electrocatalyst layer and positioned between the anode and the cathode; wherein anion exchange membrane is characterized by anion conductivity and the cathode is in ionic communication with the anode via the anion exchange membrane;

a catholyte in contact with the cathode and the anion exchange membrane, the catholyte comprising dissolved $CO_2$ and $HCO_3^-$ anions and/or $CO_3^{2-}$ anions; and an anolyte in contact with the anode and the anion exchange membrane, the anolyte comprising dissolved $CO_2$ and $HCO_3^-$ anions and/or $CO_3^{2-}$ anions;

wherein each of the anolyte and the catholyte is not an alkaline electrolyte and/or wherein each of the anolyte and the catholyte is characterized by a pH selected from the range of 5.6 to 8.4; and wherein each of the anolyte and the catholyte comprises a carbonate and/or bicarbonate electrolyte saturated with $CO_2$.

* * * * *